US005566134A

United States Patent [19]

Dufault

[11] Patent Number: 5,566,134

[45] Date of Patent: Oct. 15, 1996

[54] DIGITAL COMPUTER ALGORITHM FOR PROCESSING SONAR SIGNALS

[75] Inventor: Robert A. Dufault, Roseville, Minn.

[73] Assignee: Lockheed Martin Corporation, Bethesda, Md.

[21] Appl. No.: 252,930

[22] Filed: May 4, 1972

[51] Int. Cl.[6] .............................. H04B 1/06

[52] U.S. Cl. .............................. 367/135; 367/901

[58] Field of Search .............................. 444/1; 340/5 R; 324/77 A, 77 B, 77 C; 367/135, 901

[56] References Cited

U.S. PATENT DOCUMENTS

| | | | |
|---|---|---|---|
| 3,425,032 | 1/1969 | Bobrin | 340/850 |
| 3,656,097 | 4/1972 | Massa | 367/135 |
| 3,717,812 | 2/1973 | Hirsch | 324/76.22 |

*Primary Examiner*—Daniel T. Pihulic
*Attorney, Agent, or Firm*—Glenn W. Bowen

[57] ABSTRACT

An algorithm for detecting and tracking dynamically-related sets of unstable passive sonar signals is disclosed. The algorithm detects, enhances, tracks and displays both stable and unstable passive sonar signals, while organizing them into dynamically-related groups. The algorithm is implemented as part of a general purpose digital computer/ peripheral system that performs:

- power spectrum analysis on the segmented time-waveform from the hydrophone,
- processing of the spectra for detection and enhancement of the signal by the novel algorithms of the present invention and other methods,
- formatting and displaying of the detected and enhanced signals.

The algorithm of the present invention (the ABT, or Automatic Band Tracking algorithm) detects persistent signals having related features by means of correlation and enhances by mathematical integration (or smoothing) of the detected signals. Signals belonging to several unrelated sets may be processed by successive ABTs with each ABT simultaneously displaying its processed portion of the total signal-content, while removing precisely that signal from the spectrum to which the succeeding ABTs are assigned.

8 Claims, 18 Drawing Sheets

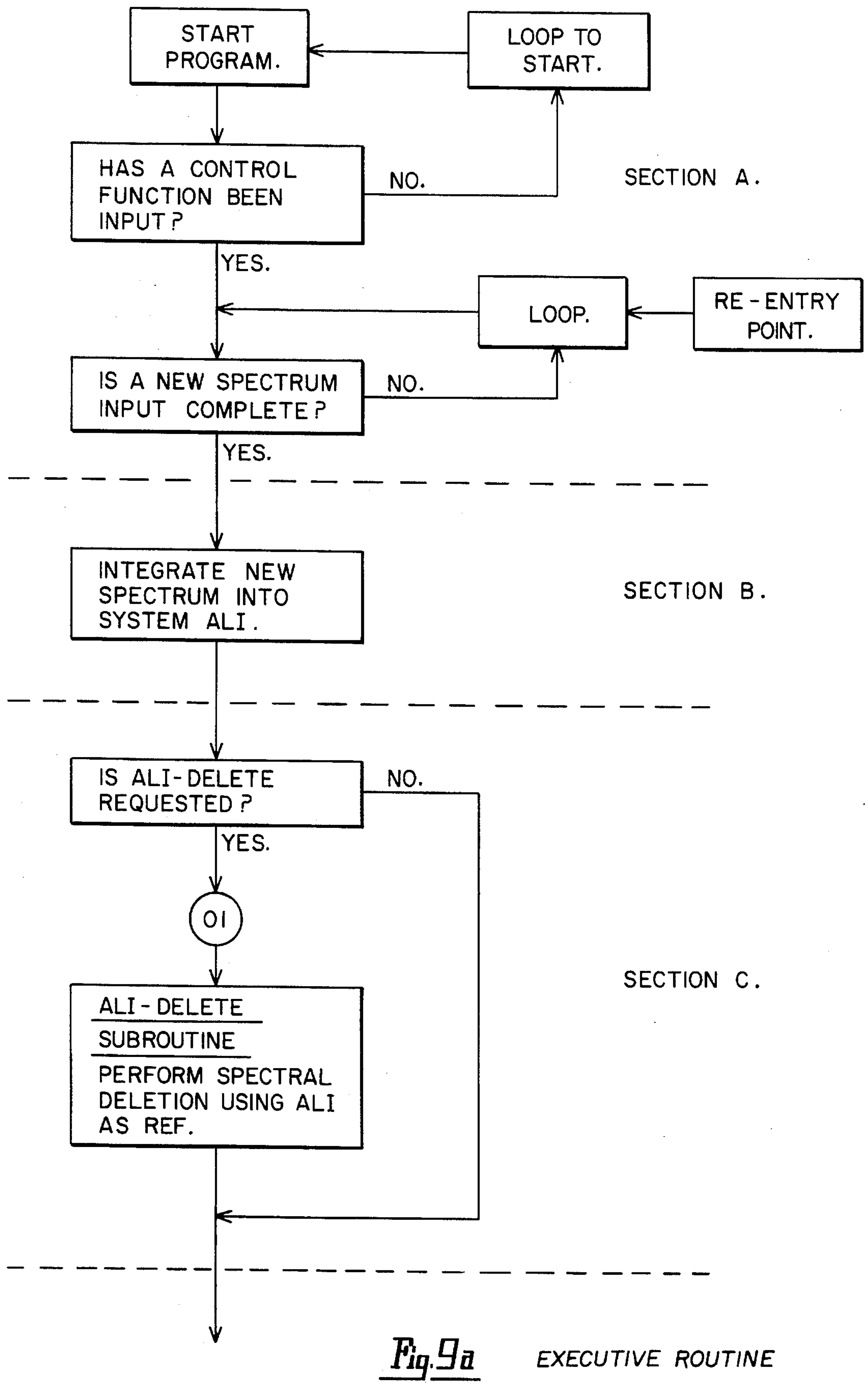
Fig. 9a EXECUTIVE ROUTINE

DELETE SUBROUTINE

ABT MODULE ROUTINE

CORRELATION-COMPUTATION SUBROUTINE

DIGITAL COMPUTER ALGORITHM FOR PROCESSING SONAR SIGNALS

BACKGROUND OF THE INVENTION

Prior art sonar signal processing has utilized several techniques to process the sonar signal to provide the desired detection, enhancement and classification functions. Such prior art techniques have included a system in which the sonar signal is time-segmented, with each time-segment then being digitized, frequency analyzed, converted to a power-vs.-frequency input spectrum and then inspected for persistent features which persistent features are assumed to be the result of naval-vessel-originated sound waves. The resulting persistent features or signal patterns are typically displayed upon a CRT display system for visual analysis.

One technique has been to threshold successive input spectra as derived from the contiguous or successive time-segments. This technique permits the processing operation to follow the persistent features of each input spectrum as they vary in frequency and to provide the resulting line-sets from the successive input spectra as frequency-varying lines on a display device. However, thresholding to delete the obfuscating noise signals must be set at a high level whereby certain persistent features may be deleted along with the noise unless such persistent features have a power level much higher than that of the average noise power level. Additionally, such technique does not take advantage of the fact that such persistent features may occur in the successive input spectra, or have counterparts across the spectrum, whereby the persistent features could be enhanced with intensity with respect to the noise signal.

Another technique has been to perform Automatic Line Integration (ALI) upon the input spectra. This ALE process consists of dividing each of the input spectra into a plurality of like frequency bins and then integrating the power over the spectra of the like time-segments for each bin. However, such technique does not permit the processing operation to follow the persistent features of each input spectrum if the persistent features vary in frequency over a number of successive input spectra. Thus, in those input spectra having sever line-instability, i.e., whether persistent features of successive input spectra vary in frequency with respect to each other, such ALI technique degrades signal enhancement and further is unable to provide much information on any line-instability that may be present in the input spectra.

SUMMARY OF THE INVENTION

The algorithm of the present invention overcomes the deficiencies of the above prior art methods of utilizing one or more Automatic Band Trackers (ABTs) which track or follow the input-spectrum as it varies in frequency. The ABT compares the input-spectrum to the first reference spectrum by moving the first reference spectrum about an estimated center on the input spectrum to determine a maximum correlation therebetween. If a correlation coefficient above a set level is detected the first reference spectrum is assumed to be contained in the input spectrum whereupon the first reference spectrum is deleted from the input spectrum. This input spectrum, less the deleted first reference spectrum, is then transferred through the cascaded ABTs, each ABT operation upon its respective input spectrum comparing it to a new and different reference spectrum. The input spectrum, after passing through the cascaded ABTs and having had all the detected signals deleted therefrom, is integrated by an Automatic Line Integration (ALI) process to form an integrated remnant spectrum. This integrated remnant spectrum may then be used as a reference spectrum to initialize an ABT when it is called to track a new input spectrum. The detected signal patterns or reference spectra are then thresholded to eliminate the smoothed noise and the resulting signal peaks, plotted as a power-vs.-frequency Lofargram, are displayed upon a display device for visual analysis.

TABLE OF CONTENTS

BACKGROUND Page 5
TERMINOLOGY Page 16
HARDWARE IMPLEMENTATION Page 21
SOFTWARE IMPLEMENTATION Page 29
ABT access control routine Page 31
ABT module routine Page 32
Display routine Page 39
PROGRAM DETAILS Page 39
Program specification Page 39
Machine listing Page 39

DESCRIPTION OF THE PREFERRED EMBODIMENT

Background

The invention described herein relates to a passive acoustic signal processing algorithm applied to the analysis of noisy, passive sonar sounds or pressure waveforms as picked up by hydrophones. The source of these sounds is assumed to be rotating machinery of various types aboard naval vessels; these machinery-generated sounds are termed, for the purpose of sonar processing, the "signal". The characteristic signal pattern formed when the sounds emanating from a particular vessel are frequency-analyzed is termed the "signature" of the vessel. The hydrophones also pick up non-machinery-generated sounds arising naturally in the ocean and having their origin in natural phenomena such as ocean waves, rain and storms, marine creatures, etc. The cumulative sound arising from these natural sources is, for the purpose of sonar processing, termed "noise". It is among the functions and capabilities of the present invention as described herein to accept the electrical representation of the sound waves collected in the water by the hydrophones and process the resulting waveform to determine the presence (detection-function), form (enhancement-function) and nature (clue-extraction-function) of the signals, or signature.

The class of passive sonar analyzers of which the present invention is a member, being their processing operations with a frequency-analysis of the hydrophone signal. This is done by segmenting the time-vs.-voltage record of the hydrophone signal into contiguous (or overlapping) time-segments of, for example, one-second each, and performing a frequency analysis of each time-segment to produce the spectrum, i.e., power-vs.-frequency distribution, of that time-segment. This type of analysis is well known and may be accomplished in different ways as, for example, by a filter-bank of shoulder-to-shoulder analog filters, or by a digital process such as the Fast Fourier Transform, i.e., the spectrum of each time-segment. In either case, the output of the frequency analyzer may be thought of as a series of numbers, or coefficients, ordered from low to high frequency, describing the amount of power at each frequency during that particular time-segment. There is nothing in the appearance of any one coefficient that indicates what portion thereof is due to signal and what is due to noise. See FIG. 1.

Figure 1:
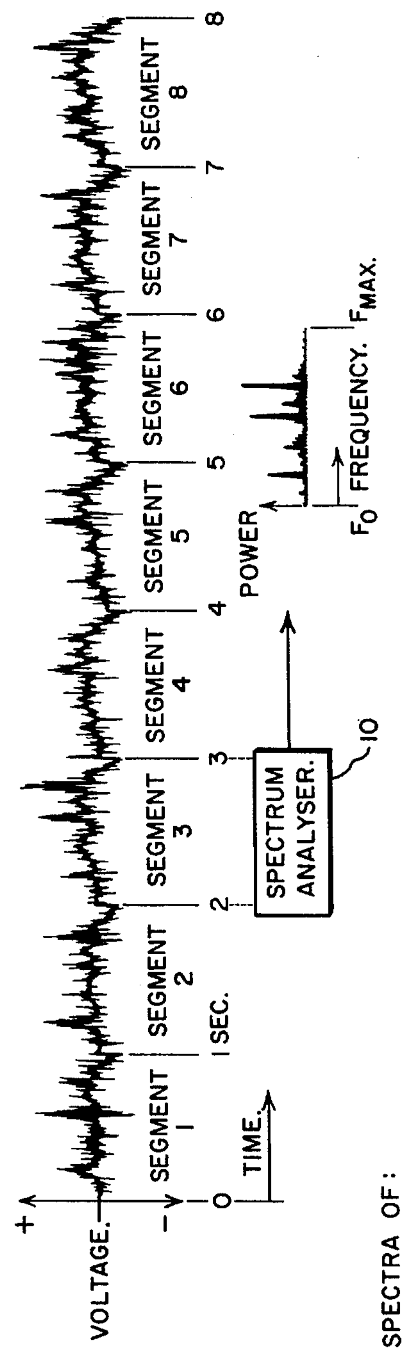
FIG. 1 is an illustration of a time-vs.-voltage record of an exemplary hydrophone signal that is segmented into 8 contiguous time-segments.

The output of the hydrophone illustrated in FIG. 1 is a voltage that varies with time, and it contains contributions from machinery-generated and non-machinery-generated sources. This time signal is segmented into a plurality of contiguous time-segments of, e.g., one second duration. Each time-segment is then analyzed into the frequency components that existed during that time-segment. Time-segment 3 is illustrated as being analyzed by spectrum analyzer 10. The frequency analysis yields the power in each 1 HZ frequency increment from 0(DC) to $F_{max}$, when $F_{max}$ might be, e.g., 500 HZ. The resulting graph of power-vs.-frequency for that time-segment is called the spectrum for that time-segment.

The frequency coefficients are often displayed as a cartesian coordinate system with increasing X representing frequency, increasing Y representing time associated with the spectra of successive time-segments. The Z-axis is simulated by intensity, and such intensity represents the magnitude of each coefficient. Such an ordering of power-spectrum coefficients is known variously as a frequency-vs.-time display, or a Lofargram. On such a presentation, the sea noise, taken alone, has a random appearance. Coefficients grouped by either frequency or time have a nearly gaussian or bell-shaped, distribution about the local average and a high variance with respect to that average. The noise is said to be an a periodic process and therefore exhibits no clean structure on a frequency-vs.-time plot.

Figure 2:
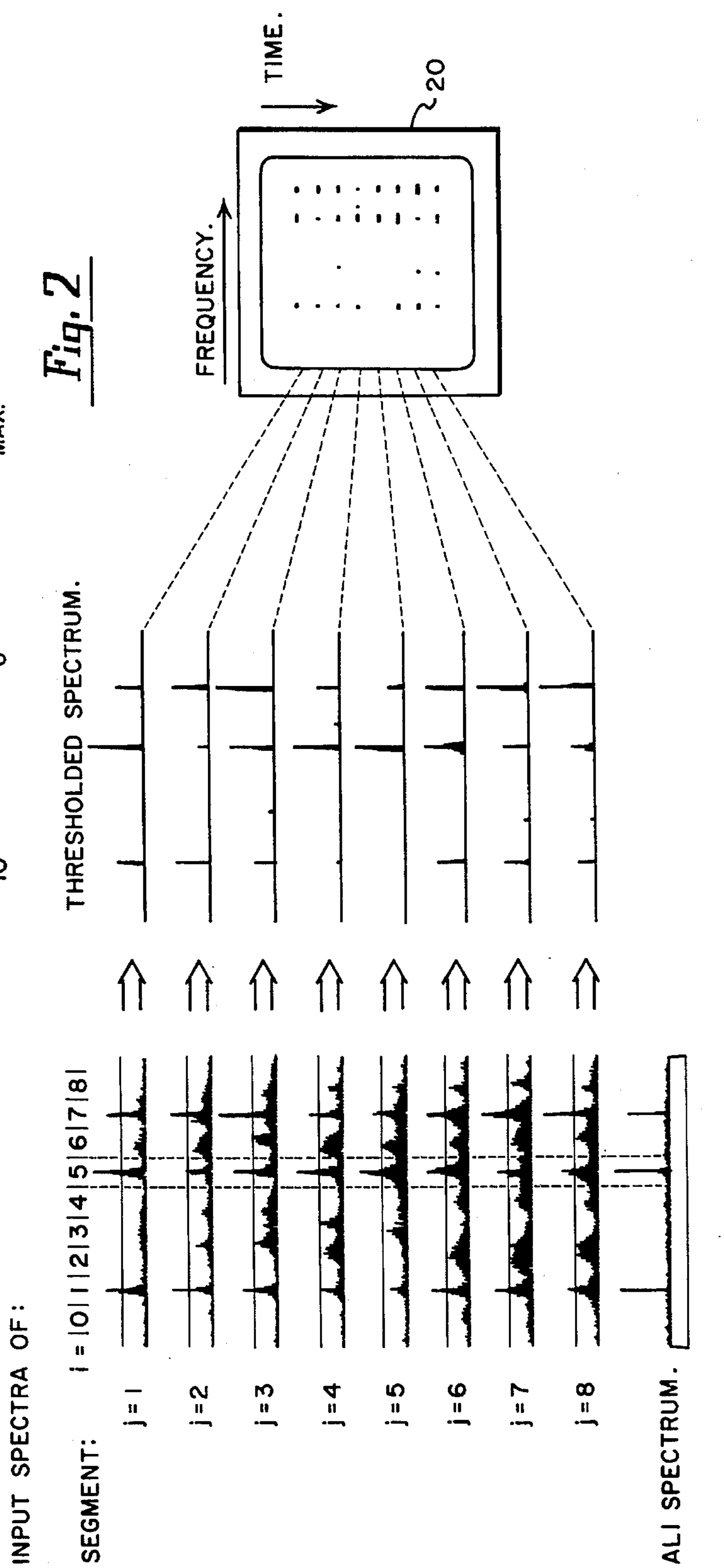
FIG. 2 is an illustration of the time-segments of FIG. 1 arranged in increasing frequency $F_0$-$F_{max}$ aligned vertically, thresholded and then displayed as Lofargrams.

The spectra of the time-segments 1 though 8 of FIG. 1 are illustrated in FIG. 2 as being arranged with increasing frequency $F_0$-$F_{max}$ aligned vertically. The spectra are thresholded to eliminate as much of the noise as possible to display the signal-peaks or persistent features of the thresholded spectra as illustrated in FIG. 2. Because of the high noise level and the resulting necessary high threshold level to eliminate most of the noise, some signal-peaks may be missed by the detection threshold while, conversely, some high level noise-peaks may be displayed.

On the display 20 of FIG. 2 the persistent features or signal-peaks that are detected in several consecutive spectra take on the appearance of "lines". These vertical lines, if from machinery-generated sources, may form harmonic and dynamically related sets. The persistent-feature pattern from a specific machine is called its "signature". The magnitude of each persistent feature, i.e., each spot, in the thresholded spectra is represented on the display 20 by its intensity.

A truly periodic process or device, such as a well-designed electrically-driven tuning fork, produces a sound wave which, when analyzed as above, would appear as a unwavering line of constant power and frequency extending along the direction of the time axis. In passive sonar terminology, such a signal would be termed a "stable line", or stable frequency. Even if mixed with noise, it would still be easily detectable, providing its average power were three or four times greater than the noise variance. See FIG. 3*a*.

If the signal-power, in relation to the noise-power variance, is less than this, then a technique known as fixed-frequency integration, or Automatic Line Integration (ALI) may be used. This ALI technique is based on the principle that, if the members of a population having a gaussian distribution, with some average and standard deviation, are averaged in sub-groups, the small averages will tend to cluster about the central average with a smaller standard-deviation than the original population exhibit. In passive sonar, the "population" consists of the power-spectrum coefficients grouped in various ways. The ALI technique consists of averaging together the coefficients representing a particular frequency for a group of contiguous time-segments; making a separate average over the same time-span for each frequency. For those frequencies containing contributions from noise only, the frequency averages will tend to cluster around the overall noise average, with a reduced variance. At the frequency of the stable signal, the average of the coefficient will cluster around the value of signal power plus the average noise power. Since this value is now much greater than the reduced noise-variance, the signal is again easily detectable. See FIG. 2.

With particular reference to FIG. 2 there is illustrated a set of 8 spectra with their like frequencies vertically aligned. Remembering that each spectrum is actually a set of ordered discrete outputs, i.e., a graph of power amplitude for each frequency cell or bin i, let any spectral element be defined as $S_{ij}$=the power in the ith frequency cell or bin when analyzing time-segment j.

Any one spectrum is then a set over i for a fixed j. For example, the spectrum of segment 1 is $$[S_{0,1}, S_{1,1}, S_{2,1}, \ldots S_{i,1}, \ldots S_{500,1}]$$

and that for segment 5 is $$[S_{0,5}, S_{1,5}, S_{2,5}, \ldots S_{i,5}, \ldots S_{500,5}].$$

The ALI-spectrum is derived by summing, column-by-column, over a number of spectra. Thus, an element of the ALI-spectrum $$A_i = \sum_j S_{i,j}$$

for, e.g., $j$ = 1–8 with elements $A_0$ to $A_{500}$

A so-called "moving window" ALI is used where the sums are updated with each new spectrum while the oldest spectrum in the sum is removed. Then $A_i$ becomes dependent on j as well and is written $$A_{ij} = \sum_{j=j}^{j=7} S_{ij}$$

and the jth ALI is the set of sums $$[A_{ij}]=[A_{0,j}, A_{1,j}, \ldots A_{i,j}, \ldots A_{500,j}]$$

with the implication that the sum is over the last 8 spectra. For example, the 40th element is in the ALI shown (j=8) is $$A_{40,8} = \sum_{j=8}^{1} S_{40}, j = [S_{40,8} + S_{40,7} + \ldots + S_{40,1}]$$

while the corresponding element in the next ALI is $$A_{40,9} = \sum_{j=9}^{2} S_{40,h} = [S_{40,9} + S_{40,8} + \ldots + S_{40,2}]$$
$$= A_{40,8} + A_{40.7} + \ldots + A_{40,1}$$

The ALI'd Lofargram has the updated ALI spectrum displayed rather than the spectrum for the current time-segment.

Figure 3A:
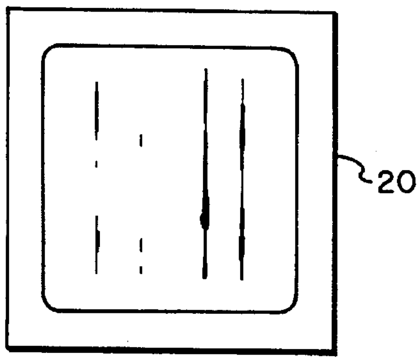
FIGS. 3*a* and 3*b* are illustrations of the Lofargrams of sets of stable and unstable lines, respectively.

As the spectra are paced more densely on the Lofargram display, the signal-peaks appear in FIG. 3a to be continuous, and are referred to as "lines". If the lines are straight, as shown here, i.e., not varying in frequency, they are referred to as "stable lines". Weaker lines may fade below the threshold or detection level for a time; this appears as gaps in line continuity. Background "snow" is due to randomly detected noise-peaks.

The sounds emanating from typical rotating and/or reciprocating machinery belong to a group sometimes described as "almost periodic". A well-oiled, perfectly balanced shaft, turning at a constant rate, would produce a signal resembling that of the tuning fork, if indeed it produced any sound at all. Typical machinery, however, is somewhat out of balance. It squeaks, is driven perhaps by other machinery by means of gears which in their meshing produce a train of impulse functions at an imperfect rate, and which derive their ultimate power from a series of not-quite-uniformly spaced chemical explosion.

Figure 3B:
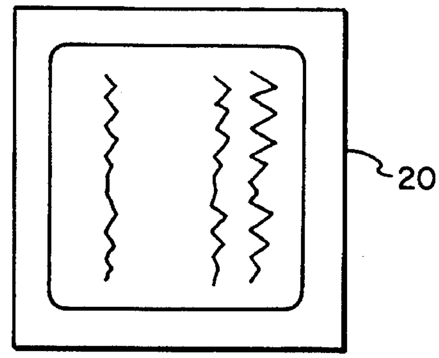

The signature of signal-pattern from one such source will appear as a series of harmonic sets, with fundamentals at multiples of the basic rotation-rate. Because of varying reinforcement from impulse functions associated with the rotation rate, resonance patterns and "transmission windows", not all harmonics will be equally evident. Furthermore, irregularities in the basic rotation-rate will cause the fundamental to oscillate in frequency about the average rate. This "motion" on the frequency-vs.-time display will be evident in all harmonics, and in fact will be equal to the harmonic number multiplied by the fundamental frequency of that set. Each harmonic, while more or less resembling a line, will contribute power to different frequency cells at different times. It is important to note that while these frequency shifts may appear random for any one harmonic, they are strictly correlated for all members of that harmonic family; when one shifts, all shift in the same direction and with rates and displacements strictly proportional to their harmonic number. Furthermore, if a number of harmonic sets are ultimately generated by the same prime mover, driving through a fixed linkage, all members of all sets will have strictly proportional dynamics even though not having harmonic spacing. Examples are the harmonic sets from two shafts geared or chained together and driven from a common shaft, gear or motor. FIG. 3b illustrates a Lofargram of such a set. Note that the three lines form a dynamically-related line-set with displacement proportional to center frequency.

Suppose the signal pattern of FIG. 3b is mixed with noise to the extent that ALI might be used in an attempt to render it more discernable (detectable). The variance of the noise power will be reduced and will tend toward the average, as usual. The signal pattern, since it is varying ion frequency and therefore forms an unstable line, will not contribute all of its power to the summation along any one frequency. Because of this fact its power will tend to average out over a number of contiguous frequencies and it will not, in general, be much more detectable than before. There may not be any less total signal power than for the equivalent stable lines, but the form of the signal renders the ALI technique inappropriate.

If it were known at what frequency the energy for that line would occur in each spectrum, and if a set of integrators could be shifted back and forth along the frequency axis to match the signal-position each time before integration, thus performing integration along the signal path, the signal power would sum as before, and detection and enhancement would occur as with the stable signal.

This is, in effect, what is accomplished within the ABT (Automatic Band Tracking) module of the present invention. An approximation to the signal pattern is correlated with the input spectrum at several positions centered about the expected, or average, signal pattern position. The position of maximum correlation is taken as the best indication of signal pattern position. The ALI integrators are then shifted to that position and integration takes place. The contents of the integrators, besides serving as the "enhanced signal", become the next approximation used in the correlation process. This bootstrapping process quickly converges to a practically valid representation of the signal pattern, and the signal pattern position is accurately identified. The initial approximation to the signal pattern is taken from the fixed-frequency integrators.

The signal-pattern consists of the total number of dynamically-related signal pattern components over that portion of the successive spectra to which the ABT module is addressed. The important features of this signal pattern are the magnitudes (powers) and relative separations in frequency of each component. In any one input-spectrum this signal pattern will be badly corrupted by noise. The noise particularly corrupts the magnitudes, to the extent that weaker components may not be evident at all. The content of the ALI module may be thought of as an approximation to the signal pattern in which the magnitude-distortion is not as great but in which frequency (separation) distortion is also present. The Automatic Band Tracking algorithm of the present invention, using the ALI pattern as an approximation to the signal pattern, produces a more refined approximation to the signal pattern, with less frequency and magnitude distortion than the ALI pattern. Still, it is yet another approximation to a pattern which cannot be known exactly. In particular, since there will always be a residual noise level and variance, there may be elements to the signal pattern that are not obvious as they are small enough to be masked by the residual noise variance. For this reason, the entire ABT reference (buffer) is taken as the signal pattern, even though the power represented in most of its bins is due to noise along. ABT module tracking performance depends on the total power available in all components of the signal pattern. The more such components are available, the less power there need be in each for acceptable tracking performance. Only a few such components need be present in the signal pattern (and in the input spectrum, i.e., the reference pattern must be current and valid) in order that the technique of the present invention be more powerful in the detection of any one component of the signal pattern set than any other method of passive sonar signal processing known to the inventor.

The automatic detection feature of the present invention is implemented by simply keeping track of the strength of correlation over several spectra. One may be sure that if several correlations occur at a level of high significance a signal is present with a very low probability of false-alarm (i.e., false-target indication). Nothing need be known a priori about the nature of the signal pattern for this to occur.

In practice, one may find several different signal patterns present in the same portion of the input spectrum. These may originate from different types of machinery on the same vessel, or from different vessels. The motions of different sets of signal patterns will, in general, not be correlated. In these circumstances,the ABT module will acquire and track the signal pattern having overall the most power. If several ABT modules were assigned to the same band width, all would select the same (and strongest) signal pattern in the absence of some sort of lock-out arrangement.

The technique of the present invention that is used to ensure that all lines and line-sets in a given part of the spectrum will be tracked is called the Deletion technique. This technique, which is described in detail below, performs an inverse cross-multiply between each input spectrum and ABT reference pattern (or in some applications, the ALI reference) which results in an efficient removal of the line-set being tracked by that ABT from the input spectrum seen by the remaining ABTs. Since this feature is associated with each ABT, the ABTs may be cascaded, each picking up the strongest remaining line or line-set and causing a minimum of perturbation to the remaining signal patterns, until the performance limit of the ABT process is reached, or until there are no more lines to acquire. At the conclusion of the ABT processing for each spectrum, the "remnant" spectrum (original input spectrum, less any lines or line-sets being tracked) is integrated, using ordinary ALI, into an integrated remnant buffer. The ABT control draws upon this buffer, the "remnant-ALI buffer", for the initialization of new ABTs, to ensure that the new reference will not contain signal patterns (or line-sets) already accounted for by an ABT.

The enhanced signal patterns from the ABTs, as contained in each ABT reference buffer, are used in several ways. First, they are displayed-thresholded and combined into a common CRT display system which displays all lines being tracked; such lines are essentially noise-free. The position of individual lines in the ABT reference pattern, taken together with the reference-position at maximum correlations can be fed to a relatively simple form of harmonic-relate algorithm for fundamental-frequency determination. Note that since the ABT algorithm guarantees that any lines that are significantly displayed are dynamically related lines, of which the harmonically related lines are a major subset, the harmonic-relate process reduces to a rather simple task. Furthermore, the positions for maximum correlation over a long time history may be saved at little expense in storage, for further dynamics-analysis on that line-set. Such analysis may include extraction of the dynamic-spectrum, or a variety of probability statistics.

Terminology pressure waveform—total energy in the water, composed of contributions from energy sources of interest (which produce "signals") and energy sources not of interest which interfere with the identification of the "signals", and whose contributions are called "noise".

(time vs.) voltage waveform—a pressure waveform which has been converted to a time-varying voltage by the transducer (hydrophone).

signal—that part of the waveform due to the object of interest, whether in the pressure waveform, voltage waveform, or spectrum.

noise—that part of the waveform due to sources not of interest, and which contaminate the "signal" portion of the waveform, again whether in the pressure waveform, voltage waveform, or spectrum.

transform—a mathematical technique for re-partitioning or organizing a distribution implied by a functional mathematical relationship. As applied to passive acoustic analysis, a technique for reorganizing the energy in the sound wave as a function of time, to an organization as a function of frequency, or vice versa.

domain, time-domain, frequency-domain—a term implying the parameter of organization in the above definition. In the time-domain, signal energy is described as a function of time, in the frequency-domain, as a function of frequency and phase. There are other domains: e.g., the cepstral domain, which organizes as a function of signal-periodicity in the frequency-domain. In current examples, various domains are interrelated by the orthogonal Fourier transform.

time-segment—in the time-domain, a section of signal bounded by any two moments in time (say, $T_1$ and $T_2$, that is, a time interval) and described within that interval.

Frequency band—the frequency-domain analog of a time-segment. A frequency segment bounded by frequencies $F_1$ and $F_2$ and described within that interval. A section of a frequency spectrum.

frequency spectrum—the frequency-domain description of a time domain signal. An ordered series of numbers describing the power, amplitude, and phase in a signal, ordered by increasing frequency.

frequency—for period functions of time, the rate at which the function oscillates.

lines—in a plot of frequency vs. time vs. power, a signal whose representation is more or less continuous from spectrum to spectrum and with a tendency to persist in the neighborhood of some constant frequency.

line-sets—groups of lines whose dynamics (excursions about mean-frequency) are correlated.

harmonic-sets—as above, with the additional restriction that their spacing in the frequency-domain occurs in multiples of some basic (fundamental) spacing.

signature—if it exists, the characteristic and persistent pattern formed by the various lines and line-sets due to the signal from some particular object, such as a machine, or an ocean vessel.

frequency pattern—a grouping of lines over some portion of a spectrum persistent from spectrum to spectrum over a significant interval of time. The relative amplitudes and spacings of these lines. Not necessarily a signature, since nothing is implied about the source.

signal-pattern—the frequency pattern of a signal, over some portion of the frequency spectrum. The frequency pattern of a signal is seldom known exactly, but noise-contaminated versions are assumed to exist in the input spectra and in processed (cleaned-up) versions of the input spectra, such as the integrated (ALI) spectrum and the ABT reference.

frequency-coefficient—a number describing the amplitude or power of a waveform at a particular frequency.

ALI-Automatic Line Integration—A method for more easily observing the signal pattern of signals which do not shift to any great extent in frequency, as a function of time. The algorithm which accomplishes this.

ALI buffer—the area in computer memory in which the output of the ALI algorithm is stored, when its input is the original input spectrum.

remnant ALI buffer—the area in computer memory in which the output of the ALI-integration subroutine is stored, when its input is the remnant spectrum from which some portion of the signal has been removed.

ABT (Automatic Band Tracking) algorithm—the method (mathematical equations, philosophy of implementation, concept) by which certain types of signals in the frequency spectra of passive sonar waveforms are detected, enhanced, and tracked through correlated instability.

ABT module—within the working model, the software subroutine which performs the ABT algorithm.

"ABT"—there is only one ABT module. However, in operation, each spectrum is operated upon by the ABT module a number of times. Each time, the ABT module is loaded with different operating parameters, signal histories, signature references, and examines either a different portion of the spectrum, or a different aspect. It therefore performs as though a different identity had been assumed, which is indeed the case. Each "identity", that is, each conjunction of the ABT module with a specific set of parameters, history, data-storage, etc., is called an "ABT". Each ABT has a specific identification number, and may communicate with the external program and the operator through that numerical identity.

correlation—a mathematical process by which two patterns, number-sets, etc., are compared element by element to yield a measure of the degree to which they are alike in an explicit sense.

reference—in the correlation process as incorporated in the ABT algorithm, one of the two number-sets is the input waveform, reduced to a spectrum. It is supposed to contain contributions from a signal. It is the purpose of correlation to determine whether it actually does contain such contributions. This is accomplished by correlating against the pattern known to contain the signal. This pattern is called the reference or reference pattern. The signal pattern is a subset of the reference pattern, providing the reference is valid.

reference buffer—the area of memory containing the reference pattern.

detection—the function of determining whether or not there is a signal present at the input of a receiver, or whether noise only is present. Seldom or never can this decision be made with absolute certainty. There will nearly always be cases where the decision "signal absent" is made when there is a signal, and the decision "signal present" when noise along is present. This latter false or incorrect decision is also known as a "false alarm".

enhancement—the function of separating the signal which has been detected from the noise, and processing it in such a manner that its structure becomes apparent.

information extraction—the function of processing the signal which has been detected and enhanced so as to reduce its structure to mathematical parameters which can be used to quantify and describe the signal.

dynamics—referring to the signal pattern in the frequency-spectra as lines, the term "dynamics" refers to the degree and structure of the line-deviation from straightness, or stability. The quantification of this instability.

cascading—the method of processing by which successive ABTs are made to process the same portion of the input spectrum, with each ABT removing the signal it is tracking from the spectrum set to the next successive ABT.

deletion—the technique, the specific algorithm as described herein, and the subroutine which implements this, are known as the deletion technique, deletion algorithm, and deletion subroutine, respectively. The function of the deletion is to remove the estimate of persistent signal patterns found in the ALI or ABT reference buffers, from the input spectrum seen by remaining processing functions.

signal environment—in whatever medium or domain, the total of other contaminating or distorting influences which are found in conjunction with the signal, e.g., spectral noise-power, propagation losses, etc.

Hardware Implementation

Figure 4:
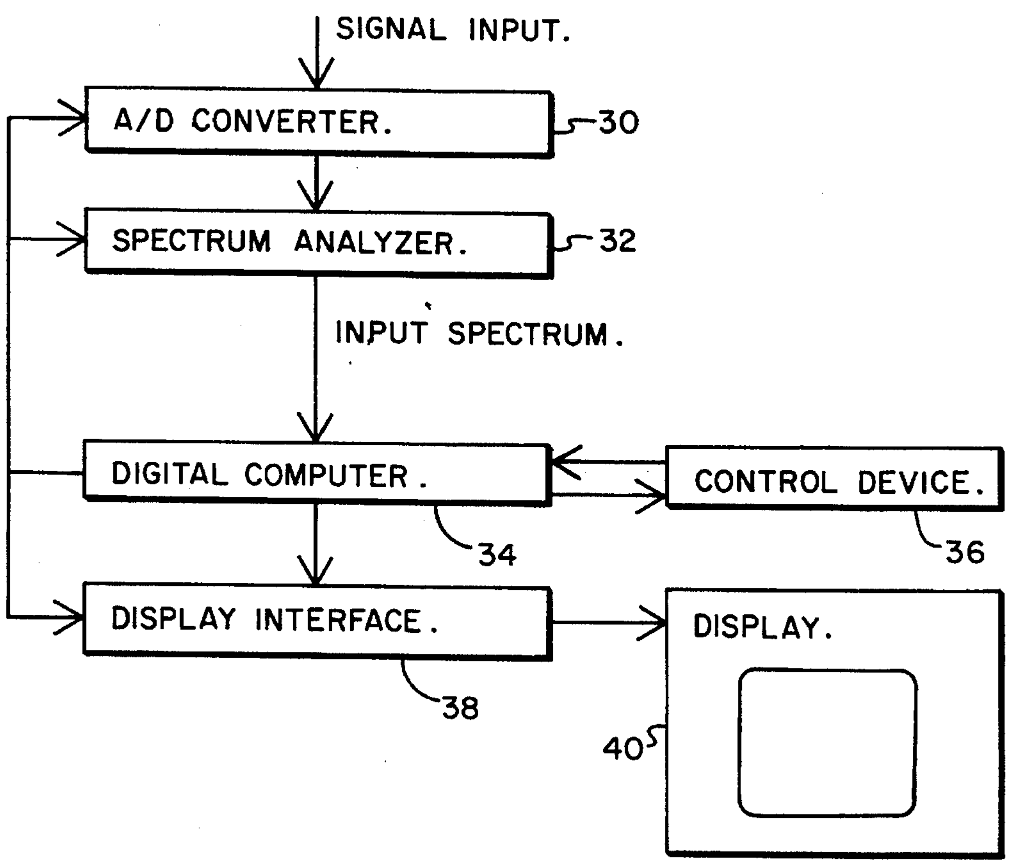
FIG. 4 is an illustration of a block diagram of an overall hardware system implementation of the present invention.

With particular reference to FIG. 4 there is illustrated the block diagram of an overall hardware system implementation of the present invention. The signal input shown is an analog (voltage) signal representing acoustic information from a passive sonar transducer or hydrophone. See FIG. 1. The signal is converted, under computer control, to digital format by an analog-to-digital (A/D) converter 30, then input to a spectrum analyzer 32 for conversion to frequency spectra. (Note: if an analog frequency analyzer is used, the A/D converter would appear between the frequency analyzer and the digital computer rather than at the position shown.) In this illustration, the frequency analyzer is digital and could, for example, be a software Fast Fourier Transform program.

The data, now in appropriate frequency-domain format, passes to the general purpose digital computer 34 which in the inventor's preferred embodiment is a UNIVAC 1616 computer. The resident program or executive routine, including the novel routine and subroutines of the present invention, operates on this data according to commands from an operator-activated control device 36, and performs such tasks as detection, enhancement, and information extraction upon the passive sonar signal. The result of this processing is then output under computer control through a display interface device 38 to the display device 40 in a format meaningful and useful to the operator.

With particular reference to FIGS. 5, 6, 7 and 8 there is illustrated the implementation of the block diagram of FIG. 4 as through the implementation were in terms of hardware modules.

Figure 5:
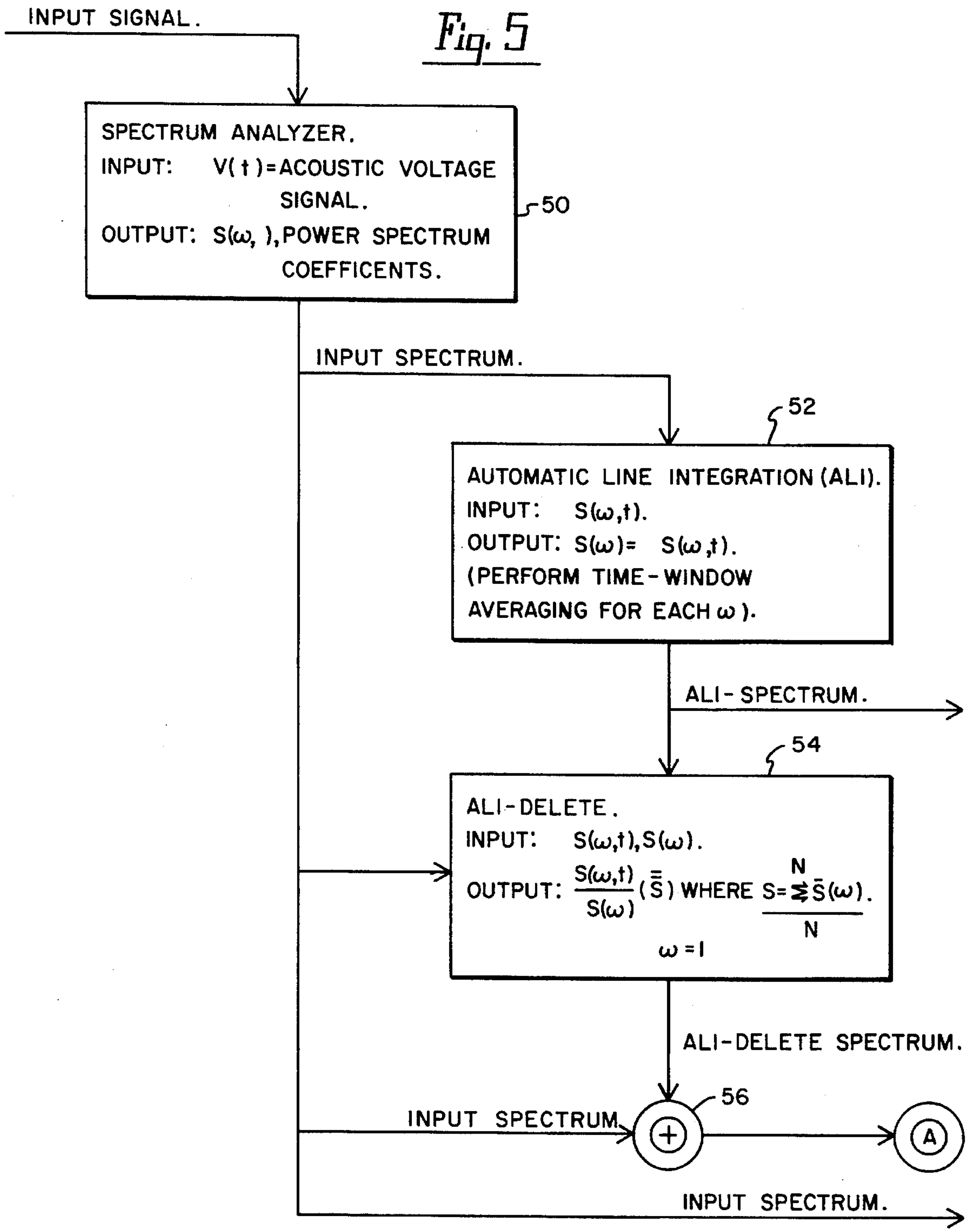
FIG. 5 is an illustration of the front-end processing operation of the present invention implemented in terms of hardware modules.

FIG. 5 illustrates the "front-end" processing operation. The hydrophone (or other acoustic-type) input signal is input to the A/D converter 30, spectrum analyzer 32 represented by block 50. The input signal is a voltage-vs.-time function and is written V(t) to show this functional relationship. This input signal is segmented for purposes of frequency analysis into a plurality of time-segments of T seconds duration each; such time-segments are usually contiguous. Thus, if analysis starts at t=0, the first segment runs from t=0 to t=T, the next from t=T to t=2T, and so on. Each segment is analyzed for its frequency content over a band width pre-filtered to include all frequencies of interest; e.g., from zero (the D.C. component or average voltage) up to some maximum, $F_{max}$. The spectral power S, is thus derived for each frequency, ω. In general, this spectral power is not the same for each segment, and therefore it is also a function of time t. The spectral power is thus written S(ω, t) with one input spectrum consisting of spectral elements from S(D.C., t) to S($F_{max}$, t) for the segment occurring over some time interval (N+1)T-NT.

The input spectrum now passes, in parallel for all bins, to the ALI integrator 52, the ALI-Delete 54, and a decision point 56. The ALI 52 updates a moving-window average of S(ω, t) over t for each frequency ω. This results in a smoothed spectrum-representation containing the persistent features such as stable lines and noise contours. The ALI-Delete 54 accepts inputs from the ALI integrator 52 and the spectrum analyzer of block 50, and inputs a spectrum that is equivalent to the input spectrum but from which the persistent features in the ALI-representation have been removed, i.e., deleted, or substantially attenuated. The decision point 56 is operator controlled and determines whether the input spectrum from the spectrum analyzer of block 50 or the ALI-deleted spectrum from the ALI-Delete 54 passes to the rest of the system, as represented by node A. Input spectrum, ALI spectrum, and ALI-deleted spectrum are all available for display.

Figure 6:
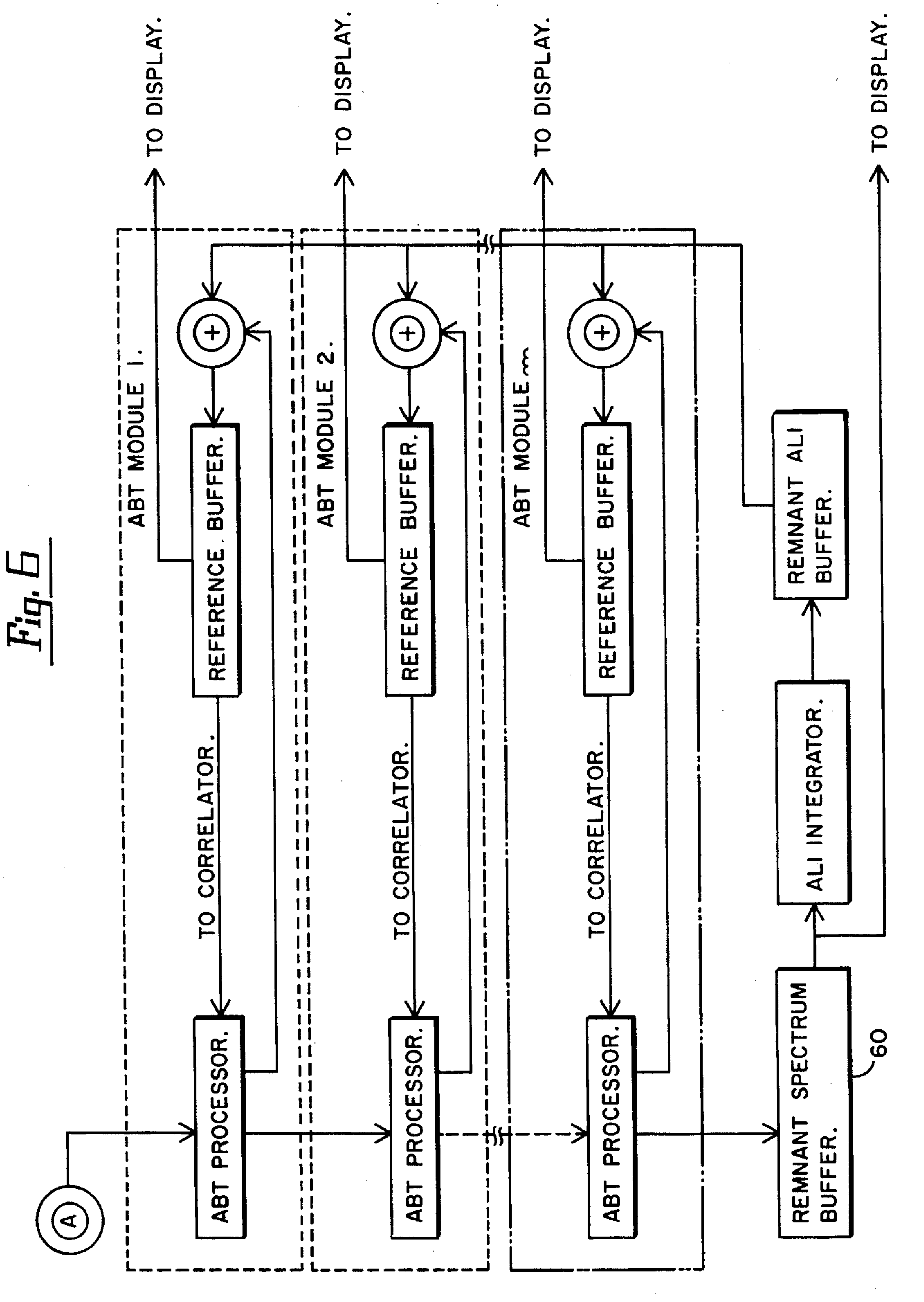
FIG. 6 is an illustration of the Automatic Band Tracking (ABT) processing operation of the present invention implemented in terms of hardware modules.

FIG. 6, beginning with node A from FIG. 5 illustrates the ABT (Automatic Band Tracker) processing block in which the data, or spectrum (input or deleted), passes successively through the ABT modules 1 through m (cascaded) and thence to the remnant spectrum buffer 60. It should be remembered that this is an illustration of a hardware-equivalent representation of a software system and in reality there is only one ABT module, implemented in software, which acts as many ABTs by assuming the "identity", that is, signal, reference and operating parameters for each of the ABTs in turn. In the ABT module, (1, 2, . . . m), detection, tracking and enhancement are performed upon all dynamically related line-sets present, such a set consisting of any lines whose instabilities are correlated. A "set" may in fact consist of one or more lines, stable or unstable, dynamically and harmonically related, or dynamically related only. By means of the cascading-delete feature, by which means a line-set being tracked by an ABT is removed from the input spectrum seen by the remaining ABTs, ABTs operating over the same band width will automatically acquire and track different line-sets. Display outputs are available from the ABTs, and from the final or remnant spectrum from which all ABT signal patterns have been removed.

Figure 7:
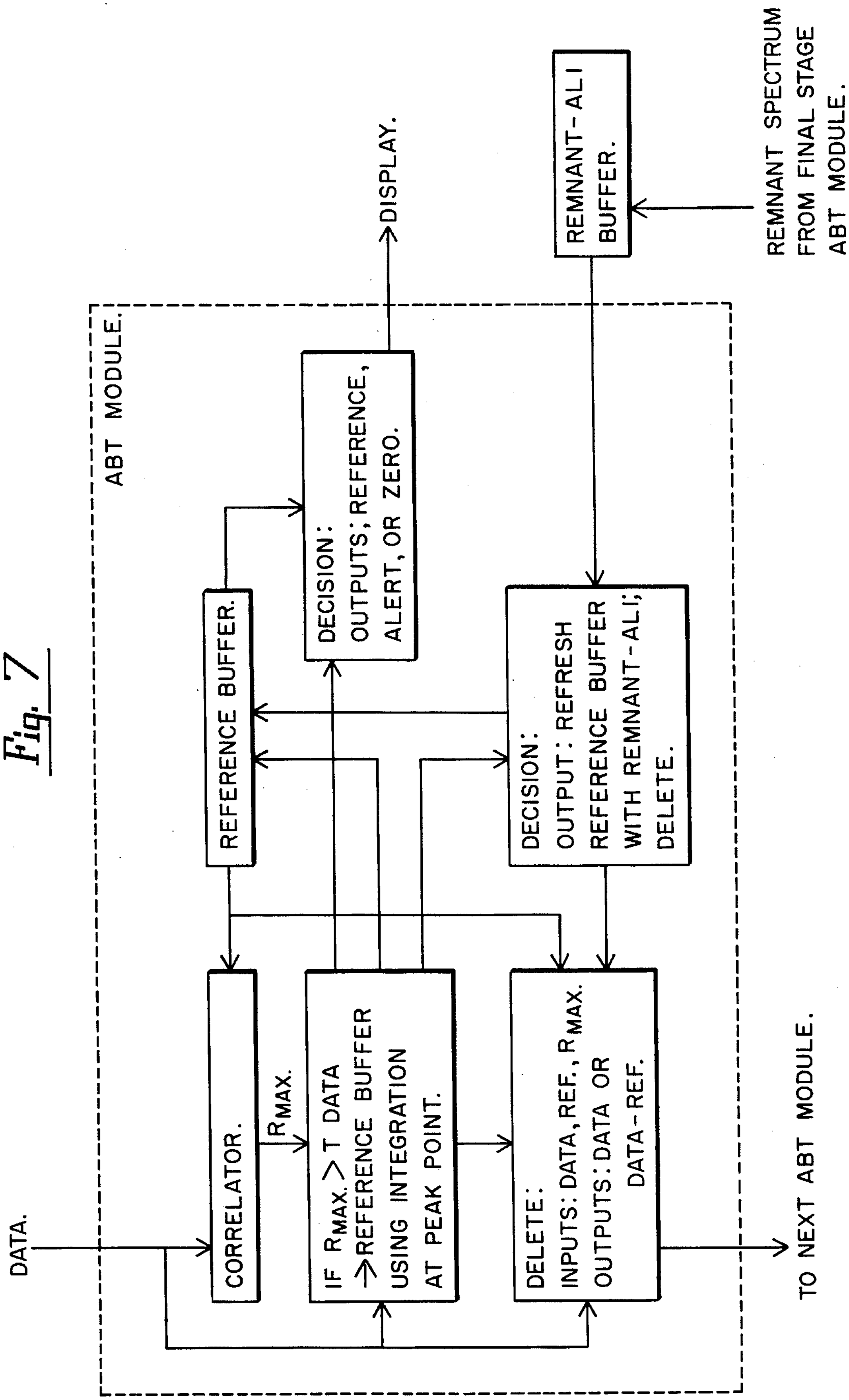
FIG. 7 is an illustration, in more detail, of the ABT modules of FIG. 6.

FIG. 7 illustrates the ABT module of FIG. 6 in detail. The heart of the ABT module is the correlator. In the following discussion of the software implementation of the present invention, the correlator is described, by using the correlation equation, in mathematical terms. Here, in keeping with the intention of FIG. 4, a description of a hardware implementation will be used.

In the application discussed herein, the correlator is a pattern-matching device. It performs a specialized comparison between two signal patterns and yields a number (or voltage) that is a measure of their similarity. It is not necessary for the operator, or the correlator, to know the specific signal patterns in advance, and in fact the signal patterns may not be known exactly even after the measure of correlation is available. What is known is that the two signal patters are similar, in the sense implied by the correlation, to the degree indicated by the correlation measure (usually called the correlation-coefficient). In practice one of the signal patterns is considered to be dominated in form by some desired pattern, called the "signal", while the remainder is due to low level random noise. This one signal pattern is called the reference pattern. It is desired to know to what extent, and where, this signal pattern or desired pattern is present in the input spectrum. It is realized that the reference pattern consists of a series of "lines" that are represented in the input spectrum by bins which will contain more power, on the average, than the bins containing noise power along. It is expected that the signal pattern as also represented in this reference pattern will be found in a particular part of the input spectrum; however, due to instability, allowance is made for the possibility that the signal pattern has shifted along the frequency axis of the input spectrum. The important thing is that the relative spacing of the lines changes insignificantly. Therefore the correlator is used to compare the reference pattern to the input spectrum at several positions adjacent to and either side of the expected position, and a correlation-coefficient is computed which estimates how alike the input spectrum and reference pattern are at each of such positions. The highest value correlation-coefficient found among the various positions is taken as indicating the best estimate of the reference pattern position. This highest value is examined further. If the highest value of correlation is still quite low, it is assumed that the signal pattern is "not present" in that input spectrum. This may indicate a momentary fade, or in the initial detection case, simply that no target is within range. If, however, the correlation value is sufficiently high, a "signal present, here" decision is made. This decision controls other internal processes which will be described later.

The software implementation discussed later, reduces the reference pattern and the input spectrum to a series of numbers which are then correlated in ordered-pairs by the software implementation of the correlation equation. To understand how the correlation function might be implemented in the hardware implementation presently being described and what the significance of the correlation-coefficient is, consider the following.

FIG. 2 illustrates eight successive input spectra (j=1 through 8), along with the integrated (ALI) representation of ALI spectrum. Suppose that the ALI spectrum is taken as a reference pattern, while any one of the eight spectra are taken as the input spectrum. It is asked, "In the sense implied by correlation, to what extent is the ALI pattern which was developed from previous spectra, also present in the current input spectrum?". Imagine that one photographs and obtains negatives of the input spectrum and the ALI spectrum. Each negative will appear as a transparent trace agains an opaque background. If either negative is held to s strong light, light will come through the entire trace. If they are overlaid, however, and then held to the light, light may only pass through where the two traces coincide. In that part of the trace due mostly to noise, the peaks seldom coincide and light passes through only where the lines cross. Furthermore, if the two negatives are overlaid so that the signal peaks in one are shifted right or left (along the frequency axis) of the signal peaks in the other, only the light from the random noise crossings will get through. Only if the signal peaks are aligned will a substantial amount be observed. A photocell may be positioned to read the total amount of light passing through the two negatives, while they are slowly slid past each other, right to left. When the voltage from the photocell is highest, the two patterns (spectra) are in the position of best correlation. Since some light will always get through, some voltage will always be produced. Perhaps it is to be observed that, with noise only, the output averages 10 millivolts, with a standard-deviation of 1 millivolt. It then would be agreed that only if the maximum voltage observed was higher than 13 millivolts (average plus three standard-deviations) would a "signal-present" decision be made.

A software decision routine within the ABT module actually examines this correlation-coefficient, determines if the "signal-present, here" or "signal-absent" condition exists, keeping a running score of how many times the signal was present out of the last N (variable) spectra. Based on these measurements, it allows the reference pattern to be updated with the lastest signal information, as found in the current spectrum (if signal-present), by shifting the reference bins to conform to the signal position, then integrating the current spectrum into the reference pattern at that position. If no signal is present, this integration is not performed, so as to prevent dilution of the reference pattern by noise. If the running detection score shows that the signal has not been present for some time, it is decided that the reference pattern is probably old and irrelevant, and a new reference pattern is produced by transferring a section of the "remnant-ALI" buffer spectrum into the reference buffer. The "remnant-ALI" is an integrated spectrum that is produced by integrating input spectrum after all signal sets being tracked have been deleted from it. The remnant-ALI contains traces of any signal-sets that may be present but are not being tracked, and therefore is used as a reference pattern starter for newly assigned ABT modules, or for ABT modules that have lost the signal pattern that they were tracking and are now available for re-assignment. When the reference pattern buffer is primed with a section of the remnant-ALI spectrum, that particular ABT module is moved to the bottom of the ABT access list. Since the ABT module now has a reference pattern from which all other signal patterns being tracked have been removed, it wants to see the corresponding input spectrum at the state of processing (deletion) at which all other signal patterns being tracked have been removed or deleted. This happens if it sees the input spectrum last in the ABT access order.

A decision-routine also controls the output to the display. If a detection is made, the enhanced signal pattern, as contained in the updated reference pattern, is thresholded and sent to the display module for incorporation in the display output. If no detection is made, this transfer is prevented, even though the reference pattern may still be valid.

The final action taken in the ABT module is ABT-deletion. The ABT-deletion routine accepts three inputs: the input spectrum as seen by the ABT module, the current reference pattern along with the best correlation position for that input spectrum, and a go/no-go decision from the decision-routine as to whether the ABT-deletion routine will be executed. The decision is based on whether a detection was made within this input spectrum indicating that the signal pattern is present to a degree strong enough to warrant deletion, and whether the detection rate is sufficiently high, indicating that the reference pattern is currently valid.

Each ABT module, in turn, processes some portion of the input spectrum performing all operations described above and deleting its reference pattern from the input spectrum. Successive ABT modules may or may not process the same portion of the input spectrum; if they do they are said to be "cascaded".

When all ABT modules have acted upon the input spectrum, that input spectrum, less all signal components deleted during processing, (and now termed the "remnant spectrum") is integrated into the remnant-ALI buffer, using the ALI integration procedure earlier described. Some internal housekeeping is performed, in which ABTs are re-ordered in the access table as necessary; control then passes to the display routine, illustrated in block diagram form in FIG. 8.

Figure 8:
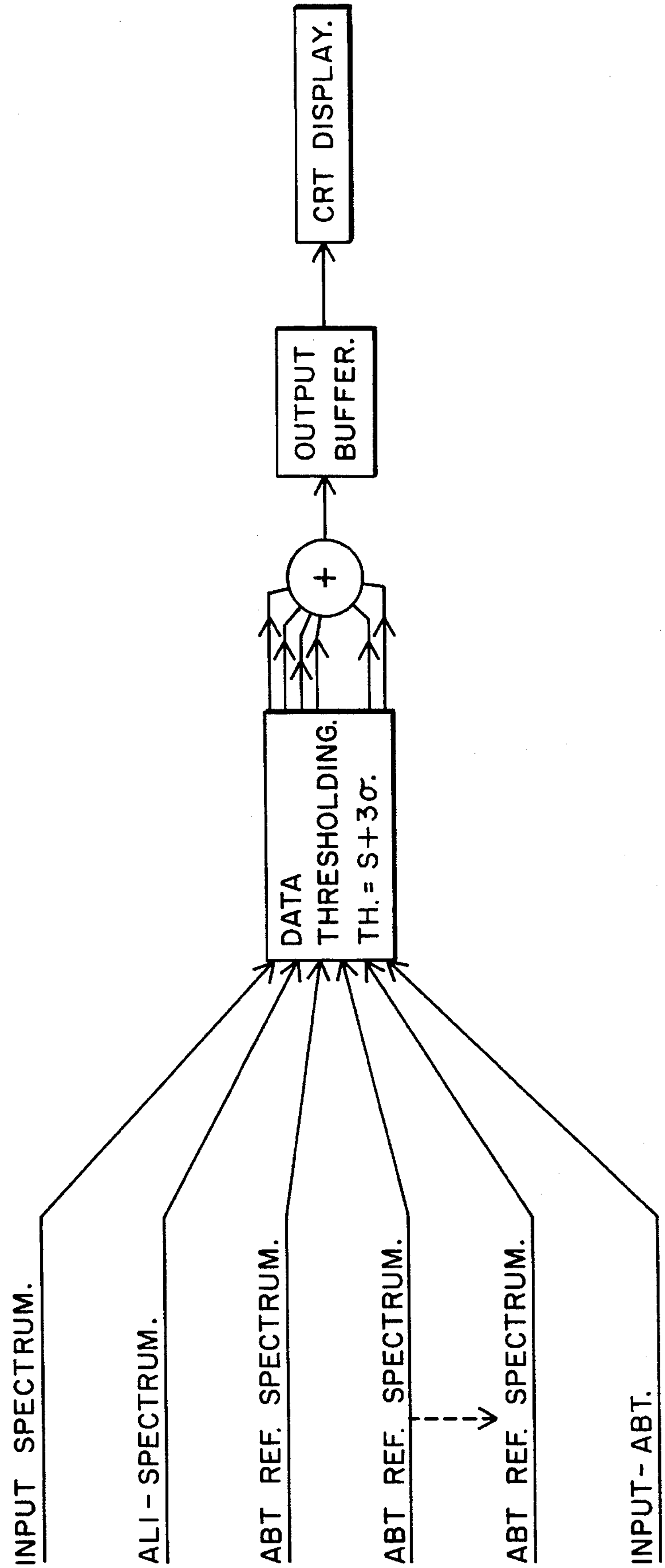
FIG. 8 is an illustration of the display processing operation of the present invention implemented in terms of hardware modules.

The display routine of FIG. 8 accepts control inputs from the operator, and from the decision-routines in the ABT modules. It chooses and thresholds those data buffers indicated by the operator, synthesizing a final output buffer from among the lines detected in all data buffers, and transfers the resulting information to the CRT display.

Software Implementation

The actual implementation of the present invention is by means of mathematical equations and logic decisions embodied in a software computer program that is stored in and that controls the operation of a general purpose digital computer.

Figure 9:
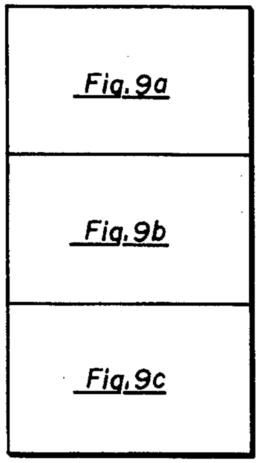
FIGS. 9*a*, 9*b*, 9*c*, when arranged as shown in FIG. 9, are illustrations of the major functions and general data flow within the executive routine of the existing hardware implementation of the present invention.

FIG. 9 illustrates the major functions and general data flow within the resident computer program or executive routine of the existing hardware implementation of the present invention.

Section A is the input section. Operator commands are interpreted here. This section also controls sampling rates, and new-spectrum inputs.

Section B performs spectral integration according to the algorithm:

$$I(t+1,\omega)=kI(t,\omega)+S(t+1,\omega) \qquad \text{Equation 1}$$

where $S_i$ is the ith cell or bin in the current spectrum.

$I(t,\omega)$ is the current (time t) ith cell in the automatic line integration (ALI) storage buffer, and $I(t+1,\omega)$ is the updated content of that cell, after time-weighted integration of the current spectrum. This algorithm has the effect of smoothing the noise and providing an adaptive record of those persistent features of the spectrum that tend to be stable in frequency.

Figure 10:
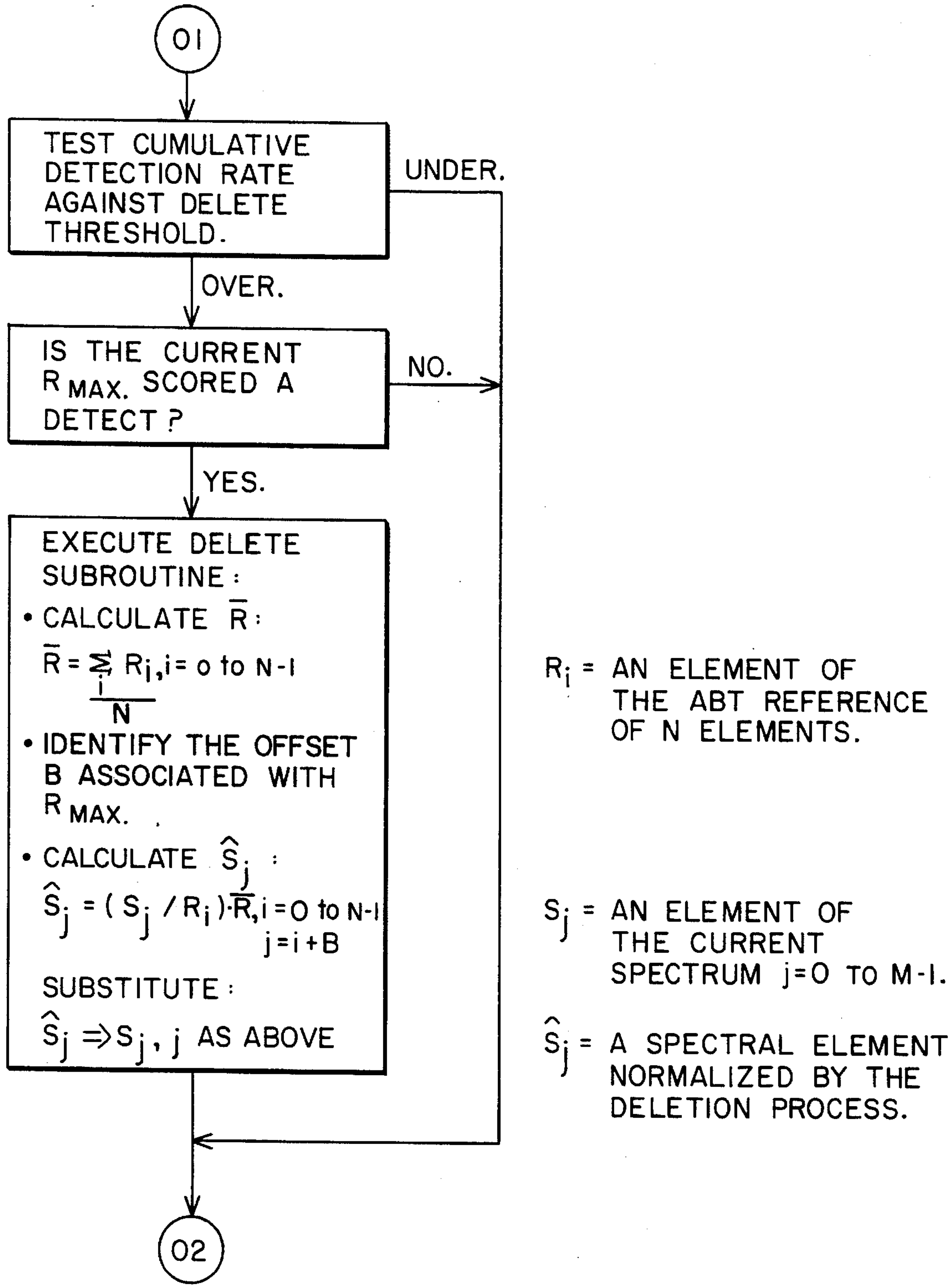
FIG. 10 is an illustration of the major functions and general data flow within the Delete subroutines of FIG. 9*a*.
Figure 11A:
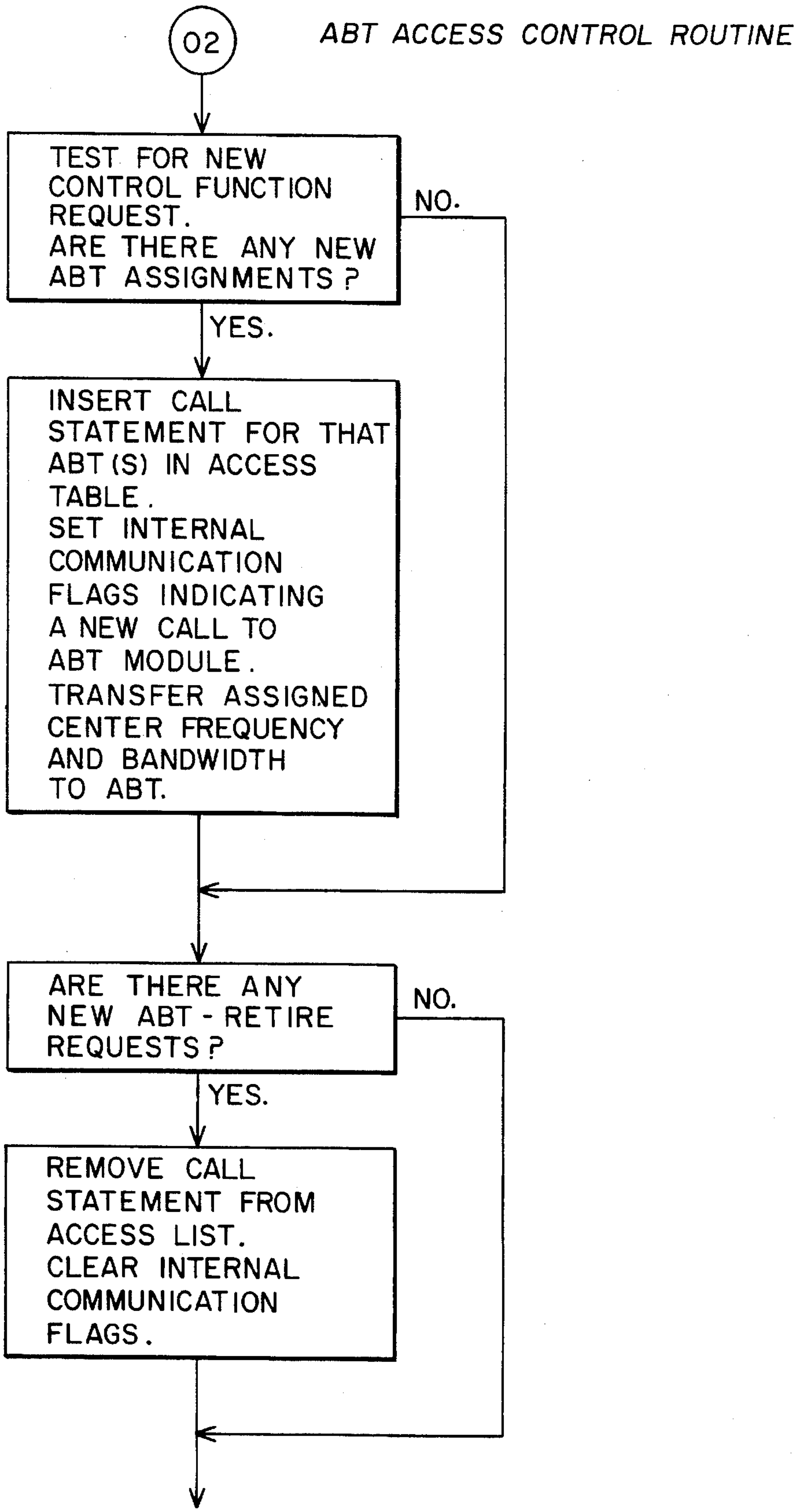
Figure 11B:
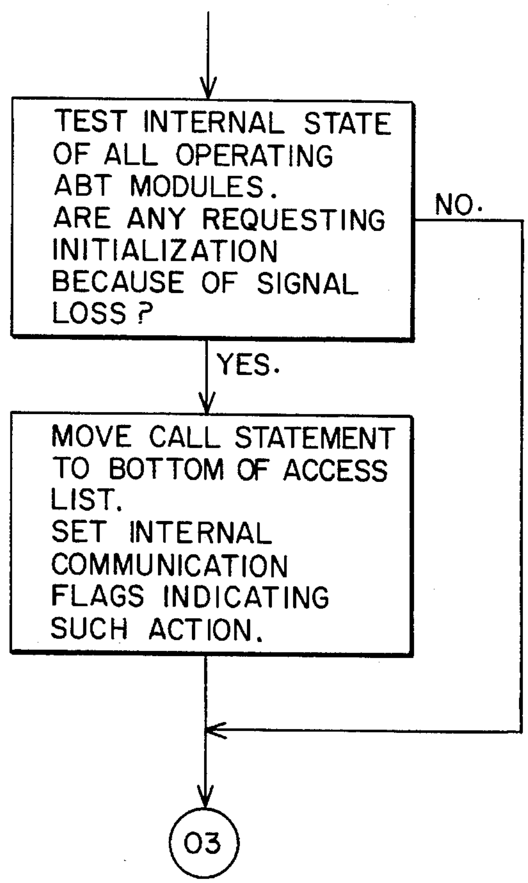
Figure 12A:
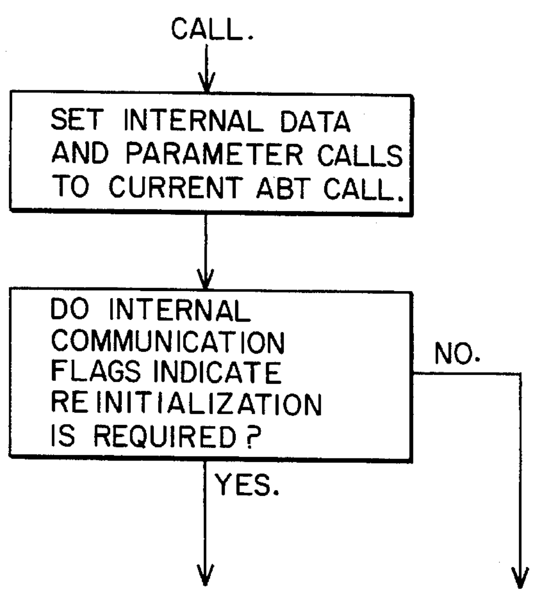
Figure 12B:
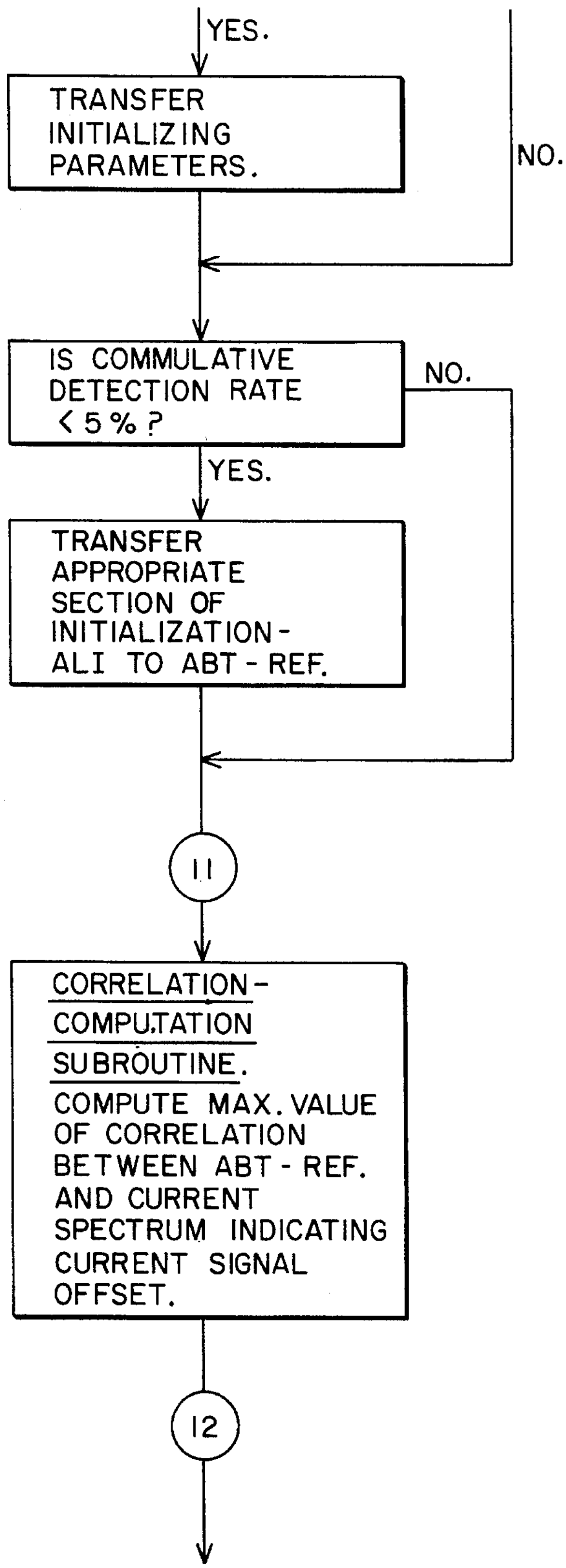
Figure 12C:
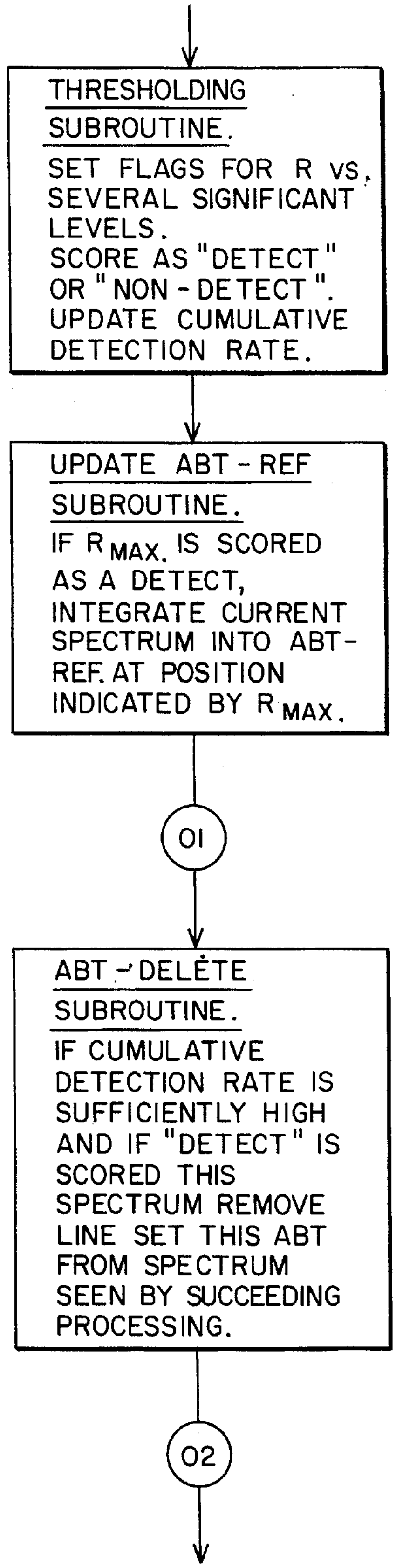
Figure 12D:
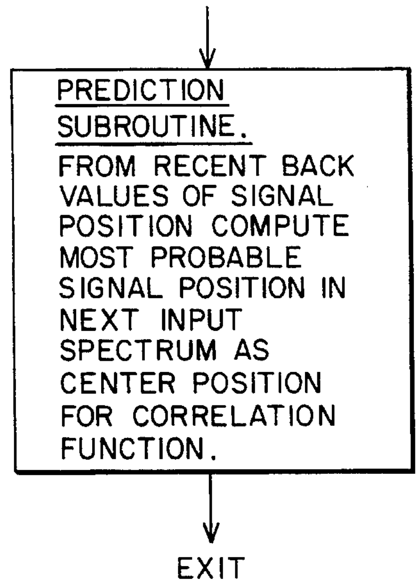
Figure 13A:
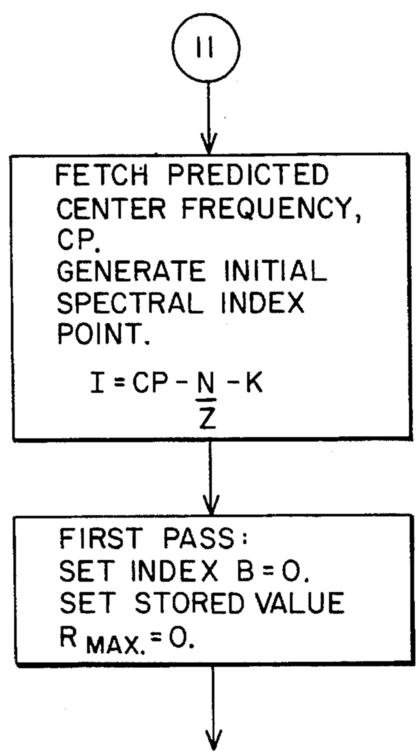
Figure 13B:
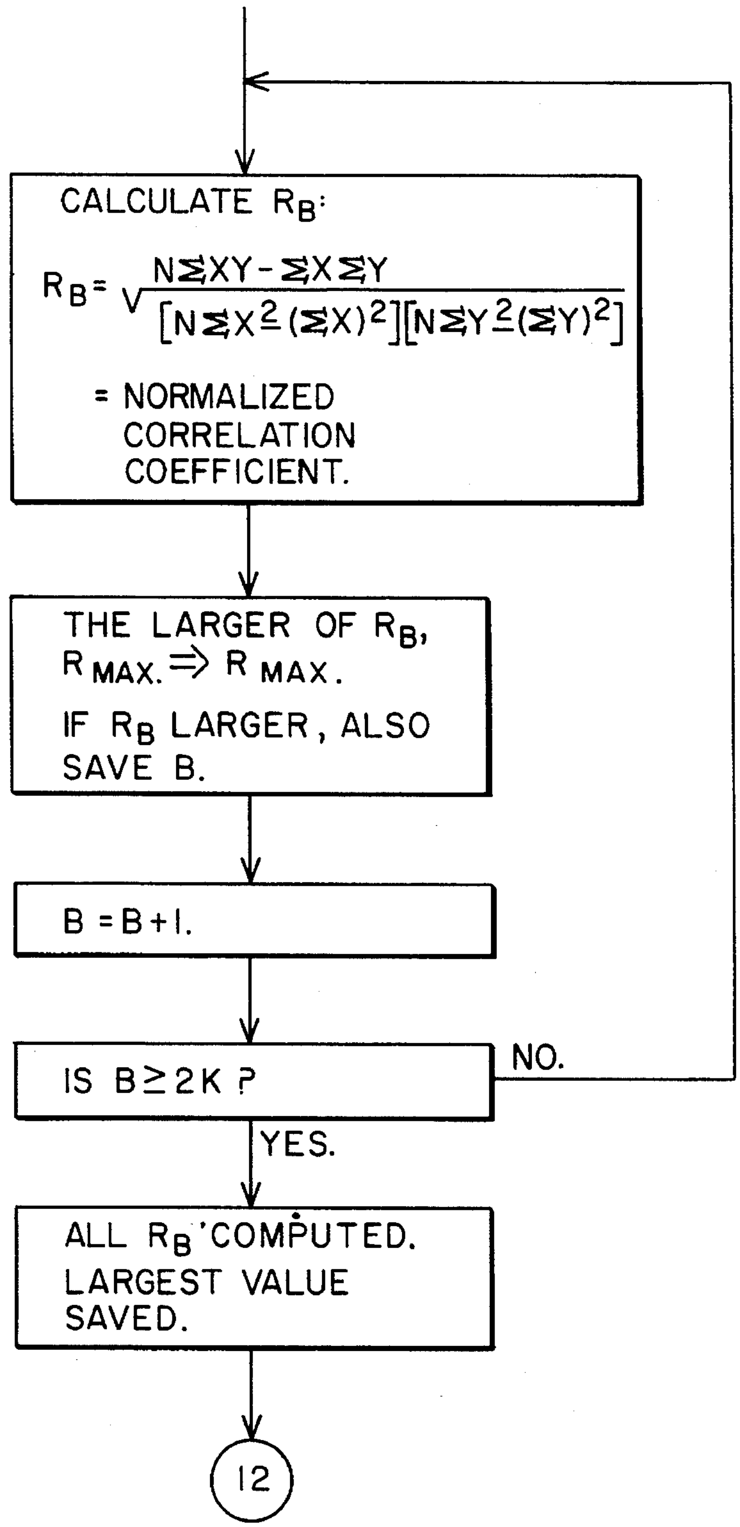

Section C deletes, if request, the persistent features recorded by ALI from the spectrum seen by the remaining processing steps, while normalizing the spectrum in the manner described below; the Delete subroutine of FIG. 10 is also utilized in this section.

Figure 11:
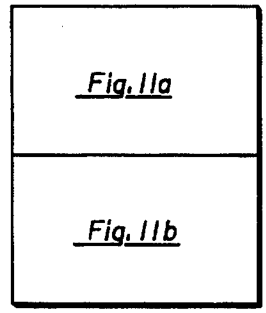
FIGS. 11*a*, 11*b*, when arranged as shown in FIG. 11, are illustrations of the major functions and general data flow within the ABT Access Control routine of FIG. 9*b*.
Figure 12:
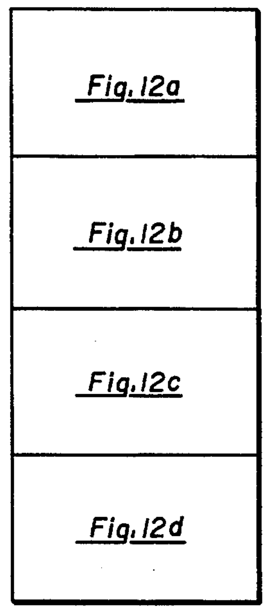
FIGS. 12*a*, 12*b*, 12*c*, 12*d*, when arranged as shown in FIG. 12, are illustrations of the major function and general data flow within the ABT Module routine of FIG. 9*b*.
Figure 13:
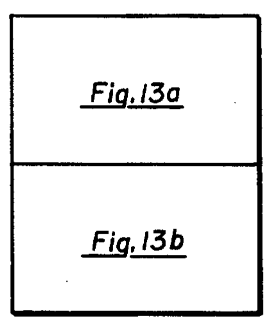
FIGS. 13*a*, 13*b*, when arranged as shown in FIG. 13, are illustrations of the major functions and general data flow within the Correlation Computation subroutine of FIG. 12*b*.
Figure 9B:
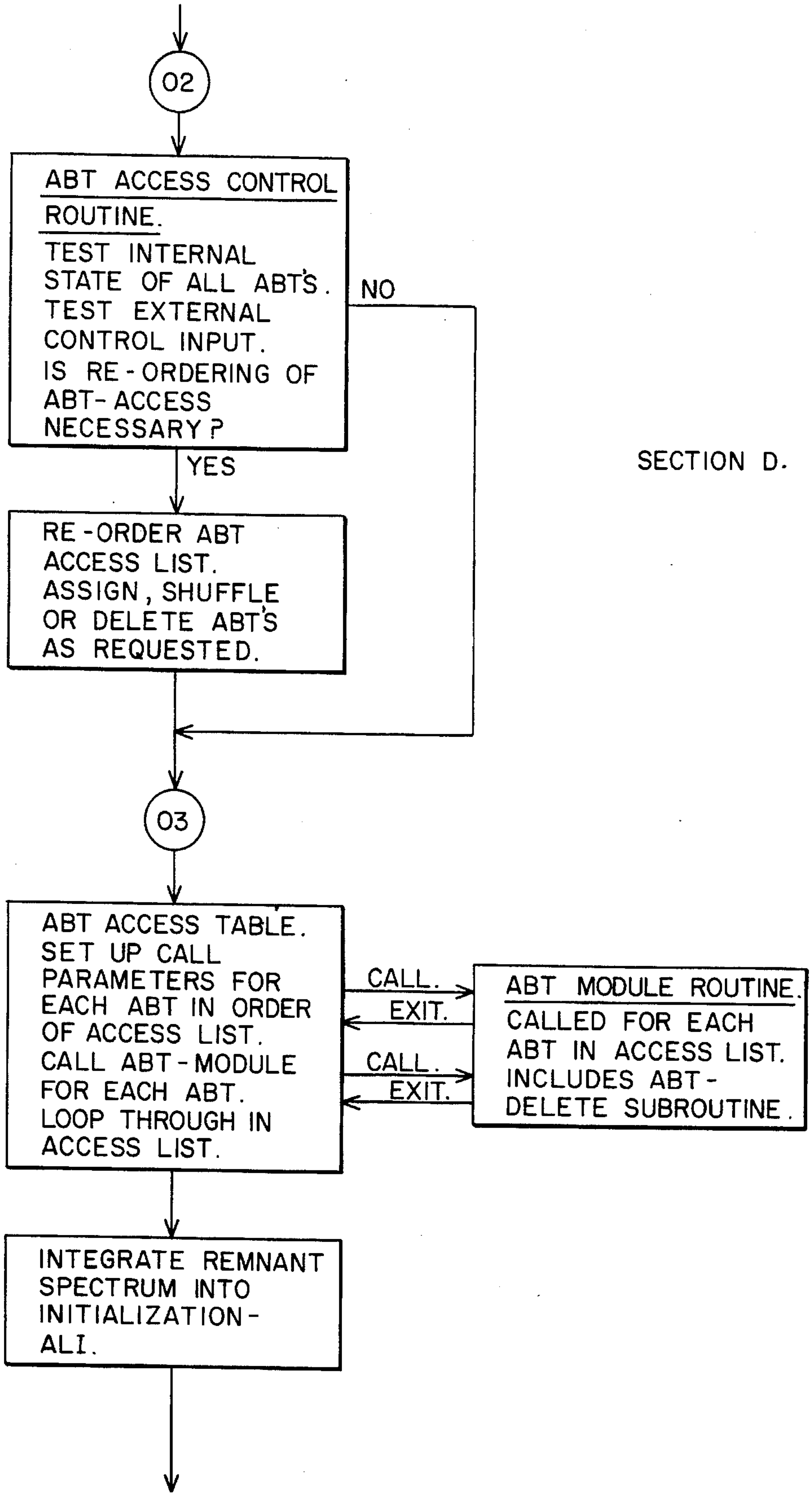
Figure 9C:
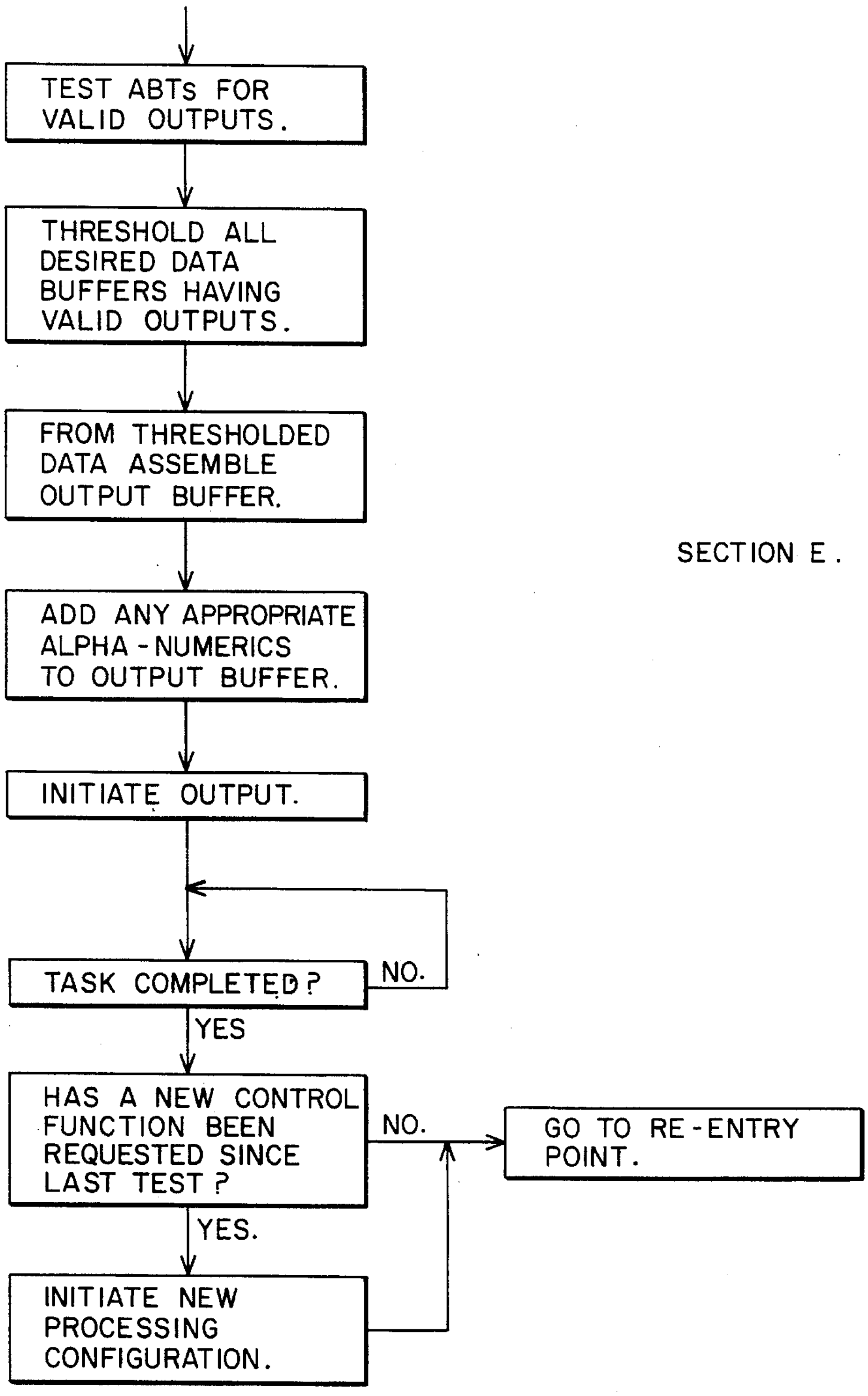

Section D is the control and execution module for the Automatic Band Tracker (ABT) module: this section includes the Delete subroutine of FIG. 10; the ABT access control routine of FIG. 11; the ABT module routine of FIG. 12; and the Correlation-computation subroutine of FIG. 13. The ABT module accesses the data repeatedly, at different spectral positions, access orders, and band widths, for each input spectrum input, thus operating as "different" ABTs, according to the total number needed for the current processing task. Because of the cascade-able features, with accompanying deletion, and the method of which "each" ABT acquires its reference pattern, it is important that the ABT sees the spectrum in the same relative state as the reference pattern was in at the time of acquisition. It is the task of the ABT access control routine of FIG. 11 to ensure this. The ABT access control routine interrogates the internal states of the various ABTs and controls, not the ABTs, but the ABT access order. Once this is done (for each input-spectrum) the ABTs are accessed in that order. (Further description of this process occurs below.) The final operation is to integrate the remnant spectrum into the remnant-ALI buffer using the algorithm of Section B. The remnant-ALI buffer is used for ABT initialization.

Section E is the display module. The function of the display is to output the consecutive frequency spectra subject to the processing gains produced by the ALI and ABT modules. The operator selects the output configuration desired. The internal processing programs then take over, deciding after each input spectrum has been processed which of the ABT modules have valid outputs. A valid output is either an enhanced spectrum output or an operator alert upon detection of a new signal. If valid data is available, the display program thresholds the data at the three-sigma (standard-deviation) level and transfers the thresholded data to the CRT display.

ABT access control routine

The function of the ABT access control routine of FIG. 11 is to order and update the ABT access table from which all calls to the ABT module are performed. The ABT access control routine receives input from the internal state of the various ABTs which are operational, and from the control input device reflecting operator decisions regarding ABT module operation.

FIG. 11 illustrates the flow chart of the ABT access control routine operation sequence.

The first function is to test for operator inputs. The inputs of interest here are either a new ABT assignment or an ABT-retire command. If a new ABT is to be assigned, its call statement is placed at the bottom of the ABT access table (formerly, under these circumstances, no call for that ABT was in the table). In this position, it receives its reference pattern from the remnant-ALI buffer after the signals from all operating ABTs have been removed from the spectra which integrate to this buffer, and will "see" the spectrum only after this same operation. It will, then, be in a position to catch any signals that "fall through" the operating ABTs. Additionally, certain flags internal to the ABTs are set, indicating that initialization operations are to take place.

If the operator command specifies that the ABT is to be deleted, the call statement for that ABT is removed from the ABT access table and its internal flags are cleared.

Operating ABTs keep track of their internal detection-rate. When this rate, averaged over the recent past, falls below a certain rate, the signal is assumed lost, and the current reference pattern for that ABT is no longer valid. The ABT then sets an internal flag requesting re-initialization. The ABT access control routine checks this flag and, if set, moves the call statement for that ABT to the bottom of the ABT access table, as for a call. If it happens that the signal was only temporarily faded and returns, it will fall through the other ABTs in the ABT access table to be reacquired by the first ABT in "hunt" mode near the bottom of the ABT access table. Operationally, it does not matter whether this is the same ABT which had originally acquired that signal or not.

When these operations have been completed, the ABT access table is ready. The ABT module routine of FIG. 12 now calls upon the ABT module repeatedly with successive ABT identities in the order found in the ABT access table. Each ABT-call causes the ABT module to assume the identity of that ABT, performing the functions of tracking the signal and deleting that signal (if valid) from the input spectrum seen by the remaining ABTs in the ABT access table.

The last step in this process is to integrate the remnant spectrum (i.e., the spectrum that remains after all valid signals have been deleted from the input spectrum) into the remnant-ALI buffer, thus forming an approximate pattern of any signal or signal-set not being tracked and, accordingly, deleted by one of the ABTs. This pattern is then available for initializing additional ABTs.

ABT module routine

The ABT module routine flow diagram is shown in FIG. 12. The function of the ABT module routine is to locate a signal pattern in the current input spectrum, using the Correlation-computation subroutine of FIG. 13 with an input spectrum and reference pattern as inputs, to make detection decisions and accumulate short term detection statistics, to update the reference pattern input with the signal information in the latest input spectrum, and, from the detection information, decide whether or not to call on the deletion routine. If called, the Delete subroutine of FIG. 10 removes the updated reference pattern from the input spectrum that is to be passed to the remaining ABTs.

When the ABT module is called (repeatedly) from the ABT access table, information is passed with the call telling the ABT module what ABT identity is to be assumed. An ABT-identity is determined by a number (0, 1, . . . ,), a set of assignment and operating parameters specifying the band width and current center frequency about which the signal is to be found, certain detection statistics, and the reference pattern for that ABT. The ABT-module upon assuming any of the ABT-identities is referred to as an (any of eight) ABT.

The first procedure executed by the ABT module upon receiving a call from the ABT access table is to assume the appropriate identity. The ABT module is now an "ABT". The next procedure performed by the ABT is to test the internal flags to see whether a previous request from the ABT for re-initialization has been honored by the external program. (If it has been honored, the call for that ABT has been transferred to the bottom of the ABT access table and internal flags have been set to indicate this.) If this transfer has occurred, the ABT performs initialization procedures which consist of setting internal parameters to certain initial values that are consistent with that ABT identity.

A flag is then tested which indicates whether the cumulative detection rate over the last several spectra is above a minimum value (i.e., whether there were at least k detections in the last N spectra). If not, a section of the remnant-spectrum ALI buffer (the buffer containing the integrated spectrum from which the reference signals of all operating ABTs have been deleted) is transferred to the reference buffer for that ABT for use in the correlation operation. If the flag indicates that the detection rate is over the minimum value, the reference buffer is left unmodified at this time.

The next series of steps results in a series of correlation-coefficients ($R_B$) between the reference pattern, which is the best available estimate of the current signal pattern, and the corresponding section of the current input spectrum. The flow diagram for the Correlation-computation subroutine is shown in FIG. 13. Since the signal is presumed to be somewhat unstable, and its current position is the input spectrum not known exactly, a search procedure is begun. The reference pattern is overlaid (mathematically) on the input spectrum, with the center of the reference pattern at the most probable spectral position along the frequency-axis as determined by a prediction algorithm. Now the correlation-coefficient is computed between the reference pattern and the section of the input spectrum. This produces the coefficient $R_B$, for B=0. where B refers to the position on the frequency-axis defined by the formula:

Equation 2

$$R_B = \frac{N\sum_i X_j Y_i - \sum_i (X_j) \sum_i (Y_i)}{\sqrt{\left(N\sum_i X_j^2 - \left(\sum_i X_j\right)^2\right)\left(N\sum_i Y_i^2 - \left(\sum_i Y_i\right)^2\right)}}$$

$$j = \left(CP - \frac{N}{2} - K + b\right) + i$$

*CP* = Predicted Central position
summation on *i* from 1 to *N*,
*N* = integer in the range 50–200

Now the same procedure is followed, by overlaying the reference pattern on the input spectrum at X±1, ±2, . . .,±K bins from the first position (B=±1, etc. in the above expression) producing the discrete, truncated correlation series (or discrete correlation function $\{R_B\}=R_{-K}, \ldots R_{-1}, R_0, R_{+1}, \ldots, R_{+K}$.

The maximum offset, K, is chosen with regard to what is known about the signal dynamics and the efficiency of the prediction algorithm.

It is assumed that the maximum positive value of $R_B$ is the best indication of signal position in the input spectrum. The associated B-value is then taken as the signal position, or at least of the best overlay of the reference pattern containing the signal. Individual lines within a signal-set must be identified in the position by the other means.

The largest $R_B$ (now stored as $R_{max}$) is now subjected to significance tests. In particular, $R_{max}$ as compared to a "receiver threshold value", T, and scored as a "detect" or "signal present" if over T, and as "signal absent" or "non-detect" if $R_{max}$ less than T. Detects and non-detects are averaged into a detection-rate count taken over the last N (variable) spectra. The information that a "detect" has occurred on the present input-spectrum and that the detection-rate is/is not in excess of one of several values, is used to control other ABT-module processes.

A decision is now made as to updating the reference pattern. If a detect was made upon this input spectrum, the reference pattern is updated by assimilating the signal information in this input spectrum into the reference pattern. This is done by positioning the reference pattern over the input spectrum at the position of best correlation, which position is the original zero-offset plus or minus the B-value associated with $R_{max}$, then integrating using the ALI algorithm. This ensures that each signal component, even though unstable, and contributing power to different spectral cells at different times, will always sum to maximum effect in the reference pattern.

If a detection was not made upon this input spectrum, the cumulative detection rate is tested. If it has dropped below a minimum value (measured by $T.D._{min}$), the ABT sets a flag to be read by the ABT access control routine, requesting re-initialization. The ABT has, in effect, concluded that the signal it had been following has disappeared, and is requesting transfer to the bottom of the ABT access table in order to hunt for any new signal not being handled by the other ABTs, or alternatively, for the signal it had been tracking, should it re-appear. If the cumulative detection-rate has not dropped below $T.D._{min}$, and there was no detection of this input spectrum, no change is made to the reference pattern, or to the access order.

Whether or not a detect was scored upon this input spectrum, the value of $R_{max}$, and associated B-value is fed to a Prediction subroutine, which is tasked with predicting the most probable position in the next input spectrum of the center of the signal pattern, using the last few back values of B, weighted by the associated value of $R_{max}$.

The final procedure to occur in the ABT module routine is the Delete subroutine of FIG. 10. The same algorithm (that of FIG. 10) is used as in Section C, wherein the ALI is deleted from the input spectrum, and both operations will be described here. FIG. 10 is the flow chart for the "delete" algorithm. The purpose of the delete algorithm is to make possible the meaningful cascading of ABT modules, wherein a number of ABTs examine the same section of an input spectrum. If a number of ABT modules were cascaded without deletion in the same section of the input spectrum of a multi-signal environment, all would select the same signal to track, given the same operational parameters. In fact, the signal-set having, overall, the most energy generally would be selected. The purpose of the delete algorithm is to attenuate the signal being followed by an ABT to the point where its energy is less than the energy of the weakest signal present which could otherwise be acquired and tracked. Properly done, a series of cascaded ABTs will pick up the various signal-sets present, in descending order of overall energy until the detection limit of the ABT process is reached.

The delete algorithm performs an inverse cross-multiply of the input spectrum with a reference pattern, normalizing the set of multiplying through by the reference pattern average. This value is substituted for the actual spectral element value.

Symbolically, if $S_j$=a spectral element value, $R_i$=a reference element value, $\bar{R}$=the average overall reference Calculate $S_j=(S_j/R_i)\bullet\bar{R}$ and substitute $S_j$ for $S_j$. Equation 3

This process has several desirable effects, depending upon what is used as a reference pattern. In any case, if the reference pattern is actually derived from the signal, and contains a representation of some significant feature of the overall signal, precisely that feature will be attenuated in the input spectrum passed along to the remaining processing.

If the delete algorithm draws upon the initial ALI, as in Section C, the persistent signal features found will include stable lines (represented to the degree they are stable) and the smoothed overall noise contour. After operation of the delete algorithm, the stable lines are attenuated, as desired, and the average noise contour, whatever its previous shape, is now flat (whitened). Furthermore, the noise variance, which tends to be proportional to the noise level in a spectral estimate, is scaled just proportionate to the noise itself so that the remaining spectral noise contour has uniform level and variance. Unstable lines not represented in the ALI are not attenuated and are in fact multiplied by the same scaling factor as the noise contour, thus leaving the local signal-to-noise ratio of any unstable signal component unchanged. Furthermore, the condition of an unstable line in a noise context of uniform power and variance is the condition in which the ABT module routine exhibits the maximum sensitivity.

When used with an ALI reference, the conditions of equation 3 are:

j=i, $R_i$ and $\overline{R}$ are identified with the ALI buffer.

(R referring here to elements in the reference, not correlation-coefficient)

When the delete algorithm is used with an ABT reference, (incorporated as part of the ABT module), two conditions must be met before execution. These conditions are:

A. a detection condition must be registered for this input spectrum, and,

B. the cumulative detection rate must exceed a threshold $T.D._1$, greater than $T.D._{min}$, the re-initialization threshold.

The reasons for these requirements are that, in condition A, deleting at the position indicated by an $R_{max}$ less than the detection threshold would result in many deletions at "false-detection" positions, leaving not only the residual signal energy at the correct position, but a "hole" at the actual deletion position, both of which would form a "pseudo-signal" for succeeding processing. The requirement of condition B is meant to ensure that the reference pattern being deleted is of sufficient persistence to warrant deletion.

For use with an ABT reference, the indices 1 and j are identified as in Equation 3 with j-(CP-N/2-k+B)+i, i=1 to N, and B associated with $R_{max}$.

Display routine

The display program of Section E combines the outputs of the ABT modules. Each ABT module having a valid output is thresholded by a two-pass thresholding algorithm which computes a threshold level over the integrated noise, less the major lines, at the (average+3 sigma) level. The lines so detected are combined to a single output buffer, with each ABT correctly referenced in position by its associated $R_{max}$ position.

Program Details

Included herewith are two sections:

Program specification

This section lists the detail definitions of the program routines and subroutines for implementing the present invention in machine language for any general purpose digital computer having the proper capacity.

Machine listing

This section lists the actual machine language used to implement the present invention in the UNIVAC 1616 computer.

| | | |
|---|---|---|
| Program Name: | SYSTEM EXEC (start) | |
| Size: | Ø241 | |
| Call: | none | |
| Input: | none | |
| Exit: | none | |
| Output: | none | |
| External References: | O1X, SPWR, POFL, TALI, DB1AD, TH7, ADEL ABTSHU, TRKCAL, DEXEC | |
| Data Referenced: | PSW1 | Class I interrupt load values |
| | PSW2 | Class II " " " |
| | PSW3 | Class III " " " |
| | PSW4 | Class IV " " " |
| | AINT1 | Class I interrupt address |
| | AINT2 | Class II " " |
| | AINT3 | Class III " " |
| | AINT4 | Class IV " " |
| | EXTAB | Start of data values to be initialized to Ø |
| | TBUFØ | Start of buffers to be cleared |
| | YVAL | Display y location to be initialized |
| | SINT | IOC constants |
| | CFLAG1 | Control flag #1 |
| | SYCH1 | Enable SA command |
| | SFLAG | Input in flag |
| | SYDT1-SYDT6 | Load parameters for routines |
| | KALI1 | ALI constant for call #1 |
| | KALI2 | ALI constant for call #2 |
| | SYJT | Jump table for display calls |

SYMSK, SYMSK1 Masks

Purpose: This is the general executive which directs control thru the subroutines and does system initialization.

Synopsis: 15-1.Ø Get interrupt load values and store them at the interrupt addresses in memory.

Load status register #1 to allow interrupts.

Clear all data that needs it.

Clear out all the buffers.

Initialize y value for scope with Ø74ØØ.

Initialize IOC.

a) Master clear all channels.

b) Allow monitor interrupts on all channels.

c) Allow data interrupts on operator switch channel.

15-1.1 Have we received an operator interrupt, bit Ø15 of CFLAG1 set?

YES Go to 15-1.2

NO Go to 15-1.1

15-1.2 Allow data interrupts on Spectrum analyzer channel.

Go to 15-2.Ø

15-2.Ø Have we accepted Spectrum data SFLAG = Ø?

NO Go to 15-2.1

YES Go to 15-2.2

15-2.1 Call OIX, Go to 15-2.Ø

15-2.2 Start processing data.

a) Clear SFLAG.

b) Load parameters for Spectrum power.

c) Call SPWR.

d) Check on overflow - Call POFL.

e) Load parameters for first ALI call.

f) Call ALI.

Does CFLAG1 have bits Ø, 1 = ØØ?

YES Go to 15-2.3

NO Go to 15-2.4

15-2.3 Call DB1AD, Go to 15-2.4.

15-2.4 Do we have delete, bits 2, 3 of CFLAG1 = 1Ø?

YES Go to 15-2.5

NO Go to 15-2.6

15-2.5 Load parameters and call ADEL.

Go to 15-2.6

15-2.6 Checks bits Ø, 1 of CFLAG1.

= ØØ Go to 15-3.Ø

= 1Ø Go to 15-2.7

= Ø1 Go to 15-2.8

= 11 Go to 15-3.Ø

15-2.7 Call DB1AD, Go to 15-3.Ø.

15-2.8 Load parameters and call TH7.

Go to 15-3.Ø

15-3.Ø a) Call ABTSHU.

b) Call OIX.

c) Call TRKCAL.

d) Load parameters and do second call on TALI.

Check bits Ø, 1 of CFLAG1. Are bits Ø, 1 = 11?

YES Go to 15-3.1

NO Go to 15-3.2

15-3.1 Call DB1AD, Go to 15-3.2.

15-3.2 Call DEXEC, then Go to 15-2.Ø.

Program Name: TRKCAL

| | | |
|---|---|---|
| Size: | Ø5Ø | |
| Call: | JLM TRKCAL | |
| Input: | none | |
| Exit: | normal return | |
| Output: | none | |
| External References: | TEXEC | |
| Data Referenced: | TTAB | Register save area |
| | TCALA | Routine constants |
| | POFLG | Overflow flag |
| | EXTAB | Tracker access table |
| | RTFLAG | Tracker active flag |
| | CEND | Last tracker in chain |
| | CSTRT | First tracker in chain |

Purpose: This is system EXEC level routine which controls the execution and sequence of execution of the trackers.

Synopsis: 16-1.Ø Save registers, get constants from constant table, clear overflow flag (POFLG).

Cycle thru tracker access table finding how many trackers are active and store the number at RTFLAG.

Load R8 with last tracker in chain.

Load R5 with first tracker in chain.

16-1.1 Load R6 with current tracker access word.

Check R6.

| | | |
|---|---|---|
| R6 = Ø | not active | Go to 16-2.Ø |
| R6 ≠ Ø | active | Go to 16-1.2 |

16-1.2 Mask off all but lower 4 bits in R6 (this is the next tracker in the chain).

R5 = current tracker number

Call on TEXEC.

Decrement R7 (number of trackers left unexecuted)

and store at RTFLAG.

Check our current tracker number against the chain end.

R5 = R8 Go to 16-2.Ø

R5 ≠ R8 Go to 16-1.3

16-1.3 Load R5 with R6 (next tracker number).

Go to 16-1.1

16-2.Ø All active trackers have been executed.

Restore registers and return.

| | | |
|---|---|---|
| Program Name: | ABTSHU | |
| Size: | Ø122 | |
| Call: | JLM ABTSHU | |
| Input: | none | |
| Exit: | normal return | |
| Output: | none | |
| External References: | none | |
| Data Referenced: | ESAV | Register save area |
| | SHUF | Constant table |
| | TRKF | Tflag table |
| | CEND | Last tracker in chain |
| | CSTRT | First tracker in chain |
| | EXTAB | Tracker access tables |
| | ORTAB | Table of OR values |

Purpose: To check if any of the active trackers need to be shuffled down to the bottom of the chain and, if so, do the shuffle.

Synopsis: 17-1.Ø Save the registers and load routine constants.

R7 = Ø pter to TRKF table.

17-1.1 Load in TFLAG1 from TRKF table.

Is it active (bit Ø17 set)?

YES Go to 17-3.Ø

NO Go to 17-1.2

17-1.2 Increment our pointer to Tflags (R7).

Have we gone thru table?

YES Go to 17-2.Ø

NO Go to 17-1.1

17-2.Ø Restore registers and return.

17-3.Ø Is this tracker to be shuffled (bit Ø set)?

YES Go to 17-3.1

NO Go to 17-1.2

17-3.1 Clear bit Ø, set bits Ø1, Ø15 in TFLAG1 and then store back in table.

Get end of tracker chain in R8.

Is this tracker end of chain (this tracker in R7)?

YES Go to 17-1.2

NO Go to 17-3.2

17-3.2 Get start of chain in R9.

Is there only one tracker in chain?

YES Go to 17-2.Ø

NO Go to 17-3.3

17-3.3 a) Store shuffled tracker as chain end (CEND).

b) Get old chains end access word.

c) Mask in this tracker number in lower.

d) Store old chains end access word back.

Now get shuffled tracker access word and shift so

R1Ø = its previous tracker pointer

R11 = its next tracker pointer

Shift old chains and tracker number to upper and mask in end code in lower (Ø2ØØ), then store in shuffled trackers access word.

Was shuffled tracker start of chain R7 = R9?

YES Go to 17-3.4

NO Go to 17-4.4

17-3.4 Store R11 (next tracker pointer) as new chain start (CSTRT).

Mask in end code (Ø2ØØ) in upper of new chain start access word.

Go to 17-1.2

17-4.Ø Now chain together shuffled trackers previous and next trackers.

a) Load in access word of previous tracker.

b) Mask in R11 (next tracker) in the lower of access word.

c) Store back.

d) Load in access word of next tracker.

e) Mask in R1Ø (previous tracker) in the upper of access word.

f) Store back.

Go to 17-1.2

| | |
|---|---|
| Program Name: | ABTCAL |
| Size: | Ø217 |
| Call: | JLM ABTCAL |
| Input: | R2 = tracker number, R3 = band width, R4 = center frequency |
| Exit: | normal return |
| Output: | none |
| External References: | none |
| Data Referenced: | SSAV Register save area |

| | |
|---|---|
| CFLAG1 | Control flag #1 |
| EXTAB | Tracker access table |
| CEND | Last tracker in chain |
| CSTRT | First tracker in chain |
| ABTC5Ø | Routine Constants |
| ABTC51 | Routine constants |
| TRKF | Table of Tflags |
| TRKD | Table of parameter addresses |
| TPAR(X) | Current Tracker parameter area |

Purpose: This routine will either add or delete a specified or unspecified tracker from service.

Synopsis: 18-1.Ø Save registers and load RØ with CFLAG1 bits Ø4, Ø5 control action.

| Bit Ø4 | Bit Ø5 | |
|---|---|---|
| Ø | Ø | Unspecified delete |
| Ø | 1 | Specified delete |
| 1 | Ø | Unspecified add |
| 1 | 1 | Specified add |

Check bit Ø4 of CFLAG1.

| | | |
|---|---|---|
| Add | Bit Ø4 set | Go to 18-1.1 |
| Delete | Bit Ø4 clear | Go to 18-2.Ø |

18-1.1 Check bit Ø5 CFLAG1.

| | | |
|---|---|---|
| Specified | Bit Ø5 set | Go to 18-1.2 |
| Not specified | Bit Ø5 clear | Go to 18-1.8 |

18-1.2 R2 = tracker number to add.

Check access word for this tracker.

Has tracker been defined?

YES Go to 18-1.7

NO Go to 18-1.3

18-1.3 Get last tracker in chain in R6 (CEND).

Store this tracker as last.

Get routine constants for add.

Get previous end access word in R8.

R8 = Ø none active Go to 18-1.4

R8 ≠ Ø active Go to 18-1.5

18-1.4 Store this tracker as start (CSTRT).

Load access word register, R1, with Ø2ØØ, Ø.

Go to 18-1.6

18-1.5 Mask this tracker in lower last end trackers.

Access word and store back.

Load previous end tracker number to upper of R1.

R1 builds this trackers access word.

Go to 18-1.6

18-1.6 Mask in end code in lower R1 and store in access table.

Store a Ø16ØØØ2 in this trackers TFLAG1.

Now clear out this trackers parameter area except for: band width = R3, center Frequency = R4.

Go to 18-1.7

18-1.7 Restore registers and return.

18-1.8 Search tracker access table for undefined tracker.

All defined Go to 18-1.7

One open Go to 18-1.9

18-1.9 Load R2 with tracker number of open slot.

Go to 18-1.3

18-2.0 Check bit Ø5 of CFLAG1.

Specified Bit Ø5 set Go to 18-2.1

Not specified Bit Ø5 clear Go to 18-4.Ø

18-2.1 Load constants for delete.

Get access word of tracker to be deleted in R6.

Clear access word and its Tflag.

Was tracker defined?

YES Go to 18-2.2

NO Go to 18-1.7

18-2.2 Load deleted trackers pointers as follows:

R6 = previous pointer

R7 = next pointer

If R6 = R7 then this was only tracker in system.

R6 = R7 Go to 18-2.3

R6 ≠ R7 Go to 18-2.4

18-2.3 Clear end and start chain pointers (CEND, CSTRT).

Go to 18-1.7

18-2.4 Check to see if R6 = end code, if so this was start of chain.

R6 = Ø2ØØ (R11) Go to 18-2.5

R6 ≠ Ø2ØØ (R11) Go to 18-3.Ø

18-2.5 Store R7 as new chain start.

Mask in end code in upper of R7 access word and store back.

Go to 18-1.7

18-3.Ø Check R7 for end code (R11), if so this was last tracker in chain.

R7 = R11 Go to 18-3.1

R7 ≠ R11 Go to 18-3.2

18-3.1 Store R6 as end of chain (CEND).

Then mask in an end code in the lower of R6's access word and store back.

Go to 18-1.7

18-3.2 a) Mask in R7 in lower of R6's access word.

b) Store back.

c) Mask in R6 in the upper of R7's access word.

d) Store back.

Go to 18-1.7

18-4.Ø Load end of chain (CEND) into R2.

Go to 18-2.1

| | | |
|---|---|---|
| Program Name: | OIX | |
| Size: | Ø717 | |
| Call: | JLM OIX | |
| Input: | none | |
| Exit: | normal return | |
| Output: | none | |
| External References: | ABTCAL | |
| Data Referenced: | RSAV | Register save area |
| | CFLAG1 | Control flag #1 |
| | OIXA | Shift value |
| | OIXD | Input command buffer |
| | OTAB1 | Table of input rates |
| | OTAB2 | Table of offset band widths |
| | KCON | Offset band width |
| | SBN | Display save for frequency of input |
| | SAMAX | Input rate value |
| | ORTAB | Table of OR values |
| | AAFLG | Auto assign flag |
| | ATAB | Auto load table |
| | EXTAB | Tracker access table |

| | |
|---|---|
| ANDTAB | Table of AND values |
| TRKD | Table of tracker parameter addresses |
| CSTRT | Start of chain tracker number |
| CEND | End of chain tracker number |
| TRKF | Table of Tflagls |
| TRKB | Table of tracker buffer addresses |
| RSBUF | Raw spectrum buffer |
| BFO | Multiply bias for center frequency |
| EFO | Add bias for center frequency |
| BAW | Bias for band width |
| OTABJ1-OTABJ4 | Routine jump tables |
| OCON1 | Routine constants for auto table |

Purpose: To interrogate the operator command word execute its functions.

Synopsis: 19-1.Ø Save registers and load RØ with CFLAG1.

Check bit Ø15 of CFLAG1 (if new command is in this bit will be set).

| | | |
|---|---|---|
| Bit Ø15 | set | Go to 19-2.Ø |
| Bit Ø15 | clear | Go to 19-1.1 |

19-1.1 Store back RØ at CFLAG1.

Restore the registers and return.

19-2.Ø Take input command word (OIXD) and load the following registers.

| | | |
|---|---|---|
| Upper four bits OIXD | R8 | D3 |
| Second four bits OIXD | R9 | D2 |
| Third four bits OIXD | R1Ø | D1 |

Fourth four bits OIXD R11 DØ

Zero bit Ø15 and set bit Ø17 of CFLAG1 (RØ).

Set bit Ø14 of CFLAG1.

Check D2 (R9).

D2 = 9 Go to 19-3.Ø

D2 = 8 Go to 19-4.Ø

D2 < 8 Go to 19-6.Ø

19-3.Ø Check DØ (R11).

DØ = Ø Go to 19-3.1

DØ ≠ Ø Go to 19-3.4

19-3.1 Check D1 (R1Ø).

D1 = 9 Go to 19-3.3

D1 ≠ 9 Go to 19-3.2

19-3.2 Clear bit 010 of CFLAG1. Go to 19-1.1.

19-3.3 Set bit 010 of CFLAG1. Go to 19-1.1.

19-3.4 Check DØ (R11)

DØ ≥ 7 Go to 19-3.2

DØ < 7 Go to 19-3.5

19-3.5 Load R2 with input rate (OTAB1, R11).

Load R3 with offset band width (OTAB2, R11).

Store R11 at SBW frequency for display.

R3 → KCON location for offset value

R2 → SAMAX input rate location

Set bit Ø13, clear bit 010 of CFLAG1.

Go to 19-1.1

19-4.Ø Use jump table OTABJ1 with D1 (R10) as key.

D1 = Ø, 3, 4, 5, 6, 7, 8 Go to 19-5.Ø

D1 = 1 Go to 19-4.1

D1 = 2 Go to 19-4.3

D1 = 9 Go to 19-4.4

19-4.1 Clear bit Ø2 of CFLAG1.

19-4.2 Clear bit Ø3 of CFLAG1. Go to 19-5.Ø

19-4.3 Set bit Ø2 of CFLAG1. Go to 19-4.2

19-4.4 Check DØ (R11).

DØ ≥ 8 Go to 19-5.Ø

DØ < 8 Go to 19-4.5

19-4.5 Clear corresponding bit in CFLAG3 as DØ designates; then store CFLAG3 away.

Go to 19-1.1

19-5.Ø Use jump table OTABJ2 with DØ (R11) as key.

DØ = Ø Go to 19-1.1

DØ = 1 Go to 19-5.1

DØ = 2 Go to 19-5.3

DØ = 3 Go to 19-5.4

DØ = 4 Go to 19-5.6

DØ = 5 Go to 19-5.7

DØ = 6 Go to 19-5.8

DØ = 7, 8, 9 Go to 19-1.1

19-5.1 Clear bit Ø CFLAG1.

19-5.2 Clear bit 1 CFLAG1. Go to 19-1.2

19-5.3 Set bit Ø CFLAG1. Go to 19-5.2

19-5.4 Clear bit Ø CFLAG1.

19-5.5 Set bit 1 CFLAG1. Go to 19-1.1

19-5.6 Set bit Ø CFLAG1. Go to 19-5.5

19-5.7 Set bit Ø11 CFLAG1. Go to 19-1.1

19-5.8 Clear bit Ø11 CFLAG1. Go to 19-1.1

19-6.Ø Check D3 (R8).

D3 = 9 Go to 19-6.1

D3 = 8 Go to 19-7.Ø

D3 < 8 Go to 19-8.Ø

19-6.1 Check D2 (R9).

D2 = Ø Go to 19-6.7

D2 = 1 Go to 19-6.3

D2 = 2 Go to 19-6.2

D2 > 2 Go to 19-1.1

19-6.2 Set bit Ø7 in CFLAG1. Go to 19-6.3

19-6.3 Check DØ (R11).

DØ = Ø Go to 19-1.1

DØ = 1, 2, 3 Go to 19-6.4

DØ > 3 Go to 19-1.1

19.6.4 Check bit (R11) of AAFLG.

Bit (R11) of AAFLG set Go to 19-6.5

Bit (R11) of AAFLG clear Go to 19-6.6

19-6.5 Check bit Ø7 of CFLAG1.

Bit Ø7 set Go to 19-6.6

Bit Ø7 clear Go to 19-1.1

19-6.6 Set bit (R11) of AAFLG.

Then:

a) Find address of auto table. ATAB + 24 + DØ b) Load EXTAB into first 8 locations of auto table.

c) Load center frequencies from parameter area into second 8 locations.

d) Load band widths from parameter area into third 8 locations.

Go to 19-1.1

19-6.7 Check bit (R11) of AAFLG.

Bit (R11) set Go to 19-6.8

Bit (R11) clear Set R11-4, Go to 19-6.8

19-6.8 a) Set EXTAB to first eight locations of auto table.

b) Set center frequencies to second eight locations of auto table.

c) Set band widths to third eight locations of auto table.

d) Set CSTRT to first tracker in EXTAB chain.

e) Set CEND to last tracker in EXTAB chain.

f) Set Tflags of all active trackers = Ø16ØØ22.

Go to 19-1.1

19-7.Ø Use jump table OTABJ3 and key D2 (R9).

| | |
|---|---|
| D2 = Ø | Go to 19-7.1 |
| D2 = 1, 2, 3, 4 | Go to 19-7.3 |
| D2 = 5, 6, 7, 8, 9 | Go to 19-1.1 |

19-7.1 Clear bit Ø4 of CFLAG1.

19-7.2 Clear bit Ø5 of CFLAG1.

Restore CFLAG1.

Call ABTCAL

Go to 19-1.1

19-7.3 Call OCF. Compute center frequency.

Call OBW. Compute band width.

Set bit Ø4 of CFLAG1.

Go to 19-7.2

19-8.0 Use OTABJ4 as jump table with D2 (R9) as key.

| | |
|---|---|
| D2 = Ø | Go to 19-8.1 |
| D2 = 1, 2, 3, 4 | Go to 19-8.3 |
| D2 = 5 | Go to 19-9.1 |
| D2 = 6 | Go to 19-9.Ø |
| D2 = 7 | Go to 19-8.4 |

D2 = 8, 9 Go to 19-1.1

19-8.1 Clear bit Ø4 of CFLAG1.

19-8.2 Set bit Ø4 of CFLAG 1.

Load D3 to R2 (tracker number).

Store back CFLAG2 (RØ).

Call ABTCAL.

Go to 19-1.1

19-8.3 Call OCF.

Call OBW.

Set bit Ø4 CFLAG 1.

Go to 19-8.2

19-8.4 Set bit Ø14 of TFLAG1 for tracker number (D3).

Restore TFLAG1.

Go to 19-1.1

19-9.Ø Set bit Ø14 of tracker (R2) Tflag, then store it back.

Go to 19-9.1

19-9.1 Check R1Ø (D1), if D1 is zero move interrupted as negative, if D1 ≠ Ø then move is interrupted as positive.

D1 = Ø Go to 19-9.4

D1 ≠ Ø Go to 19-9.2

19-9.2 Get current predicted frequency (QFP) and add D1 to it (R8, is tracker number).

Check $FP_{new}$ = FP + D1 for in bounds (R2).

$FP_{new} \geq 5ØØ$ Go to 19-1.1

$FP_{new} < 5ØØ$ Go to 19-9.3

19-9.3 Store FP + D1 → FP

CF + D1 → CF

Then do the following move in the tracker buffer defined by (R8).

$$Y_{i+D1} \rightarrow Y_C \qquad i = \emptyset,\ BW\text{-}D1$$

This shifts the reference buffer down by Ø1, we then have to fill the upper D1 bins from the raw Spectrum buffer.

We calculate RSBUF + FP + BW/2 and then move D1 bias from there to the reference buffer, $REF_\emptyset$ + BW-D1 is the start of reference fill area.

Go to 19-1.1

19-9.4 Get current predicted frequency and subtract D1 from it. Check it for within bounds $FP_{new} = FP_{old} - D1$.

$$FP_{new} < \emptyset \qquad \text{Go to 19-1.1}$$

$$FP_{new} \geq \emptyset \qquad \text{Go to 19-9.5}$$

19-9.5 Now we will move the tracker reference buffer defined by D3 as follows.

$$Y_{i-D1} \rightarrow Y_i \qquad i = D_i\text{: } BW$$

We have now shifted the reference buffer up D1 bins. Now we have to fill the lower D1 bins from the raw Spectrum buffer. We then move D1 bins from:

RSBUF + FP - BW/2 - D1 to $REF_\emptyset$

Go to 19-1.1

19-9.6 Store: $FP_1 \neq D1 \rightarrow FP$ $CF - D1 \rightarrow CF$ 19-1Ø.Ø CCF routine - compare center frequency from parameters DØ, D1.

| | |
|---|---|
| Multiply D1 (R1Ø) by 1Ø. | 1Ø * (R1Ø) |
| Add DØ to it. | 1Ø * (R1Ø) + R11 |
| Multiply that sum by BFO. | BFO (1Ø * (R10) + R11) |
| Add to that product EFO. | BFO*(1Ø * (R10) + |

R11) + EFO

Store result in R4.

Return.

19-11.Ø OBW routine - compute band width from parameter in D2.

Multiply D2 (R9) by BAW.

Store result in R3.

Return.

| | | |
|---|---|---|
| Program Name: | SAINT | |
| Size: | Ø34 | |
| Call: | none, interrupt routine | |
| Input: | none | |
| Exit: | return to interrupted address | |
| Output: | none | |
| External References: | none | |
| Data Referenced: | PSAV | Register save area |
| | SACNT | Constant table |

Purpose: To handle input request interrupt from spectrum analyzer and determine if input is needed. If so then initiate input requests.

Synopsis: 2Ø-1.Ø Save registers, load constants which contain input counter and increment counter.

R5 = input counter

R6 = input accept value

Do we accept this input?

NO Go to 2Ø-1.1

YES Go to 2Ø-1.2

2Ø-1.1 Clear loop counter for number of IO commands (do only one).

Go to 2Ø-2.Ø

20-1.2 Clear input counter R5.

Go to 2Ø-2.Ø

2Ø- 2.Ø Load in IOC command and store at IOC command cell address (Ø14Ø).

Note: Accept data, do re-enable interrupts, input data.

No accept do only re-enable.

Activate IOC and wait until IOC has taken command.

Do we accept data this time?

NO Go to 2Ø-3.Ø

YES Go to 2Ø-2.1

2Ø-2.1 Store counter back at SACNT.

Load status register and P register with interrupted values and return.

| | | |
|---|---|---|
| Program Name: | SACINT | |
| Size: | Ø47 | |
| Call: | none, interrupt routine | |
| Input: | none | |
| Exit: | return to interrupted address if tracker active go to display | |
| Output: | none | |
| External References: | DISP, ABTCAL | |
| Data Referenced: | PSAV | Register save area |
| | SFLAG | Input in flag |
| | RTFLAG | Tracker active flag |
| | SACCOM | Constant table |
| | CFLAG1 | Control flag #1 |

Purpose: To process data in interrupt from the spectrum analyzer. If tracker is still active then return in error recovery mode.

Synopsis: 21-1.Ø Save registers, set input in flag and load tracker active flag to R2. Get constants for IOC commands.

Load command to re-enable interrupts and store at IOC command call address (Ø14Ø).

Activate IOC and wait till IOC has taken control.

Check tracker active flag (R2).

| | |
|---|---|
| R2 = Ø | Go to 21-3.Ø |
| R2 ≠ Ø | Go to 21-2.Ø |

21-2.Ø Zero bits 4, 5 in CFLAG1 and call ABTCAL (delete unspecified tracker).

Decrement R2 (number of trackers active) and check again.

| | |
|---|---|
| R2 ≠ Ø | Go to 21-2.Ø |
| R2 = Ø | Go to DISP in SEXEC |

21-3.Ø Restore the registers and load status register one and P register with interrupted values and return.

| | | |
|---|---|---|
| Program Name: | OINT | |
| Size: | Ø41 | |
| Call: | none, interrupt routine | |
| Input: | none | |
| Exit: | return to interrupted address | |
| Output: | none | |
| External References: | none | |
| Data Referenced: | PSAV | Register save area |
| | OINT1 | Constant table |
| | OIXD | Input command word storage |

CFLAG1 Control flag #1

Purpose: To process interrupts from the operator switch.

Synopsis: 22-1.Ø Save registers, load constants.

Store interrupt at OIXD so OIX can process it.

Store command to re-enable interrupts at IOC command cell address (Ø14Ø).

Activate IOC.

Wait for IOC to take command.

Set bit Ø15 in CFLAG1 (this signifies an operator has occurred).

Restore registers and load in status register one and P register from interrupted values and return.

Program Name: POWER

Size: Ø1Ø

Call: none, interrupt routine

Input: none

Exit: return to interrupted address

Output: none

External References: none

Data Referenced: PRSAV Register save area

Purpose: To handle power out of tolerance interrupts.

Synopsis: 23-1.Ø Save registers.

Wait until power is within bounds.

Restore registers and load back interrupted status register and P register and return.

UTILITY ROUTINES

Program Name: OVX2

Size: Ø3Ø

Call: JLM OVX2

Input: R4, R5 $\Sigma x^2$

Exit: normal return

Output: R4, R5 $\Sigma x$ without overflow

SCFX2 with the overflow amount

External References: none

Data Referenced: RSAV1 Register save area

POFLG Overflow flag

SCFX2 Overflow accumulation

Purpose: To check overflow on the $\Sigma x^2$ calculation in the accumulation routine. If overflow occurred accumulate it is SCFX2.

Synopsis: U1-Ø Check overflow.

Overflow Go to U1-2

No overflow Go to U1-1

U1-1 Return.

U1-2 Save registers R13 - R15. Set the overflow flag POFLAG. Load in the $\Sigma x^2$ overflow value (SCFX2). Shift off the upper six bits of $\Sigma x^2$ and add it to the overflow value, then store away the overflow value. Restore the upper register of $\Sigma x^2$ with the upper 6 bits clear. Restore R13 - R15.

Go to U1-1

Program Name: OVX2

Size: Ø3Ø

Call: JLM OVY2

Input: R6, R7 $\Sigma y^2$

Exit: normal return

Output: R6, R7 $\Sigma y^2$ without overflow

SCFY2 with the overflow amount

External References: none

Data Referenced: RSAV1 Register save area

POFLG Overflow flag

SCFY2 Overflow accumulation

Purpose: To check overflow on the $\Sigma y^2$ calculation in the accumulation routines. If overflow occurred accumulate it in SCFY2.

Synopsis: U2-Ø Check overflow

Overflow occurred Go to U2-2

No overflow Go to U2-1

U2-1 Return

U2-2 Save register R13 - R15. Set the overflow flag POFLG. Load in the $\Sigma y^2$ overflow value (SCFY2). Shift off the upper six bits of $\Sigma y^2$ and add it to the overflow value, then store it away. Restore the upper register of $\Sigma y^2$ sum with the upper six bits clear. Restore R13 - R15.

Go to U2-1

Program Name: OVXY

Size: Ø3Ø

Call: JLM OVXY

Input: R8, R9 $\Sigma xy$

Exit: normal return

Output: R8, R9 $\Sigma xy$ without overflow

SCFXY with the overflow amount

External References: none

Data Referenced: RSAV1 Register save area

POFLG Overflow flag

SCFXY Overflow accumulation

Purpose: To check overflow on the $\Sigma xy$ calculation in the accumulation routines. If overflow occurred accumulate it in SCFXY.

Synopsis: U3-Ø Check overflow

| | |
|---|---|
| Overflow occurred | Go to U3-2 |
| No overflow | Go to U3-1 |

U3-1 Return

U3-2 Save registers R13 - R15. Set the overflow flag POFLG. Load in the $\Sigma xy$ sum overflow value (SCFXY). Shift off the upper six bits of $\Sigma xy$ and add it to SCFXY, then store it away. Now restore the upper register of $\Sigma xy$ with the upper six bits cleared. Restore R13 - R15.

Go to U3-1

Program Name: UNFLX

Size: Ø14

Call: JLM UNFLX

Input: R4, R5 $\Sigma x^2$

Exit: normal return

Output: R4, R5 $\Sigma x^2$ without underflow

SCFX2 with corrected overflow value

External References: none

Data Referenced: SCFX2 $\Sigma x^2$ overflow accumulation

Purpose: To check if underflow occurred in $\Sigma x^2$ subtractions in ACUM2. If so, the $\Sigma x^2$ is made positive by retrieving some of the overflow from SCFX2.

Synopsis: U4-Ø Check for underflow

| | | |
|---|---|---|
| Underflow | R4 $<$ Ø | Go to U4-1 |
| No underflow | R4 $\geq$ Ø | Go to U4-2 |

U4-1 Add Ø76ØØØ to $\Sigma x^2$(R4, R5) upper.

Subtract Ø76ØØØ from the overflow value (SCFX2).

Store back.

Go to U4-2

U4-2 Return.

Program Name: UNFLY

Size: Ø14

Call: JLM UNFLY

Input: R8, R9 $\Sigma y^2$

Exit: normal return

Output: R8, R9 $\Sigma y^2$ without underflow

SCFY2 with corrected overflow value

External References: none

Data Referenced: SCFY2 $\Sigma y^2$ overflow accumulation

Purpose: To check if underflow occurred in the $\Sigma y^2$ subtraction in ACUM2. If so, the $\Sigma y^2$ is made positive by retrieving some of the overflow from SCFY2.

Synopsis: U5-Ø Check for underflow.

| | | |
|---|---|---|
| Underflow | R8 $<$ Ø | Go to U5-1 |
| No underflow | R9 $\geq$ Ø | Go to U5-2 |

U5-1 Add Ø76ØØØ to $\Sigma y^2$(R8, R9) upper.

Subtract Ø76ØØØ from the overflow value SCFY2.

Store back.

Go to U5-2

U5-2 Return.

Program Name: PSQR

Size: Ø7Ø

Call: JLM PSQR

Input: value to find the square root of data in TSAV, TSAV +1

Exit: normal return

Output: square root in TSAV

External References: PSFR

Data Referenced:

| | |
|---|---|
| PPSV | Register save area |
| TSAV | Input/output buffer |
| SSSV | Storage for input value |

Purpose: To find the square root of any positive double word length value.

Synopsis: U6-Ø Save the registers, then check the input value for negative

Input ≥ Ø  Go to U6-1

Input < Ø  Go to U6-7

U6-1 Now scale factor the input value and check shift count.

Shift count = 31 (input = Ø)  Go to U6-6

Shift count ≠ 31  Go to U6-2

U6-2 Get first approximation R4 = 2 (shift count - 1). Load in loop counter (maximum approximations = 2Ø).

U6-3 R6 = R4 = approximation, check R4.

R4 = Ø (divide by Ø)  Go to U6-6

R4 ≠ Ø  Go to U6-4

U6-4 Divide input value by approximation and round the result by checking remainder.

Now take quotient and subtract approximation from it. Divide difference by 2 and add it to approximation.

Check this value against the approximation.

The same  Go to U6-6

Different  Go to U6-5

U6-5 Use this calculated value as next approximation. Reload original value. Have we done 2Ø approximations?

NO Go to U6-3

YES Go to U6-6

U6-6 Store our value (R1) in TSAV. Restore the registers and return.

| | |
|---|---|
| $A_i$ | this approximation |
| $A_{i+1}$ | next approximation |
| SUM | original value |

$$\frac{SUM}{A_i} = A_k \qquad A_{i+1} = A_i + \frac{A_k + A_i}{2}$$

Exit when $A_{i+1} = A_i$ or 2Ø iterations done.

U6-7 Error exit when input is negative or a divide by Ø is encountered.

| | |
|---|---|
| Program Name: | PSFR |
| Size: | Ø34 |
| Call: | JLM PSFR |
| Input: | value to be scale factored in TSAV, TSAV + 1 |
| Exit: | normal return |
| Output: | scale factored result in TSAV, TSAV + 1<br>shift count result in TSAV in TSAV + 2 |
| External References: | none |
| Data Referenced: | PSAV1 Register save area<br>TSAV Input/output buffer |

Purpose: To simulate scale factor instruction. Input value is shifted up until $bit_{17} \neq bit_{16}$ of upper of Z word location and shift count is recorded.

Synopsis: U7-Ø Save registers. Get double word input value from TSAV, TSAV + 1. Check input for Ø

Input = Ø Go to U7-1

Input ≠ Ø Go to U7-2

U7-1 Set shift count to 31.

Go to U7-5

U7-2 Input in (RØ, R1). Check RØ for negative.

RØ < Ø Go to U7-4

RØ ≥ Ø Go to U7-3

U7-3 Shift RØ, R1 1 to the left, increment shift count.

Go to U7-2

U7-4 Shift RØ, R1 to the right by 1, decrement shift count.

Go to U7-5

U7-5 Store away scale factored value and shift count respectively in TSAV, TSAV + 1, TSAV + 2.

Restore the registers and return.

| | | |
|---|---|---|
| Program Name: | TEXEC | |
| Size: | Ø14Ø | |
| Call: | JLM TEXEC | |
| Input: | R5 = tracker number | |
| Exit: | normal return | |
| Output: | none | |
| External References: | TINIT, TLALI, ICOMP, ACUM1, ACUM2, RCOMP, TNORM, WGHT, COMR, THOLD, TALI, TDEL, TPRED | |
| Data Referenced: | ESAV | Register save area |
| | TRKB | Table of tracker buffer addresses |

| | |
|---|---|
| TRKD | Table of tracker parameter addresses |
| TRKF | Table of Tflagls |
| TREF | Working storage for current tracker buffer, parameter, Tflag |
| KCON | Offset band width |
| TPAR(X) | Current tracker parameter area number = x |
| RSBUF | Row spectrum buffer |
| TFLAG1 | Working Tflagl |
| RTABS | Best R value table |

Purpose: Control routine for execution of tracker module.

Synopsis: 1-Ø Save registers. With tracker number in RS get this trackers buffer start address, parameter area, and Tflagl and store them at TREF, TOAT, TFLAG1.

Clear accumulation parameter to pick up ACUM1 on first pass.

Call to TINIT.

Call to TLALI.

Pick up offset band width and get first offset in R8, end check offset in R7.

1-1.Ø Load registers for 1COMP call.

Call 1COMP.

Call ACUMX.

Increment ACUM pointer so all further calls will go to ACUM2.

Call RCOMP

Call TNORM

Call WGHT

Call COMR

Check to see if all offsets run

YES Go to 1-2.Ø

NO Increment R8, store at R13, Go to 1-1.Ø

1-2.Ø Call THOLD

Load in RTABS table and a) R → tracker parameter area b) Working BW → " " "

c) Absolute reference start → " " "

d) relative data start → " " "

Now get TFLAG1 and check bit Ø2.

Bit Ø2 TFLAG1 set Go to 1-2.1

Bit Ø2 TFLAG1 clear Go to 1-2.2

1-2.1 Load registers and call TALI.

Go to 1-2.2

1-2.2 Load registers and call TDEL.

Call TPRED.

Store working TFLAG1 in table of TFLAG1s (TRKF).

Restore registers and return.

| | |
|---|---|
| Program Name: | TINIT |
| Size: | Ø51 |
| Call: | JLR R12, TINIT |
| Input: | none |
| Exit: | normal return |
| Output: | none |
| External References: | none |
| Data Referenced: | RSAV Register save area |

| | |
|---|---|
| TFLAG1 | Working Tflag in ABT module |
| TDAT | Address of current tracker parameter area |
| TPAR(X) | Current tracker parameter area<br>X = tracker number |

Purpose: This routine determines if initialization or re-initialization is called for from the Tflag settings, if so then it sets up the tracker parameter area for initialization.

Synopsis: 2-1.Ø The registers are saved and RØ is loaded with the current TFLAG1.

2-1.1 Check bit Ø16 in TFLAG1. If this bit is set initialization is needed.

| | |
|---|---|
| Bit Ø16 set | Go to 2-2.Ø |
| Bit Ø16 clear | Go to 2-1.2 |

2-1.2 Check bit Ø15 in TFLAG1. If this bit is set then re-initialization is called for.

| | |
|---|---|
| Bit Ø15 set | Go to 2-2.1 |
| Bit Ø15 clear | Go to 2-1.3 |

2-1.3 Restore the registers and return.

2-2.Ø Clear bit Ø16 in TFLAG1 (RØ).

2-2.1 Clear bits Ø15, Ø4, and Ø2 in TFLAG1.

Set up the tracker parameter area for initialization.

a) $CF_{initial} \rightarrow CF, FP, P_{i-1}, P_{i-2}, P_{i-3}, P_{i-4}, P_{i-5}$ b) Ø → Threshold counter c) Ø2ØØ → QRD, denominator for prediction d) $CF_{initial} \times 2 \rightarrow$ QRN, numerator for prediction 2-2.2 RØ is stored back at TFLAG1 (restore flag with bit changes).

Go to 2-1.3

| | | |
|---|---|---|
| Program Name: | TLALI | |
| Size: | Ø35 | |
| Call: | JLR R12, TLALI | |
| Input: | none | |
| Exit: | normal return | |
| Output: | none | |
| External References: | none | |
| Data Referenced: | TFLAG1 | Working Tflag in ABT module |
| | TDAT | Address of current tracker parameter area |
| | TREF | Address of current tracker buffer |
| | B3AD | Address of ALI re-initialization buffer |
| | RSAV | Register save area |
| | TPAR(X) | Current tracker parameter area X = tracker number |

Purpose: This routine will reload the tracker reference buffer from the ALI initialization buffer if it is needed.

Synopsis: 3-1.Ø Upon entry the registers are saved and register nine, R9, is loaded with TFLAG1.

3-1.1 Bit Ø4 of TFLAG1 is checked. If clear, the tracker buffer needs re-initialization; if set, this routine needs to do nothing.

Bit Ø4 set Go to 3-1.2

Bit Ø4 clear  Go to 3-2.Ø

3-1.2 Restore the registers and return.

3-2.0 Find the start of the tracker in the ALI initialization buffer (B3AD + CF - $^{BW}/2$). Set up registers for move:

| | |
|---|---|
| R1 | location in ALI initialization buffer |
| RØ | location in current tracker reference buffer |
| R2 | last location in ALI + 1 |

When tracker reference buffer is completely loaded

Go to 3-1.2

| | | |
|---|---|---|
| Program Name: | ICOMP | |
| Size: | Ø62 | |
| Call: | JLR R12, ICOMP | |
| Input: | R13 = offset parameter | |
| | R14 = relative center frequency | |
| | R15 = band width | |
| Exit: | normal return | |
| Output: | R13 = band width for summation | |
| | R14 = absolute start of data buffer | |
| | R15 = absolute start of reference buffer | |
| External References: | none | |
| Data Referenced: | RTABT | Temporary R table |
| | RSAV | Register save area |
| | RSBUF | Raw spectrum buffer |
| | TREF | Address of current tracker buffer |

Purpose: This routine calculates the starting positions in the data and reference buffers and the width of summation for the accumulation routines.

Synopsis: 4-1.Ø Upon entry the registers are saved and the offset and center frequency are stored in the RTABT table.

4-1.1 The value L = $^{BW}/2$ - CF - R is calculated. If L is positive the band width overlaps the lower edge of the spectrum buffer, if it is negative it doesn't.

L positive Go to 4-1.2

L negative Go to 4-2.Ø

4-1.2 Set

| | | |
|---|---|---|
| R13 = Ø | relative data buffer start |
| R14 = L | relative tracker buffer start |
| R15 = BW-L | band width for summation |

Go to 4-4.Ø

4-2.0 Compute L1 = L + 5ØØ - BW, if L1 is positive then the band width is within the spectrum buffer, if it is negative then it overlaps the upper edge of the spectrum buffer.

L1 positive Go to 4-2.1

L1 negative Go to 4-3.Ø

| | | |
|---|---|---|
| 4-2.1 | R13 = -L | relative data buffer start |
| | R14 = Ø | relative tracker buffer start |
| | R15 = BW | band width for summation |

Go to 4-4.Ø

| | | |
|---|---|---|
| 4-3.Ø | R13 = -L | relative data buffer start |
| | R14 = 0 | relative tracker buffer start |
| | R15 = 5ØØ + L | band width for summation |

Go to 4-4.0

4-4.Ø Convert the relative data and reference buffer pointers to absolute. Store the absolute pointers along with the band width in RTABT table. Set up the exit by:

| | |
|---|---|
| R13 = | band width |
| R14 = | absolute data buffer start address |
| R15 = | absolute reference buffer start address |

Then restore registers RØ - R12 and return.

| | | |
|---|---|---|
| Program Name: | ACUM1 | |
| Size: | Ø72 | |
| Call: | JLR R12, ACUM1 | |
| Input: | R13 = working band width | |
| | R14 = absolute start address in data buffer | |
| | R15 = absolute start address in reference buffer | |
| Exit: | normal return | |
| Output: | none | |
| External References: | OVX2, OVY2, OVXY | |
| Data Referenced: | RSAV | Register save area |
| | BPREV | Storage for previous band width for ACUM2 |
| | RTABS | Best R value table |
| | ANDTAB | Table of AND values |
| | SCFX2 | Scale for $\sum x^2$ |
| | SCFY2 | Scale for $\sum y^2$ |
| | SCFXY | Scale for $\sum xy$ |
| | LPCK | Storage for summation and check |
| | SMX | $\sum x$ |
| | SMY | $\sum y$ |
| | SMX2 | $\sum x^2$ |

SMY2 $\sum y^2$

SMXY $\sum xy$

Purpose: This routine computes the summations in the data and reference buffers for the calculations in RCOMP. This routine is used only in the first offset value.

Synopsis: 5-1.Ø Upon entry the registers are saved, the band width is stored at BPREV, the RTABS table is cleared out except for the R position where a large negative value is stored. The scale save locations are zeroed out and LPCK is set to the last location in the data buffer summation + 1.

All the summation registers are cleared:

RØ, R1 $\sum x$

R2, R3 $\sum y$

R4, R5 $\sum x^2$

R6, R7 $\sum y^2$

R8, R9 $\sum xy$ 5-1.1 This is the start of the summation loop.

The x, y load registers are cleared out.

x load, y load } R10 - R13 a) x is loaded R11, R13 b) x is added to $\sum x$ R10, R11+RØ, R1 $\rightarrow$ R1, R1 c) $x^2$ is computed R12, R13 d) $x^2$ is added to $\sum x^2$ R12, R13 + R4, R5 $\rightarrow$ R4, R5 e) overflow is checked by call on OVX2 f) y is loaded R13 g) xy is computed R10, R11 h) xy is added to $\Sigma xy$ — R10, R11 + R8, R9 → R8, R9 i) overflow is checked by call on OVXY j) y is added to $\Sigma y$ — R10, R11 + R2, R3 → R2, R3 k) $y^2$ is computed — R10, R11 l) $y^2$ is added to $\Sigma y^2$ — R10, R11 + R6, R7 → R6, R7 m) overflow is checked by call on OVY2 n) check for summation complete

| | |
|---|---|
| Summation not complete | Go to 5-1.1 |
| Summation complete | Go to 5-2.Ø |

5-2.Ø The sums are stored away:

RØ, R1 → SMX

R2, R3 → SMY

R4, R5 → SMX2

R6, R7 → SMY2

R8, R9 → SMXY

The registers are restored and return to calling program.

| | |
|---|---|
| Program Name: | ACUM2 |
| Size: | Ø176 |
| Call: | JLR R12, ACUM2 |
| Input: | R13 = working band width |
| | R14 = absolute start address in data buffer |
| | R15 = absolute start address in reference buffer |
| Exit: | normal return |
| Output: | none |
| External References: | OVXY, OVX2, OVY2, UNFLX, UNFLY |

Data Referenced:

| | |
|---|---|
| RSAV | Register save area |
| BPREV | Last band width |
| SMY | $\Sigma y$ |
| SMX | $\Sigma x$ |
| SMX2 | $\Sigma x^2$ |
| SMY2 | $\Sigma y^2$ |
| SMXY | $\Sigma xy$ |
| SCFX2 | Scale on $x^2$ |
| SCFY2 | Scale on $\Sigma y^2$ |
| SCFXY | Scale on $\Sigma xy$ |

Purpose: This routine is used to calculate the summations for RCOMP on all passes except the first offset.

Figure 14A:
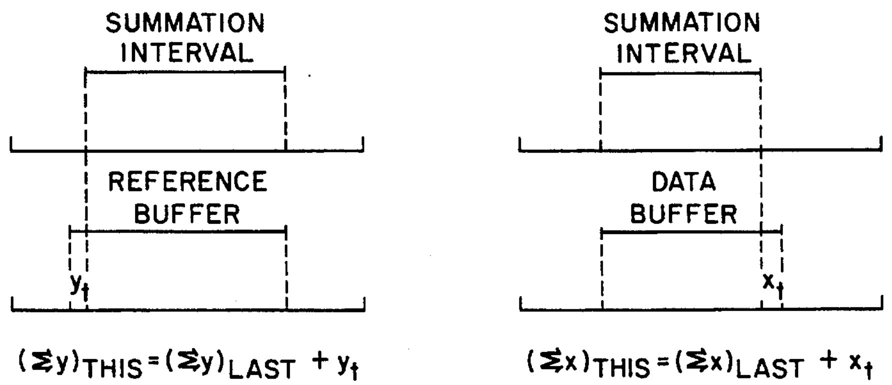
FIGS. 14*a*, 14*b*, 14*c* are illustrations of the band width comparisons associated with program ACUMZ.
Figure 14B:
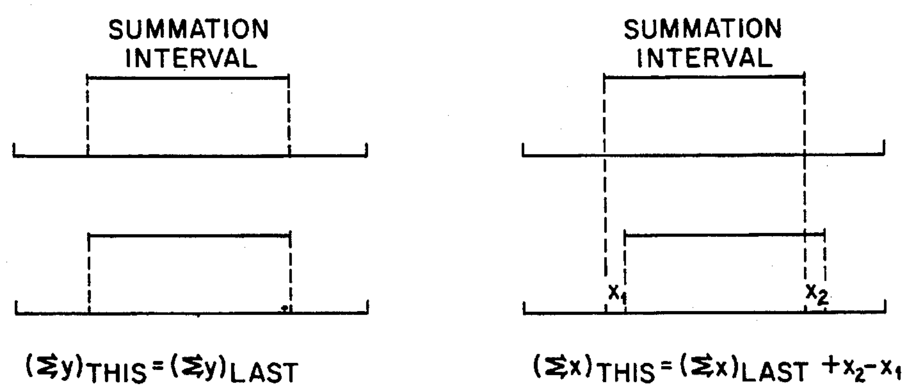
Figure 14C:
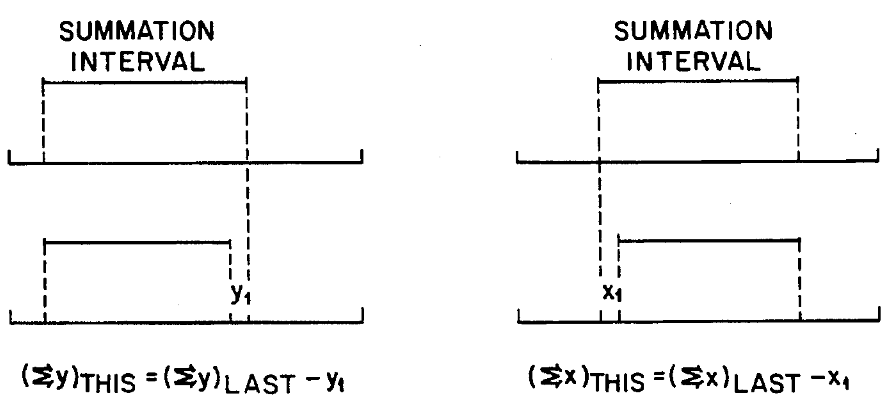

Synopsis: 6-1.Ø Upon entry the registers are saved and the band width is checked against the band width for the last pass.

a) $B_{now}$ (R13) $<$ $B_{previous}$ Go to 6-2.Ø
See Figure 14a b) $B_{now}$ (R13) $=$ $B_{previous}$ Go to 6-3.Ø
See Figure 14b c) $B_{now}$ (R13) $>$ $B_{previous}$ Go to 6-4.Ø
See Figure 14c 6-2.Ø Load reference bin start into R1, R7. Compute $y^2$ in R6, R7. Add the reference bin to $\Sigma y$ and $y^2$ to $\Sigma y^2$. Then check on overflow with $\Sigma y^2$ by a call on OVY2. Store the sums back at SMY, SMY2.

Now load the last bin of the data buffer summation in R1 and R5. Compute $x^2$ in R4, R5. Add x to $\Sigma x$ and store at SMX. Add $x^2$ to $\Sigma x^2$ and check for overflow on a call to OVX2. Then store the sum at SMX2.

Go to 6-5.Ø

6-3.Ø Load in the last data bin in the summation (x + B - 1) and the first data bin in the last summation (x - 1). Square both of these values.

Now we have:

| | |
|---|---|
| (x - 1) | RØ, R1 |
| $(x - 1)^2$ | R2, R3 |
| (x + B - 1) | R6, R7 |
| $(x + B - 1)^2$ | R4, R5 |

Add (x + B - 1) to SMX and $(x + B - 1)^2$ to SMX2. Check SMX2 for overflow by a call on OVX2. Subtract (x - 1) from SMX and subtract $(x - 1)^2$ from SMX2 and check on underflow by a call on UNFLX. Now store these sums back at SMX, SMX2.

Go to 6-5.Ø

6-4.Ø Load in the first data bin of the last summation (x - 1). Subtract this value from SMX and subtract $(x - 1)^2$ from SMX2 and check on overflow by a call on UNFLX.

Now load in the last reference bin of the last summation (y + B). Subtract this bin from SMY and subtract $(y + B)^2$ from SMY2 and check for overflow by a call on UNFLY. Then store these values back at SMY, SMY2.

Go to 6-5.Ø

6-5.Ø Clear the xy sum registers (R8, R9) and the scale for the xy sum (SCFXY). Store the band width away at BPREV for the checks on the next offset. Now go thru finding the xy products and add them to the sum registers checking for overflow each time by a call on OVXY. When sum is complete store away at SMXY.

Then restore the registers and return.

| | | |
|---|---|---|
| Program Name: | RCOMP | |
| Size: | Ø463 | |
| Call: | JLR R12, RCOMP | |
| Input: | none | |
| Exit: | normal return | |
| Output: | none | |
| External References: | PSFR, PSQR | |
| Data Referenced: | RSAV | Register save area |
| | TSAV | Storage for calls on PSFR, PSQR |
| | SMX | $\Sigma x$ |
| | SMY | $\Sigma y$ |
| | SMX2 | $\Sigma x^2$ |
| | SMY2 | $\Sigma y^2$ |
| | SMXY | $\Sigma xy$ |
| | SCFT1 | Overflow on $\Sigma x$, $\Sigma y$ |
| | SCFX2 | Overflow on $\Sigma x^2$ |
| | SCFY2 | Overflow on $\Sigma y^2$ |
| | SCFXY | Overflow on $\Sigma xy$ |
| | SCFR1 - SCFR4 | Working scales |
| | RSUM1 - RSUM9 | Working storage |
| | RTABT | Temporary R table |

Purpose: This routine takes the sums calculated in the summation routines and calculates a correlation value, R, for each offset.

Synopsis: 7-1.0 Upon entry the registers are saved. Then the $\Sigma x$ and $\Sigma y$ are checked for size. The sums SMX, SMY are loaded in stored RSUM5, RSUM6 for later use. Then the $\Sigma x$ and $\Sigma y$ are scale factored. The shift count on both sums must be 16 or above so that they fit in one register for further multiplications Scale factor on both $\Sigma x$ and $\Sigma y \geq 16$ Go to 7-1.2

Scale factor on either $\Sigma x$ or $\Sigma y < 16$

Go to 7-1.1

7-1.1 Take the smaller factor value SFx or SFy and subtract it from 16: SF = -min (SFx, SFy) + 16. Use this value as a scale on $\Sigma x$ and $\Sigma y$ by right shifting the values by this number. Store the scaled values at RSUM5 and RSUM6 and the scale at SCFR1.

Go to 7-1.2

7-1.2 Now we have to reduce the sums of $\Sigma x^2$, $\Sigma y^2$, $\Sigma xy$ to one register and adjust if overflow occurred in the summations. Load in $\Sigma x^2$ and its overflow scale, SDFX2.

Go to 7-1.3

7-1.3 Check if overflow occurred.

Overflow Go to 7-1.7

No overflow Go to 7-1.4

7-1.4 Scale factor the sum, check the shift count to see if the value fits in one register ($\geq 16$).

Shift count $\geq 16$ Go to 7-1.5

Shift count $< 16$ Go to 7-1.6

7-1.5 Store the scale (Ø) at the appropriate SCFR(x), shift the sum back to normal after the scale factor and store at appropriate RSUM(x).

Go to 7-2.Ø

7-1.6 Subtract the shift count from 16, this value will be the scale on this sum. Store this value at the appropriate scale (SCFR(x)), shift the scaled value down by 16 and store at the appropriate RSUM(x).

Go to 7-2.Ø

7-1.7 Overflow occurred. Clear R2 and load R3 with the upper of the sum registers. Shift R2, R3 up by 6 and add the overflow value to get the pseudo-3 register sum. Scale factor this value. Subtract the shift count from 1Ø. Shift to the right the original sum (RØ, R1) by this value. Add 16 to this value and this is the scale on this sum, store at appropriate SCFR(x).

Load the scaled sum of the overflow (upper register) into RØ and shift RØ, R1 by 16 to the right and store at the appropriate RSUM(x).

Go to 7-2.Ø

7-2.Ø End of loop setting up $\Sigma x^2$, $\Sigma y^2$, $\Sigma xy$.

All three sums set up.

Go to 7-2.1

Not done, increment parameters.

Go to 7-1.2

7-2.1 Now all the sums are set up for processing and will fit in one register for multiplies.

a) RSUM1 = $\Sigma x \, \Sigma y$ b) RSUM2 = $\Sigma x \, \Sigma x$ c) RSUM3 = $\Sigma y \, \Sigma y$ d) RSUM4 = $\Sigma xy * B_{previous}$ e) RSUM5 = $\Sigma x^2 * B_{previous}$ f) RSUM6 = $\Sigma y^2 * B_{previous}$ Now retrieve RSUM4, RSUM1 and their corresponding scales SCFR4, SCFR1.

SCFR1 > SCFR4 Go to 7-2.2

SCFR1 = SCFR4 Go to 7-2.4

SCFR1 < SCFR4 Go to 7-2.3

7-2.2 RSUM1 > RSUM4 (scales). Store SCFR1 at SCFR4 (SCFR4 now represents scale of numerator for final R divide). Right shift RSUM4 by the difference of the scales to get both RSUM1 and RSUM4 at same scale.

Go to 7-2.4

7-2.3 RSUM4 has higher scale so don't alter SCFR4, but right shift RSUM1 by difference of scales.

Go to 7-2.4

7-2.4 RSUM7 = RSUM4 - RSUM1. Now RSUM7 contains the final numerator and SCFR4 has its scale.

Now we have to calculate the denominator. Load in RSUM5 and RSUM2 and SCFR2, SCFR1 is still in register.

SCFR1 > SCFR2 Go to 7-2.5

SCFR1 = SCFR2 Go to 7-2.7

SCFR1 < SCFR2 Go to 7-2.6

7-2.5 Store SCFR1 at SCFR2 (SCFR2 is the scale for denominator #1), and right shift RSUM5 by the difference of the scales.

Go to 7-2.7

7-2.6 SCFR2 has the scale for denominator #1, right shift RSUM2 by the difference of the scales.

Go to 7-2.7

7-2.7 Denominator #1 = RØ, R1 = RSUM5 - RSUM2 and its scale is SCFR2.

Now we find denominator #2. Load in RSUM6, RSUM3 and SCFR3.

SCFR1 > SCFR3 Go to 7-2.8

SCFR1 = SCFR3 Go to 7-3.Ø

SCFR1 < SCFR3 Go to 7-2.9

7-2.8 Store SCFR1 at SCFR3 (scale for denominator #2) and right shift RSUM6 by the difference of the scales.

Go to 7-3.Ø

7-2.9 SCFR3 has scale, so just right shift RSUM3 by the difference of the scales.

Go to 7-3.Ø

7-3.Ø Denominator #2 = R10, R11 = RSUM6 - RSUM1 and its scale is in SCFR3

Now we have both denominators in the registers:

#1 - RØ, R1 #2 - R10, R11

So we now scale factor both values. For both values we make sure that they fit in one register by checking the shift count on the scale factor (must b = ≥16). If they are okay we just shift them back to normal, if not we increment their scale by the difference of (16 - shift count) and then shift them back 16.

At this point

| | | |
|---|---|---|
| Denominator #1 | RØ, R1 | Scale SCFR2 |
| Denominator #2 | R10, R11 | Scale SCFR3 |

Now we multiply them out:

R10, R11 = Denominator #1 * Denominator #2

We add the scales and divide by two to set up the scale for the square root. If the scale isn't divisible by two we adjust.

(scale 1 + scale 2)/2 remainder ≠ Ø

Go to 7-3.1

(scale 1 + scale 2)/2 remainder = Ø

Go to 7-3.2

7-3.1 Increment scale by 1 and right shift product by one.

Go to 7-3.2

7-3.2 Take the square root of denominator by a call on PSQR.

Now the final denominator is in R1Ø and its scale in R6.

Load in the numerator and its scale. Check it for being positive.

Numerator positive Go to 7-3.4

Numerator negative Go to 7-3.3

7-3.3 Complement numerator and set flag register (R13) to non-zero.

Go to 7-3.4

7-3.4 Load R14 with our bias for R (we will find R x $2^9$) and load the denominator into R5, clearing R4.

Now we scale factor both the numerator and denominator.

Then shift the scale factored denominator down into one register.

Situation: numerator in RØ, R1 with a scale of

R3(original scale) - R2(shift count in scale factor) + R14 (bias)

denominator in R5 with a scale of

R7(original scale) - R6(shift count in scale factor) + 16(down shift for one register)

Numerator scale R3

Denominator scale R7

R7 > R3 Go to 7-3.5

R7 = R3 Go to 7-4.Ø

R7 < R3 Go to 7-3.6

7-3.5 Right shift the numerator by the difference of the scales.

Go to 7-4.Ø

7-3.6 Right shift the denominator by the difference of the scales.

Go to 7-4.Ø

7-4.Ø Divide the numerator by the denominator for R.

Check the sign flag register (R13).

R13 = Ø Go to 7-4.2

R13 ≠ Ø Go to 7-4.1

7-4.1 Complement the value of R.

Go to 7-4.2

7-4.2 Store R away in RTABT and restore registers, then return.

Note:

RSUM1 = $\Sigma x \, \Sigma y$

RSUM2 = $\Sigma x \, \Sigma x$

RSUM3 = $\Sigma y \, \Sigma y$

RSUM4 = $\Sigma xy$ * B

RSUM5 = $\Sigma x^2$ * B

RSUM6 = $\Sigma y^2$ * B

Numerator = RSUM4 - RSUM1

Denominator 1 = RSUM5 - RSUM2

Denominator 2 = RSUM6 - RSUM3

$$R = \frac{\text{Numerator}}{\sqrt{\text{Denominator 1} * \text{Denominator 2}}}$$

Program Name: TNORM

Size: Ø1Ø6

| | | |
|---|---|---|
| Call: | JLR R12, TNORM | |
| Input: | none | |
| Exit: | normal return | |
| Output: | none | |
| External References: | PSFR, PSQR | |
| Data Referenced: | RSAV | Register save area |
| | DNORM | Routine constants |
| | RTABT | Temporary R table |
| | TSAV | Storage for calls on PSFR, PSQR |

Purpose: To normalize the calculated R value by the below algorithm.

$$1)\ K = \frac{R^2(B-2)}{1 - R^2} \qquad 2)\ R_{norm} = \sqrt{K/K + 126}$$

Synopsis: 8-1.0 Save the registers, load in routine constants, and get the R value. Check its sign.

R positive Go to 8-1.2

R negative Go to 8-1.1

8-1.1 Set the sign flag register (R4) and complement R. Go to 8-1.2

8-1.2 Shift R down by 3 places then square. Subtract this squared value from 1 (with needed bias). This value is R15. Then retrieve B from RTABT table and subtract 2. Now multiply this by the $R^2$ value. Scale factor this result and then restore, saving shift count. Now scale factor $(1 - R^2)$ and check the shift count here against the shift count on the first scale factor to see if the divide will be valid.

Divide valid Go to 8-1.4

Divide invalid Go to 8-1.3

8-1.3 Load a maximum value in (R7 = Ø4ØØØØ).

Go to 8-1.5

8-1.4 Shift up the numerator by 3 and divide to find the K value:

$$K = \frac{R^2(B-2)}{1 - R^2}$$

8-1.5 Clear upper of divide register (R6), move value to R9 where a biased Ø126 will be added to it. Shift numerator up 12 places for significance and then divide:

$$R^2 = R7 = \frac{K}{K + 126}$$

Now clear the upper register (R6) and call on PSQR to get the square root. Shift up the value by 3 to hold onto a R value biased by 29 and check sign flag register.

| | |
|---|---|
| $R4 = \emptyset$ | Go to 8-2.Ø |
| $R4 \neq \emptyset$ | Go to 8-1.6 |

8-1.6 Complement the calculated normalized R value.

Go to 8-2.Ø

8-2.Ø Store the normalized R value back in the RTABT table, restore the registers and return.

| | | |
|---|---|---|
| Program Name: | WGHT | |
| Size: | Ø32 | |
| Call: | JLR R12, WGHT | |
| Input: | none | |
| Exit: | normal return | |
| Output | none | |
| External References: | none | |
| Data Referenced: | RSAV | Register save area |
| | RTABT | Temporary R table |

COMW Weight constant

Purpose: To take the normalized R value and weigh it according to the following algorithmL $$R_w = R_{norm}\left(\frac{w - |k|}{w}\right)$$

Synopsis: 9-1.Ø Save the registers, load in the offset value from the RTABT table. Make the offset value positive then find the values:

$R3 = w - |k|$ $R4 = w$

Now retrieve $R_{norm}$ from the RTABT table, check its sign.

| | | |
|---|---|---|
| $R_{norm}$ | positive | Go to 9-1.2 |
| $R_{norm}$ | negative | Go to 9-1.1 |

9-1.1 Set the sign flag to non-zero and make $R_{norm}$ positive (R10).

Go to 9-1.2

9-1.2 Now multiply R by R3 and then divide by R4 so $R7 = R_{norm}\left(\frac{w - |k|}{w}\right)$.

Now check sign flag.

| | |
|---|---|
| R1Ø = Ø | Go to 9-1.4 |
| R1Ø ≠ Ø | Go to 9-1.3 |

9-1.3 Complement the R value.

Go to 9-1.4

9-1.4 Store the weighted R value away in the RTABT table, restore the registers, and return.

Program Name: COMR

Size: Ø37

Call: JLR R12, COMR

Input: none

Exit: normal return

Output: none

External References: none

Data Referenced: RSAV Register save area

RTABT Temporary R table

RTABS Best R table

Purpose: To compare the current calculated R value with the best value on this series of offsets and set the best set of values in the RTABS table.

Synopsis: 1Ø-1.Ø Save the registers and load the R values from the RTABS and RTABT tables.

$R_T < R_S$ Go to 1Ø-3.Ø

$R_T = R_S$ Go to 1Ø-1.1

$R_T > R_S$ Go to 1Ø-2.Ø

1Ø-1.1 Load the offset values from the RTABT and the RTABS tables.

$|K_t| < |K_s|$ Go to 1Ø-2.Ø

$|K_t| = |K_s|$ Go to 1Ø-1.2

$|K_t| > |K_s|$ Go to 1Ø-3.Ø

1Ø-1.2 Check the sign of $K_t$.

$K_t \geq Ø$ Go to 1Ø-3.Ø

$K_t < Ø$ Go to 1Ø-2.Ø

1Ø-2.Ø Move the RTABT table to RTABS table.

Go to 1Ø-3.Ø

1Ø-3.Ø Restore the registers and exit.

Program Name: THOLD

Size: Ø72

Call: JLR R12, THOLD

Input: none

Exit: normal return

Output: none

External References: none

Data Referenced:

| | |
|---|---|
| RSAV | Register save area |
| RTABS | Best R table |
| TFLAG1 | Working Tflag in ABT module |
| TDAT | Address of current tracker parameter area |
| HINC | Threshold counter increment |
| T1 | Threshold check #1 |
| T2 | Threshold check #2 |
| TC1 | Threshold counter check #1 |
| TC2 | Threshold counter check #2 |
| TC3 | Threshold counter check #3 |
| DEC(2) | Time weight for counter |
| ORTAB | Table of OR values |
| ANDTAB | Table of AND values |
| TPAR(x) | Tracker parameter area for tracker No. X |

Purpose: To check current R value against threshold values and the counter against values and set the flat bits in Tflag to signify the existing conditions.

Synopsis: 11-1.Ø Save the registers and load in the current R value and TFLAG1 (RØ = R; R1Ø = TFLAG1).

Check R against second threshold.

R ≥ T2 Go to 11-1.1

R < T2 Go to 11-1.2

11-1.1 Set bit Ø3 in TFLAG1.

Go to 11-1.3

11-1.2 Clear bit Ø3 in TFLAG1.

Go to 11-1.3

11-1.3 Load in bit counter to R7, check R : T1.

R ≥ T1 Go to 11-1.4

R < T1 Go to 11-1.5

11-1.4 Set bit Ø2 in TFLAG1 and R14, the counter increment register with HINC.

Go to 11-1.6

11-1.5 Clear bit Ø2 and set R14 to Ø (counter increment register).

Go to 11-1.6

11-1.6 Get the weight factor for the counter (DEC, DEC + 1). Multiply the counter and then divide it to get the new weighted value. Now add the counter increment register (R14) and store back in the tracker parameter area.

Now compare the new counter value (R7) with TC1.

R7 ≥ TC1 Go to 11-1.7

R7 < TC1 Go to 11-1.8

11-1.7 Set bit Ø4 in TFLAG1.

Go to 11-1.9

11-1.8 Clear bit Ø4 and set bit ØØ in TFLAG1.

Go to 11-1.9

11-1.9 R7 ≥ TC2 Go to 11-2.Ø

R7 < TC2 Go to 11-2.1

11-2.Ø Set bit Ø5 in TFLAG1.

Go to 11-2.2

11-2.1 Clear bit Ø5 in TFLAG1.

Go to 11-2.2

11-2.2 R7 $\geq$ TC3 Go to 11-2.3

R7 $<$ TC3 Go to 11-2.4

11-2.3 Set bit Ø6 in TFLAG1.

Go to 11-3.Ø

11-2.4 Clear bit Ø6 in TFLAG1.

Go to 11-3.Ø

11-3.Ø Store TFLAG1 back at its location, restore the registers and exit.

Program Name: TALI

Size: Ø34

Call: JLR R12, TALI

Input: RØ = absolute start address of data buffer

R1 = absolute start address of reference buffer

R2 = number of iternations

R3 = time weight constant for UTAB, LTAB

Exit: normal return

Output: none

External References: none

Data Referenced: RSAV Register save area

UTAB Time weight numerators table

LTAB Time weight denominators table

Purpose: To integrate a data buffer into a reference buffer by the following algorithm:

$$Y_i = \text{maximum}\left(1, \frac{X_i * N_{TN} + Y_i + \text{round value}}{D_{TN}}\right)$$

Synopsis: 12-1.Ø Save the registers, load R12 with minimum value (1) then:

a) get numerator from UTAB in R4 b) get denominator (shift) from LTAB in R5 c) get round factor in R14, R15

12-1.1 Load in data bin.

Multiply data bin by numerator (R4).

Load reference bin and add to above product.

Add rounding factor to sum.

Divide sum by shifting down.

Check against minimum value sum in R9.

| | |
|---|---|
| R9 ≥ 1 | Go to 12-1.3 |
| R9 < 1 | Go to 12-1.2 |

12-1.2 Load R9 with minimum value.

Go to 12-1.3

12-1.3 Store R9 back in reference bin.

Now check to see if all iterations are done.

| | |
|---|---|
| All data moved | Go to 12-2.Ø |
| Data left | Go to 12-1.1 |

12-2.0 Restore the registers and exit.

| | |
|---|---|
| Program Name: | TDEL - second entry ADEL |
| Size: | Ø44 |
| Call: | JLR R12, TDEL or JLR R12, ADEL |
| Input: | R13 = absolute start address of data buffer |
| | R14 = absolute start address of reference buffer |
| | R15 = band width |
| Exit: | normal return |
| Output: | none |
| External References: | none |
| Data Referenced: | RSAV Register save area |
| | TFLAG1 Working Tflag in ABT module |

ORTAB Table of OR values

Purpose: The routine is used to delete stable lines from a a data buffer by the following algorithm:

$$X_i = \frac{X_i * \overline{Y}}{Y_i} \qquad \overline{Y} = \text{average of Ys}$$

TDEL entry is used from tracker module.

ADEL entry is used from system EXEC.

Synopsis: 13-1.Ø ADEL entry - store registers.

Go to 13-3.Ø

13-1.1 TDEL entry - store registers and load TFLAG1 in RØ for checks to see if delete is needed.

Bit Ø6 in TFLAG1 set Go to 13-1.2

Bit Ø6 in TFLAG1 clear Go to 13-2.Ø

13-1.2 Check bit Ø2.

Bit Ø2 TFLAG1 set Go to 13-3.Ø

Bit Ø2 TFLAG1 clear Go to 13-2.Ø

13-2.Ø Restore registers and exit.

13-3.Ø Clear sum registers and add register RØ - R2.

Find end value for reference buffer.

Sum up all the reference bins then divide by the number of bins to find the average of the Ys (in R1).

13-3.1 Now pick up data bin.

Multiply data bin by average of Y bins.

Get a reference bin and divide it into the above product.

Store it back at the data bin.

Have we deleted all the data bins.

YES Go to 13-2.Ø

NO Go to 13-3.1

| | | |
|---|---|---|
| Program Name: | TPRED | |
| Size: | Ø233 | |
| Call: | JLR R12, TPRED | |
| Input: | none | |
| Exit: | normal return | |
| Output: | none | |
| External References: | none | |
| Data Referenced: | RSAV | Register save area |
| | RTABS | Best R value table |
| | TDAT | Address of current tracker parameter area |
| | TPAR(x) | Current tracker parameter area tracker No. X |
| | SYSC | Time weighted bias for numerator, denominator |
| | OWALL | Maximum system wall for prediction |
| | TFLAG1 | Current Tflag in ABT module |
| | TPC1 | Routine constants |
| | TPC2 | Routine constants |

Purpose: To use the weighted, normalized R value to predict the next value for the center frequency.

Synopsis: 14-1.Ø Save the registers and then load the R value from the RTABS table. Then raise the R value to fourth power - $R^4$ in RØ, R1.

Now shift $R^4$ down into one register saving number of shifts needed to do this.

Our original R was biased by $2^6$ so $R^4$ is biased by $2^{24}$. After shifting $R^4$ down to fit in one register our bias is 24 - shift count (R5).

Now multiply this value by Ø21227 ($9.7^4$) and down shift our product by R5 so we wind up with R1 = $(917 * R)^4$.

Now we load R4 with a 1 and add R1.

Left shift R1 by 6 to give significance for divide. We now divide R4 into R1 to get our W value.

$$W = \frac{(9.7 \times R)^4}{(9.7 \times R)^4 + 1} \times 2^6$$

14-1.1 Now we check the remainder on the divide.

RØ = remainder

R1 = quotient $RØ \geq R1/2$ Go to 14-1.2

$RØ < R1/2$ Go to 14-1.3

14-1.2 Increment W by one.

Go to 14-1.3

14-1.3 Now we shift the previous predicted values in the tracker parameter area.

a) $P_{i-4} \rightarrow P_{i-5}$ b) $P_{i-3} \rightarrow P_{i-4}$ c) $P_{i-2} \rightarrow P_{i-3}$ d) $P_{i-1} \rightarrow P_{i-2}$ Now we load the numerator and denominator used in the prediction from the parameter area. The numerator is stored unbiased, the denominator is stored biased.

We multiply the numerator by SYSC and divide the denominator by 2.

Then we get FP + K from the RTABS table and multiply it by our calculated W. We then add (FP + K)(W) to the numerator and W to the denominator. So we have R7 = new denominator = $Den_{old} + W$ R8, R9 = new numerator = $Num_{old} + (FP + K) + W$ We store R7 back in the tracker parameter area as the next denominator.

We shift the numerator down 6 and store in back in the parameter area as the next numerator.

Then we divide the numerator and denominator and this value is our new $P_{i-1}$, store it in the tracker parameter area.

Now we will find our next FP ($P_{i+1}$). We compute the following values:

$$K = R9 = \frac{16(P_{i-1})+8(P_{i-2})-15(P_{i-3})-4(P_{i-4})+4(P_{i-5})}{9}$$

$$P_{i+1} = R9 = \frac{(K * Ø1Ø) +4}{Ø1Ø}$$

We now have $P_{i+1}$ for our new predicted center frequency. Now we check it to see if it falls in bounds $Ø \leq P_{i+1} < 5Ø1$.

$P_{i+1}$ (R9) $\geq Ø$ Go to 14-2.2

$P_{i+1}$ (R9) $< Ø$ Go to 14-2.Ø

14-2.Ø Predicted frequency out of bounds.

Set bit Ø in TFLAG1 and store back.

GO to 14-2.1

14-2.1 Restore the registers and exit.

14-2.2 Check $P_{i+1} < 5Ø1$ Go to 14-2.3

$P_{i+1} \geq 5Ø1$ Go to 14-2.Ø

14-2.3 Now load TFLAG1 and check bit Ø3.

Bit Ø3 TFLAG1 set Go to 14-2.4

Bit Ø3 TFLAG1 clear Go to 14-3.Ø

14-2.4 Get the FP + L from the RTABS table and store it at the wall value in the tracker parameter area.

Go to 14-3.Ø

14-3.Ø Load in the wall value from the tracker parameter area and the system wall limit (OWALL).

Set up for limit checks by

R4 = tracker wall - OWALL

R5 = tracker wall + OWALL

Our new predicted value must fall within the bounds of R4, R5 or else we will use one of the boundary values as the next predicted value.

Check $P_{i+1}$ against lower wall

R4 (lower wall) $\geq$ R9 ($P_{i+1}$) Go to 14-3.1

R4 (lower wall) $<$ R9 ($P_{i+1}$) Go to 14-3.2

14-3.1 Store lower wall as our next predicted center frequency in its location in the parameter area.

Go to 14-2.1

14-3.2 Compare $P_{i+1}$ against upper wall.

R9 ($P_{i+1}$) $\geq$ R5 (upper wall) Go to 14-3.3

R9 ($P_{i+1}$) $<$ R5 (upper wall) Go to 14-3.4

14-3.3 Store upper wall as our next predicted center frequency in its location in the parameter area.

Go to 14-2.1

14-3.4 Store $P_{i+1}$ as our next predicted center frequency in its location in the parameter area.

Go to 14-2.1

```
SOFTWARE SYSTEM, KWH III, VERSION 8-0

@FGPA.GPA2,USA    TPF$.SNAME,TPF$.REL
CYCLE 01    GPA ASSEMBLED BY V-1    ON 03 APR 72 AT    14:57:31
                                          *ULTRA    KWH
                                                    PR2$
                                                    GR2$
          00    000000                              RES    0270
                        000134            AINT1     EQU    0134
                        000124            AINT2     EQU    0124
                        000114            AINT3     EQU    0114
                        000104            AINT4     EQU    0104
                        000000            CHANPT    EQU    0                  . PT CHANNEL
                        000001            CHAND     EQU    1                  . DISPLAY CHANNEL
                        000002            CHANO     EQU    2                  . OP SWITCH CHANNEL
                        000003            CHANSA    EQU    3                  . SA CHANNEL
                        000000            IN        EQU    0                  . INPUT I/O CODE
                        000001            OUT       EQU    1                  . OUTPUT I/O CODE
                        000002            EF        EQU    2                  . EF I/O CODE
                        000003            FORCE     EQU    3                  . FORCE I/O CODE
                        000120            CONW      EQU    80
                        001750            OK1       EQU    01750
                        000310            OK2       EQU    0310
                        000144            OK3       EQU    0144
                        000024            OK4       EQU    024
                        000005            OK5       EQU    05
                        000005            OK6       EQU    05
                        000003            KALI1     EQU    3
                        000002            KALI2     EQU    02
                        000002            KALI3     EQU    02
                        000005            QRN       EQU    05
                        000006            GRD       EQU    06
                        000007            GRP1      EQU    07
                        000012            GRP2      EQU    012
                        000004            QWL       EQU    04
                        000003            QFP       EQU    03
                        000001            QBW       EQU    01
                        000001            QU        EQU    01
                        000000            QCF       EQU    0
                        000000            QCK       EQU    0
                        000002            QHCNT     EQU    02
                        000014            QDB       EQU    014                . REL START ADR IN DATA
                        000015            QRB       EQU    015                . ABS START IN REF
                        000016            QDBW      EQU    016                . WORKING BAND WIDTH
                        000017            QRSV      EQU    017                . R SAVE
                                          IOCW      FORM   2,1,1,12           . IOC RCW FORMAT
                                          . ************************************
                                          . ** TRACKER PARAMETER AREA FORMAT   **
                                          . ** WORD     DEFINITION      EQUATE **
                                          . **   0      - CENTER FREQ    QCF    **
                                          . **   1      - BAND WIDTH     QBW    **
                                          . **   2      - HIT COUNTER    QHCNT  **
                                          . **   3      - PRED FREQ      QFP    **
                                          . **   4      - WALL FOR PRED  QWL    **
                                          . **   5      - NUI FOR PRED   QRN    **
                                          . **   6      - DEN FOR PRED   QRD    **
                                          . **   7      - PRED VALUE -1  QRP1   **
                                          . **  10      - PRED VALUE -2         **
                                          . **  11      - PRED VALUE -3         **
```

SOFTWARE SYSTEM, KWH III, VERSION 0-0

```
                                . **  12      - PRED VALUE -4  QRP2   **
                                . **  13      - PRED VALUE -5         **
                                . **  14      REL DATA STRT   QDB     **
                                . **  15      ABS REF STRT    ORB     **
                                . **  16      WORKING BW      QDBW    **
                                . **  17      R VALUE         QRSV    **
                                . **************************************
                                . **************************************
                                . **  RTABT/RTABS FORMAT              **
                                . **  WORD      DEFINITION            **
                                . **    0       - R VALUE             **
                                . **    1       - OFFSET              **
                                . **    2       - CENTER FREQ         **
                                . **    3       - ABS SPECTRUM START  **
                                . **    4       - ABS REFERENCE START **
                                . **    5       - BAND WIDTH          **
                                . **************************************
                                . ************************************************
                                . ** TRACKER ACCESS TABLE - EXTAB(8)            **
                                . **   WORD/TRKER        H1          H2         **
                                . **      0       PREV TRK NO   NEXT TRK NO     **
                                . **      1       PREV TRK NO   NEXT TRK NO     **
                                . **      2       PREV TRK NO   NEXT TRK NO     **
                                . **      3       PREV TRK NO   NEXT TRK NO     **
                                . **      4       PREV TRK NO   NEXT TRK NO     **
                                . **      5       PREV TRK NO   NEXT TRK NO     **
                                . **      6       PREV TRK NO   NEXT TRK NO     **
                                . **      7       PREV TRK NO   NEXT TRK NO     **
                                . **                                            **
                                . **  WORD=0 MEANS TRKER NOT ACTIVE             **
                                . **  H1=0200 MEANS FIRST TRKER IN CHAIN        **
                                . **  H2=0200 MEANS LAST TRKER IN CHAIN         **
                                . ************************************************
                                . ************************************************
                                . **  FORMAT OF AUTO LOAD TABLE                 **
                                . **  NAME- ATAB(192), DEFINED FLAG-AAFLG
                                . **  NAME- ATAB(192), DEFINED FLAG-AAFLG       **
                                . **  TABLE IS DIVIDED INTO 8 SEGMENTS OF 24 WO**
                                . **  SEGMENT CONSTRUCTION-                     **
                                .  **  FIRST 8 WORDS ARE THE TRKER ACCESS TAB   **
                                . **  SECOND 8 WORDS ARE THE CENTER FREQ,S      **
                                . **  THIRD 8 WORDS ARE THE BAND WIDTHS         **
                                . ******************************************************
           000270  004 02 01    ICXY     LR      R2,R1
           000271  025 00 01             LXI     R0,R1
           000272  202 11 00             JS      ICXX
           000273  000274
           000274  045 00 02    ICXX     SI      R0,R2
           000275  201 373               LJ      ICXY
           000276  000000                + 0
           000277  000000                + 0
           000300  202 10 00             J       START
           000301  000560
                                . INTERRUPT JUMP TABLE
           000302  202 10 00    CLIINT   J       POWER          . POWER FAULT INT
           000303  000532
           000304  202 10 00             J       CLAN1          . CP MEMORY RESUME ERROR
```

```
SOFTWARE SYSTEM, KWH III, VERSION 8-0

               000305  000542
110.           000306  202 10 00               J     DEAD1         . CP PARITY ERROR
               000307  000542
111.           000310  202 10 00    CL2INT     J     DEAD2         . CP INSTRUCTION FAULT
               000311  000544
112.           000312  202 10 00               J     DEAD2         . PRIVILEGED INSTRUCTION ERROR
               000313  000544
113.           000314  202 10 00               J     DEAD2         . MEMORY LOCK AND KEY ERROR
               000315  000544
114.           000316  202 10 00               J     CL0CK         . RTC OVERFLOW ERROR
               000317  000554
115.           000320  202 10 00               J     DEAD2         . EXECUTIVE CALL
               000321  000544
116.                                CL3INT.
117.           000322  202 10 00               J     PTINT         . CHAN 0- EXT INT
               000323  000552
118.           000324  202 10 00               J     PTINT         . CHAN 0- CHAIN INT
               000325  000552
119.           000326  202 10 00               J     DEAD3         . CHAN 0- HARDWARE ERR
               000327  000546
120.           000330  202 10 00               J     DEAD3         . CHAN 0- PARITY ERR
               000331  000546
121.           000332  202 10 00               J     DINT          . CHAN 1- EXT INT
               000333  000556
122.           000334  202 10 00               J     DINT          . CHAN 1- CHAIN INT
               000335  000556
123.           000336  202 10 00               J     DEAD3         . CHAN 1- HARDWARE ERR
               000337  000546
124.           000340  202 10 00               J     DEAD3         . CHAN 1- PARITY ERR
               000341  000546
125.           000342  202 10 00               J     OINT          . CHAN 2- EXT INT
               000343  000471
126.           000344  202 10 00               J     OINT          . CHAN 2- CHAIN INT
               000345  000471
127.           000346  202 10 00               J     DEAD3         . CHAN 2- HARDWARE ERR
               000347  000546
128.           000350  202 10 00               J     DEAD3         . CHAN 2- PARITY ERR
               000351  000546
129.           000352  202 10 00               J     SAINT         . CHAN 3- EXT INT
               000353  000366
130.           000354  202 10 00               J     SAINT         . CHAN 3- CHAIN INT
               000355  000422
131.           000356  202 10 00               J     DEAD3         . CHAN 3- HARDWARE ERR
               000357  000546
132.           000360  202 10 00               J     DEAD3         . CHAN 3- PARITY ERR
               000361  000546
133.           000362  202 10 00    CL4INT     J     DEAD4         . SERVICE IN INT
               000363  000550
134.           000364  202 10 00               J     DEAD4         . STATUS IN INT
               000365  000550
135.                                . ***************************************************************
136.                                . SPECTRUM ANALYZER INTERRUPT HANDLER
137.                                . ENTRY FOR INPUT REQUEST
138.           000366  057 00 17    SAINT      SM    R1,PSAV,R15   . SAVE ENVIROMENT
               000367  004715
139.           000370  017 05 11               LM    R1,SACNT,R9   . LOAD DATA
               000371  000415
```

```
SOFTWARE SYSTEM, KWH III, VERSION 8-0

      000372  010 05 10           IROR   R5             . INC INPUT CNTER
      000373  120 05 06           CR     R5,R6          . DO WE ACCEPT
      000374  235 017             LJLS   SA10           . BRANCH ON NO
      000375  100 05 05           SUR    R5,R5          . YES, INIT CNTER
      000376  031 02 10    SA02   LDXI   R2,R8          . LOAD COMMAND
      000377  051 02 07           SDI    R2,R7          . STORE IN COMMAND CELL
      000400  164 00 00           IOCR   R0             . ACTIVATE IOC
      000401  155 00 07    SA01   BFI    R7             . CHECK IF COMMAND DONE
      000402  235 377             LJLS   SA01           . LOOP ON NO
      000403  206 11 00           XJ     R9,SA02        . LOOP THRU COMMANDS
      000404  000376
      000405  047 05 00           S      R5,SACNT       . STORE COUNTER
      000406  000415
      000407  017 00 17           LM     R0,PSAV,R15    . RESTORE ENVIROMENT
      000410  004715
      000411  037 00 00           LP     0110           . RETURN TO INT ADR
      000412  000110
      000413  100 11 11    SA10   SUR    R9,R9          . ONLY FIRST COMMAND
      000414  201 362             LJ     SA02           . GO OUTPUT COMMAND
      000415  000000       SACNT  + 0                   . SA INPUT COUNTER
      000416  000024       SAMAX  + 024                 . CHECK FOR INPUT ACCEPT
      000417  000140              + 0140                . COMMAND CELL ADR
      000420  000520              + SACOM               . COMMAND TABLE
      000421  000001              + 1                   . LOOP CNTER
                           * ****************************************************
                           . ENTRY FOR DATA COMPLETE REQUEST
      000422  057 00 17    SACINT SM     R0,PSAV,R15    . SAVE ENVIROMENT
      000423  004715
      000424  167 00 00           BF     SFLAG          . SET INPUT IN FLG
      000425  005033
      000426  007 02 00           L      R2,RTFLAG      . GET TRK STATUS FLG
      000427  005035
      000430  047 07 10           LM     R7,SACCOM,R8   . LOAD DATA
      000431  000467
      000432  011 04 07           LDI    R4,R7          . LOAD COMMAND
      000433  051 04 10           SDI    R4,R8          . STORE IN COMMAND CELL
      000434  164 00 00           IOCR   R0             . ACTIVATE IOC
      000435  165 00 10    SAC03  BFI    R8             . CHECK FOR COMMAND COMPLETE
      000436  235 377             LJLS   SAC03          . BRANCH ON NO
      000437  226 02 00           JNZ    R2,SAC01       . BRANCH ON TRK ACTIVE
      000440  000445
      000441  017 00 17           LM     R0,PSAV,R15    . RESTORE ENVIROMENT
      000442  004715
      000443  037 00 00           LP     0110           . RETURN TO INT ADR
      000444  000110
      000445  010 02 11    SAC01  DROR   R2             . DEC NUM OF TRK LEFT
      000446  007 03 00    SAC02  L      R3,CFLAG1      . GET CFLAG
      000447  005027
      000450  030 03 04           ZBR    R3,4           .
      000451  030 03 05           ZBR    R3,5           .
      000452  047 03 00           S      R3,CFLAG1      . STORE BACK
      000453  005027
      000454  216 00 00           JLM    ABTCAL         . DELETE TRK
      000455  003512
      000456  206 02 00           XJ     R2,SAC02       . ANY LEFT
      000457  000446
      000460  077 00 00           SZ     RTFLAG         . CLEAR TRKER ACTIVE FLAG
```

SOFTWARE SYSTEM, KWH III, VERSION 8-0

```
000461  005035
000462  007 05 00             L      R5,0111          . NO, GET STATUS REG
000463  000111
000464  014 05 05             LSOR   R5               . RESTORE STATUS REG
000465  202 10 00             J      DISP             . GO TO DISPLAY
000466  000724
000467  000520      SACCOM    + SACOM                 . ENABLE COMMAND ADR
000470  000140                + 0140                  . COMMAND CELL ADR
                    . ***************************************************************
                    . OPERATOR FLYWHEEL INTERRUPT HANDLER
000471  057 00 17   OINT      SM     R0 PSAV,R15      . SAVE ENVIROMENT
000472  004715
000473  017 03 07             LM     R3,OINT1,R7      . LOAD DATA
000474  000512
000475  045 03 04             SI     R3,R4            . STORF COM IN COM CELL
000476  164 00 00             IOCR   R0               . ACTIVATE IOC
000477  165 00 04   OT01      BFI    R4               . HAS COMMAND BEEN TAKEN
000500  235 377               LJLS   OT01             . BRANCH ON NO
000501  005 10 05             LI     R8,R5            . LOAD INT
000502  045 10 06             SI     R8,R6            . STORE AT OIXD
000503  005 10 07             LI     R8,R7            . GET CFLAG
000504  024 10 15             SBR    R8,015           . SET IN DATA FLAG BIT
000505  045 10 07             SI     R8,R7            . STORF BACK
000506  017 00 17             LM     R0,PSAV,R15      . RESTORE ENVIROMENT
000507  004715
000510  037 00 00             LP     0110             . RETURN TO PROCESSING
000511  000110
000512  340 02 14   OINT1     CCR    CHAN0,014        . ENABLE INT COMMAND
000513  000140                + 0140                  . COMMAND CELL ADR
000514  000202                + 0202                  . INT STORAGE LOC
000515  004660                + OIXD                  . INT DATA LOCATION
000516  005027                + CFLAG1                . CFLAF1 ADR
000517                        EVEN                    . SET ON EVEN FOR LOAD DOUBLE
000520  340 03 14   SACOM     CCR    CHANSA,014       . ENABLE EXT INT
000521  000000                + 0                     .
000522  346 03 02             ICK    CHANSA,SAINP,2   . INITIATE INPUT CHAIN
000523  000524
000524  343 00 00   SAINP     IO     IN,SABCW         . ASK FOR INPUT
000525  000530
000526  354 01 00             IPR                     . GENERATE CHAIN INT
000527  354 00 00             HCH                     . HALT CHAIN
000530  2 0 0 0764  SABCW     IOCW   2,0,0,500        . SA INPUT BCW
000531  012310                + BUF0
                    . ***************************************************************
000532  057 00 17   POWER     SM     R0,PRSAV,R15     . SAVE ENVIROMENT
000533  004675
000534  202 06 00   POW1      JPT    POW1             . HANG ON BAD POWER
000535  000534
000536  017 00 17             LM     R0,PRSAV,R15     . RESTORE ENVIROMENT
000537  004675
000540  037 00 00             LP     0130             . EXIT TO INT ADR
000541  000130
000542  202 11 00   DEAD1     JS     DEAD1            . CLASS 1
000543  000542
000544  202 11 00   DEAD2     JS     DEAD2            . CLASS 2
000545  000544
000546  202 11 00   DEAD3     JS     DEAD3            . CLASS 3
```

SOFTWARE SYSTEM, KWH III, VERSION 8-0

```
000547  000546
000550  202 11 00     DEAD4   JS     DEAD4          . CLASS 4
000551  000550
000552  202 11 00     PTINT   JS     PTINT          . PAPER TAPE INT
000553  000552
000554  202 11 00     CLOCK   JS     CLOCK
000555  000554
000556  202 11 00     DINT    JS     DINT           . DISP INT
000557  000556
                      . ***************************************************************
000560  017 00 13     START   LM     R0,PSW1,R11    . LOAD INT VALUES
000561  000661
000562  057 00 02             SM     R0,AINT1,R2    . STORF INT CLASS I TARLE
000563  000134
000564  057 03 05             SM     R3,AINT2,R5    . STORE INT CLASS II TARLE
000565  000124
000566  057 06 10             SM     R6,AINT3,R8    . STORE INT CLASS III TARLE
000567  000114
000570  057 11 13             SM     R9,AINT4,R11   . STORF INT CLASS IV TARLE
000571  000104
000572  014 12 05             LSOR   R10            . SET STATUS REG 1
000573  006 02 00             LK     R2,28          .
000574  000034
000575  077 00 02     SY57    SZ     EXTAB,R2       .
000576  005015
000577  206 02 00             XJ     R2,SY57        .
000600  000575
000601  006 02 00             LK     R2,07503
000602  007503
000603  077 00 02     SY58    SZ     TBUF0,R2       .
000604  010110
000605  206 02 00             XJ     R2,SY58        .
000606  000603
000607  006 02 00             LK     R2,07400
000610  007400
000611  047 02 00             S      R2,YVAL        . INITIALIZE TO TOP OF SCREEN
000612  007001
000613  017 07 11             LM     R7,SINT,R9     . LOAD CONSTANTS
000614  000770
000615  025 06 07     SY11    LXI    R6,R7          . LOAD COMMAND
000616  045 06 10             SI     R6,R8          . STORF IN COMMAND CELL
000617  164 00 00             IOCR   R0             . INITIATE I/O
000620  165 00 10     SY10    BFI    R8             . CHECK FOR DONE
000621  235 377               LJLS   SY10           . BRANCH ON NO
000622  206 11 00             XJ     R9,SY11        . YES, LOOP THRU 3 COMMANDD
000623  000615
000624  007 00 00     SY56    L      R0,CFLAG1      . GET CONTROL FLAG
000625  005027
000626  034 00 15             CBR    R0,015         . HAS THERE BEEN OP INT
000627  221 375               LJE    SY56           . BRANCH ON NO
000630  006 10 00             LK     R8,0140        . YES, ENABLE SA INT
000631  000140
000632  007 07 00             L      R7,SYCH1       . GET COMMAND
000633  000776
000634  045 07 10             SI     R7,R8          . STORF AT COMMAND CELL
000635  164 00 00             IOCR   R0             . ACTIVATE IOC
000636  165 00 10     SY55    BFI    R8             . WAIT FOR IOC TO TAKR
```

```
SOFTWARE SYSTEM, KWH III, VERSION 8-0

258.      000637  235 377              LJLS   SY56             . BRANCH ON NO
259.      000640  007 00 00    SY12    L      R0,SFLAG         . GET INPUT FLAG
          000641  005033
260.      000642  226 00 00            JNZ    R0,SY13          . BRANCH ON SET
          000643  000647
261.      000644  216 00 00            JLM    OIX              . CHECK ON OP INT
          000645  003731
262.      000646  201 372              LJ     SY12             . WAIT FOR INT IN LOOP
263.      000647  077 00 00    SY13    SZ     SFLAG            . CLEAR INPUT FLAG
          000650  005033
264.      000651  017 14 16            LM     R12,SYDT1,R14    . LOAD PARAMETERS
          000652  006777
265.      000653  216 00 00            JLM    SPWR             . SPEC POWER
          000654  007002
266.      000655  216 00 00            JLM    POFL             . CHECK ON OVERFLOW
          000656  007201
267.      000657  017 00 02            LM     R0,SYDT2,R2      . LOAD PARAMETERS
          000660  001002
268.      000661  006 03 00            LK     R3,KALI1         .
          000662  000003
269.      000663  212 14 00            JLR    R12,TALI         . ALI
          000664  002656
270.      000665  160 02 02            SUR    R2,R2            .
271.      000666  007 03 00            L      R2,SYMSK         .
          000667  000762
272.      000670  007 00 00            L      R0,CFLAG1        .
          000671  005027
273.      000672  154 02 00            MSR    R2,R0            .
274.      000673  007 03 02            L      R3,SYJT,R2       .
          000674  000764
275.      000675  226 02 00            JNZ    R2,SY15          .
          000676  000700
276.      000677  210 11 03            JLRR   R9,R3            . THRESH DETECT DISPLAY
277.      000700  160 06 06    SY15    SUR    R6,R6            . CLEAR REG
278.      000701  007 07 00            L      R7,SYMSK1        . LOAD DELETE MSK
          000702  000763
279.      000703  154 06 00            MSR    R6,R0            . MASK BITS 3,2
280.      000704  122 06 00            CK     R6,4             .  =0,1
          000705  000004
281.      000706  225 005              LJNE   SY16             . BRANCH ON NO
282.      000707  017 15 17            LM     R13,SYDT5,R15    . LOAD PARAMETERS
          000710  001012
283.      000711  212 14 00            JLR    R12,ADEL         . DELETE
          000712  002712
284.      000713  222 00 00    SY16    JZ     R0,SY14          . BRANCH IF THRESH DONE
          000714  000716
285.      000715  210 11 03            JLRR   R9,R3            . THRESH DETECT DISP
286.      000716  216 00 00    SY14    JLM    ABTSHU           . ABT SHUFFLE
          000717  003370
287.      000720  216 00 00            JLM    OIX              . CHECK ON OP INT
          000721  003731
288.      000722  216 00 00            JLM    TRKCAL           . ACTIVATE TRK
          000723  003320
289.      000724  017 00 02    DISP    LM     R0,SYDT3,R2      . LOAD PARAMETERS
          000725  001005
290.      000726  006 03 00            LK     R3,KALI2         .
          000727  000002
```

```
SOFTWARE SYSTEM, KWH III, VERSION 8-0

291.   000730  212 14 00            JLR    R12,TALI         . ALI
       000731  002656
292.   000732  100 00 00            SUR    R0,R0            . CLEAR REG
293.   000733  007 01 00            L      R1,SYMSK         . GET MASK
       000734  000762
294.   000735  007 02 00            L      R2,CFLAG1        . GET CFLAG
       000736  005027
295.   000737  154 00 02            MSR    R0,R2            . GET BITS 0,1
296.   000740  102 00 00            SUK    R0,3             . CHECK FOR BOTH SET
       000741  000003
297.   000742  226 00 00            JNZ    R0,SY20          . BRANCH ON NO
       000743  000746
298.   000744  216 00 00            JLM    DE1AD            . THRESH DETECT DISPLAY
       000745  007231
299.   000746  216 00 00   SY20     JLM    DEXEC
       000747  006121
300.   000750  202 10 00            J      SY12             . GO TO START
       000751  000640
301.   000752  216 00 00   SY50     JLM    DE1AD            . DISPLAY RAW
       000753  007231
302.   000754  200 10 11            JR     R9               . RETURN
303.   000755  017 14 17   SY70     LM     R12,SYDT6,R15    . LOAD DATA
       000756  001015
304.   000757  216 00 00            JLM    TH7              . THRESH DETECT DISP, STABLE
       000760  005615
305.   000761  200 10 11            JR     R9               . RETURN
306.   000762  000003      SYMSK    + 3
307.   000763  000014      SYMSK1   + 014                   . MASK FOR BITS 3,2
308.   000764  000752      SYJT     + SY50                  . BITS 1,0=  00
309.   000765  000752               + SY50
310.   000766  000755               + SY70                  . BITS 1,0=  10
311.   000767  000716               + SY14                  . BITS 0,1=  11
312.   000770  000773      SINT     + SYCH                  . ADR OF I/O COMMANDS
313.   000771  000140               + 0140                  . COMMAND CELL ADR
314.   000772  000002               + 2                     .
315.   000773  340 00 00   SYCH     CCR    0,0              . MASTER CLEAN
316.   000774  340 00 06            CCR    0,6              . ENABLE MONITOR INT
317.   000775  340 02 14            CCR    CHANO,014        . ENABLE DATA INT ON OPER
318.   000776  340 03 14   SYCH1    CCR    CHANSA,014       . ENABLE DATA INT SA
319.   000777  012310      SYDT1    + BUF6
320.   001000  013273               + BUF6+499              .
321.   001001  013274               + BUF1
322.   001002  013274      SYDT2    + RSBUF
323.   001003  014260               + BUF2
324.   001004  000763               + 499                   .
325.   001005  013274      SYDT3    + RSBUF
326.   001006  015244               + B3AD
327.   001007  000763               + 499                   .
328.   001010  017214      SYDT4    + B5AD
329.   001011  007434               + BUFLOC
330.   001012  013274      SYDT5    + BUF1
331.   001013  014260               + BUF2
332.   001014  000763               + 499                   .
333.   001015  014260      SYDT6    + B2AD
334.   001016  015243               + B2AD+499              .
335.   001017  016230               + B4AD
336.   001020  000000               + 0
```

SOFTWARE SYSTEM, KWH III, VERSION 8-0

```
                                • **********************************************************************
                                • TEXEC  TRACKER INTERNAL EXEC-ABT MODULF
                                • CALL-    JLM   TEXFC
                                • INPUTS-  R5=NUMBER OF CURRENT TRACKER
                                • OUTPUTS-  NONE
001021  000000                TEXEC    + 0                     • TRACKFR FXEC, R5=TRACKFR NUM
001022  057 00 17                      SM     R0,ESAV,R15      • SAVE ENVIROMENT
001023  004735
001024  007 10 05                      L      R8,TRKB,R5       • R8=START ADR OF BUFFER
001025  005215
001026  007 11 05                      L      R9,TRKD,R5       • R9=START ADR OF DATA
001027  005225
001030  007 12 05                      L      R10,TRKF,R5      • R10=ADR OF TFLAG
001031  005042
001032  057 10 12                      SM     R8,TREF,R10      • STORE AT TREF,TDAY,TFLAG1
001033  005360
001034  100 06 06                      SUR    R6,R6            • CLEAR REX PTER
001035  212 14 00                      JLR    R12,TINIT        • INITIALIZATION
001036  001161
001037  212 14 00                      JLR    R12,TLALI        • LOAD ALI
001040  001234
001041  007 15 00                      L      R13,KCON         • GET OFFSET CONSTANT
001042  005235
001043  010 15 11                      DROR   R13              • DEC
001044  002 15 00                      LRS    R13,1            • DIVIDE BY 2
001045  000001
001046  004 07 15                      LR     R7,R13           • STORE IN R7 FOR CHECK
001047  010 07 11                      DROR   R7               •
001050  010 15 04                      TCR    R13              • COMP TO START LOOP
001051  004 10 15                      LR     R8,R13           • R8 KEEPS CURRENT OFFSET
                              TEX01 .
001052  007 16 11                      L      R14,QFP,R9       • GET FREQ
001053  000003
001054  007 17 11                      L      R15,QN,R9        •          ICOMP
001055  000001
001056  212 14 00                      JLR    R12,ICOMP        • INDEX COMPUTATION
001057  001271
001060  166 00 06                      REX    TEX30,R6         • ACCUMULATE SUMS
001061  001155
001062  210 14 06                      JLRR   R12,R6
001063  006 06 00                      LK     R6,2             • SET REX PTER
001064  000002
001065  212 14 00                      JLR    R12,RCOMP        • R COMPUTATION
001066  002007
001067  212 14 00                      JLR    R12,TNORM        • NORMALIZE R
001070  002756
001071  212 14 00                      JLR    R12,WGHT         • WEIGH R VALUE
001072  002473
001073  212 14 00                      JLR    R12,CONR         • CHECK FOR BEST R
001074  002525
001075  120 10 07                      CR     R8,R7            • ALL OFFSETS RUN
001076  231 004                        LJGE   TEX02            • YES
001077  010 10 10                      IROR   R8               • INC OFFSET
001100  004 15 10                      LR     R13,R8           • NO,SET OFFSET REG FOR ICOMP
001101  201 351                        LJ     TEX01            • LOOP
001102  212 14 00             TEX02    JLR    R12,THOLD        • THRESHOLD
001103  002564
```

```
SOFTWARE SYSTEM, KWH III, VERSION 8-0

      001104  007 10 00          L      R8,TDAT         . PARAM START ADR
      001105  005361
      001106  004 06 05          LR     R6,R5           . R6=TRKER NUM
      001107  017 00 05          LM     R0,RTABS,R5     . GET NEEDED R VALUES
      001110  005274
      001111  047 00 10          S      R0,QRSV,R8      . STORE R
      001112  000017
      001113  006 07 00          LK     R7,RSBUF        . DATA BUFF START
      001114  013274
      001115  100 03 07          SUR    R3,R7           . R3=START IN DATA, RFL
      001116  047 03 10          S      R3,QDB,R8       . STORE REL STRT OF DATA
      001117  000014
      001120  047 04 10          S      R4,QRB,R8       . STORE ABS START OF REF
      001121  000015
      001122  047 05 10          S      R5,QDBW,R8      . STORE WORKING BW
      001123  000016
      001124  007 00 00          L      R0,TFLAG1       .
      001125  005362
      001126  034 00 02          CBR    R0,2            .
      001127  221 010            LJE    TEX04           .
      001130  017 00 02          LM     R0,RTABS+3,R2   . LOAD PARAMETERS
      001131  005277
      001132  006 03 00          LK     R3,KALI3        .
      001133  000002
      001134  010 02 11          DROR   R2              . SET R FOR XJ
      001135  212 14 00          JLR    R12,TALI        . ALI
      001136  002656
      001137  017 15 17   TEX04  LM     R13,RTABS+3,R15 . LOAD REG FOR DELFTF
      001140  005277
      001141  212 14 00          JLR    R12,TDEL        . DELETE
      001142  002715
      001143  212 14 00          JLR    R12,TPRED       . PREDICTION
      001144  003665
      001145  007 00 00          L      R0,TFLAG1       . RESTORE TFLAG
      001146  005362
      001147  047 00 06          S      R0,TRKF,R6      .
      001150  005042
      001151  017 00 17          LM     R0,ESAV,R15     . RESTORE ENVIROMENT
      001152  004735
      001153  203 10 00          J      *TEXEC          . RETURN
      001154  001021
      001155  006 06 00   TEX30  LK     R6,ACUM1
      001156  001353
      001157  006 06 00          LK     R6,ACUM2
      001160  001611
                          . ****************************************************************
                          . TINIT  TRACKER INITIALIZATION ROUTINE-ABT MODULE
                          . CALL-    JLR R12,TINIT
                          . INPUT-   USES CURRENT TFLAG
                          . OUTPUT-   ALTERS TFLAG
      001161  057 00 17   TINIT  SM     R0,RSAV,R15     . STORE ENVIROMENT
      001162  004775
      001163  007 00 00          L      R0,TFLAG1       . GET CURRENT TEST FLAG
      001164  005362
      001165  034 00 17          CBR    R0,017          .
      001166  225 006            LJNE   TIN01           . BRANCH IF SET
      001167  034 00 15          CBR    R0,015          .
```

SOFTWARE SYSTEM, KWH III, VERSION 8-0

```
         001170  225 005                LJNE   TIN02          . BRANCH IF SET
         001171  017 00 17      TIN00   LM     R0,RSAV,R15    . RESTORE ENVIROMENT
         001172  004775
         001173  200 10 14              JR     R12            . RETURN
                                TIN01 .
         001174  030 00 17              ZBR    R0,017         .
                                TIN02 .
         001175  030 00 15              ZBR    R0,015         .
         001176  030 00 04              ZBR    R0,04          .
         001177  030 00 02              ZBR    R0,2           .
         001200  007 05 00              L      R5,TDAT        .
         001201  005361
         001202  006 07 00              LK     R7,4           . LOOP
         001203  000004
         001204  006 02 00              LK     R2,0200
         001205  000200
         001206  007 06 05              L      R6,QCF,R5      . GET CF
         001207  000000
         001210  004 03 06              LR     R3,R6          .
         001211  066 03 00              CLS    R3,1           .
         001212  000001
         001213  047 02 05              S      R2,QRD,R5      .
         001214  000006
         001215  047 03 05              S      R3,QRN,R5      .
         001216  000005
         001217  047 06 05              S      R6,QFP,R5      . CF To FP
         001220  000003
         001221  047 06 05              S      R6,QWL,R5      . CF To WALL
         001222  000004
         001223  077 00 05              SZ     QHCNT,R5       .
         001224  000002
         001225  067 06 05      TIN10   SX     R6,QRP1,R5     . CF To ALL P I-N
         001226  000007
         001227  206 07 00              XJ     R7,TIN10       . LOOP FOR ALL PS
         001230  001225
         001231  047 00 00              S      R0,TFLAG1      . RESTORE TFLAG
         001232  005362
         001233  201 336                LJ     TIN00          . EXIT
                                . *********************************************************************
                                . TLALI  LOAD ALI SUBROUTINE-ABT MODULE
                                . CALL-      JLR  R12,TLALI
                                . INPUTS-    TFLAG1,TDAT
                                . OUTPUTS-   IF NEEDED,REFERENCE BUF SET UP
         001234  057 00 17      TLALI   SM     R0,RSAV,R15    . STORE ENVIROMENT
         001235  004775
         001236  007 11 00              L      R9,TFLAG1      . GET FLAG
         001237  005362
         001240  034 11 04              CBR    R9,4           .
         001241  225 025                LJNE   TL02           .
         001242  007 06 00              L      R6,TDAT        . GET START OF DATA AREA
         001243  005361
         001244  007 00 00              L      R0,TREF        . GET REF BUF ADR
         001245  005360
         001246  006 01 00              LK     R1,R3AD        . LOAD IN BUF ADR
         001247  015244
         001250  113 01 06              A      R1,QCK,R6      . ADD CENTER FREQ
         001251  000000
```

```
SOFTWARE SYSTEM, KWH III, VERSION 8-0
         001252  007 02 06                 L     R2,QN,R6        . GET BAND WIDTH
         001253  000001
         001254  042 02 00                 LRS   R2,1            . DIVIDE WIDTH BY 2
         001255  000001
         001256  100 01 02                 SUR   R1,R2           . FIND START OF MOVE AREA
         001257  007 02 06                 L     R2,QN,R6        . RESTORE BAND WIDTH
         001260  000001
         001261  110 02 01                 AR    R2,R1           . FIND LOOP END
         001262  025 07 01          TL01   LXI   R7,R1           . PICK UP SPEC BIN
         001263  065 07 00                 SXI   R7,R0           . STORE IN REF BIN
         001264  120 01 02                 CR    R1,R2           . COMPARE FOR DONE
         001265  235 375                   LJLS  TL01            . NO
         001266  017 00 17          TL02   LM    R0,RSAV,R15     . RESTORE ENVIROMENT
         001267  004775
         001270  200 10 14                 JR    R12             . EXIT
                                    . *****************************************************************
                                    . INDEX COMPUTATION SUBROUTINE-ABT MODULE
                                    . CALL-        JLR  R12,ICOMP
                                    . INPUT-       R13=K, OFFSET PARAMETER
                                    .              R14=C, CENTER FREQ(RELATIVE)
                                    .              R15=N, BAND WIDTH OF TRACKER
                                    .             TREF=START OF REFERENCE BUFFER FOR THIS TRACKER
                                    . OUTPUT-      R13=BAND WIDTH FOR SUMMATION
                                    .              R14=ABSOLUTE ADR FOR SUM START IN SPECTRUM BUF
                                    .              R15=ABSOLUTE ADR FOR SUM START IN REFERENCE BUF
                                    .              VALUES OF K,C,M,N,B STORED IN TEMPORARY R TABLE
         001271  057 00 17          ICOMP  SM    R0,RSAV,R15     . SAVE ENVIROMENT
         001272  004775
         001273  057 15 16                 SM    R13,RTABT+1,R14 . STORE K,C
         001274  005267
         001275  046 17 00                 ARS   R15,1           . DIVIDE BAND WIDTH BY 2
         001276  000001
         001277  100 17 16                 SUR   R15,R14         . SUBTRACT CENTER FREQ
         001300  100 17 15                 SUR   R15,R13         . SUB K, R15=N/2-C-K
         001301  236 17 00                 JN    R15,IC01        . R15=L, BRANCH ON NEG
         001302  001326
         001303  004 16 17                 LR    R14,R15         .
         001304  100 15 15                 SUR   R13,R13         .
         001305  007 12 00                 L     R10,RSAV+15     .     R14=0
         001306  005014
         001307  100 12 16                 SUR   R10,R14         .
         001310  004 17 12                 LR    R15,R10         .
                                    IC00 .
         001311  112 15 00                 AK    R13,RSBUF       .
         001312  013274
         001313  113 16 00                 A     R14,TREF        .
         001314  005360
         001315  057 15 17                 SM    R13,RTABT+3,R15 . STORE M,N,B
         001316  005271
         001317  004 14 17                 LR    R12,R15         .
         001320  004 17 16                 LR    R15,R14         .
         001321  004 16 15                 LR    R14,R13         .
         001322  004 15 14                 LR    R13,R12         .
         001323  017 00 14                 LM    R0,RSAV,R12     .
         001324  004775
         001325  200 10 14                 JR    R12             . RETURN
         001326  112 17 00          IC01   AK    R15,500         .
```

```
SOFTWARE SYSTEM, KWH III, VERSION 8-0
          001327  000764
          001330  004 12 17              LR     R10,R15        . SAVE L+512 IN R10
          001331  007 11 00              L      R9,RSAV+15     . R9=N
          001332  005014
          001333  100 12 11              SUR    R10,R9         . R10=L+512-N
          001334  236 12 00              JN     R10,IC02       . BRANCH ON NEG
          001335  001345
          001336  010 17 04              TCR    R15            . OUTPUT SET UP
          001337  112 17 00              AK     R15,500
          001340  000764
          001341  100 16 16              SUR    R14,R14        .
          001342  004 15 17              LR     R13,R15        .
          001343  004 17 11              LR     R15,R9         .     R15=N
          001344  201 345                LJ     1C00           . EXIT
          001345  004 15 17       IC02   LR     R13,R15        .
          001346  102 15 00              SUK    R13,500        .
          001347  000764
          001350  010 15 04              TCR    R13            .
          001351  100 16 16              SUR    R14,R14        .
          001352  201 337                LJ     1C00           . EXIT
                                  . ***************************************************************
                                  . ACCUM PASS-1 SUBROUTINE-ABT MODULE
                                  . CALL-        JLR  R12,ACUM1
                                  . INPUT-       R13=NUMBER OF BINS TO SUM OVER
                                  .              R14=START ADR IN SPECTRUM(ABSOLUTE)
                                  .              R15=START ADR IN REFERENCE(ABSOLUTE)
                                  . OUTPUT-      SUMS OF X,Y,X2,Y2,XY STORED IN MEMORY
          001353  057 00 17       ACUM1  SM     R0,RSAV,R15    . SAVE ENVIROMENT
          001354  004775
          001355  047 15 00              S      R13,BPREV      . STORE B FOR ACUM2 CK
          001356  005302
          001357  006 02 00              LK     R2,5           .
          001360  000005
          001361  077 00 02       ACM7A  SZ     RTABS,R2       .
          001362  005274
          001363  206 02 00              XJ     R2,ACM7A       .
          001364  001361
          001365  007 02 00              L      R2,ANDTAB+12   .
          001366  005611
          001367  047 02 00              S      R2,RTABS
          001370  005274
          001371  077 00 00              SZ     SCFX2          . CLEAR      *
          001372  005310
          001373  077 00 00              SZ     SCFY2          .    SCALE   *
          001374  005311
          001375  077 00 00              SZ     SCFXY          .      FLAGS *
          001376  005312
          001377  110 15 16              AR     R13,R14        . CALCULATE END OF LOOP
          001400  047 15 00              S      R13,LPCK       . STORE LOOP END
          001401  005303
          001402  104 00 00              SUDR   R0,R0          . SUM FOR X
          001403  104 02 02              SUDR   R2,R2          . SUM FOR Y
          001404  104 04 04              SUDR   R4,R4          . SUM FOR X2
          001405  104 06 06              SUDR   R6,R6          . SUM FOR Y2
          001406  104 10 10              SUDR   R8,R8          . SUM FOR XY
          001407  104 12 12       ACM1A  SUDR   R10,R10        . WORKING
          001410  104 14 14              SUDR   R12,R12        .     REGISTERS
```

```
SOFTWARE SYSTEM, KWH III, VERSION 8-0

532.      001411  025 13 16          LXI   R11,R14          . LOAD IN X
533.      001412  004 15 13          LR    R13,R11          . MOVE FOR SQUARE
534.      001413  114 00 12          ADR   R0,R10           . ADD X INTO SUMMER
535.      001414  130 14 13          MR    R12,R11          . SQUARE X
536.      001415  114 04 14          ADR   R4,R12           . ADD X2 INTO SUMMER
537.      001416  216 00 00          JLM   OVX2             . CHECK FOR OVERFLOW
          001417  001445
538.      001420  100 14 14  ACM1C   SUR   R12,R12          . CLEAR REG FROM MULT
539.      001421  025 15 17          LXI   R13,R15          . LOAD IN Y
540.      001422  130 12 15          MR    R10,R13          . MULT XY
541.      001423  114 10 12          ADR   R8,R10           . ADD INTO SUMMER
542.      001424  216 00 00          JLM   OVXY             . CHECK FOR OVERFLOW
          001425  001475
543.      001426  100 12 12  ACM1D   SUR   R10,R10          . CLEAR REG FROM MULT
544.      001427  004 13 15          LR    R11,R13          . MOVE Y FOR SQUARE
545.      001430  114 02 12          ADR   R2,R10           . ADD INTO Y SUMMER
546.      001431  130 12 15          MR    R10,R13          . SQUARE Y
547.      001432  114 06 12          ADR   R6,R10           . ADD INTO Y2 SUMMER
548.      001433  216 00 00          JLM   OVY2             . CHECK FOR OVERFLOW
          001434  001525
549.      001435  123 16 00  ACM1E   C     R14,LPCK         . ALL SUMS DONE
          001436  005303
550.      001437  235 350            LJLS  ACM1A            . NO, CONTINUE
551.      001440  057 00 11          SM    R0,SMX,R9        . YES STORE SUMS
          001441  005320
552.      001442  017 00 17          LM    R0,RSAV,R15      . RESTORE ENVIROMENT
          001443  004775
553.      001444  200 10 14          JR    R12              . RETURN
554.                         * ***************************************************************
555.      001445  000000     OVX2    + 0                    . OVERFLOW CHECK ON X2
556.      001446  202 04 00          JO    OVX2B            . BRANCH ON OVERFLOW
          001447  001452
557.      001450  203 10 00  OVX2A   J     *OVX2            . RETURN TO CALLER
          001451  001445
558.      001452  057 15 17  OVX2B   SM    R13,RSAV1,R15    . SAVE WORKING REG
          001453  005304
559.      001454  167 00 00          BF    POFLG            . SET OVERFLOW FLAG
          001455  005036
560.      001456  007 15 00          L     R13,SCFX2        . LOAD X2 SCALE
          001457  005310
561.      001460  100 16 16          SUR   R14,R14          . CLEAR REG
562.      001461  004 17 04          LR    R15,R4           . LOAD UPPER REG OF SUM
563.      001462  072 16 00          ALD   R14,6            . SHIFT OFF UPPER 6 BITS
          001463  000006
564.      001464  110 15 16          AR    R13,R14          . ADD TO SCALE VALUE
565.      001465  047 15 00          S     R13,SCFX2        . STORE SCALE
          001466  005310
566.      001467  042 17 00          LRS   R15,6            . RESHIFT REG
          001470  000006
567.      001471  004 04 17          LR    R4,R15           . RESTORE SUM REG
568.      001472  017 15 17          LM    R13,RSAV1,R15    . RESTORE REGS
          001473  005304
569.      001474  201 354            LJ    OVX2A            . RETURN
570.      001475  000000     OVXY    + 0                    . OVERFLOW CHECK ON XY
571.      001476  202 04 00          JO    OVXYB            . BRANCH ON OVERFLOW
          001477  001502
572.      001500  203 10 00  OVXYA   J     *OVXY            . RETURN TO CALLER
```

```
SOFTWARE SYSTEM, KWH III, VERSION 8-0

        001501  001475
573.    001502  057 15 17   OVXYB   SM   R13,RSAV1,R15  . SAVE WORKING REGS
        001503  005304
574.    001504  167 00 00           BF   POFLG          . SET OVERFLOW FLAG
        001505  005036
575.    001506  007 15 00           L    R13,SCFXY      . LOAD SCALE VALUE
        001507  005312
576.    001510  100 16 16           SUR  R14,R14        . CLEAR REG
577.    001511  004 17 10           LR   R15,R8         . LOAD UPPER REG OF SUM
578.    001512  072 16 00           ALD  R14,6          . SHIFT UPPER 6 BITS
        001513  000006
579.    001514  110 15 16           AR   R13,R14        . ADD TO SCALE
580.    001515  047 15 00           S    R13,SCFXY      . STORE SCALE
        001516  005312
581.    001517  042 17 00           LRS  R15,6          . RESHIFT REG
        001520  000006
582.    001521  004 10 17           LR   R8,R15         . RESTORE SUM REG
583.    001522  017 15 17           LM   R13,RSAV1,R15  . RESTORE REGS
        001523  005304
584.    001524  201 354             LJ   OVXYA          . RETURN
585.    001525  000000      OVY2    + 0                 . OVERFLOW CHECK ON Y2
586.    001526  202 04 00           JO   OVY2B          . BRANCH ON OVERFLOW
        001527  001532
587.    001530  203 10 00   OVY2A   J    *OVY2          . RETURN TO CALLER
        001531  001525
588.    001532  057 15 17   OVY2B   SM   R13,RSAV1,R15  . SAVE WORKING REGS
        001533  005304
589.    001534  167 00 00           BF   POFLG          . SET OVERFLOW FLAG
        001535  005036
590.    001536  007 15 00           L    R13,SCFY2      . LOAD SCALE
        001537  005311
591.    001540  100 16 16           SUR  R14,R14        . CLEAR REG
592.    001541  004 17 06           LR   R15,R6         . LOAD UPPER REG OF SUM
593.    001542  072 16 00           ALD  R14,6          . SHIFT OFF UPPER 6 BITS
        001543  000006
594.    001544  110 15 16           AR   R13,R14        . ADD TO SCALE
595.    001545  047 15 00           S    R13,SCFY2      . STORE SCALE
        001546  005311
596.    001547  042 17 00           LRS  R15,6          . RESHIFT REG
        001550  000006
597.    001551  004 06 17           LR   R6,R15         . RESTORE SUM REG
598.    001552  017 15 17           LM   R13,RSAV1,R15  . RESTORE REGS
        001553  005304
599.    001554  201 354             LJ   OVY2A          . RETURN
600.    001555  000000      UNFLX   + 0
601.    001556  232 04 00           JP   R4,UNFX1       .
        001557  001571
602.    001560  013 12 00           LD   R10,U2VL       .
        001561  005356
603.    001562  114 04 12           ADR  R4,R10         .
604.    001563  007 02 00           L    R2,SCFX2       .
        001564  005310
605.    001565  102 02 00           SUK  R2,037         .
        001566  000037
606.    001567  047 02 00           S    R2,SCFX2       .
        001570  005310
607.    001571  203 10 00   UNFX1   J    *UNFLX
```

```
SOFTWARE SYSTEM, KWH III, VERSION 8-0

                 001572  001555
608.             001573  000000       UNFLY   + 0
609.             001574  232 10 00            JP      R8,UNFY1         .
                 001575  001607
610.             001576  013 12 00            LD      R10,UZVL         .
                 001577  005356
611.             001600  114 10 12            ADR     R8,R10           .
612.             001601  007 02 00            L       R2,SCFY2         .
                 001602  005311
613.             001603  102 02 00            SUK     R2,037
                 001604  000037
614.             001605  047 02 00            S       R2,SCFY2         .
                 001606  005311
615.             001607  203 10 00    UNFY1   J       *UNFLY
                 001610  001573
616.                                  . ********************************************************************
617.                                  . ACCUM PASS-2 SUBROUTINE-ABT MODULE
618.                                  . CALL-       JLR  R12,ACUM2
619.                                  . INPUT-      R13=NUMBER OF BINS TO SUM OVER
620.                                  .             R14=START ADR IN SPECTRUM(ABSOLUTE)
621.                                  .             R15=START ADR IN REFERENCE(ABSOLUTE)
622.                                  .           BPREV=NUMBER OF BINS IN SUM ON LAST PASS
623.                                  . OUTPUT-     SUMS OF X,Y,X2,Y2,XY STORED IN MEMORY
624.             001611  057 00 17    ACUM2   SM      R0,RSAV,R15      . SAVE ENVIROMENT
                 001612  004775
625.             001613  123 15 00            C       R13,BPREV        . COMPARE B WITH PREVIOUS B
                 001614  005302
626.             001615  221 070              LJE     BNDEQ            . EQUAL
627.             001616  235 124              LJLS    BNDLS            . NEW B LT OLD B
628.             001617  100 00 00            SUR     R0,R0            . NEW B GT OLD B
629.             001620  005 01 17            LI      R1,R15           . LOAD IN Y
630.             001621  004 07 01            LR      R7,R1            . MOVE Y
631.             001622  130 06 01            MR      R6,R1            . SQUARE Y
632.             001623  013 10 00            LD      R8,SMY           . LOAD Y SUM
                 001624  005322
633.             001625  114 00 10            ADR     R0,R8            . ADD NEW Y
634.             001626  013 10 00            LD      R8,SMY2          . LOAD Y2 SUM
                 001627  005326
635.             001630  114 06 10            ADR     R6,R8            . ADD NEW Y2
636.             001631  216 00 00            JLM     OVY2             . CHECK FOR OVERFLOW
                 001632  001525
637.             001633  053 06 00            SD      R6,SMY2          . STORE Y2 SUM
                 001634  005326
638.             001635  053 00 00            SD      R0,SMY           . STORE Y SUM
                 001636  005322
639.             001637  110 15 16            AR      R13,R14          . CALCULATE X BIN TO ADD
640.             001640  010 15 11            DROR    R13              . DEC CNTER FOR RETREIVE
641.             001641  025 01 15            LX1     R1,R13           . LOAD VALUE
642.             001642  100 00 00            SUR     R0,R0            . CLEAR
643.             001643  004 05 01            LR      R5,R1            . MOVE X
644.             001644  130 04 01            MR      R4,R1            . SQUARE X
645.             001645  013 10 00            LD      R8,SMX2          . LOAD X2 SUM
                 001646  005324
646.             001647  114 04 10            ADR     R4,R8            . ADD NEW X2
647.             001650  216 00 00            JLM     OVX2             . CHECK FOR OVERFLOW
                 001651  001445
648.             001652  053 04 00            SD      R4,SMX2          . STORE NEW SUM
```

SOFTWARE SYSTEM, KWH III, VERSION 8-0

```
              001653  005324
 649.         001654  013 10 00              LD     R8,SMX          . LOAD X SUM
              001655  005320
 650.         001656  114 00 10              ADR    R0,R8           . ADD NEW X
 651.         001657  053 00 00              SD     R0,SMX          . STORE NEW SUM
              001660  005320
 652.         001661  100 15 16              SUR    R13,R14         . RESTORE STARTING X RIN
 653.         001662  104 10 10   ACM2A      SUDR   R8,R8           . CLEAR SUM REGS
 654.         001663  077 00 00              SZ     SCFXY           . CLEAR XY SCALE
              001664  005312
 655.         001665  047 15 00              S      R13,BPREV       . STORE NEW B VALUE
              001666  005302
 656.         001667  010 15 11              DROR   R13             . DEC LOOP CNTER
 657.                             ACM2B .
 658.         001670  025 03 16              LXI    R3,R14          . LOAD X
 659.         001671  025 01 17              LXI    R1,R15          . LOAD Y VALUE
 660.         001672  130 00 03              MR     R0,R3           . FIND XY PRODUCT
 661.         001673  114 10 00              ADR    R8,R0           . ADD TO SUMMER
 662.         001674  216 00 00              JLM    OVXY            . CHECK ON OVERFLOW
              001675  001475
 663.         001676  206 15 00              XJ     R13,ACM2B       . LOOP TILL DONE
              001677  001670
 664.         001700  053 10 00              SD     R8,SMXY         . STORF NEW SUM
              001701  005330
 665.         001702  017 00 17              LM     R0,RSAV,R15     . RESTORE ENVIROMENT
              001703  004775
 666.         001704  200 10 14              JR     R12             . RETURN
 667.         001705  100 00 00   BNDEQ      SUR    R0,R0           . CLEAR
 668.         001706  100 06 06              SUR    R6,R6           .       SUMS
 669.         001707  010 16 11              DROR   R14             . DEC PTER FOR BIN TO BF DROPPED
 670.         001710  110 15 16              AR     R13,R14         . FIND UPPER X
 671.         001711  025 01 16              LXI    R1,R14          . LOAD LOWER X
 672.         001712  025 05 15              LXI    R5,R13          . LOAD UPPER X
 673.         001713  004 03 01              LR     R3,R1           . MOVE X RIN MINUS
 674.         001714  004 07 05              LR     R7,R5           . MOVE X RIN PLUS
 675.         001715  130 02 01              MR     R2,R1           . SQUARE FOR MINUS
 676.         001716  130 04 07              MR     R4,R7           . SQUARE FOR PLUS
 677.         001717  013 10 00              LD     R8,SMX          . LOAD X SUM
              001720  005320
 678.         001721  114 06 10              ADR    R6,R8           . ADD NEW X
 679.         001722  013 10 00              LD     R8,SMX2         . LOAD X2 SUM
              001723  005324
 680.         001724  114 04 10              ADR    R4,R8           . ADD NEW X2
 681.         001725  216 00 00              JLM    OVX2            . CHECK FOR OVERFLOW
              001726  001445
 682.         001727  104 04 02              SUDR   R4,R2           . SUB OLD RIN
 683.         001730  216 00 00              JLM    UNFLX
              001731  001555
 684.         001732  104 06 00              SUDR   R6,R0           . SUB OLD SQUARE
 685.         001733  053 04 00              SD     R4,SMX2         . STORE NEW SQUARE SUM
              001734  005324
 686.         001735  053 06 00              SD     R6,SMX          . STORE NEW SUM
              001736  005320
 687.         001737  100 15 16              SUR    R13,R14         . RESTORE X PTER
 688.         001740  202 10 00              J      ACM2A           . GO TO XY PRODUCT
              001741  001662
 689.         001742  100 00 00   BNDLS      SUR    R0,R0           . CLEAR
```

```
SOFTWARE SYSTEM, KWH III, VERSION 8-0

690.    001743  010 16 11    DROR   R14            . DEC PTER
691.    001744  025 01 16    LXI    R1,R14         . LOAD IN X BIN
692.    001745  004 03 01    LR     R3,R1          . MOVE X
693.    001746  130 02 01    MR     R2,R1          . SQUARE X
694.    001747  013 10 00    LD     R8,SMX         . LOAD X SUM
        001750  005320
695.    001751  104 10 00    SUDR   R8,R0          . SUB OLD X
696.    001752  053 10 00    SD     R8,SMX         . STORE NEW X SUM
        001753  005320
697.    001754  013 04 00    LD     R4,SMX2
        001755  005324
698.    001756  104 04 02    SUDR   R4,R2
699.    001757  216 00 00    JLM    UNFLX
        001760  001555
700.    001761  053 04 00    SD     R4,SMX2
        001762  005324
701.    001763  110 15 17    AR     R13,R15        . FIND Y PTER
702.    001764  100 00 00    SUR    R0,R0          . CLEAR
703.    001765  005 01 15    LI     R1,R13         . LOAD IN Y
704.    001766  004 03 01    LR     R3,R1          . MOVE Y
705.    001767  100 15 17    SUR    R13,R15        .    Y PTER
706.    001770  130 02 01    MR     R2,R1          . SQUARE Y
707.    001771  013 10 00    LD     R8,SMY         . LOAD Y SUM
        001772  005322
708.    001773  104 10 00    SUDR   R8,R0          . SUB OLD Y
709.    001774  053 10 00    SD     R8,SMY         . STORE NEW Y SUM
        001775  005322
710.    001776  013 10 00    LD     R8,SMY2        . LOAD Y2 SUM
        001777  005326
711.    002000  104 10 02    SUDR   R8,R2          . SUB OLD Y2
712.    002001  216 00 00    JLM    UNFLY
        002002  001573
713.    002003  053 10 00    SD     R8,SMY2        . STORF NEW Y2 SUM
        002004  005326
714.    002005  202 10 00    J      ACM2A          . GO TO XY PRODUCT
        002006  001662
715.                       . ***********************************************************************
716.                       . COMPUTATION OF R SUBROUTINE-ABT MODULE
717.                       . CALL-      JLR  R12,RCOMP
718.                       . INPUTS-    SUMS OF X,Y,X2,Y2,XY STORED IN MEMORY
719.                       . OUTPUTS-   R STORED IN TEMPORARY R TABLE
720.    002007  057 00 17  RCOMP  SM     R0,RSAV,R15    . SAVE ENVIROMENT
        002010  004775
721.    002011  104 00 00    SUDR   R0,R0          . * CLEAR
722.    002012  104 02 02    SUDR   R2,R2          . *   ALL R
723.    002013  057 00 03    SM     R0,SCFR1,R3    .       SCALES
        002014  005313
724.    002015  006 05 00    LK     R5,16          . LOAD CON
        002016  000020
725.    002017  013 00 00    LD     R0,SMX         . LOAD X SUM
        002020  005320
726.    002021  013 06 00    LD     R6,SMY         . LOAD Y SUM
        002022  005322
727.    002023  053 00 00    SD     R0,RSUM5       . STORE AT SUM
        002024  005342
728.    002025  053 06 00    SD     R6,RSUM6       . STORE AT SUM
        002026  005344
```

```
SOFTWARE SYSTEM, KWH III, VERSION 8-0

729.   002027  057 00 01         SM     R0,TSAV,R1        . *******
       002030  005550
730.   002031  216 00 00         JLM    PSFR              . *******
       002032  005453
731.   002033  017 00 02         LM     R0,TSAV,R2        . *******
       002034  005550
732.   002035  057 06 07         SM     R6,TSAV,R7        . *******
       002036  005550
733.   002037  216 00 00         JLM    PSFR              . *******
       002040  005453
734.   002041  017 06 10         LM     R6,TSAV,R8        . *******
       002042  005550
735.   002043  120 02 05         CR     R2,R5             .
736.   002044  202 03 00         JLS    RC01              . BRANCH ON NO
       002045  002445
737.   002046  120 10 05         CR     R8,R5             .
738.   002047  202 03 00         JLS    RC01              . BRANCH ON NO
       002050  002445
739.   002051  104 12 12  RC10   SUDR   R10,R10           . CLEAR PTERS
740.   002052  006 14 00         LK     R12,2             . LOOP CNTER
       002053  000002
741.   002054  013 00 13  RC11   LD     R0,SMX2,R11       . GET PRODUCT SUM
       002055  005324
742.   002056  007 07 12         L      R7,SCFX2,R10      . GET SCALE
       002057  005310
743.   002060  226 07 00         JNZ    R7,RC13           . BRANCH ON SCALE
       002061  002110
744.   002062  057 00 01         SM     R0,TSAV,R1        . *******
       002063  005550
745.   002064  216 00 00         JLM    PSFR              . *******
       002065  005453
746.   002066  017 00 02         LM     R0,TSAV,R2        . *******
       002067  005550
747.   002070  120 [illegible]   CR     [illegible]       .
748.   002071  231 011           LJGE   RC16              .  YES
749.   002072  004 04 05         LR     R4,R5             .
750.   002073  100 04 02         SUR    R4,R2             . RU=SCALE
751.   002074  067 04 12         SX     R4,SCFR2,R10      . STORE SCALE
       002075  005314
752.   002076  050 00 05         LRDR   R0,R5             .
753.   002077  073 00 13         SDX    R0,RSUM7,R11      . SUM OF PRODUCT
       002100  005346
754.   002101  201 043           LJ     RC12              . GO TO LOOP CHECK
755.   002102  067 07 12  RC15   SX     R7,SCFR2,R10      . STORE SCALE
       002103  005314
756.   002104  050 00 02         LRDR   R0,R2             . SHIFT BACK
757.   002105  073 00 13         SDX    R0,RSUM7,R11      . SUM OF PRODUCT
       002106  005346
758.   002107  201 035           LJ     RC12              . CHECK FOR DONE
759.   002110  100 02 02  RC13   SUR    R2,R2             . SCALF EXISTS
760.   002111  004 03 00         LR     R3,R0             . LOAD UPPER OF SUM TO R3
761.   002112  076 02 00         CLD    R2,6              . SHIFT 6
       002113  000006
762.   002114  110 02 07         AR     R2,R7             . ADD SCALE FOR ACTUAL VALUE
763.   002115  057 02 03         SM     R2,TSAV,R3        . *******
       002116  005550
764.   002117  216 00 00         JLM    PSFR              . *******
```

SOFTWARE SYSTEM, KWH III, VERSION 8-0

```
         002120  005453
765.     002121  017 02 04          LM    R2,TSAV,R4       . *******
         002122  005550
766.     002123  006 10 00          LK    R8,10            . MAX NUM OF SHIFTS
         002124  000012
767.     002125  100 10 04          SUR   R8,R4            . SUB NO OF SHIFTS
768.     002126  232 10 00          JP    R8,RC55          . BRANCH ON NO UNDERFLOW
         002127  002134
769.     002130  004 15 10          LR    R13,R8           . UNDERFLOW,MOVE REG 3 SUM SHIFT
770.     002131  100 10 10          SUR   R3,R8            . CLEAR LOWER 2 REGS SHIFT
771.     002132  010 15 04          TCR   R13              . MAKE SHIFT POS
772.     002133  040 02 15          LRSR  R2,R13           . SHIFT DOWN REG 3 SUM
773.     002134  050 00 10    RC55  LRDR  R0,R8            . SHIFT DOWN LOWER 2 REGS SUM
774.     002135  004 00 02          LR    R0,R2            . LOAD NEW UPPER REG
775.     002136  050 00 05          LRDR  R0,R5            .
776.     002137  110 10 05          AR    R8,R5            .
777.     002140  067 10 12          SX    R8,SCFR2,R10     . STORE SCALE
         002141  005314
778.     002142  073 00 13          SDX   R0,RSUM7,R11     . SUM OF PRODUCT
         002143  005346
779.     002144  206 14 00    RC12  XJ    R12,RC11         . LOOP CHECK
         002145  002054
780.     002146  013 00 00          LD    R0,RSUM5         . SUM OF X
         002147  005342
781.     002150  004 03 01          LR    R3,R1            . MOVE X
782.     002151  130 00 03          MR    R0,R3            . SQUARE
783.     002152  053 00 00          SD    R0,RSUM2         . STORE
         002153  005334
784.     002154  007 04 00          L     R4,SCFR1         . GET SCALE
         002155  005313
785.     002156  110 04 04          AR    R4,R4            . CONVERT FOR MULT
786.     002157  047 04 00          S     R4,SCFR1         . STORE NEW SCALE
         002160  005313
787.     002161  013 00 00          LD    R0,RSUM6         . SUM OF Y
         002162  005344
788.     002163  130 02 01          MR    R2,R1            . FIND XY
789.     002164  053 02 00          SD    R2,RSUM1         . STORE
         002165  005332
790.     002166  130 00 01          MR    R0,R1            . FIND YY
791.     002167  053 00 00          SD    R0,RSUM3         . STORE
         002170  005336
792.     002171  007 07 00          L     R7,BPREV         . GET B VALUE
         002172  005302
793.     002173  013 00 00          LD    R0,RSUM9         . SUM OF XY
         002174  005352
794.     002175  130 00 07          MR    R0,R7            . MULT BY B
795.     002176  053 00 00          SD    R0,RSUM4         . STORE
         002177  005340
796.     002200  013 00 00          LD    R0,RSUM7         . SUM OF X2
         002201  005346
797.     002202  130 00 07          MR    R0,R7            . MULT BY B
798.     002203  053 00 00          SD    R0,RSUM5         . STORE
         002204  005342
799.     002205  013 00 00          LD    R0,RSUM8         . SUM OF Y2
         002206  005350
800.     002207  130 00 07          MR    R0,R7            . MULT BY B
801.     002210  053 00 00          SD    R0,RSUM6         . STORE
```

```
SOFTWARE SYSTEM, KWH III, VERSION 8-0

              002211  005344
802.          002212  013 00 00             LD    R0,RSUM4     . CALCUTE
              002213  005340
803.          002214  013 02 00             LD    R2,RSUM1     .    NUMERATOR
              002215  005332
804.          002216  007 07 00             L     R7,SCFR4     . GET
              002217  005316
805.          002220  007 10 00             L     R8,SCFR1     .    SCALES
              002221  005313
806.          002222  100 07 10             SUR   R7,R8        . SUB
807.          002223  222 07 00             JZ    R7,RC20      . SAME SCALE
              002224  002235
808.          002225  232 07 00             JP    R7,RC21      . FRONT LARGER
              002226  002234
809.          002227  010 07 04             TCR   R7           . BACK LARGER
810.          002230  047 10 00             S     R8,SCFR4     . STORE SCALE
              002231  005316
811.          002232  050 00 07             LRDR  R0,R7        . SHIFT FRONT
812.          002233  201 002               LJ    RC20         . GO TO SUB
813.          002234  050 02 07    RC21     LRDR  R2,R7        . SHIFT BACK
814.          002235  104 00 02    RC20     SUDR  R0,R2        . FIND NUMERATOR
815.          002236  053 00 00             SD    R0,RSUM7     . STORE
              002237  005346
816.          002240  013 00 00             LD    R0,RSUM5     . FIND
              002241  005342
817.          002242  013 02 00             LD    R2,RSUM2     .    DENOM 1
              002243  005334
818.          002244  007 07 00             L     R7,SCFR2     . CHECK SCALE
              002245  005314
819.          002246  100 07 10             SUR   R7,R8        . SUB
820.          002247  222 07 00             JZ    R7,RC22      . SAME
              002250  002261
821.          002251  232 07 00             JP    R7,RC23      . FRONT LARGER
              002252  002260
822.          002253  010 07 04             TCR   R7           . BACK LARGER
823.          002254  047 10 00             S     R8,SCFR2     . STORE NEW SCALE
              002255  005314
824.          002256  050 00 07             LRDR  R0,R7        . SHIFT FRONT
825.          002257  201 002               LJ    RC22         . GO TO SUB
826.          002260  050 02 07    RC23     LRDR  R2,R7        . SHIFT BACK
827.          002261  104 00 02    RC22     SUDR  R0,R2        . FIND DENOM 1
828.          002262  013 12 00             LD    R10,RSUM6    . FIND
              002263  005344
829.          002264  013 14 00             LD    R12,RSUM3    .    DENOM 2
              002265  005336
830.          002266  007 07 00             L     R7,SCFR3     . GET SCALE
              002267  005315
831.          002270  100 07 10             SUR   R7,R8        . SUB
832.          002271  222 07 00             JZ    R7,RC24      . SAME
              002272  002303
833.          002273  232 07 00             JP    R7,RC25      . FRONT LARGER
              002274  002302
834.          002275  010 07 04             TCR   R7           . BACK LARGER
835.          002276  047 10 00             S     R8,SCFR3     . STORE NEW SCALE
              002277  005315
836.          002300  050 12 07             LRDR  R10,R7       . SHIFT FRONT
837.          002301  201 002               LJ    RC24         . GO TO SUB
```

```
SOFTWARE SYSTEM, KWH III, VERSION 8-0

838.   002302  050 14 07    RC25  LRDR  R12,R7          . SHIFT BACK
839.   002303  104 12 14    RC24  SUDR  R10,R12         . FIND DENOM 2
840.   002304  057 00 01          SM    R0,TSAV,R1      . ******
       002305  005550
841.   002306  216 00 00          JLM   PSFR            . *****
       002307  005453
842.   002310  017 00 02          LM    R0,TSAV,R2      . ******
       002311  005550
843.   002312  057 12 13          SM    R10,TSAV,R11    . *****
       002313  005550
844.   002314  216 00 00          JLM   PSFR            . *****
       002315  005453
845.   002316  017 12 14          LM    R10,TSAV,R12    . ******
       002317  005550
846.   002320  017 15 16    RC39  LM    R13,SCFR2,R14   . GET SCALES
       002321  005314
847.   002322  120 02 05    RC70  CR    R2,R5           .
848.   002323  231 004            LJGE  RC71            . BRANCH IF YES
849.   002324  010 02 10          IROR  R2              . INC SHIFT
850.   002325  010 15 10          IROR  R13             . INC SCALE
851.   002326  201 374            LJ    RC70            . CHECK SIZE
852.   002327  120 14 05    RC71  CR    R12,R5          .
853.   002330  231 004            LJGE  RC72            . BRANCH ON YES
854.   002331  010 14 10          IROR  R12             . INC SHIFT
855.   002332  010 16 10          IROR  R14             . INC SCALE
856.   002333  201 374            LJ    RC71            . CHECK SIZE
857.   002334  057 15 16    RC72  SM    R13,SCFR2,R14   . STORE SCALES AWAY
       002335  005314
858.   002336  050 00 02    RC40  LRDR  R0,R2           . * SHIFT BACK
859.   002337  050 12 14          LRDR  R10,R12         . *           DENOMS
860.   002340  130 12 01    RC41  MR    R10,R1          .  PRODUCT OF DENOMS
861.   002341  007 06 00          L     R6,SCFR2        . FIND NEW SCALE
       002342  005314
862.   002343  113 06 00          A     R6,SCFR3        .       DENOM
       002344  005315
863.   002345  100 07 07          SUR   R7,R7           . CLEAR REG
864.   002346  052 06 00          LRD   R6,1            . SHIFT SCALE FOR ROOT
       002347  000001
865.   002350  222 07 00          JZ    R7,RC26         . BRANCH ON EVEN
       002351  002355
866.   002352  010 06 10          IROR  R6              . ODD, SCALE
867.   002353  052 12 00          LRD   R10,1           . SCALE PRODUCT
       002354  000001
868.   002355  057 12 13    RC26  SM    R10,TSAV,R11    . *******
       002356  005550
869.   002357  216 00 00          JLM   PSQR            . *******
       002360  005363
870.   002361  017 12 13          LM    R10,TSAV,R11    . *******
       002362  005550
871.   002363  013 00 00          LD    R0,RSUM7        . LOAD NUMERATOR
       002364  005346
872.   002365  007 03 00          L     R3,SCFR4        . LOAD NUM SCALE
       002366  005316
873.   002367  100 15 15          SUR   R13,R13         . SIGN FLAG
874.   002370  232 00 00          JP    R0,RC27         . BRANCH ON POS
       002371  002374
875.   002372  010 15 10          IROR  R13             . SET FLAG
```

SOFTWARE SYSTEM, KWH III, VERSION 8-0

```
876.    002373  010 00 05             TCDR  R0           . COMP NUM
877.    002374  006 16 00    RC27     LK    R14,9        .
        002375  000011
878.    002376  004 05 12             LR    R5,R10       . SAVE DENOM
879.    002377  100 04 04             SUR   R4,R4        . CLEAR REG
880.    002400  057 00 01    RC29     SM    R0,TSAV,R1   . *******
        002401  005550
881.    002402  216 00 00             JLM   P5FR         . *******
        002403  005453
882.    002404  017 00 02             LM    R0,TSAV,R2   . *******
        002405  005550
883.    002406  004 07 06             LR    R7,R6        .
884.    002407  057 04 05             SM    R4,TSAV,R5   .
        002410  005550
885.    002411  216 00 00             JLM   P5FR         .
        002412  005453
886.    002413  017 04 06             LM    R4,TSAV,R6   .
        002414  005550
887.    002415  052 04 00             LRD   R4,16        .
        002416  000020
888.    002417  100 07 06             SUR   R7,R6        .
889.    002420  112 07 00             AK    R7,16        .
        002421  000020
890.    002422  100 03 02             SUR   R3,R2        .
891.    002423  110 03 16             AR    R3,R14
892.    002424  120 07 03             CR    R7,R3
893.    002425  235 005               LJLS  RC30         . DENOM TOO LARGE
894.    002426  221 006               LJE   RC31         . GOOD
895.    002427  100 07 03             SUR   R7,R3
896.    002430  050 00 07             LRDR  R0,R7        .
897.    002431  201 003               LJ    RC31         . GO TO DIVIDE
898.    002432  100 03 07    RC30     SUR   R3,R7
899.    002433  040 05 03             LRSR  R5,R3
900.    002434  134 00 05    RC31     DR    R0,R8        .
901.    002435  222 15 00             JZ    R13,RC32     . TEST SIGN FLAG
        002436  002440
902.    002437  010 01 04             TCR   R1           . NEG, COMP R
903.    002440  047 01 00    RC32     S     R1,RTABT     . STORE R
        002441  005266
904.    002442  017 00 17             LM    R0,RSAV,R15  . RESTORE ENVIROMENT
        002443  004775
905.    002444  200 10 14             JR    R12          . RETURN
906.    002445  100 02 10    RC01     SUR   R2,R8        . FIND SCALE DIFF
907.    002446  004 11 05             LR    R9,R5        .
908.    002447  236 02 00             JN    R2,RC02      . Y GT X
        002450  002453
909.    002451  100 11 10             SUR   R9,R8        . X GT Y
910.    002452  201 003               LJ    RC03         . GO TO SHIFT
911.    002453  110 02 10    RC02     AR    R2,R8        . FIND SHIFT
912.    002454  100 11 02             SUR   R9,R2        . SUB FROM KEY
913.    002455  013 00 00    RC03     LD    R0,SMX       . LOAD X SUM
        002456  005320
914.    002457  013 06 00             LD    R6,SMY       . LOAD Y SUM
        002460  005322
915.    002461  050 00 11             LRDR  R0,R9        . SHIFT SUM
916.    002462  050 06 11             LRDR  R6,R9        . SHIFT SUM
917.    002463  053 00 00             SD    R0,RSUM5     . SUM OF X
```

```
SOFTWARE SYSTEM, KWH III, VERSION 8-0
          002464  005342
918.      002465  053 06 00            SD    R6,RSUM6        . SUM OF Y
          002466  005344
919.      002467  047 11 00            S     R9,SCFR1        . STORE SCALE
          002470  005313
920.      002471  202 10 00            J     3C10            . GO TO PRODUCT CHECK
          002472  002051
921.                             . *****************************************************************
922.                             . *****************************************************************
923.                             . WEIGHT FUNCTION OF R SURROUTINE-ABT MODULE
924.                             . CALL-       JLR  R12,WGHT
925.                             . INPUTS-     VALUE OF R IN TEMPORARY TABLE
926.                             . OUTPUTS-    WEIGHTED VALUE OF R STORED IN TEMP TABLE
927.      002473  057 00 17      WGHT  SM    R0,RSAV,R15     . SAVE ENVIROMENT
          002474  004775
928.      002475  007 02 00            L     R2,RTABT+1      . RETRIEVE K
          002476  005267
929.      002477  010 02 00            PR    R2              . MAKE POS
930.      002500  006 03 00            LK    R3,CONW         . LOAD WEIGHT VALUE
          002501  000120
931.      002502  004 04 03            LR    R4,R3           . MOVE WEIGHT
932.      002503  100 03 02            SUR   R3,R2           . R3=W-K
933.      002504  007 07 00          . L     R7,RTABT        . GET CURRENT R
          002505  005266
934.      002506  100 12 12            SUR   R10,R10         . CLEAR SIGN FLAG
935.      002507  232 07 00            JP    R7,WGH01        . BRANCH ON POS
          002510  002513
936.      002511  010 07 04            TCR   R7              . NEG, THEN COMP
937.      002512  004 12 07            LR    R10,R7          . SET FLAG
938.      002513  130 06 03      WGH01 MR    R6,R3           . R6=R*(W-K)
939.      002514  134 06 04            DR    R6,R4           . DIVIDE PRODUCT BY W
940.      002515  222 12 00            JZ    R10,WGH02       . BRANCH ON R POS
          002516  002520
941.      002517  010 07 04            TCR   R7              . COMP IF NEG
942.      002520  047 07 00      WGH02 S     R7,RTABT        . STORE AWAY
          002521  005266
943.      002522  017 00 17            LM    R0,RSAV,R15     . RESTORE ENVIROMENT
          002523  004775
944.      002524  200 10 14            JR    R12             . RETURN
945.                             . *****************************************************************
946.                             . COMPARE R SURROUTINE-ABT MODULE
947.                             . CALL        JLR  R12,COMR
948.                             . INPUTS-     TEMP AND SYS R WITH PARAMETERS FROM RTABT,RTABS
949.                             . OUTPUT-     BEST VALUE OF R AND PARAMETERS STORED IN RTABS
950.      002525  057 00 17      COMR  SM    R0,RSAV,R15     . SAVE ENVIROMENT
          002526  004775
951.      002527  007 03 00            L     R3,RTABT        . R3=NEW R
          002530  005266
952.      002531  007 04 00            L     R4,RTABS        . R4=SYSTEM R
          002532  005274
953.      002533  120 03 04            CR    R3,R4           . COMPARE
954.      002534  221 012              LJE   CH03            . EQ,FURTHER TESTS
955.      002535  231 004              LJGE  CH02            . NEW LARGER,NEW SYSTEM R
956.      002536  017 00 17      CR01  LM    R0,RSAV,R15     . NEW BAD,RESTORE ENVIROMENT
          002537  004775
957.      002540  200 10 14            JR    R12             . RETURN
958.      002541  017 00 05      CH02  LM    R0,RTABT,R5     . LOAD NEW R AND PARAMETERS
```

SOFTWARE SYSTEM, KWH III, VERSION 8-0

```
002542  005266
002543  057 00 05          SM    R0,RTABS,R5     . STORE IN SYSTEM SAVE
002544  005274
002545  201 371            LJ    CR01            . EXIT
002546  007 00 00    CR03  L     R0,RTABT+1      . LOAD NEW K
002547  005267
002550  004 01 00          LR    R1,R0           . MOVE
002551  007 02 00          L     R2,RTABS+1      . LOAD SYSTEM K
002552  005275
002553  010 00 00          PR    R0              . MAKE OLD K POS
002554  010 02 00          PR    R2              . MAKE SYSTEM K POS
002555  120 00 02          CR    R0,R2           . COMPARE
002556  235 363            LJLS  CR02            . SWITCH
002557  221 002            LJE   CR04            . CHECK SIGN
002560  201 356            LJ    CR01            . EXIT
002561  232 01 00    CR04  JP    R1,CR01         . NEW POS,EXIT
002562  002536
002563  201 356            LJ    CR02            . NEW NEG,SWITCH
                     . ****************************************************************
                     . THOLD  THRESHOLD SUBROUTINE-ABT MODULE
                     . CALL-        JLR  R12,THOLD
                     . INPUTS-      VALUE OF R FROM RTABS AND FLAG TFLAG1
                     .              VALUES T1,T2,TC1,TC2,TC3
                     . OUTPUTS-     FLAG BITS IN TFLAG1 ARE SET/CLEAR
002564  057 00 17    THOLD SM    R0,RSAV,R15     . SAVE ENVIROMENT
002565  004775
002566  007 12 00          L     R10,TFLAG1      . R10=TFLAG
002567  005362
002570  007 00 00          L     R0,RTABS        . R0=BEST R
002571  005274
002572  123 00 00          C     R0,T2           . COMPARE R:THRES 2
002573  005240
002574  235 003            LJLS  TH01            . BRANCH ON R LESS
002575  024 12 03          SBR   R10,3           .
002576  201 002            LJ    TH02            . NEXT CHKER
                     TH01 .
002577  030 12 03          ZBR   R10,3           .
                     TH02 .
002600  007 04 00          L     R4,TDAT         . R4=START ADR OF PARAM
002601  005361
002602  007 07 04          L     R7,QHCNT,R4     . GET HIT CNTER
002603  000002
002604  123 00 00          C     R0,T1           . COMPARE R:THRES 2
002605  005237
002606  235 005            LJLS  TH03            . BRANCH ON R LESS
002607  024 12 02          SBR   R10,2           .
002610  007 16 00          L     R14,HINC        .
002611  005244
002612  201 003            LJ    TH04            . BRANCH TO WEIGH CNTER
                     TH03 .
002613  030 12 02          ZBR   R10,2           .
002614  100 16 16          SUR   R14,R14         .
002615  013 10 00    TH04  LD    R8,DEC          . LOAD WEIGHT FACTOR
002616  005354
002617  130 06 10          MR    R5,R8           . MULT CNTER
002620  050 06 11          LRDR  R6,R9           . DIVInE ENTER
002621  110 07 16          AR    R7,R14          .
```

```
SOFTWARE SYSTEM, KWH III, VERSION 8-0

       002622  047 07 04             S     R7,QHCNT,R4     . STORE HIT CNTER
       002623  000002
       002624  123 07 00             C     R7,TC1          . COMPARE R:TC1
       002625  005241
       002626  235 003               LJLS  TH05            . BRANCH ON R LESS
       002627  024 12 04             SBR   R10,4           .
       002630  201 003               LJ    TH06            . NEXT COMPARE
                               TH05 .
       002631  030 12 04             ZBR   R10,4           .
       002632  024 12 00             SBR   R10,0           .
       002633  123 07 00       TH06  C     R7,TC2          . COMPARE R:TC2
       002634  005242
       002635  235 003               LJLS  TH07            . BRANCH ON R LESS
       002636  024 12 05             SBR   R10,5           .
       002637  201 002               LJ    TH08            . NEXT COMPARE
                               TH07 .
       002640  030 12 05             ZBR   R10,5           .
       002641  123 07 00       TH08  C     R7,TC3          . COMPARE R:TC3
       002642  005243
       002643  235 004               LJLS  TH09            . BRANCH ON R LESS
       002644  147 12 00             OR    R10,ORTAB+6     .
       002645  005563
       002646  201 003               LJ    TH00            . GO TO EXIT
                               TH09 .
       002647  143 12 00             AND   R10,ANDTAB+6    .
       002650  005603
       002651  047 12 00       TH00  S     R10,TFLAG1      . STORE FLAG
       002652  005362
       002653  017 00 17             LM    R0,RSAV,R15     . RESTORE ENVIROMENT
       002654  004775
       002655  200 10 14             JR    R12             . EXIT
                               . ********************************************************************
                               . TALI  ALI SUBROUTINE-ART MODULE
                               . CALL-       JLR  R12,TALI
                               . INPUTS-      R0=BEGINNING DATA ADR(ABSOLUTE)
                               .              R1=BEGINNING REFERENCE ADR(ABSOLUTE)
                               .              R2=NUMBER OF ITERATIONS
                               .              R3=KEY FOR UTAB,LTAB
                               . OUTPUTS- TIME WEIGHTED SUM OF THE DATA AND STORAGE BUFFER
                               .              STORED IN STORAGE BUFFER
       002656  057 00 17       TALI  SM    R0,RSAV,R15     . SAVE ENVIROMENT
       002657  004775
       002660  006 14 00             LK    R12,1           . LOAD MIN CHECK VALUE
       002661  000001
       002662  004 17 14             LR    R15,R12         .
       002663  100 16 16             SUR   R14,R14         .
       002664  007 04 03             L     R4,UTAB,R3      . R4=U VALUE
       002665  005256
       002666  007 05 03             L     R5,LTAB,R3      . R5=L VALUE
       002667  005246
       002670  064 17 05             CLSR  R15,R5          .
       002671  100 12 12             SUR   R10,R10         . CLEAR LOAD REG
                               TALI1 .
       002672  005 11 01             LI    R9,R1           . PICK UP STORAGE BIN
       002673  130 10 04             MR    R8,R4           . MULT BY U
       002674  025 13 00             LXI   R11,R0          . GET DATA BIN
       002675  114 10 12             ADR   R8,R10          . ADD DATA TO PRODUCT
```

SOFTWARE SYSTEM, KWH III, VERSION 8-0

```
1047.    002676  114 10 16           ADR    R8,R14          .
1048.    002677  050 10 05           LRDR   R8,R5           . DIVIDE BY L
1049.    002700  120 11 14           CR     R9,R12          . COMPARE WITH MIN
1050.    002701  235 003             LJLS   TALI3           . LESS THAN MIN
1051.    002702  065 11 01           SXI    R9,R1           . NO,STORE VALUE
1052.    002703  201 002             LJ     TALI2           . CHECK FOR LOOP END
1053.    002704  065 14 01   TALI3   SXI    R12,R1          . STORE MIN IN REF
1054.    002705  206 02 00   TALI2   XJ     R2,TALI1        . LOOP UNTIL ALL DONE
         002706  002672
1055.    002707  017 00 17           LM     R0,RSAV,R15     . RESTORE ENVIROMENT
         002710  004775
1056.    002711  200 10 14           JR     R12             . EXIT
1057.                        . ****************************************************************
1058.                        . ADEL,TDEL  DELETE SUBROUTINE-ABT MODULE
1059.                        . CALL-      JLR  R12,TDEL  OR  JLR  R12,ADEL
1060.                        . INPUTS-    R13=START ADR OF SPEC(ABSOLUTE)
1061.                        .            R14=START ADR OF ALI(ABSOLUTE)
1062.                        .            R15=BAND WIDTH
1063.                        . OUTPUTS-   DELETED SPEC STORED IN BINS IN SPEC BUF
1064.    002712  057 00 17   ADEL    SM     R0,RSAV,R15     . STORE ENVIROMENT
         002713  004775
1065.    002714  201 020             LJ     DEL00           . GO TO DELETE
1066.    002715  057 00 17   TDEL    SM     R0,RSAV,R15     . STORE ENVIROMENT
         002716  004775
1067.    002717  007 00 00           L      R0,TFLAG1       . GET FLAG
         002720  005362
1068.    002721  007 02 00           L      R2,ORTAB+6      .
         002722  005563
1069.    002723  140 02 00           ANDR   R2,R0           .
1070.    002724  122 02 00           CK     R2,0            .
         002725  000000
1071.    002726  221 003             LJE    TDEL1           . BRANCH ON 0
1072.    002727  034 00 02           CDR    R0,2            .
1073.    002730  226 004             LJNE   DEL00           . GO TO DELETE
1074.    002731  017 00 17   TDEL1   LM     R0,RSAV,R15     . RESTORE ENVIROMENT
         002732  004775
1075.    002733  200 10 14           JR     R12             . EXIT
1076.                        DEL00 .
1077.    002734  100 02 02           SUR    R2,R2           . CLEAR LOAD REG
1078.    002735  104 00 00           SUDR   R0,R0           . CLEAR SUM REGS
1079.    002736  004 14 16           LR     R12,R14         . GET START STOR BUF
1080.    002737  110 14 17           AR     R12,R15         . ADD BAND
1081.    002740  025 03 16   DEL01   LXI    R3,R14          . GET STOR BIN
1082.    002741  114 00 02           ADR    R0,R2           . GET SUM FOR AVE
1083.    002742  120 16 14           CR     R14,R12         . ALL ADDED
1084.    002743  235 375             LJLS   DEL01           . NO
1085.    002744  134 00 17           DR     R0,R15          . YES,GET AVE
1086.    002745  100 16 17           SUR    R14,R15         . RESTORE PTER TO BUF START
1087.                        DEL02 .
1088.    002746  005 07 15           LI     R7,R13          . GET SPEC BIN
1089.    002747  130 06 01           MR     R6,R1           . MULT BY AVE
1090.    002750  025 10 16           LXI    R8,R14          . GET STOR BIN
1091.    002751  134 06 10           DR     R6,R8           . R7=AVE*SPEC/STOR
1092.    002752  065 07 15           SXI    R7,R13          . STORE AT SPEC
1093.    002753  120 16 14           CR     R14,R12         . FINISHED
1094.    002754  235 372             LJLS   DEL02           . NO
1095.    002755  201 354             LJ     TDEL1           . YES
```

```
SOFTWARE SYSTEM, KWH III, VERSION 8-0

1096.                                   . ************************************************************
1097.                                   . TNORM- NORMALIZATION OF R SUBROUTINE-AHT MODULE
1098.                                   . CALL-   JLR    R12,TNORM
1099.                                   . INPUT-  RTABT TABLE
1100.                                   . OUTPUT-  NORMALIZED R STORED IN RTABT TABLE
1101.         002756  057 00 17         TNORM    SM     R0,RSAV,R15       . SAVE ENVIROMENT
              002757  004775
1102.         002760  017 12 17                  LM     R10,DNORM,R15     . GET CONSTANTS
              002761  003057
1103.         002762  007 01 00                  L      R1,RTABT          . GET R VALUE
              002763  005266
1104.         002764  100 04 04                  SUR    R4,R4             . CLEAR NEG FLG
1105.         002765  232 01 00                  JP     R1,TN0            . CHECK SIGN
              002766  002771
1106.         002767  010 01 00                  PR     R1                . NEG, MAKE POS
1107.         002770  004 04 01                  LR     R4,R1             . SET FLG
1108.         002771  042 01 00         TN0      LRS    R1,3              . SHIFT DOWN
              002772  000003
1109.         002773  130 00 01                  MR     R0,R1             . SQUARE R VALUE
1110.         002774  100 17 01                  SUR    R15,R1            . GET DENOM DIV
1111.         002775  007 07 00                  L      R7,RTABT+5        . GET R VALUE
              002776  005273
1112.         002777  100 07 13                  SUR    R7,R11            . SUB 2
1113.         003000  130 06 01                  MR     R6,R1             . GET NUM FOR DIV
1114.         003001  057 06 07                  SM     R6,TSAV,R7        .
              003002  005550
1115.         003003  216 00 00                  JLM    PSFR              .
              003004  005453
1116.         003005  017 06 10                  LM     R6,TSAV,R8        .
              003006  005550
1117.         003007  050 06 10                  LRDR   R6,R8             . RESTORE R6,R7 TO NORMAL
1118.         003010  004 01 17                  LR     R1,R15            . LOAD REG FOR SFR
1119.         003011  100 00 00                  SUR    R0,R0             . CLEAR SFR REG
1120.         003012  057 00 01                  SM     R0,TSAV,R1        .
              003013  005550
1121.         003014  216 00 00                  JLM    PSFR              .
              003015  005453
1122.         003016  017 00 02                  LM     R0,TSAV,R2        .
              003017  005550
1123.         003020  100 02 10                  SUR    R2,R8
1124.         003021  122 02 00                  CK     R2,13
              003022  000015
1125.         003023  235 004                    LJLS   TN2               . BRANCH IF DIVIDE GOOD
1126.         003024  006 07 00                  LK     R7,040000         .
              003025  040000
1127.         003026  201 003                    LJ     TN3               . JUMP AROUND DIVIDE
1128.         003027  074 06 14         TN2      CLDR   R6,R12            . SHIFT FOR SIGNIF
1129.         003030  134 06 17                  DR     R6,R15            . R7=R*R*(R-2)/1-R*R=K
1130.         003031  100 06 06         TN3      SUR    R6,R6             . CLEAR REMAINDER
1131.         003032  004 11 07                  LR     R9,R7             . GET DIV DENOM
1132.         003033  110 11 16                  AR     R9,R14            . ADD 126
1133.         003034  074 06 15                  CLDR   R6,R13            . SHIFT FOR SIGNIF
1134.         003035  134 06 11                  DR     R6,R9             . R=K/K+126
1135.         003036  100 06 06                  SUR    R6,R6             . CLEAR SQRT REG
1136.         003037  057 06 07                  SM     R6,TSAV,R7
              003040  005550
1137.         003041  216 00 00                  JLM    PSQR
```

```
SOFTWARE SYSTEM, KWH III, VERSION 8-0

                003042  005363
1138.           003043  017 06 07             LM     R6,TSAV,R7
                003044  005550
1139.           003045  062 06 00             ALS    R6,3            . RESTORE BIAS
                003046  000003
1140.           003047  222 04 00             JZ     R4,TN1          . JUMP ON POS
                003050  003052
1141.           003051  010 06 04             TCR    R6              . MAKE RESULT NEG
1142.           003052  047 06 00     TN1     S      R6,RTABT        . STORE R BACK
                003053  005266
1143.           003054  017 00 17             LM     R0,RSAV,R15     . RESTORE ENVIROMENT
                003055  004775
1144.           003056  200 10 14             JR     R12             . RETURN
1145.           003057  000001        DNORM   + 1
1146.           003060  000002                + 2
1147.           003061  000003                + 3
1148.           003062  000014                + 12
1149.           003063  001760                + 01760
1150.           003064  010000                + 010000
1151.                                 . ***********************************************************
1152.                                 . TPRED - CENTER FREQ PREDICTION   ART MODULE
1153.                                 . CALL -  JLR R12,TPRED
1154.                                 . INPUTS- USES TRK PARAM AREA,RTABS
1155.                                 . OUTPUTS- STORE PREDICTED CF IN TRK PARAMETER AREA
1156.           003065  057 00 17     TPRED   SM     R0,RSAV,R15     . SAVE ENVIROMENT
                003066  004775
1157.           003067  007 01 00             L      R1,RTABS        . GET R VALUE
                003070  005274
1158.           003071  046 01 00             ARS    R1,3            . SHIFT DOWN
                003072  000003
1159.           003073  130 00 01             MR     R0,R1           . SQUARE R
1160.           003074  130 00 01             MR     R0,R1           . R TO FOURTH POWER
1161.           003075  100 02 02             SUR    R2,R2           . CLEAR SHIFT CNTER
1162.           003076  052 00 00     TPD00   LHD    R0,1            . SHIFT DOWN R TO FOURTH
                003077  000001
1163.           003100  010 02 10             IROR   R2              . INC CNTER
1164.           003101  226 00 00             JNZ    R0,TPD00        . R0 CLEAR, JUMP ON NO
                003102  003076
1165.           003103  236 01 00             JN     R1,TPD00        . JUMP TO MAKE R1 POS
                003104  003076
1166.           003105  006 05 00             LK     R5,24           . R 4TH HAD BIAS OF 24
                003106  000030
1167.           003107  100 05 02             SUR    R5,R2           . SUB DOWN SHIFT
1168.           003110  006 04 00             LK     R4,021227       . LOAD 97 TO FOURTH
                003111  021227
1169.           003112  130 00 04             MR     R0,R4           . (R*97) TO 4TH
1170.           003113  050 00 05             LRDR   R0,R5           . SHIFT PRODUCT DOWN TO DROP BIAS
1171.           003114  006 04 00             LK     R4,1            . LOAD 1
                003115  000001
1172.           003116  110 04 01             AR     R4,R1           . ADD PRODUCT To 1
1173.           003117  072 00 00             ALD    R0,6            .
                003120  000006
1174.           003121  134 00 04             DR     R0,R4           . DIVIDE, R1=W
1175.                                 . R1 CONTAINS W
1176.           003122  062 00 00             ALS    R0,1            .
                003123  000001
1177.           003124  120 00 01             CR     R0,R1           .
```

```
SOFTWARE SYSTEM, KWH III, VERSION 8-0

1178.   003125  235 002            LJLS  TPXX           .
1179.   003126  010 01 10          IROR  R1             .
1180.   003127  007 11 00   TPXX   L     R9,TDAT        .
        003130  005361
1181.   003131  004 13 11          LR    R11,R9         . MOVE TO SAVE
1182.   003132  112 11 00          AK    R9,ORP2        . FIND ADR OF P-4
        003133  000012
1183.   003134  006 12 00          LK    R10,3          . LOOP CNTER
        003135  000003
1184.   003136  005 10 11   TP01   LI    R8,R9          . LOAD IN P
1185.   003137  047 10 11          S     R8,1,R9        . STORE P
        003140  000001
1186.   003141  010 11 11          OROR  R9             . DEC PTER
1187.   003142  206 12 00          XJ    R10,TP01       . LOOP TILL DONE
        003143  003136
1188.   003144  007 11 13          L     R9,ORN,R11     . GET PARAM N
        003145  000005
1189.   003146  007 07 13          L     R7,ORD,R11     . GET PARAM D
        003147  000006
1190.   003150  007 02 00          L     R2,SYSC        .
        003151  005245
1191.   003152  130 10 02          MR    R6,R2          .
1192.   003153  042 07 00          LRS   R7,1           .
        003154  000001
1193.   003155  007 05 00          L     R5,RTABS+2     . LOAD IN FP
        003156  005276
1194.   003157  113 05 00          A     R5,RTABS+1     . ADD K TO CF
        003160  005275
1195.   003161  130 04 01          MR    R4,R1          . MULT FP*W
1196.   003162  114 10 04          ADR   R8,R4          . NUM FOR DIVIDE
1197.   003163  110 07 01          AR    R7,R1          . CD+W
1198.   003164  047 07 13          S     R7,ORD,R11     .
        003165  000006
1199.   003166  004 14 10          LR    R12,R8         .
1200.   003167  004 15 11          LR    R13,R9         .
1201.   003170  052 14 00          LRD   R12,6          . ELIMINATE BIAS
        003171  000006
1202.   003172  047 15 13          S     R13,ORN,R11    . STORE IN PARAM AREA
        003173  000005
1203.   003174  134 10 07          DR    R8,R7          . DIVIDE FOR P-1
1204.   003175  047 11 13          S     R9,ORP1,R11    . STORE IN P TABLE
        003176  000007
1205.   003177  017 03 07          LM    R3,TPC1,R7     . LOAD CONSTANTS
        003200  003307
1206.   003201  130 10 03          MR    R8,R3          . P*16
1207.   003202  004 12 11          LR    R10,R9         . R10 COLLECTS P+1
1208.   003203  004 14 13          LR    R12,R11        . SAVE PARAM PTER
1209.   003204  112 13 00          AK    R11,ORP1       . SET UP P PTER
        003205  000007
1210.   003206  010 13 10          IROR  R11            .     TO P-2
1211.   003207  025 11 13          LXI   R9,R11         . LOAD P-2
1212.   003210  130 10 04          MR    R8,R4          . (P-2)*8
1213.   003211  110 12 11          AR    R10,R9         . ADD TO SUM
1214.   003212  025 11 13          LXI   R9,R11         . LOAD P-3
1215.   003213  130 10 05          MR    R8,R5          . (P-3)*15
1216.   003214  100 12 11          SUR   R10,R9         . SUR FROM SUM
1217.   003215  025 11 13          LXI   R9,R11         . LOAD P-4
```

```
SOFTWARE SYSTEM, KWH III, VERSION 8-0

1218.          003216  130 10 06                  MR     R8,R6          . (P-4)*4
1219.          003217  100 12 11                  SUR    R10,R9         . SUB FROM SUM
1220.          003220  025 11 13                  LXI    R9,R11         . LOAD P-5
1221.          003221  130 10 06                  MR     R8,R6          . (P-5)*4
1222.          003222  110 12 11                  AR     R10,R9         . ADD TO SUM
1223.          003223  004 11 12                  LR     R9,R10         . LOAD SUM FOR DIVIDE
1224.          003224  100 10 10                  SUR    R8,R8          . CLEAR DIVIDE REG
1225.          003225  134 10 07                  DR     R8,R7          . DIVIDE BY 9
1226.          003226  017 03 06                  LM     R3,TPC2,R6     . LOAD CONSTANTS
               003227  003314
1227.          003230  130 10 03                  MR     R8,R3          . MULT BY 010
1228.          003231  112 11 00                  AK     R9,4           .
               003232  000004
1229.          003233  044 11 06                  ARSR   R9,R6          . SHIFT DOWN 3
1230.          003234  232 11 00                  JP     R9,TP02        . BRANCH RESULT POS
               003235  003246
1231.          003236  007 02 00           TP03   L      R2,TFLAG1      . GET FLAG
               003237  005362
1232.          003240  024 02 00                  SBR    R2,0           .
1233.          003241  047 02 00                  S      R2,TFLAG1      . STORE BACK
               003242  005362
1234.          003243  017 00 17           TP00   LM     R0,RSAV,R15    . RESTORE ENVIROMENT
               003244  004775
1235.          003245  200 10 14                  JR     R12            . EXIT
1236.          003246  122 11 00           TP02   CK     R9,501         .
               003247  000765
1237.          003250  231 366                    LJGE   TP03           . BRANCH ON OUT OF RANGE
1238.          003251  007 02 00                  L      R2,TFLAG1      . GET FLAG
               003252  005362
1239.          003253  034 02 03                  CBR    R2,3           .
1240.          003254  221 007                    LJE    TP04           . JUMP CLEAR
1241.          003255  007 04 00                  L      R4,RTABS+2     . GET FP
               003256  005276
1242.          003257  113 04 00                  A      R4,RTABS+1     .
               003260  005275
1243.          003261  047 04 14                  S      R4,QWL,R12     . STORE AT WALL
               003262  000004
1244.          003263  007 04 14           TP04   L      R4,QWL,R12     . GET WALL
               003264  000004
1245.          003265  004 05 04                  LR     R5,R4          . MOVE
1246.          003266  007 06 00                  L      R6,OWALL       . LOAD SYS INC
               003267  005236
1247.          003270  100 04 06                  SUR    R4,R6          . WALL-OWALL
1248.          003271  110 05 06                  AR     R5,R6          . WALL+OWALL
1249.          003272  120 04 11                  CR     R4,R9          . P+1 AND SUB
1250.          003273  235 004                    LJLS   TP05           . P+1 LESS
1251.          003274  047 04 14                  S      R4,QFP,R12     . P+1 BIG, STORE DIFF IN FP
               003275  000003
1252.          003276  201 345                    LJ     TP00           . EXIT
1253.          003277  120 11 05           TP05   CR     R9,R5          . P+1 AND SUM
1254.          003300  235 004                    LJLS   TP06           . BRANCH P+1 LESS
1255.          003301  047 05 14                  S      R5,QFP,R12     . STORE SUM AS FP
               003302  000003
1256.          003303  201 340                    LJ     TP00           . EXIT
1257.          003304  047 11 14           TP06   S      R9,QFP,R12     . STORE P+1 AS FP
               003305  000003
1258.          003306  201 335                    LJ     TP00           . EXIT
```

SOFTWARE SYSTEM, KWH III, VERSION 8-0

```
003307  000020      TPC1    + 16                 . * WEIGHT
003310  000010              + 8                  . *  FACTORS
003311  000017              + 15                 . *    IN
003312  000004              + 4                  . *     P+1
003313  000011              + 9                  . *       CALC
003314  000010      TPC2    + 010                . ** SHIFT
003315  000011              + 011                . **   FACTORS
003316  177774              + 0177774            . **      IN
003317  000003              + 3                  . **         P+1 CALC
                    . ***********************************************************
                    . TRKCAL- ACTIVATE TRACKER ROUTINE
                    . CALL-    JLM    TRKCAL
                    . THIS ROUTINE WILL ACTIVATE EACH TRACKER  IN THE SYSTEM
                    . IN THE SEQUENCE WHICH IS CHAINED IN THE TRACKER ACCESS TABLE
003320  000000      TRKCAL  + 0                  . ENTRY FOR TRKER XQT
003321  057 00 17           SM     R0,TTAB,R15   .
003322  006755
003323  017 00 04           LM     R0,TCALA,R4   . LOAD CONSTANTS
003324  003363
003325  077 00 00           SZ     POFLG         .
003326  005036
003327  100 07 07           SUR    R7,R7         . CLEAR TRK ACTIVE CNT
003330  007 06 02   TCAA    L      R6,EXTAB,R2   . LOAD TRK ACCESS WORD
003331  005015
003332  222 06 00           JZ     R6,TCAB       . JUMP NOT ACTIVE
003333  003335
003334  010 07 10           IROR   R7            . ACTIVE, INC CNT
003335  206 02 00   TCAB    XJ     R2,TCAA       . LOOP TILL ALL CKED
003336  003330
003337  045 07 04           SI     R7,R4         . STORF CNT AT FLG
003340  005 10 01           LI     R8,R1         . R8=LAST TRKER
003341  005 05 00           LI     R5,R0         . R5=FIRST TRKER
003342  007 06 05   TCAD    L      R6,EXTAB,R5   . LOAD ACCFSS WORD
003343  005015
003344  222 06 00           JZ     R6,TCAC       . EXIT IF NO TRK ACTIVE
003345  003357
003346  140 06 03           ANDR   R6,R3         . MSK FOR NEXT TRKER
003347  216 00 00           JLM    TEXEC         . XQT TRKER
003350  001021
003351  010 07 11           DROR   R7            . DEC NUM LEFT
003352  045 07 04           SI     R7,R4         . STORF AT FLG
003353  120 05 10           CR     R5,R8         . DONE
003354  221 003             LJE    TCAC          . YES
003355  004 05 06           LR     R5,R6         . NO, R5=NEXT TRKER
003356  201 364             LJ     TCAD          . GO TO XQT
003357  017 00 17   TCAC    LM     R0,TTAB,R15   .
003360  006755
003361  203 10 00           J      *TRKCAL       . EXIT
003362  003320
003363  005026      TCALA   + CSTRT              . FIRST TRKER
003364  005025              + CEND               . LAST TRKER
003365  000007              + 7                  . SIZE OF EXTAB
003366  000017              + 017                . MSK FOR ACCESS WORD
003367  005035              + RTFLAG             . TRK MODULE FLAG
                    . ***********************************************************
                    . ART SHUFFLE ROUTINE
                    . ALTERS ORDER OF TRACKER ACCESS TABLEE
```

SOFTWARE SYSTEM, KWH III, VERSION 8-0

```
1305.   003370  000000      ABTSHU  + 0                      . ABT SHUFFLE
1306.   003371  057 00 17           SM    R0,ESAV,R15        .
        003372  004735
1307.   003373  017 05 07           LM    R5,SHUF,R7         . LOAD CONSTANTS
        003374  003507
1308.   003375  007 02 07   ABTS01  L     R2,TRKF,R7         . GET TFLAG
        003376  005042
1309.   003377  236 02 00           JN    R2,ABTS10          . BRANCH ON ACTIVE
        003400  003410
1310.   003401  010 07 10   ABTS05  IROR  R7                 . INC PTER
1311.   003402  120 07 06           CR    R7,R6              . ALL CHECKED
1312.   003403  235 372             LJLS  ABTS01             . NO
1313.   003404  017 00 17   ABTS03  LM    R0,ESAV,R15        .
        003405  004735
1314.   003406  203 10 00           J     *ABTSHU            . EXIT
        003407  003370
1315.                       ABTS10 .
1316.   003410  034 02 00           CBR   R2,0               .
1317.   003411  221 370             LJE   ABTS05             . BRANCH ON CLEAR
1318.   003412  030 02 00           ZBR   R2,0               .
1319.   003413  024 02 01           SBR   R2,1               .
1320.   003414  024 02 15           SBR   R2,015             .
1321.   003415  047 02 07           S     R2,TRKF,R7         . STORE TFLAG
        003416  005042
1322.   003417  007 10 00           L     R8,CEND            . GET END PTER
        003420  005025
1323.   003421  120 07 10           CR    R7,R8              .
1324.   003422  221 357             LJE   ABTS05             .
1325.   003423  007 11 00           L     R9,CSTRT           .
        003424  005026
1326.   003425  120 10 11           CR    R8,R9              .
1327.   003426  221 356             LJE   ABTS03             .
1328.   003427  047 07 00           S     R7,CEND            . STORE THIS TRK AS END
        003430  005025
1329.   003431  007 05 10           L     R5,EXTAB,R8        . LOAD OLD END CHAIN
        003432  005015
1330.   003433  142 05 00           ANDK  R5,0177400         . CLEAR LOWER
        003434  177400
1331.   003435  110 05 07           AR    R5,R7              . SET IN NEXT PTER
1332.   003436  047 05 10           S     R5,EXTAB,R8        . STORE BACK
        003437  005015
1333.   003440  007 12 07           L     R10,EXTAB,R7       .
        003441  005015
1334.   003442  100 13 13           SUR   R11,R11            .
1335.   003443  050 12 06           LRDR  R10,R6             .
1336.   003444  040 13 06           LRSR  R11,R6             .
1337.   003445  064 10 06           CLSR  R8,R6              . SHIFT PREV TO UPPER
1338.   003446  147 10 00           OR    R8,ORTAB+7         .
        003447  005564
1339.   003450  047 10 07           S     R8,EXTAB,R7        . STORE IN EXTAB
        003451  005015
1340.   003452  120 07 11           CR    R7,R9              .
1341.   003453  225 013             LJNE  ABTS09             .
1342.   003454  047 13 00           S     R11,CSTRT          .
        003455  005026
1343.   003456  007 14 13           L     R12,EXTAB,R11      .
        003457  005015
```

```
SOFTWARE SYSTEM, KWH III, VERSION 8-0

003460  142 14 00            ANDK   R12,0377       .
003461  000377
003462  024 14 16            SBR    R12,016
003463  047 14 13            S      R12,EXTAB,R11  .
003464  005015
003465  201 314              LJ     ABTS05         .
003466  007 14 12   ABTS09   L      R12,EXTAB,R10  .
003467  005015
003470  142 14 00            ANDK   R12,0177400    .
003471  177400
003472  110 14 13            AR     R12,R11        .
003473  047 14 12            S      R12,EXTAB,R10  .
003474  005015
003475  007 14 13            L      R12,EXTAB,R11  .
003476  005015
003477  142 14 00            ANDK   R12,0377       .
003500  000377
003501  064 12 06            CLSR   R10,R6         .
003502  110 14 12            AR     R12,R10        .
003503  047 14 13            S      R12,EXTAB,R11  .
003504  005015
003505  202 10 00            J      ABTS05         . EXIT
003506  003401
003507  000004      SHUF     + 4
003510  000010               + 8
003511  000000               + 0
                    . ****************************************************************
                    . ABT CALL ROUTINE
                    . DELETES, ADDS CALLS TO TRACKER ACCESS TABLE
003512  000000      ABTCAL   + 0                   . ABT CALL SUBROUTINE
003513  057 00 17            SM     R0,SSAV,R15    . SAVE ENVIROMENT
003514  004755
003515  007 00 00            L      R0,CFLAG1      . GET CFLAG
003516  005027
003517  034 00 04            CBR    R0,4           .
003520  202 00 00            JE     ABTC20         . BRANCH IF CLEAR
003521  003620
003522  034 00 05            CBR    R0,5           .
003523  221 061              LJE    ABTC10         . BRANCH IF CLEAR
003524  007 06 02            L      R6,EXTAB,R2    . GET ACCESS WORD
003525  005015
003526  226 06 00            JNZ    R6,ABTEX       . BRANCH IF DEFINED
003527  003573
003530  007 06 00   ABTC13   L      R6,CEND        . R6=NUM OF LAST TRK
003531  005025
003532  047 02 00            S      R2,CEND        . STORE THIS AS LAST
003533  005025
003534  017 11 14            LM     R9,ABTC50,R12  . GET CONSTANTS
003535  003721
003536  007 10 06            L      R8,EXTAB,R6    . GET PREV END CHAIN
003537  005015
003540  222 10 00            JZ     R8,ABTC16      .
003541  003577
003542  154 10 02            MSR    R8,R2          . MASK IN THIS AS NEXT
003543  047 10 06            S      R8,EXTAB,R6    . STORE
003544  005015
003545  004 01 06            LR     R1,R6          . LOAD PREV PTER
```

SOFTWARE SYSTEM, KWH III, VERSION 8-0

```
1381.   003546  064 01 12            CLSR   R1,R10           . SHIFT TO UPPER
1382.   003547  144 01 13   ABTC17   ORR    R1,R11           .
1383.   003550  047 01 02            S      R1,EXTAB,R2      . STORE
        003551  005015
1384.   003552  047 14 02            S      R12,TRKF,R2      . TFLAG, SET BITS 17,16,15A4
        003553  005042
1385.   003554  007 01 02   ABTC12   L      R1,TRKD,R2       . GET DATA AREA
        003555  005225
1386.   003556  047 03 01            S      R3,QBW,R1        . STORE BW
        003557  000001
1387.   003560  047 04 01            S      R4,QCF,R1        . STORE CF
        003561  000000
1388.   003562  100 02 02            SUR    R2,R2            .
1389.   003563  112 01 00            AK     R1,QHCNT         .
        003564  000002
1390.   003565  075 00 01   ABTC60   SZI    R1               .
1391.   003566  013 01 10            IROR   R1               .
1392.   003567  013 02 10            IROR   R2               .
1393.   003570  122 02 00            CK     R2,14
        003571  000016
1394.   003572  235 373              LJLS   ABTC60           .
1395.   003573  017 00 17   ABTEX    LM     R0,SSAV,R15      . RESTORE ENVIROMENT
        003574  004755
1396.   003575  203 10 00            J      *ABTCAL          . EXIT
        003576  003512
1397.   003577  047 02 00   ABTC16   S      R2,CSTRT         .
        003600  005026
1398.   003601  007 01 00            L      R1,ABTC51+3      .
        003602  003730
1399.   003603  201 344              LJ     ABTC17           .
1400.   003604  100 14 14   ABTC10   SUR    R12,R12          . CLEAR CNTER
1401.   003605  027 07 14   ABTC11   LX     R7,EXTAB,R12     . GET CHAIN PTER
        003606  005015
1402.   003607  222 07 00            JZ     R7,ABTC15        . BRANCH IF OPEN
        003610  003615
1403.   003611  122 14 00            CK     R12,8            . CHECK FOR DONE
        003612  000010
1404.   003613  235 372              LJLS   ABTC11           . NO
1405.   003614  201 357              LJ     ABTEX            .
1406.   003615  010 14 11   ABTC15   DROR   R12              . DEC FOR TRK NUM
1407.   003616  004 02 14            LR     R2,R12           . LOAD R2 WITH NUM
1408.   003617  201 311              LJ     ABTC13           . GO TO SET UP
1409.                       ABTC20 .
1410.   003620  034 00 05            CBR    R0,5             .
1411.   003621  221 075              LJE    ABTC30           . BRANCH ON CLEAR
1412.   003622  017 11 14   ABTC23   LM     R9,ABTC51,R12    . LOAD CONSTATNS
        003623  003725
1413.   003624  007 06 02            L      R6,EXTAB,R2      . PICK UP CHAIN PTER
        003625  005015
1414.   003626  077 00 02            SZ     EXTAB,R2         . CLEAR PTER IN TAB
        003627  005015
1415.   003630  077 00 02            SZ     TRKF,R2          . CLEAR TFLAG
        003631  005042
1416.   003632  222 06 00            JZ     R6,ABTEX         . EXIT NOT DEFINED
        003633  003573
1417.   003634  100 07 07            SUR    R7,R7            . CLEAR SHIFT REG
1418.   003635  056 06 12            LRDR   R6,R10           . R6=PREV PTER
```

SOFTWARE SYSTEM, KWH III, VERSION 8-0

```
1419.   003636  040 07 12            LRSR  R7,R10          . R7=NEXT PTER
1420.   003637  120 06 07            CR    R6,R7           .
1421.   003640  221 014              LJE   ABTC40          .
1422.   003641  120 06 13            CR    R6,R11          . CHECK END CODE
1423.   003642  225 020              LJNE  ABTC21          . BRANCH ON NO
1424.   003643  047 07 00            S     R7,CSTRT        . R7 NEW START
        003644  005026
1425.   003645  007 10 07            L     R8,EXTAB,R7     . GET RT CHAIN PTER
        003646  005015
1426.   003647  154 10 14            MSR   R8,R12          . MASK IN END CODE IN UPPER
1427.   003650  047 10 07            S     R8,EXTAB,R7     . STORE
        003651  005015
1428.   003652  202 10 00            J     ABTEX           . EXIT
        003653  003573
1429.   003654  077 00 00    ABTC40  SZ    CSTRT           .
        003655  005026
1430.   003656  077 00 00            SZ    CEND            .
        003657  005025
1431.   003660  202 10 00            J     ABTEX           .
        003661  003573
1432.   003662  120 07 13    ABTC21  CR    R7,R11          . COMPARE FOR END CODE
1433.   003663  225 013              LJNE  ABTC22          . BRANCH ON NO
1434.   003664  047 06 00            S     R6,CEND         . STORE AS LAST
        003665  005025
1435.   003666  007 10 06            L     R8,EXTAB,R6     . GET CHAIN PTER
        003667  005015
1436.   003670  140 10 11            ANDR  R8,R9           .
1437.   003671  110 10 13            AR    R8,R11          . MASK IN END CODE
1438.   003672  047 10 06            S     R8,EXTAB,R6     . STORE
        003673  005015
1439.   003674  202 10 00            J     ABTEX           . EXIT
        003675  003573
1440.   003676  007 10 06    ABTC22  L     R8,EXTAB,R6     . GET CHAIN PTER OF PREV
        003677  005015
1441.   003700  140 10 11            ANDR  R8,R9           .
1442.   003701  110 10 07            AR    R8,R7           . PUT IN NEXT
1443.   003702  047 10 06            S     R8,EXTAB,R6     . STORE
        003703  005015
1444.   003704  007 10 07            L     R8,EXTAB,R7     . GET CHAIN PTER OF NEXT
        003705  005015
1445.   003706  142 10 00            ANDK  R8,0377         .
        003707  000377
1446.   003710  064 06 12            CLSR  R6,R10          . SHIFT PREV TO UPPER
1447.   003711  110 10 06            AR    R8,R6           . ADD IN
1448.   003712  047 10 07            S     R8,EXTAB,R7     . STORE
        003713  005015
1449.   003714  202 10 00            J     ABTEX           . EXIT
        003715  003573
1450.   003716  007 02 00    ABTC30  L     R2,CEND         . SUPPLANT END OF CHAIN
        003717  005025
1451.   003720  201 302              LJ    ABTC23          . GO SET UP
1452.   003721  000217       ABTC50  + 0217                . MASK FOR NEW NUM
1453.   003722  000010               + 8                   . SHIFT FACTOR
1454.   003723  000200               + 0200                . END CODE
1455.   003724  160002               + 0160002             . TFLAG MSK- BITS 17,16,15,1
1456.   003725  177400       ABTC51  + 0177400             . MSK TO CLEAR LOWER
1457.   003726  000010               + 8                   . SHIFT FACTOR
```

SOFTWARE SYSTEM, KWH III, VERSION 8-0

```
003727  000200                 + 0200                    . END CODE
003730  100000                 + 0100000                 . END CODE IN UPPER
                 . *****************************************************************
                 . OPERATOR INTERRUPT ANALYSIS ROUTINE
                 . ANALYZES THE INPUT DATA WORD AND SETS
                 . NECESSARY FLAGS, TURNS CONTROL TO
                 .  ARTCAL IF NECESSARY
003731  000000   OIX           + 0                       . OPERATOR REQUEST
003732  057 00 17              SM     R0,RSAV,R15        . SAVE ENVIROMENT
003733  004775
003734  007 00 00              L      R0,CFLAG1          . R0=CFLAG1
003735  005027
003736  034 00 15              CBR    R0,015             .
003737  221 050                LJE    OIX00              . JUMP ON-NOT SET
003740  017 07 10              LM     R7,OIXA,R8         . R7=SHIFT FT,R8=DATA INPUT
003741  004657
003742  100 11 11              SUR    R9,R9              . CLEAR SHIFT REG
003743  050 10 07              LRDR   R8,R7              . SHIFT D0 TO R9
003744  004 13 11              LR     R11,R9             . R11=D0 IN UPPER 4 BITS
003745  064 13 07              CLSR   R11,R7             . SHIFT D0 TO LOWER 4 BITS
003746  100 11 11              SUR    R9,R9              . CLEAR SHIFT REG
003747  050 10 07              LRDR   R8,R7              . SHIFT D1 TO R9
003750  004 12 11              LR     R10,R9             . R10=D1 IN UPPER 4 BITS
003751  064 12 07              CLSR   R10,R7             . SHIFT D1 DOWN
003752  100 11 11              SUR    R9,R9              . CLEAR SHIFT REG
003753  050 10 07              LRDR   R8,R7              . SHIFT D2 TO R9
003754  034 11 07              CLSR   R9,R7              . SHIFT DOWN D2
                 . R8=D3, R9=D2, R10=D1, R11=D0
003755  030 00 15              ZBR    R0,015             .
003756  024 00 16              SBR    R0,016             .
                 OIX01 .
003757  024 00 14              SBR    R0,014             .
003760  122 11 00              CK     R9,8               . CHECK D2
003761  000010
003762  222 14 00              JL     [illegible]        . D2 LT 8
003763  004075
003764  202 00 00              JE     OIX10              . D2=8
003765  004024
                 . ENTRY FOR BANDWIDTH OF 301, COPY-CONTROL
003766  222 13 00              JZ     R11,OIX02          . JUMP D0=0
003767  004013
003770  122 13 00              CK     R11,7              .
003771  000007
003772  231 026                LJGE   OIX06              .
003773  007 02 13              L      R2,OTAB1,R11       . GET K VALUE IN R2
003774  004564
003775  007 03 13              L      R3,OTAB2,R11       .
003776  004573
003777  047 03 00              S      R3,KCON            .
004000  005235
004001  047 13 00              S      R11,SBW
004002  007266
004003  024 00 13              SBR    R0,013             .
004004  030 00 10              ZBR    R0,010             .
004005  047 02 00              S      R2,SAMAX           . STORE INT MAX CHECK
004006  006416
004007  047 00 00  OIX00       S      R0,CFLAG1          . STORE AWAY CFLAG
```

SOFTWARE SYSTEM, KWH III, VERSION 8-0

```
004010  005027
004011  017 00 17                     LM     R0,RSAV,R15        . RESTORE ENVIROMENT
004012  004775
004013  203 10 00                     J      *OIX               . RETURN
004014  003731
004015  122 12 00          OIX02      CK     R10,9              . CHECK D1 FOR 9
004016  000011
004017  221 003                       LJE    OIX03              . YES
004020  030 00 10          OIX04      ZBR    R0,010             .
004021  201 366                       LJ     OIX00              . EXIT
                           OIX03 .
004022  024 00 10                     SBR    R0,010             .
004023  201 364                       LJ     OIX00              . EXIT
                            . INDICATES ALT/DELETE ON D1, DISPLAY ON D0
004024  007 15 12          OIX10      L      R13,OTABJ1,R10     . GET JUMP KEY FROM D1
004025  004602
004026  200 10 15                     JR     R13                . BRANCH
                           OIX11 .
004027  030 00 02                     ZBR    R0,2               .
                           OIX13 .
004030  030 00 03                     ZBR    R0,3               .
004031  201 017                       LJ     OIX15              .
                           OIX12 .
004032  024 00 02                     SBR    R0,2               .
004033  201 375                       LJ     OIX13              .
004034  122 13 00          OIX14      CK     R11,8              . CHECK D0 FOR 8,9
004035  000010
004036  231 012                       LJGE   OIX15              .
004037  030 00 16                     ZBR    R0,016             .
004040  007 02 00                     L      R2,CFLAG3          . GET CFLAG3
004041  005031
004042  050 02 13                     LRDR   R2,R11             . CLEAR BIT CORRESPONDING
004043  030 02 00                     ZBR    R2,0               .
004044  074 02 13                     CLDR   R2,R11             . SHIFT CFLAG3 BACK
004045  047 02 00                     S      R2,CFLAG3          . STORE CFLAG3 BACK
004046  005031
004047  201 340                       LJ     OIX00
004050  007 15 13          OIX15      L      R13,OTABJ2,R11     .
004051  004614
004052  200 10 15                     JR     R13                .
                           OIX20 .
004053  030 00 00                     ZBR    R0,0               .
                           OIX16      .
004054  030 00 01                     ZBR    R0,1               .
004055  202 10 00                     J      OIX00              . EXIT
004056  004007
                           OIX21 .
004057  024 00 00                     SBR    R0,0               .
004060  201 374                       LJ     OIX16              .
                           OIX22 .
004061  030 00 00                     ZBR    R0,0               .
                           OIX17 .
004062  024 00 01                     SBR    R0,1
004063  202 10 00                     J      OIX00              . EXIT
004064  004007
                           OIX23 .
004065  024 00 00                     SBR    R0,0
```

SOFTWARE SYSTEM, KWH III, VERSION 8-0

```
1548.   004066  201 374              LJ     0IX17          .
1549.                       0IX24 .
1550.   004067  024 00 11            SBR    R0,011         .
1551.   004070  202 10 00            J      0IX00          . EXIT
        004071  004007
1552.                       0IX25 .
1553.   004072  030 00 11            ZBR    R0,011         .
1554.   004073  202 10 00            J      0IX00          . EXIT
        004074  004007
1555.   004075  122 10 00   0IX30    CK     R9,8           . CHECK MODE
        004076  000010
1556.   004077  202 03 00            JLS    0IX60          . MANUAL
        004100  004315
1557.   004101  202 00 00            JE     0IX50          . SEMI-AUTOMATIC
        004102  004274
1558.                        . AUTOMATIC MODE
1559.   004103  122 11 00            CK     R9,1           . CHECK D2
        004104  000001
1560.   004105  221 014              LJE    0IX32          . D2=1
1561.   004106  235 077              LJLS   0IX40          .
1562.   004107  122 11 00            CK     R9,3           .
        004110  000003
1563.   004111  235 006              LJLS   0IX31          . D2=2
1564.   004112  202 10 00            J      0IX00          . EXIT, D2 GT 2
        004113  004007
1565.   004114  030 00 07   0IX81    ZBR    R0,7
1566.   004115  202 10 00            J      0IX00
        004116  004007
1567.                       0IX31 .
1568.   004117  147 00 00            OR     R0,ORTAB+7     .
        004120  005564
1569.   004121  242 13 00   0IX32    JZ     R11,0IX81
        004122  004114
1570.   004123  122 13 00            CK     R11,4          .
        004124  000004
1571.   004125  202 02 00            JGE    0IX81
        004126  004114
1572.   004127  007 02 00            L      R2,AAFLG       . LOAD AUTO ASG FLG
        004130  005032
1573.   004131  050 02 13            LRDR   R2,R11         . SHIFT TO
1574.   004132  052 02 00            LRD    R2,1           .   SEE IF DO ASG
        004133  000001
1575.   004134  232 03 00            JP     R3,0IX33       . BRANCH ON NO
        004135  004147
1576.   004136  007 16 00            L      R14,ORTAB+7    .
        004137  005564
1577.   004140  140 16 00            ANDR   R14,R0         .
1578.   004141  122 16 00            CK     R14,0          .
        004142  000000
1579.   004143  202 00 00            JE     0IX00          . NO, EXIT
        004144  004007
1580.   004145  143 00 00            AND    R0,ANDTAB+7    .
        004146  005604
1581.                       0IX33 .
1582.   004147  024 03 16            SBR    R3,016         .
1583.   004150  076 02 00            CLD    R2,1           . SHIFT BACK
        004151  000001
```

```
SOFTWARE SYSTEM, KWH III, VERSION 8-0

1584.   004152  074 02 13           CLDR  R2,R11         .      TO R2
1585.   004153  047 02 00           S     R2,AAFLG       . STORE FLAG AWAY
        004154  005032
1586.   004155  017 02 06           LM    R2,OCON1,R6    . GET CONSTANTS
        004156  004652
1587.   004157  130 02 13           MR    R2,R11         . FIND POS IN AUTO TAB
1588.   004160  110 05 03           AR    R5,R3          . ADD START
1589.   004161  025 07 06   OIX34   LXI   R7,R6          . LOAD EXEC ACCESS
1590.   004162  065 07 05           SXI   R7,R5          . STORE IN AUTO TAB
1591.   004163  206 04 00           XJ    R4,OIX34       . LOOP TO GET ALL
        004164  004161
1592.   004165  006 01 00           LK    R1,7           . LOAD LOOP CNTER
        004166  000007
1593.   004167  006 02 00           LK    R2,TRKD        . GET PTERS TO BUF PARAMS
        004170  005225
1594.   004171  025 03 02   OIX35   LXI   R3,R2          . LOAD IN ADR OF PARAM AREA
1595.   004172  007 07 03           L     R7,QCF,R3      .
        004173  000000
1596.   004174  007 10 03           L     R8,QBW,R3      .
        004175  000001
1597.   004176  047 10 05           S     R8,8,R5        . STORE BW IN AUTO TAB
        004177  000010
1598.   004200  065 07 05           SXI   R7,R5          . STORE CF IN AUTO TAB
1599.   004201  206 01 00           XJ    R1,OIX35       . LOOP TILL DONE
        004202  004171
1600.   004203  202 10 00           J     OIX81
        004204  004114
1601.   004205  007 02 00   OIX40   L     R2,AAFLG       . GET AUTO ASG FLG
        004206  005032
1602.   004207  050 02 13           LRDR  R2,R11         . SHIFT DOWN
1603.   004210  052 02 00           LRD   R2,1           .    TO SEE IF DO ASG
        004211  000001
1604.   004212  236 03 00           JN    R3,OIX80
        004213  004216
1605.   004214  100 13 13           SUR   R11,R11        . NO, SET DO TO 0
1606.   004215  100 14 14   OIX80   SUR   R12,R12
1607.   004216  017 02 06   OIX41   LM    R2,OCON1,R6    . LOAD DATA
        004217  004652
1608.   004220  130 02 13           MR    R2,R11         . FIND BIAS IN AUTO TAB
1609.   004221  110 05 03           AR    R5,R3          . ADD START
1610.   004222  025 07 05   OIX43   LXI   R7,R5          . PICK UP PTERS
1611.   004223  100 12 12           SUR   R10,R10        . TFLAG STORE
1612.   004224  222 07 00           JZ    R7,OIX42       . TRK ASG
        004225  004230
1613.   004226  146 12 00           ORK   R10,0160022    .
        004227  160022
1614.   004230  065 07 06   OIX42   SXI   R7,R6          . STORE PTER
1615.   004231  034 07 16           CBR   R7,016         .
1616.   004232  221 004             LJE   OIXX1          .
1617.   004233  047 14 00           S     R12,CSTRT      .
        004234  005026
1618.   004235  201 005             LJ    OIXX2          .
1619.   004236  034 07 07   OIXX1   CBR   R7,7           .
1620.   004237  221 003             LJE   OIXX2          .
1621.   004240  047 14 00           S     R12,CEND       .
        004241  005025
1622.   004242  067 12 14   OIXX2   SX    R10,TRKF,R12   .
```

```
SOFTWARE SYSTEM, KWH III, VERSION 8-0 '

           004243  005042
1623.      004244  206 04 00            XJ    R4,OIX43        . LOOP TILL MOVE DONE
           004245  004222
1624.      004246  006 04 00            LK    R4,7            . LOAD LOOP CNTER
           004247  000007
1625.      004250  006 02 00            LK    R2,TRKD         . LOAD START OF PTERS
           004251  005225
1626.      004252  006 01 00            LK    R1,0177         .
           004253  000177
1627.      004254  077 00 01   OIX46    SZ    TPARO,R1        .
           004255  012110
1628.      004256  206 01 00            XJ    R1,OIX46        .
           004257  004254
1629.      004260  025 03 02   OIX44    LXI   R3,R2           . PICK UP FIRST PARAM ARFA
1630.      004261  007 07 05            L     R7,8,R5         . GET BW FROM AUTO TAB
           004262  000010
1631.      004263  025 10 05            LXI   R8,R5           . GET CF FROM AUTO TAB
1632.      004264  047 10 03            S     R8,OCF,R3       . STORE CF IN PARAM AREA
           004265  000000
1633.      004266  047 07 03            S     R7,OBW,R3       . STORE BW IN PARAM AREA
           004267  000001
1634.      004270  206 04 00            XJ    R4,OIX44        . LOOP TILL DONE
           004271  004260
1635.      004272  202 10 00            J     OIX00           . EXIT
           004273  004007
1636.      004274  007 02 11   OIX50    L     R2,OTABJ3,R9    . LOAD JUMP KEY FROM D2
           004275  004626
1637.      004276  200 10 02            JR    R2              . BRANCH
1638.                          OIX51 .
1639.      004277  030 00 04            ZBR   R0,4            .
1640.                          OIX53 .
1641.      004300  030 00 05            ZBR   R0,5            .
1642.      004301  047 00 00            S     R0,CFLAG1
           004302  005027
1643.      004303  216 00 00            JLM   ABTCAL          . ABT CALL
           004304  003512
1644.      004305  202 10 00            J     OIX00           . EXIT
           004306  004007
1645.      004307  216 00 00   OIX52    JLM   OCF             . CF TO R4
           004310  004424
1646.      004311  216 00 00            JLM   OBW             . BW TO R3
           004312  004442
1647.      004313  024 00 04            SBR   R0,4            .
1648.      004314  201 364              LJ    OIX53           .
1649.      004315  007 05 11   OIX60    L     R5,OTABJ4,R9    . JUMP KEY OFF D2
           004316  004640
1650.      004317  200 10 05            JR    R5              . BRANCH
1651.      004320  007 05 10   OIX61    L     R5,TRKF,R8      . GET TFLAG
           004321  005042
1652.      004322  024 05 14            SBR   R5,014          .
1653.      004323  047 05 10            S     R5,TRKF,R8      . STORF TFLAG
           004324  005042
1654.      004325  202 10 00            J     OIX00           . EXIT
           004326  004007
1655.                          OIX62 .
1656.      004327  030 00 04            ZBR   R0,4            .
1657.                          OIX59 .
```

```
SOFTWARE SYSTEM, KWH III, VERSION 8-0

1658.   004330  024 00 05          SBR   R0,5            . R2=TRK NUM
1659.   004331  004 02 10          LR    R2,R0
1660.   004332  047 00 00          S     R0,CFLAG1
        004333  005027
1661.   004334  216 00 00          JLM   ABTCAL          . ABT CALL
        004335  003512
1662.   004336  202 10 00          J     OIX00           . EXIT
        004337  004007
1663.   004340  216 00 00   OIX63  JLM   DCF             . R4=CF
        004341  004424
1664.   004342  216 00 00          JLM   DBW             . R3=BW
        004343  004442
1665.   004344  024 00 04          SBR   R0,4            .
1666.   004345  201 363            LJ    OIX59           .
1667.   004346  007 06 10   OIX64  L     R6,TRKF,R8      . GET TFLAG
        004347  005042
1668.   004350  024 06 14          SBR   R6,014          .
1669.   004351  047 06 10          S     R6,TRKF,R8      . STORE TFLAG
        004352  005042
1670.   004353  226 12 00   OIX65  JNZ   R10,OIX70       . BRANCH IF D1 NOT 0
        004354  004452
1671.   004355  007 06 10          L     R6,TRKB,R8      . TRK REF BUF START
        004356  005215
1672.   004357  007 07 10          L     R7,TRKD,R6      . TRK DATA START
        004360  005225
1673.   004361  007 15 07          L     R13,OFP,R7
        004362  000003
1674.   004363  004 17 15          LR    R15,R13         . R15=R13=CF
1675.   004364  110 17 13          AR    R15,R11         . R15=CF+D0
1676.   004365  007 10 07          L     R8,QBW,R7       .
        004366  000001
1677.   004367  122 17 00          CK    R15,501         .
        004370  000765
1678.   004371  202 02 00          JGE   OIX00           .
        004372  004007
1679.   004373  047 17 07          S     R15,GPH,R7
        004374  000003
1680.   004375  216 00 00          JLM   OIXPT
        004376  004534
1681.   004377  004 16 10          LR    R14,R8
1682.   004400  110 10 06          AR    R8,R6
1683.   004401  004 01 06          LR    R1,R6           . R6 IS STORE PTER
1684.   004402  110 01 13          AR    R1,R11          . R1=STRT+D0
1685.   004403  025 05 01   OIX66  LXI   R5,R1           . PICK UP BIN
1686.   004404  065 05 06          SXI   R5,R6           . STORE BIN
1687.   004405  120 01 10          CR    R1,R8
1688.   004406  235 375            LJLS  OIX66           . NO
1689.   004407  042 16 00          LRS   R14,1           . YES, BW/2
        004410  000001
1690.   004411  110 15 16          AR    R13,R14         . CF+BW/2
1691.   004412  112 15 00          AK    R13,B3AD        . ADD ALI INIT START
        004413  015244
1692.   004414  010 13 11          DROR  R11             . DEC LOOP CNTER
1693.   004415  010 13 11   OIX67  DROR  R11
1694.   004416  025 05 15          LXI   R5,R13
1695.   004417  065 05 06          SXI   R5,R6           . STORE IN REF
1696.   004420  232 13 00          JP    R11,OIX67
```

SOFTWARE SYSTEM, KWH III, VERSION 8-0

```
              004421  004415
1697.         004422  202 10 00            J      OIX00              . EXIT
              004423  004007
1698.         004424  000000        OCF    + 0                       . COMPUTE CF
1699.         004425  004 07 12            LR     R7,R10             . R7=D1
1700.         004426  006 01 00            LK     R1,10              . MULT CON
              004427  000012
1701.         004430  130 06 01            MR     R6,R1              . D1*10
1702.         004431  110 07 13            AR     R7,R11             . ADD D0
1703.         004432  007 01 00            L      R1,BFO             . GET MULT CON
              004433  005053
1704.         004434  130 06 01            MR     R6,R1              . MULT
1705.         004435  113 07 00            A      R7,EFO             . GET ADD CON
              004436  005054
1706.         004437  004 04 07            LR     R4,R7              . STORE IN R4
1707.         004440  203 10 00            J      *OCF               . RETURN
              004441  004424
1708.         004442  000000        OBW    + 0                       . COMPUTE BW
1709.         004443  004 07 11            LR     R7,R9              . LOAD D2
1710.         004444  007 01 00            L      R1,BAW             . GET MULT CON
              004445  005052
1711.         004446  130 06 01            MR     R6,R1              . MULT
1712.         004447  004 03 07            LR     R3,R7              . BW TO R3
1713.         004450  203 10 00            J      *OBW               . RETURN
              004451  004442
1714.         004452  007 06 10     OIX70  L      R6,TRKB,R8         . GET REF START
              004453  005215
1715.         004454  007 07 10            L      R7,TRKO,R8         . GET DATA STRT
              004455  005225
1716.         004456  007 15 07            L      R13,QFP,R7
              004457  000003
1717.         004460  004 16 15            LR     R14,R13            . MOVE CF
1718.         004461  100 16 13            SUR    R14,R11            . CF-D0
1719.         004462  007 03 07            L      R3,QBW,R7          .
              004463  000001
1720.         004464  236 16 00            JN     R14,OIX08          .
              004465  004007
1721.         004466  047 16 07            S      R14,QFP,R7
              004467  000003
1722.         004470  216 00 00            JLM    OIXPT
              004471  004534
1723.         004472  007 16 07            L      R14,QBW,R7         . GET BW
              004473  000001
1724.         004474  007 17 00            L      R15,R14            . MOVE BW
              004475  000016
1725.         004476  004 00 00            LR     R0,R0              . NO-OP
1726.         004477  100 16 13            SUR    R14,R11            . BW-D0
1727.         004500  004 04 06            LR     R4,R6              . R4=REF STRT
1728.         004501  110 04 17            AR     R4,R15             . REF+BW-D0
1729.         004502  004 03 06            LR     R3,R6              . REF STRT
1730.         004503  110 03 16            AR     R3,R14             . REF+BW
1731.         004504  010 03 11            DROR   R3
1732.         004505  010 04 11            DROR   R4
1733.         004506  005 05 03     OIX71  LI     R5,R3              . GET BIN
1734.         004507  045 05 04            SI     R5,R4              . STORE BIN
1735.         004510  010 03 11            DROR   R3                 . DEC LOAD PTER
1736.         004511  010 04 11            DROR   R4                 . DEC STORE PTER
```

SOFTWARE SYSTEM, KWH III, VERSION B-0

```
004512  120 03 06            CR     R3,R6           . DONE
004513  231 373              LJGE   OIX71           . NO
004514  042 17 00            LRS    R15,1           . YES, RW/2
004515  000001
004516  112 15 00            AK     R13,R3AD        . ADD ALI INIT START
004517  015244
004520  100 15 17            SUR    R13,R15         . SUB RW/2
004521  010 15 11            DROR   R13             . DEC BY 1
004522  010 13 11            DROR   R11             .
004523  010 13 11     OIX72  DROR   R11             . SET LOOP CNTER
004524  005 05 15            LI     R5,R13          . GET RS RIN
004525  045 05 04            SI     R5,R4           . STORE IN REF
004526  010 15 11            DROR   R13             . DEC LOAD PTER
004527  010 04 11            DROR   R4              . DEC STORE PTER
004530  232 13 00            JP     R11,OIX72       . LOOP TILL DONE
004531  004523
004532  202 10 00            J      OIX00           . EXIT
004533  004007
004534  000000        OIXPT  + 0
004535  057 00 17            SM     R0,PPSV,R15
004536  005510
004537  007 01 07            L      R1,OFP,R7
004540  000003
004541  006 02 00            LK     R2,4
004542  000004
004543  004 03 07            LR     R3,R7
004544  007 01 03     OIXP1  SX     R1,ORP1,R3
004545  000007
004546  206 02 00            XJ     R2,OIXP1
004547  004544
004550  002 01 00            ALS    R1,1
004551  000001
004552  047 01 07            S      R1,ORN,R7
004553  000005
004554  006 05 00            LK     R5,0200
004555  000200
004556  047 05 07            S      R5,ORD,R7
004557  000006
004560  017 00 17            LM     R0,PPSV,R15
004561  005510
004562  203 10 00            J      *OIXPT
004563  004534
                      OTAB1  .
004564  000000        SCNT   + 0
004565  001750               + OK1
004566  000310               + OK2
004567  000144               + OK3
004570  000024               + OK4
004571  000005               + OK5
004572  000005               + OK6
                      OTAB2  .
004573  000011               + 011
004574  000041               + 041
004575  000041               + 041
004576  000041               + 041
004577  000017               + 017
004600  000005               + 05
```

```
SOFTWARE SYSTEM, KWH III, VERSION 8-0

004601  000005             + 05
004602  004050  OTABJ1     + OIX15
004603  004027             + OIX11
004604  004032             + OIX12
004605  004050             + OIX15
004606  004050             + OIX15
004607  004050             + OIX15
004610  004050             + OIX15
004611  004050             + OIX15
004612  004050             + OIX15
004613  004034             + OIX14
004614  004007  OTABJ2     + OIX00
004615  004053             + OIX20
004616  004057             + OIX21
004617  004061             + OIX22
004620  004065             + OIX23
004621  004067             + OIX24
004622  004072             + OIX25
004623  004007             + OIX00
004624  004007             + OIX00
004625  004007             + OIX00
004626  004277  OTABJ3     + OIX51
004627  004307             + OIX52
004630  004307             + OIX52
004631  004307             + OIX52
004632  004307             + OIX52
004633  004007             + OIX00
004634  004007             + OIX00
004635  004007             + OIX00
004636  004007             + OIX00
004637  004007             + OIX00
004640  004327  OTABJ4     + OIX62
004641  004340             + OIX63
004642  004340             + OIX63
004643  004340             + OIX63
004644  004340             + OIX63
004645  004353             + OIX65
004646  004346             + OIX64
004647  004320             + OIX61
004650  004007             + OIX00
004651  004007             + OIX00
004652  000000  OCON1      + 0
004653  000030             + 24
004654  000007             + 7
004655  005055             + ATAB
004656  005015             + EXTAB
004657  000004  OIXA       + 4
004660  000000  OIXD       + 0
                . ********************************************************************
                . KWH III   SYSTEM DATA
004661  000302  PSW1       + CL1INT              . CLASS 1 INT LOAD
004662  010000             + 010000              .
004663  000000             + 0                   .
004664  000310  PSW2       + CL2INT              . CLASS 2 INT LOAD
004665  010010             + 010010              .
004666  000000             + 0                   .
004667  000322  PSW3       + CL3INT              . CLASS 3 INT LOAD
```

```
SOFTWARE SYSTEM, KWH III, VERSION 8-0

1836.    004670  010010             + 010010          .
1837.    004671  000000             + 0               .
1838.    004672  000362    PSW4     + CL4INT          . CLASS 4 INT LOAD
1839.    004673  010012             + 010012          .
1840.    004674  000000             + 0
1841.    004675            PRSAV    RES   15          . REGISTER SAVE AREA, LEVEL 0
1842.    004715            PSAV     RES   16          . REGISTER SAVE AREA, LEVEL 1
1843.    004735            ESAV     RES   15          . REGISTER SAVE AREA, LEVEL 2
1844.    004755            SSAV     RES   15          . REGISTER SAVE AREA, LEVEL 3
1845.    004775            RSAV     RES   15          . REGISTER SAVE AREA, LEVEL 4
1846.    005015            EXTAB    RES    8          . TRKER ACCESS TABLE
1847.    005025  000000    CEND     + 0               . FIRST TRKER IN CHAIN
1848.    005026  000000    CSTRT    + 0               . LAST TRKER IN CHAIN
1849.    005027  000000    CFLAG1   + 0               . MASTER CONTROL FLAG
1850.    005030  000000    CFLAG2   + 0               . CONTROL FLAG 2
1851.    005031  000000    CFLAG3   + 0               . CONTROL FLAG 3
1852.    005032  000000    AAFLG    + 0               . AUTO LOAD ASG FLAG
1853.    005033  000000    SFLAG    + 0               . SA INPUT IN FLAG
1854.    005034  000000    OHFLG    + 0               . OP INT FLAG
1855.    005035  000000    RTFLAG   + 0               . TRACKER ACTIVE FLAG
1856.    005036  000000    POFLG    + 0               . OVERFLOW FLAG
1857.    005037  000000    SCBUSY   0                 . SCOPE BUSY FLAG
1858.    005040  000000    COPFLG   0                 . COPY FLAG
1859.    005041  000000    ERSFLG   0                 . ERASE ONLY FLAG, NO COPY
1860.                      TRKF  .                    TRKER TFLAG1 TABLE
1861.    005042                     RES    8          .
1862.    005052  000040    BAW      + 32              . INCS FOR BW
1863.    005053  000005    BFO      + 5               . CF MULT BIAS FOR OIX
1864.    005054  000006    EFO      + 6               . CF BIAS ADD FOR OIX
1865.                      ATAB  .
1866.    005055  200 001            + 0200,01
1867.    005056  000 002            + 0,2
1868.    005057  001 003            + 1,3
1869.    005060  002 004            + 2,4
1870.    005061  003 005            + 3,5
1871.    005062  004 006            + 4,6
1872.    005063  005 007            + 5,7
1873.    005064  006 200            + 6,0200
1874.    005065  000100             + 0100
1875.    005066  000100             + 0100
1876.    005067  000274             + 0274
1877.    005070  000274             + 0274
1878.    005071  000470             + 0470
1879.    005072  000470             + 0470
1880.    005073  000664             + 0664            .
1881.    005074  000664             + 0664            .
1882.                               DO  8 , + 0200
         005075  000200
         005076  000200
         005077  000200
         005100  000200
         005101  000200
         005102  000200
         005103  000200
         005104  000200
1883.    005105                     RES      72
1884.                      TRKB  .                    ADR OF TRK REF BUFFERS
```

```
SOFTWARE SYSTEM, KWH III, VERSION 8-0

         005215  010110                          + TBUFO
         005216  010310                          + TBUF1
         005217  010510                          + TBUF2
         005220  010710                          + TBUF3
         005221  011110                          + TBUF4
         005222  011310                          + TBUF5
         005223  011510                          + TBUF6
         005224  011710                          + TBUF7
                                       TRKD .                         ADR OF TRK PARAMETER ARFAS
         005225  012110                          + TPAR0
         005226  012130                          + TPAR1
         005227  012150                          + TPAR2
         005230  012170                          + TPAR3
         005231  012210                          + TPAR4
         005232  012230                          + TPAR5
         005233  012250                          + TPAR6
         005234  012270                          + TPAR7
         005235  000011                KCON      + 9                  . OFFSFT BAND WIDTH
         005236  000012                OwALL     + 10                 . WALL FOR TRKER PRED
         005237  000200                T1        + 0200               .
         005240  000240                T2        + 0240               .
         005241  001600                TC1       + 01600              .
         005242  007640                TC2       + 07640              . THRESH CNTER CHECK 2
         005243  005050                TC3       + 05050              . THRESH CNTER CHECK 3
         005244  001750                HINC      + 01750              . THRESH CNTER INC
         005245  000040                SYSC      + 040                .
                                       LIAB .                         DEN FOR ALI TIME WEIGHT
         005246  000000                          + 0                  .
         005247  000003                          + 3                  .
         005250  000005                          + 5                  .
         005251  000006                          + 6                  .
         005252  000000                          + 0                  .
         005253  000000                          + 0                  .
         005254  000000                          + 0                  .
         005255  000000                          + 0                  .
                                       UTAB .                         NUM FOR ALI TIME WEIGHT
         005256  000001                          + 1                  .
         005257  000007                          + 7                  .
         005260  000037                          + 037                .
         005261  000077                          + 077                .
         005262  000001                          + 1                  .
         005263  000001                          + 1                  .
         005264  000001                          + 1                  .
         005265  000001                          + 1                  .
                                       . ***********************************************************
                                       . KWH III    MODULE, LOCAL DATA
                                       . ABT MODULE DATA AREA
                                       RIABT .
                                                 DO  6 , + 0
         005266  000000
         005267  000000
         005270  000000
         005271  000000
         005272  000000
         005273  000000
                                       RTABS .
                                                 DO  6 , + 0
```

SOFTWARE SYSTEM, KWH III, VERSION 8-0

```
        005274  000000
        005275  000000
        005276  000000
        005277  000000
        005300  000000
        005301  000000
        005302  000000       BPREV    + 0                   . LAST PASS B VALUE
        005303  000000       LPCK     + 0
        005304               HSAV1    RES  3
        005307  000000       SCFT1    + 0                   . SCALF ON X,Y SUMS
        005310  000000       SCFX2    + 0                   . SCALF ON X2 SUMS
        005311  000000       SCFY2    + 0                   . SCALF ON Y2 SUMS
        005312  000000       SCFXY    + 0                   . SCALF ON XY SUMS
        005313  000000       SCFR1    + 0                   . SCALFS
        005314  000000       SCFR2    + 0                   .     USED
        005315  000000       SCFR3    + 0                   .      IN
        005316  000000       SCFR4    + 0                   .       RCOMP
        005317                        EVEN
        005320               SMX      RES 2                 . SUM OF X
        005322               SMY      RES 2                 . SUM OF Y
        005324               SMX2     RES 2                 . SUM OF X SQUARES
        005326               SMY2     RES 2                 . SUM OF Y SQUARES
        005330               SMXY     RES 2                 . SUM OF XY PRODUCTS
        005332               RSUM1    RES 2                 . ** RCOMP
        005334               RSUM2    RES 2                 . **  SUM
        005336               RSUM3    RES 2                 . **   AREAS
        005340               RSUM4    RES 2                 . **    FOR
        005342               RSUM5    RES 2                 . **     R
        005344               RSUM6    RES 2                 . **      CALCULATION
        005346               RSUM7    RES 2                 . **
        005350               RSUM8    RES 2                 . **
        005352               RSUM9    RES 2                 . **
                             DEC .                          TIME WEIGHTING VALUES FOR THRESH
        005354  000007                + 7                   .
        005355  000003                + 3                   . SHIFT FOR DIVIDE BY 8
        005356  076000       U2VL     + 076000
        005357  000000                + 0
        005360  000000       TREF     + 0                   . CURRENT TRKER BUFFER AREA
        005361  000000       TDAT     + 0                   . CURRENT TRK PARAMETFR AREA
        005362  000000       TFLAG1   + 0                   . CURRENT TRK TFLAG
                              . ************************************************************
        005363  000000       PSQR     + 0
        005364  057 00 17             SM      R0,PPSV,R15
        005365  005510
        005366  017 00 01             LM      R0,TSAV,R1
        005367  005550
        005370  236 00 00             JN      R0,PSQ2        .
        005371  005445
        005372  057 00 01             SM      R0,SSSV,R1
        005373  005553
        005374  216 00 00             JLM     PSFR
        005375  005453
        005376  017 02 04             LM      R2,TSAV,R4
        005377  005550
        005400  122 04 00             CK      R4,31          .
        005401  000037
        005402  221 043               LJE     PSQ2           .
```

```
SOFTWARE SYSTEM, KWH III, VERSION 8-0

1980.   005403  006 05 00                 LK     R5,32
        005404  000040
1981.   005405  100 05 04                 SUR    R5,R4
1982.   005406  042 05 00                 LRS    R5,1
        005407  000001
1983.   005410  122 05 00                 CK     R5,16
        005411  000020
1984.   005412  225 002                   LJNE   PSQ4
1985.   005413  010 05 11                 DROR   R5
1986.   005414  006 04 00         PSQ4    LK     R4,0100000
        005415  100000
1987.   005416  006 07 00                 LK     R7,20                .
        005417  000024
1988.   005420  064 04 05                 CLSR   R4,R5
1989.   005421  004 06 04         PSQ1    LR     R6,R4
1990.   005422  222 04 00                 JZ     R4,PSQ2              .
        005423  005445
1991.   005424  134 00 04                 DR     R0,R4
1992.   005425  032 00 00                 ALS    R0,1
        005426  000001
1993.   005427  120 00 04                 CR     R0,R4
1994.   005430  235 002                   LJLS   PSQ3
1995.   005431  010 01 10                 IROR   R1
1996.                             PSQ3 .
1997.   005432  100 01 04                 SUR    R1,R4
1998.   005433  046 01 00                 ARS    R1,1
        005434  000001
1999.   005435  110 01 06                 AR     R1,R6
2000.   005436  120 01 06                 CR     R1,R6
2001.   005437  221 006                   LJE    PSQ2
2002.   005440  004 04 01                 LR     R4,R1
2003.   005441  017 00 01                 LM     R0,SSSV,R1
        005442  005553
2004.   005443  206 07 00                 XJ     R7,PSQ1              .
        005444  005421
2005.   005445  047 01 00         PSQ2    S      R1,TSAV
        005446  005550
2006.   005447  017 00 17                 LM     R0,PPSV,R15
        005450  005510
2007.   005451  203 10 00                 J      *PSQR
        005452  005363
2008.   005453  000000            PSFR    + 0
2009.   005454  057 00 17                 SM     R0,PSAV1,R15
        005455  005530
2010.   005456  017 00 01                 LM     R0,TSAV,R1
        005457  005550
2011.   005460  100 02 02                 SUR    R2,R2
2012.   005461  226 00 00                 JNZ    R0,P02
        005462  005471
2013.   005463  226 01 00                 JNZ    R1,P02
        005464  005471
2014.   005465  006 02 00                 LK     R2,31                .
        005466  000037
2015.   005467  202 10 00                 J      P09                  .
        005470  005502
2016.   005471  236 00 00         P02     JN     R0,P01
        005472  005477
```

```
SOFTWARE SYSTEM, KWH III, VERSION 8-0

         005473  072 00 00             ALB    R0,1
         005474  000001
         005475  010 02 10             IROR   R2
         005476  201 373               LJ     P02
         005477  010 02 11      P01    DROR   R2
         005500  052 00 00             LRD    R0,1
         005501  000001
                                P09 .
         005502  057 00 02             SM     R0,TSAV,R2
         005503  005550
         005504  017 00 17             LM     R0,PSAV1,R15
         005505  005530
         005506  203 10 00             J      *P5FR
         005507  005453
         005510                 PPSV   RES   16
         005530                 PSAV1  RES  16
         005550                 TSAV   RES   3
         005553                 SSSV   RES   2
                                ORTAB .
         005555  000001            + 01
         005556  000002            + 02
         005557  000004            + 04
         005560  000010            + 010
         005561  000020            + 020
         005562  000040            + 040
         005563  000100            + 0100
         005564  000200            + 0200
         005565  000400            + 0400
         005566  001000            + 01000
         005567  002000            + 02000
         005570  004000            + 04000
         005571  010000            + 010000
         005572  020000            + 020000
         005573  040000            + 040000
         005574  100000            + 0100000
                                ANDTAB .
         005575  177776            + 0177776
         005576  177775            + 0177775
         005577  177773            + 0177773
         005600  177767            + 0177767
         005601  177757            + 0177757
         005602  177737            + 0177737
         005603  177677            + 0177677
         005604  177577            + 0177577
         005605  177377            + 0177377
         005606  176777            + 0176777
         005607  175777            + 0175777
         005610  173777            + 0173777
         005611  167777            + 0167777
         005612  157777            + 0157777
         005613  137777            + 0137777
         005614  077777            + 0077777
                                 . ************************************************************
         005615  000000         TH7    *0                    . R12=FIRST ADDR WRT WHOLE SPEC
                                                             . R13LAST  ADDR
                                                             . R14=F0 FOR OUTPUT SPEC BUFFER
                                                             . R15=0100000 IMPLIES TKR
```

```
SOFTWARE SYSTEM, KWH III, VERSION 8-0

2069.   005616  057 14 17          SM    R12,TTAB,R15   . SAVE PAR
        005617  006755
2070.   005620  057 00 17          SM    R0,RSAV,R15    . SAVE REG
        005621  004775
2071.   005622  010 15 10          IROR  R13            . R13  END CHECK
2072.   005623  100 15 14          SUR   R13,R12        . R12=FIRST ADDR
2073.   005624  047 15 00          S     R13,TNOP       . NO OF DATA PTS
        005625  006120
2074.   005626  110 15 14          AR    R13,R12        . RESTORE R12
2075.   005627  104 02 02          SUDR  R2,R2          . CLR DBL
2076.   005630  100 00 00          SUR   R0,R0          .
2077.   005631  025 01 14    TH10  LXI   R1,R12         .
2078.   005632  114 02 00          ADR   R2,R0          . ADD DBL
2079.   005633  120 14 15          CR    R12,R13        . DONE
2080.   005634  235 375            LJLS  TH10           . NO
2081.   005635  007 04 00          L     R4,TNOP        . AVE IN R3
        005636  006120
2082.   005637  134 02 04          DR    R2,R4          . AVE IN R3
2083.   005640  004 07 03          LR    R7,R3          . R7=AVE=XBAR
2084.   005641  100 12 12          SUR   R10,R10        . OFL CNTR
2085.   005642  007 14 00          L     R12,TTAB       . RESTORE R12
        005643  006755
2086.   005644  104 02 02          SUDR  R2,R2          . CLR DBL
2087.   005645  025 01 14    TH20  LXI   R1,R12         . XSUBI
2088.   005646  100 01 07          SUR   R1,R7          . -XBARI
2089.   005647  130 00 01          MR    R0,R1          . VAR SQRD
2090.   005650  114 02 00          ADR   R2,R0          . ACCUMULATE
2091.   005651  216 00 00          JLM   THOCK          .
        005652  006033
2092.   005653  120 14 15    TH21  CR    R12,R13        . DONE
2093.   005654  235 371            LJLS  TH20           . NO
2094.   005655  216 00 00          JLM   THOV           .
        005656  006055
2095.   005657  057 02 03          SM    R2,TSAV,R3
        005660  005550
2096.   005661  216 00 00          JLM   PSQR
        005662  005363
2097.   005663  017 02 03          LM    R2,TSAV,R3
        005664  005550
2098.   005665  004 03 02          LR    R3,R2          . R2,R3=0,ROOT
2099.   005666  100 02 02          SUR   R2,R2          . CR R2
2100.   005667  070 02 12          ALDR  R2,R10         . RESTORE SCALE
2101.   005670  007 01 00          L     R1,TNOP
        005671  006120
2102.   005672  100 00 00          SUR   R0,R0
2103.   005673  057 00 01          SM    R0,TSAV,R1
        005674  005550
2104.   005675  216 00 00          JLM   PSQR
        005676  005363
2105.   005677  017 00 01          LM    R0,TSAV,R1
        005700  005550
2106.   005701  134 02 00          DR    R2,R0          . SIGMA IN R3
2107.   005702  004 11 00          LR    R9,R0          . SAVE R9
2108.   005703  110 03 03          AR    R3,R3
2109.   005704  110 03 07          AR    R3,R7          . XBAR+2SIGMA
2110.   005705  004 06 03          LR    R6,R3          . TT1 IN R6
2111.   005706  007 14 00          L     R12,TTAB       . RESTORE R12
```

SOFTWARE SYSTEM, KWH III, VERSION B-0

```
005707  006755
005710  104 02 02          SUDR   R2,R2          . CL ACCUM
005711  100 00 00          SUR    R0,R0          .
005712  025 01 14   TH30   LXI    R1,R12         .
005713  120 01 06          CR     R1,R6          . CF TT1
005714  235 002            LJLS   TH31
005715  004 01 07          LR     R1,R7          . USE XBAR1
005716  114 02 00   TH31   ADR    R2,R0          . ACCUMULATE
005717  120 14 15          CR     R12,R13        . DONE
005720  235 372            LJLS   T:30           . NO
005721  134 02 04          DR     R2,R4          .
005722  004 05 03          LR     R5,R3          . XBAR2
005723  007 14 00          L      R12,TTAB       . RESTORE R12
005724  006755
005725  100 12 12          SUR    R10,R10        . CL CNTR
005726  104 02 02          SUDR   R2,R2          . CL ACCUM
005727  025 01 14   TH40   LXI    R1,R12         . XSUB1
005730  120 01 06          CR     R1,R6          . CF TT1
005731  235 002            LJLS   TH41
005732  004 01 07          LR     R1,R7          . USE XBARI
005733  100 01 05   TH41   SUR    R1,R5          . -XBAR2
005734  130 00 01          MR     R0,R1          . VAR SQRD
005735  114 02 00          ADR    R2,R0          . ACCUMULATE
005736  216 00 00          JLM    THOCK          .
005737  006033
005740  120 14 15   TH42   CR     R12,R13        . DONE
005741  235 366            LJLS   TH40           . NO
005742  216 00 00          JLM    THOV
005743  006055
005744  057 02 03          SM     R2,TSAV,R3
005745  005550
005746  216 00 00          JLM    PSQR
005747  005363
005750  017 02 03          LM     RR,TBAV,R3
005751  005550
005752  004 03 02          LR     R3,R2
005753  100 02 02          SUR    R2,R2
005754  070 02 12          ALDR   R2,R10         . RESTORE SCALE
005755  134 02 11          DR     R2,R9          . R3=SIGMA
005756  057 02 07          SM     R2,SIGDAT,R7
005757  006110
005760  110 05 03          AR     R5,R3
005761  110 05 03          AR     R5,R3
005762  110 05 03          AR     R5,R3          . XBAR2+3SIGMA
005763  004 03 05          LR     R3,R5          . R3=TT2
005764  007 14 00          L      R12,TTAB       . RESTORE R12
005765  006755
                                                 . R0=XSUBI
                                                 . R3=TT2
                                                 . R4=0
                                                 . R8=TKR OUPUT CODE
                                                 . R9=TKR INPUT INDICATOR
                                                 . R10=RIN NO
                                                 . R11=INPUT BASE
                                                 . R12=INPUT ADDR
                                                 . R13=INPUT LAST ADDR
                                                 . R14=OUTPUT BASE
```

```
SOFTWARE SYSTEM, KWH III, VERSION 8-0

2160.                                                  . R15=EXT TKR INDICATOR
2161.     005766  100 04 04          SUR    R4,R4      . SET TO 0
2162.     005767  004 13 14          LR     R11,R12    . SAVE BASE ADDR
2163.     005770  007 11 00          L      R9,TKRFT   . BIT   TO CHECK FOR TKR
          005771  006116
2164.     005772  140 11 17          ANDR   R9,R15     . SETS ON TKR INPUT
2165.     005773  007 10 00          L      R8,STO     . AS ABOVE
          005774  006117
2166.     005775  025 00 14   TH50   LXI    R0,R12     . GET XSUBI
2167.     005776  100 00 03          SUR    R0,R3      . XSUBI - TT2     LIES TKR
2168.     005777  232 00 00          JP     R0,TH501   . XSUBI GT TT2         TKR
          006000  006004
2169.     006001  100 00 00          SUR    R0,R0      . XSUBI LT TT2         TKR
2170.     006002  202 10 00          J      TH54       . ENTER ZERO           TKR
          006003  006014
2171.     006004  232 11 00   TH501  JZ     R9,TH51    . XSUBI GT TT2, JP IF NOT TKR
          006005  006007
2172.     006006  144 00 10          ORR    R0,R8      . SET IN TKR OUTPUT CODE
2173.     006007  004 12 14   TH51   LR     R10,R12    . CURRENT ADDR
2174.     006010  100 12 13          SUR    R10,R11    . SUB BASE ADDR
2175.     006011  110 12 16          AR     R10,R14    . BIN NO PLUS OUTPUT BASE ADDR
2176.     006012  045 00 12          SI     R0,R10     . STORE
2177.     006013  201 012            LJ     TH60
2178.     006014  222 11 00   TH54   JZ     R9,TH60    . XSUBI LT TT2, NOT TKR
          006015  006025
2179.     006016  004 12 14          LR     R10,R12    . CUR ADR, THIS IS A TKR
2180.     006017  100 12 13          SUR    R10,R11    . -BASE=BIN NO
2181.     006020  110 12 16          AR     R10,R14    . +OUT BASE
2182.     006021  005 01 12          LI     R1,R10     . GET PREVIOUS OUTPUT
2183.     006022  236 01 00          JN     R1,TH60    . IT WAS A TKR OUTPUT
          006023  006025
2184.     006024  045 10 12          SI     R0,R10     . IT WAS NOT, STORE TKR 0
2185.     006025  120 14 15   TH60   CR     R12,R13    . DONE
2186.     006026  235 347            LJLS   TH50       . NO
2187.     006027  017 00 17          LM     R0,RSAV,R15 . RESTORE REG
          006030  004775
2188.     006031  203 10 00          J      *TH7
          006032  005615
2189.     006033  000000      THOCK  + 0               .
2190.     006034  202 04 00          JO     THCK1      .
          006035  006040
2191.     006036  203 10 00   THCK0  J      *THOCK
          006037  006033
2192.     006040  057 10 11   THCK1  SM     R8,RSAV1,R9 .
          006041  005304
2193.     006042  100 10 10          SUR    R8,R8      .
2194.     006043  004 11 02          LR     R9,R2      .
2195.     006044  076 10 00          CLD    R8,2       .
          006045  000002
2196.     006046  110 12 10          AR     R10,R8     .
2197.     006047  042 11 00          LRS    R9,2       .
          006050  000002
2198.     006051  004 02 11          LR     R2,R9      .
2199.     006052  017 10 11          LM     R8,RSAV1,R9 .
          006053  005304
2200.     006054  201 362            LJ     THCK0      .
2201.     006055  000000      THOV   + 0               .
```

```
SOFTWARE SYSTEM, KWH III, VERSION 8-0

2202.     006056  226 12 00               JNZ    R10,THOV1        .
          006057  006062
2203.     006060  203 10 00      THOV0    J      *THOV            .
          006061  006055
2204.     006062  057 10 11      THOV1    SM     R8,RSAV1,R9      .
          006063  005304
2205.     006064  100 10 10               SUR    R8,R8            .
2206.     006065  004 11 02               LR     R9,R2            .
2207.     006066  072 10 00               ALD    R8,2             .
          006067  000002
2208.     006070  110 10 12               AR     R8,R10           .
2209.     006071  100 12 12               SUR    R10,R10          .
2210.     006072  052 10 00      THOV2    LRD    R8,2             .
          006073  000002
2211.     006074  052 02 00               LRD    R2,2             .
          006075  000002
2212.     006076  010 12 10               IROR   R10              .
2213.     006077  226 10 00               JNZ    R8,THOV2         .
          006100  006072
2214.     006101  236 11 00               JN     R9,THOV2         .
          006102  006072
2215.     006103  004 02 11               LR     R2,R9            .
2216.     006104  017 10 11               LM     R8,RSAV1,R9      .
          006105  005304
2217.     006106  201 352                 LJ     THOV0            .
2218.     006107                          EVEN
2219.     006110                 SIGDAT   RES 6
2220.                                                             . R2=  ---
2221.                                                             . R3=SIGMA2
2222.                                                             . R4= ---
2223.                                                             . R5= XBAR2
2224.                                                             . R6=TTHR1
2225.                                                             . R7=XBAR1
2226.     006116  100000         TKRFT    + 0100000
2227.     006117  100000         STO      0100000
2228.     006120  000000         TNOP     0
2229.                            . ************************************************************************
2230.     006121  000000         DEXEC    + 0                     . DISPLAY CONTROL
2231.     006122  007 00 00      D000     L      R0,COPFLG        . CHECK FOR COPY OR ERASE
          006123  005040
2232.     006124  006 02 00               LK     R2,R5AD
          006125  017214
2233.     006126  010 02 10               IROR   R2               .
2234.     006127  047 02 00               S      R2,BUFLOC
          006130  007434
2235.     006131  007 01 00               L      R1,ERSFLG
          006132  005041
2236.     006133  144 01 00               ORR    R1,R0
2237.     006134  226 01 00               JNZ    R1,D777          . SKIP TO END WE ARE BUSY  WITH COPY OR ERASE
          006135  006377
2238.     006136  007 00 00               L      R0,SCBUSY
          006137  005037
2239.     006140  226 00 00               JNZ    R0,D777          . BUSY DRAWING LEGEND
          006141  006377
2240.     006142  007 00 00               L      R0,DLGFLG
          006143  006410
2241.                                                             . CHECK, IS LEGEND REQUEST UP
```

```
SOFTWARE SYSTEM, KWH III, VERSION 8-0
2242.          006144  226 00 00           JNZ    R0,D011       . NO
               006145  006154
2243.          006146  167 00 00           BF     DLGFLG        . KNOCK DOWN REQUEST
               006147  006410
2244.          006150  216 00 00           JLM    DLEG          . PACK LEGEND DATA
               006151  007313
2245.          006152  202 10 00           J      D701          . INITIATE LEGEND OUTPUT
               006153  006375
2246.          006154  007 00 00   D011    L      R0,CFLAG1     . CHECK BIT 013
               006155  005027
2247.          006156  034 00 13           CBR    R0,013        .
2248.          006157  221 006             LJE    D020          .
2249.          006160  030 00 13           ZBR    R0,013        . CLEAR BIT 013
2250.          006161  047 00 00           S      R0,CFLAG1     . RESTORE CFLAG1
               006162  005027
2251.          006163  202 10 00           J      BANNER
               006164  006200
2252.          006165  007 00 00   D020    L      R0,YVAL
               006166  007001
2253.          006167  007 01 00           L      R1,YINC
               006170  007000
2254.          006171  100 00 01           SUR    R0,R1
2255.          006172  236 00 00           JN     R0,BANNER
               006173  006200
2256.          006174  047 00 00           S      R0,YVAL
               006175  007001
2257.          006176  202 10 00           J      D02A
               006177  006220
2258.          006200  007 00 00   BANNER  L      R0,CFLAG1
               006201  005027
2259.          006202  007 01 00           L      R1,YTOP
               006203  007361
2260.          006204  047 01 00           S      R1,YVAL       . RESET Y VALUE TO TOP OF SCREEN
               006205  007001
2261.          006206  077 00 00           SZ     DLGFLG        . PUT UP LEGEND REQUEST
               006207  006410
2262.          006210  034 00 10           CBR    R0,010        .
2263.          006211  225 003             LJNE   BAN10         . COPY IF BIT 010=0
2264.                                                           . CHECK BIT 010 FOR COPY ENEABLE
2265.          006212  216 00 00           JLM    COPY
               006213  007700
2266.          006214  216 00 00   BAN10   JLM    ERASE         . ERASE ONLY, NO COPY
               006215  007740
2267.          006216  202 10 00           J      D777          . SKIP TO END
               006217  006377
2268.          006220  007 00 00   D02A    L      R0,CFLAG1     . TEST BIT017
               006221  005027
2269.          006222  034 00 16           CBR    R0,016        .
2270.          006223  221 010             LJE    D0S1          .
2271.          006224  007 00 00           L      R0,CFLAG3
               006225  005031
2272.          006226  007 01 00           L      R1,LOW010
               006227  006401
2273.          006230  144 00 01           ORR    R0,R1         . SET BITS 0 - 7 OF CFLAG3
2274.          006231  047 00 00           S      R0,CFLAG3
               006232  005031
2275.                              D0S1    .                      SECTION 1
```

SOFTWARE SYSTEM, KWH III, VERSION 8-0

```
006233  216 00 00   DOS2P1   JLM    TABT          TEST ABTS FOR OUTPUT
006234  007540
006235  007 00 00   DOS3P0   L      R0,CFLAG1
006236  005027
006237  034 00 11            CBR    R0,011        .
006240  221 045             LJE    D0S5          . JUMP TO SPLIT SCREEN
                                                  . *****FULL SCREEN*************
006241  004 00 00   DOS4     LR     R0,R0         . FULL SCREEN
006242  216 00 00   DF31     JLM    TIKR          . TEST TKRS FOR OUTPUT
006243  007765
006244  216 00 00   DF32     JLM    TIRA          . TEST FOR TRACERS
006245  010036
006246  216 00 00   DF33     JLM    FS10          . PUT IN FREQ SCALE
006247  007271
006250  006 14 00   DF4      LK     R12,B4AD
006251  016230
006252  006 15 00            LK     R13,B5AD
006253  017214
006254  010 15 11            DROR   R13
006255  007 16 00            L      R14,BUFLOC
006256  007434
006257  007 00 00            L      R0,SXINC2
006260  006403
006261  047 00 00            S      R0,XINC       . DBL INC
006262  006777
006263  007 00 00            L      R0,SXST1
006264  006404
006265  047 00 00            S      R0,XSTART
006266  006776
006267  216 00 00            JLM    PKDISP        . DSOB TO DAB
006270  007111
006271  006 14 00            LK     R12,B5AD
006272  017214
006273  047 15 00            S      R13,BUFLOC
006274  007434
006275  033 14 00            SD     R12,DABFL
006276  006406
006277  216 00 00            JLM    CDSOB
006300  006411
006301  013 14 00            LD     R12,DABFL
006302  006406
006303  202 10 00            J      D700
006304  006373
                                                  . **********SPLIT SCREEN*************
                    DOS5     .
006305  216 00 00   DSS10    JLM    TIRA          . TEST FOR TRACERS
006306  010036
006307  216 00 00   DSS11    JLM    FS10          . PUT IN FREQ SCALE
006310  007271
006311  006 14 00            LK     R12,B4AD
006312  016230
006313  006 15 00            LK     R13,B5AD
006314  017214
006315  010 15 11            DROR   R13
006316  007 16 00            L      R14,BUFLOC
006317  007434
006320  007 00 00            L      R0,SXINC1     . SGL INC
```

```
SOFTWARE SYSTEM, KWH III, VERSION 8-0

                006321  006402
2309.           006322  047 00 00                S       R0,XINC
                006323  006777
2310.           006324  007 00 00                L       R0,SXST1
                006325  006404
2311.           006326  047 00 00                S       R0,XSTART
                006327  006776
2312.           006330  216 00 00                JLM     PKDISP
                006331  007111
2313.           006332  047 15 00                S       R13,BUFLOC      . SAVE LAST ADDR IN DAR
                006333  007434
2314.           006334  216 00 00                JLM     CDSOB
                006335  006411
2315.           006336  216 00 00                JLM     TIRA
                006337  010036
2316.           006340  216 00 00                JLM     TTKR
                006341  007765
2317.           006342  216 00 00                JLM     FS10
                006343  007271
2318.           006344  006 14 00                LK      R12,B4AD
                006345  016230
2319.           006346  006 15 00                LK      R13,B5AD
                006347  017214
2320.           006350  010 15 11                DROR    R13
2321.           006351  007 16 00                L       R14,BUFLOC
                006352  007434
2322.           006353  007 00 00                L       R0,SXST2
                006354  006405
2323.           006355  047 00 00                S       R0,XSTART
                006356  006776
2324.           006357  216 00 00                JLM     PKDISP
                006360  007111
2325.           006361  006 14 00                LK      R12,B5AD
                006362  017214
2326.           006363  047 15 00                S       R13,BUFLOC
                006364  007434
2327.           006365  053 14 00                SD      R12,DABFL
                006366  006406
2328.           006367  216 00 00                JLM     CDSOB
                006370  006411
2329.           006371  013 14 00                LD      R12,DABFL
                006372  006406
2330.           006373  216 00 00       D700     JLM     DTOPW           . TEST FOR NEW OPER WORD
                006374  006424
2331.                                   D701  .                            ENTRY POINT FOR LEGEND OUTPUT
2332.           006375  216 00 00                JLM     SCOT            . R12=FIRST,R13=LAST
                006376  007626
2333.           006377  203 10 00       D777     J       *DEXEC          . RETURN
                006400  006121
2334.           006401  000377          LOW010   0377                    . WORD WITH LOWER 010 BITS SET
2335.           006402  000004          SXINC1   + 04                    .
2336.           006403  000010          SXINC2   + 010                   .
2337.           006404  000000          SXST1    0
2338.           006405  004000          SXST2    04000                   . XSTART AT 1/2 FULL SCREEN
2339.           006406                           EVEN
2340.           006406                  DABFL    RES 2                   . DAR FIRST AND LAST ADDRS
2341.           006410  000000          DLGFLG   0                       . LEGEND REQUEST FLAG
```

```
SOFTWARE SYSTEM, KWH III, VERSION 8-0

2342.                                                          . SET=REQ DOWN
2343.                                                          . ZERO=REQ UP
2344.                                  . ***************************************************************************
2345.     006411  000000               CDSOB    + 0                  . CLEAN DSOB
2346.     006412  006 14 00                     LK      R12,B4AD
          006413  016230
2347.     006414  006 15 00                     LK      R13,B5AD
          006415  017214
2348.     006416  100 05 05                     SUR     R5,R5        .
2349.     006417  065 05 14            CDSOB1   SXI     R5,R12       .
2350.     006420  120 14 15                     CR      R12,R13
2351.     006421  235 376                       LJLS    CDSOB1
2352.     006422  203 10 00                     J       *CDSOB
          006423  006411
2353.                                  . ***************************************************************************
2354.     006424  000000               DTOPW    + 0                  . TEST FOR NEW OPER WORD
2355.     006425  007 00 00            DCWB     L       R0,DCWB7     . GET CNTR
          006426  006473
2356.     006427  222 00 00                     JZ      R0,DCWB2     . OK , GO AHEAD
          006430  006436
2357.     006431  010 00 11                     DROR    R0
2358.     006432  047 00 00                     S       R0,DCWB7     . COUNT DOWN 010 LINE
          006433  006473
2359.     006434  202 10 00                     J       DTOP10       . EXIT
          006435  006470
2360.     006436  007 02 00            DCWB2    L       R2,CFLAG1
          006437  005027
2361.     006440  034 02 14                     CBR     R2,014       .
2362.     006441  221 027                       LJE     DTOP10       .
2363.     006442  030 02 14                     ZBR     R2,014       . CLEAR BIT 014
2364.     006443  047 02 00                     S       R2,CFLAG1
          006444  005027
2365.     006445  006 00 00                     LK      R0,014       . LOAD COUNTER WITH NO FOR LINES TO WAIT
          006446  000014
2366.                                                                . AFTER EACH OPER WORD OUTPUT
2367.     006447  047 00 00                     S       R0,DCWB7
          006450  006473
2368.     006451  007 16 00                     L       R14,DIXD     . GET OPER WORD
          006452  004660
2369.     006453  053 14 00                     SD      R12,DABFL
          006454  006406
2370.     006455  007 14 00                     L       R12,DOPWX
          006456  006472
2371.     006457  007 15 00                     L       R13,YVAL
          006460  007001
2372.     006461  007 17 00                     L       R15,DABFL+1
          006462  006407
2373.     006463  216 00 00                     JLM     D4C
          006464  006651
2374.     006465  007 14 00                     L       R12,DABFL
          006466  006406
2375.     006467  004 15 17                     LR      R13,R15
2376.     006470  203 10 00            DTOP10   J       *DTOPW       . RETURN
          006471  006424
2377.     006472  000020               DOPWX    020                  . X COORD OF OPER WORD
2378.     006473  000000               DCWB7    0                    . COUNTER
2379.     006474  000000               D4C      *0                   . DRAW ONE CHARACTER
```

SOFTWARE SYSTEM, KWH III, VERSION 8-0

```
006475  057 14 17          SM    R12,CDAT,R15   . BY STORING NEC. DATA
006476  006604
                                                . R12=X0  UPPER LEFT
                                                . R13=Y0   CORNER OF CHARACTER
006477  004 00 16          LR    R0,R14         . R14=N IN OCTAL
006500  062 00 00          ALS   R0,1           . R15=FIRST OUTPUT BUF ADDR
006501  000001
006502  110 00 16          AR    R0,R14         . FIND ADDR
                                                . R0=3N
006503  112 00 00          AK    R0,CTAB        . IN CHAR TABLE           TKR
006504  006613
006505  025 02 00          LXI   R2,R0
006506  025 03 00          LXI   R3,R0          . CHAR BIT PATTERN
006507  025 04 00          LXI   R4,R0          . IN R2,R3,R4
006510  100 05 05          SUR   R5,R5          . CLR WORD CNTR
006511  006 06 00          LK    R6,03          . SET WORD COUNT
006512  000003
006513  007 07 00          L     R7,CXINC       . CHARACTER X INCREMENT
006514  006610
006515  007 10 00          L     R8,CYINC       .           Y
006516  006611
006517  007 12 00          L     R10,HIBIT      . Y INDICATOR
006520  006612
006521  065 14 17    DC4   SXI   R12,R15        . STORE X
006522  100 00 00          SUR   R0,R0          . CLR BIT CNTR
006523  006 01 00          LK    R1,010         . SET BIT COUNT
006524  000010
006525  232 02 00    DC6   JP    R2,DC10        . NON-STORE
006526  006532
006527  004 11 15          LR    R9,R13         . GET Y
006530  144 11 12          ORR   R9,R10         . MAKE NEGATIVE
006531  065 11 17          SXI   R9,R15         . STORE Y
006532  100 15 10    DC10  SUR   R13,R8         . DECREMENT Y
006533  062 02 00          ALS   R2,1           . GET NEXT BIT
006534  000001
006535  010 00 10          IROR  R0
006536  120 00 01          CR    R0,R1          . DONE FIRST 8
006537  235 366            LJLS  DC6            . NO
006540  007 15 00          L     R13,YTOP
006541  007361
006542  144 15 12          ORR   R13,R10        . MAKE Y FORMAT
006543  065 15 17          SXI   R13,R15
006544  007 15 00          L     R13,CDAT+1     . RESET Y
006545  006605
006546  110 14 07          AR    R12,R7         . INCREMENT X
006547  065 14 17          SXI   R12,R15        . STORE X
006550  100 00 00          SUR   R0,R0          . CLR BIT CNTR
006551  232 02 00    DC16  JP    R2,DC20        . NON-STORE
006552  006556
006553  004 11 15          LR    R9,R13         . GET Y
006554  144 11 12          ORR   R9,R10         . MAKE NEGATIVE
006555  065 11 17          SXI   R9,R15         . STORE Y
006556  100 15 10    DC20  SUR   R13,R8         . DECREMENT Y
006557  062 02 00          ALS   R2,1           . GET NEXT BIT
006560  000001
006561  010 00 10          IROR  R0
006562  120 00 01          CR    R0,R1          . DONE SECOND 8
```

```
SOFTWARE SYSTEM, KWH III, VERSION 8-0

006563  235 366                LJLS   DC16          . NO
006564  007 15 00              L      R13,YTOP
006565  007361
006566  144 15 12              ORR    R13,R10       . MAKE Y FORMAT
006567  065 15 17              SXI    R13,R15
006570  007 15 00              L      R13,CDAT+1    . RESET Y
006571  006605
006572  004 02 03              LR     R2,R3         . MOVE
006573  004 03 04              LR     R3,R4         .  UP
006574  010 05 10              IROR   R5
006575  110 14 07              AR     R12,R7        . INCREMENT X
006576  120 05 06              CR     R5,R6         . DONE 3 WORDS
006577  235 322                LJLS   DC4           . NO
006600  007 15 00              L      R13,CDAT+1    . RESET Y
006601  006605
                                                    . R12=X0   UPPER LEFT
                                                    . R13=Y0   OF NEXT CHAR
006602  203 10 00              J      *DOC
006603  005474
006604                 CDAT    RES 4                .
006610  000010         CXINC   010
006611  000011         CYINC   011                  . CHAR Y INCREMENT
006612  100000         HIBIT   .0100000
                       . ************************************************************
                                                    . TABLE OF BIT PATTERNS
006613  076 101        CTAB    0076,0101            . 0
006614  101 101                0101,0101
006615  076 000                0076,0000
006616  000 041                0000,0041            . 1
006617  177 001                0177,0001
006620  000 000                0000,0000
006621  041 103                0041,0103            . 2
006622  105 111                0105,0111
006623  061 000                0061,0000
006624  042 101                0042,0101            . 3
006625  111 111                0111,0111
006626  066 000                0066,0000
006627  170 010                0170,0010            . 4
006630  010 177                0010,0177
006631  010 000                0010,0000
006632  172 111                0172,0111            . 5
006633  111 111                0111,0111
006634  106 000                0106,0000
006635  076 111                0076,0111            . 6
006636  111 111                0111,0111
006637  006 000                0006,0000
006640  103 104                0103,0104            . 7
006641  110 120                0110,0120
006642  140 000                0140,0000
006643  066 111                0066,0111            . 8
006644  111 111                0111,0111
006645  066 000                0066,0000
006646  060 111                0060,0111            . 9
006647  111 111                0111,0111
006650  076 000                0076,0000
                       . ************************************************************
006651  000000         D4C     *0                   . DRAW FOUR CHAR SET
```

```
SOFTWARE SYSTEM, KWH III, VERSION 8-0

006652  057 14 17          SM     R12,D4TAB,R15   . R12=X0  UP L H START
006653  006676
                                                  . R13=Y0  COORDINATES
                                                  . R14=4 CHAR SET
                                                  . R15=BUFLOC FIRST AVAILABLE
006654  004 03 16          LR     R3,R14          . GET CHARS IN R3
006655  100 00 00          SUR    R0,R0           . CLR CHAR CNTR
006656  006 01 00          LK     R1,4            . LOAD COUNT
006657  000004
006660  100 02 02   D4C1   SUR    R2,R2           . CLEAR ONE CHAR HOLDING WORD
006661  070 02 01          ALDR   R2,R1           . GET ONE CHAR IN R2
006662  004 16 02          LR     R14,R2          . NOW TO R14
006663  057 00 03          SM     R0,D4TEMP,R3    . SAVE OTHERS
006664  006702
006665  216 00 00          JLM    DOC             . DRAW ONE CHAR      R
006666  006474
006667  017 00 03          LM     R0,D4TEMP,R3    . RESTORE OTHERS
006670  006702
006671  010 00 10          IROR   R0              . INCR CNTR          R
006672  120 00 01          CR     R0,R1           . DONE
006673  235 365            LJLS   D4C1            . NO
                                                  . R12,R13=X0,Y0 FOR NEXT CHAR
                                                  . R15= LAST ADDR USED +1
006674  203 10 00          J      *D4C
006675  006651
006676              D4TAB  RES 4
006702              D4TEMP RES 4
* ****************************************************************************
                                                  . R12=CF
                                                  . R13=RW OR B
                                                  . R14=N=TKR NO
006706  000000      T110   *0                     . TRACKER TRACE GENERATOR
006707  057 00 17          SM     R0,TTAB,R15     .
006710  006755
006711  046 15 00          ARS    R13,1           . B/2
006712  000001
006713  100 14 15          SUR    R12,R13         . LH END OF TRACER
006714  047 14 00          S      R12,TRXST
006715  006775
006716  007 01 00          L      R1,XINC         .
006717  006777
006720  130 00 14          MR     R0,R12          . POS IN SPEC WRT F0
006721  113 01 00          A      R1,XSTART
006722  006776
006723  004 14 01          LR     R12,R1          . X0
006724  007 15 00          L      R13,YVAL        . Y0
006725  007001
006726  007 17 00          L      R15,BUFLOC      .
006727  007434
006730  216 00 00          JLM    DOC             . DRAW TKR NO
006731  006474
006732  047 17 00          S      R15,BUFLOC
006733  007434
006734  006 04 00          LK     R4,B4AD         .
006735  016230
006736  113 04 00          A      R4,TRXST
006737  006775
```

SOFTWARE SYSTEM, KWH III, VERSION 8-0

```
2516.   006740  004 05 04            LR     R5,R4
2517.   006741  113 05 00            A      R5,TTAB+13       .
        006742  006772
2518.   006743  007 00 00            L      R6,STO
        006744  006117
2519.   006745  010 00 10            IROR   R0               . 0100001
2520.   006746  005 00 04   TT20     SXI    R0,R4
2521.   006747  120 04 05            CR     R4,R5            . DONE N
2522.   006750  235 376              LJLS   TT20             . NO
2523.   006751  017 00 17            LM     R0,TTAB,R15
        006752  006755
2524.   006753  203 10 00            J      *TT10
        006754  006706
2525.   006755              TTAB     RES    16
2526.   006775  000000      TRXST    0
2527.   006776  000000      XSTART   0
2528.   006777  000010      XINC     010
2529.   007000  000010      YINC     010
2530.   007001  007400      YVAL     07400                   . INITIALLY =(YTOP)
2531.                       . ************************************************************
2532.   007002  000000      SPWR     + 0                     . SPECTRUM POWER COMP
2533.   007003  057 00 17   SP0      SM     R0,RSAV,R15      . SAVE REG
        007004  004775
2534.                                                        . R12= FIRST = BINPT
2535.                                                        . R13=LASTT
2536.                                                        . R14=RUF1=B1AD
2537.   007005  100 04 04            SUR    R4,R4            . CLEAR UPPER
2538.   007006  007 05 00            L      R5,CMAX          . MAX ALLOWED
        007007  007107
2539.   007010  100 06 06            SUR    R6,R6            . CLR CLIP COUNTER
2540.   007011  010 15 10            IROR   R13
2541.   007012  104 02 02            SUDR   R2,R2            . CLR ACCUM
2542.   007013  025 01 14   SP10     LXI    R1,R12           . XSUBI
2543.   007014  130 00 01            MR     R0,R1            . X SQRD
2544.   007015  056 00 40            ARD    R0,02            . SHIFT DOWN
        007016  000002
2545.   007017  124 00 04            CDR    R0,R4            . XSUBI SQD CF CMAX
2546.   007020  235 004              LJLS   SP11             . LT CMAX
2547.   007021  007 01 00            L      R1,R5            . USE CMAX
        007022  000005
2548.   007023  010 06 10            IROR   R6               . COUNT CLIPS
2549.   007024  005 01 16   SP11     SXI    R1,R14           . MOVE TO RUF1
2550.   007025  114 02 00            ADR    R2,R0            . DBL SUM
2551.   007026  120 14 15            CR     R12,R13          . DONE
2552.   007027  235 364              LJLS   SP10             . NO
2553.   007030  047 06 00            S      R6,CLIPS         . SAVE CLIP COUNT
        007031  007110
2554.   007032  056 02 00            ARD    R2,011           . R2= SPEC AVE PWR
        007033  000011
2555.   007034  053 02 00            SD     R2,AVPR          .
        007035  007104
2556.   007036  100 05 05            SUR    R5,R5            . CLEAR R5
2557.   007037  104 00 00            SUDR   R0,R0            . CLR DBL
2558.   007040  006 01 00            LK     R1,1
        007041  000001
2559.   007042  124 00 02   CK10     CDR    R0,R2              COMPARE DBL
2560.   007043  231 005              LJGE   CH20             .
```

SOFTWARE SYSTEM, KWH III, VERSION 8-0

```
2561.   007044  072 00 00           ALD    R0,1             .
        007045  000001
2562.   007046  010 05 10           IROR   R5               . COUNT IN R5
2563.   007047  201 373             LJ     CK10             . LOOP
2564.   007050  007 00 00   CH20    L      R0,APEXP         . EXP OF DES AVE
        007051  007106
2565.   007052  100 00 05           SUR    R0,R5            . CF ACT PWR
2566.   007053  236 00 00           JN     R0,CK32          . EXIT
        007054  007100
2567.   007055  004 04 00           LR     R4,R0            . SCALE FACTOR IN R4
2568.   007056  017 14 17           LM     R12,RSAV+12,R15. RESTORE         R4
        007057  005011
2569.   007060  010 15 10           IROR   R13
2570.   007061  100 15 14           SUR    R13,R12,
2571.   007062  004 14 16           LR     R12,R14
2572.   007063  110 15 14           AR     R13,R12
2573.   007064  100 02 02           SUR    R2,R2
2574.   007065  007 03 00           L      R3,CMAX
        007066  007107
2575.   007067  100 00 00   CK20    SUR    R0,R0            . CLR UPPER
2576.   007070  005 01 14           LI     R1,R12           .
2577.   007071  070 00 04           ALDR   R0,R4            . SHIFT UP
2578.   007072  124 00 02           CDR    R0,R2            .
2579.   007073  255 002             LJLS   CK21
2580.   007074  004 01 03           LR     R1,R3            . USE XMAX
2581.   007075  065 01 14   CK21    SXI    R1,R12           .
2582.   007076  120 14 15           CR     R12,R13          . DONE
2583.   007077  255 370             LJLS   CK20             . NO
2584.   007100  017 00 17   CK32    LM     R0,RSAV,R15      . RESTORE
        007101  004775
2585.   007102  203 10 00           J      *SPWR            . RETURN
        007103  007602
2586.   007104                      EVEN
2587.   007104              AVPR    RES 2                   . AVERAGE POWER DBL
2588.   007106  000003      APEXP   03                      . MIN AVE PWR ALLOWED
2589.   007107  070000      CMAX    + 07000)
2590.   007110  000000      CLIPS   0                       . CLIP COUNTER
2591.                        . ****************************************************
2592.   007111  000000      PKDISP  + 0                     . PACK SOR FOR DISPLAY
2593.                                                       . R12=FIRSTFOR DISPLAY
2594.                                                       . R13=LAST     DISPLAY
2595.                                                       . R14=OUTPUT BASE    Y
2596.   007112  007 01 00           L      R1,HIBIT         . HIBIT IS YIND
        007113  006612
2597.   007114  007 00 00           L      R0,YVAL          . GET Y POSITION
        007115  007001
2598.   007116  144 00 01           ORR    R0,R1            . STORE Y POSITON
2599.   007117  065 00 16           SXI    R0,R14
2600.   007120  007 03 00           L      R3,XINC          . R3=XINC
        007121  006777
2601.   007122  007 01 00           L      R1,XSTART        . XSTART = 0 OR 1/2 FULL SCREEN
        007123  006776
2602.   007124  025 00 14   PK10    LXI    R0,R12           . XSUBI
2603.   007125  062 00 00           ALS    R0,01            . SHIFT OFF TKR INDICATOR BIT
        007126  000001
2604.   007127  242 00 00           JZ     R0,PK11          . OMIT ZEROS
        007130  007135
```

SOFTWARE SYSTEM, KWH III, VERSION 8-0

```
007131  065 01 16                SXI     R1,R14
007132  122 16 00                CK      R14,017777     .
007133  017777
007134  231 004                  LJGE    PK12           .
007135  110 01 03       PK11     AR      R1,R3          . UPDATE XVALUE
007136  120 14 15                CR      R12,R13        . DONE
007137  235 365                  LJLS    PK10
007140  010 16 11       PK12     DROR    R14            .
007141  004 15 16                LR      R13,R14        . NOW IN R13          ALUF
007142  203 10 00                J       *P DISP        . RETURN, R13=LAST ADDR USED
007143  007111

                        . ***************************************************
007144  000000          DVERT    *0                     . DRAW VERTICAL LINE,R15=BUFLOC
007145  065 14 17                SXI      R12,R15       . R12=X0,R13=Y0,R14=YSTOP
007146  007 00 00                L       R0,LYINC
007147  007177
007150  007 01 00                L       R1,LYIND       . GET Y WORD INDICATOR
007151  007200
007152  144 01 15       DV10     ORR      R1,R13        . MAKE NEG
007153  065 01 17                SXI      R1,R15        . STORE YS
007154  110 15 00                AR       R13,R0        . ADD Y INCR
007155  120 15 16                CR       R13,R14       . DONE
007156  235 374                  LJLS     DV10          . NO
007157  203 10 00                J        *DVERT        . EXIT
007160  007144
007161  000000          DHORZ    *0                     .DRAW HORIZONTAL LINE
007162  007 00 00                L        R0,LYIND      .R12=X0,R13=Y0,R14=XSTOP
007163  007200
007164  144 00 15                ORR      R0,R13        .R15=BUFLOC
007165  055 00 17                SXI      R0,R15        .STORE YO
007166  007 00 00                L       R0,LXINC
007167  007176
007170  065 14 17       DH10     SXI      R12,R16       . STORE XS
007171  110 14 00                AR       R12,R0        . ADD X INCR
007172  120 14 16                CR       R12,R14       . DONE
007173  235 375                  LJLS     DH10          . NO
007174  203 10 00                J        *DHORZ        . EXIT
007175  007161
007176  000020          LXINC     020                   . LINE DRAWING XINC
007177  000010          LYINC    010                    . INCREMENTS
007200  100000          LYIND    0100000                . Y OUTPUT IND
                        . ***************************************************
007201  000000          POFL     + 0                    . ADJUSTS INPUT IF PROGRAM
007202  057 00 17                SM      R0,R5AV,R15    . OVERFLOW HAS OCURRED
007203  004775
007204  167 00 00                BF      POFLG          .
007205  005036
007206  221 014                  LJE     P30            .
007207  006 14 00                LK      R12,R1AD
007210  013274
007211  006 15 00                LK      R13,R2AD
007212  014260
007213  007 01 00                L       R1,POSF        . SCALE ADJUSTMENT
007214  007236
007215  005 00 14       P10      LI      R0,R12         .
007216  044 00 01                ARSR    R0,R1          . SHIFT DOWN
007217  065 00 14                SXI     R0,R12         .
```

```
SOFTWARE SYSTEM, KWH III, VERSION 8-0

2649.    007220  120 14 15          CR     R12,R13
2650.    007221  235 374            LJLS   P13
2651.    007222  017 00 17   P30    LM     R0,R5AV,R15
         007223  004775
2652.    007224  077 00 00          SZ     POFLG         .
         007225  005036
2653.    007226  203 10 00          J      *POFL         . RETURN
         007227  007201
2654.    007230  000001      POSF   01                   . SCALE DOWN FACTOR
2655.    007231  000000      DB1AD  +0                   . DISPLAY CONTENTS OF BUF1
2656.    007232  006 14 00          LK     R12,B1AD
         007233  013274
2657.    007234  006 15 00          LK     R13,B2AD
         007235  014260
2658.    007236  010 15 11          DROR   R13
2659.    007237  006 16 00          LK     R14,B4AD
         007240  016230
2660.    007241  100 17 17          SUR    R15,R15       . NOT TKR
2661.    007242  216 00 00          JLM    TH7           . THRESHOLD
         007243  005615
2662.    007244  203 10 00          J      *DB1AD        . RETURN
         007245  007231
2663.    007246  000000      DSOB   .+ 0                 . DISPLAY SPEC OUTPUT BUFFER
2664.                                                    . NO INPUT PAR
2665.    007247  006 14 00          LK     R12,B4AD      . FIRST
         007250  016230
2666.    007251  006 15 00          LK     R13,B5AD
         007252  017214
2667.    007253  010 15 11          DROR   R13           . LAST
2668.    007254  006 16 00          LK     R14,B5AD
         007255  017214
2669.    007256  216 00 00          JLM    FKDISP        . RETURNS WITH R13=LAST ADDR USED
         007257  007111
2670.    007260  006 14 00          LK     R12,B5AD
         007261  017214
2671.    007262  047 15 00          S      R13,BUFLOC    . LAST USED , NEXT TO USE
         007263  007434
2672.    007264  203 10 00          J      *DSOB         . RETURN
         007265  007246
2673.                                                    . SYSTEM PARAMETERS
2674.    007266  000000      SBW    0                    . SYSTEM BANDWIDTH
2675.    007267  000000      OPWORD 0                    . LAST OPER INPUT
2676.    007270                     EVEN                 . SYSTEM CLOCK,ELAPSED
2677.    007270  000000             0                    . FROM DEP FROM ----
2678.    007271  000000      FS10   + 0                  . PUT FREQ SCALE IN SOB
2679.    007272  007 05 00          L      R5,FSIN       . F SCALE INCREMENT=500=620CT
         007273  007311
2680.    007274  007 00 00          L      R0,FSOT       . TKR TYPE OUTPUT CODE
         007275  007312
2681.    007276  006 14 00          LK     R12,B4AD      . SPEC OUTPUT
         007277  016230
2682.    007300  006 15 00          LK     R13,B5AD      . BUFFER LIMITS
         007301  017214
2683.    007302  010 15 10          IROR   R13
2684.    007303  045 00 14   FS20   SI     R0,R12        .
2685.    007304  110 14 05          AR     R12,R5
2686.                                                    . ADD SCALE INCR
```

```
SOFTWARE SYSTEM, KWH III, VERSION 8-0

2687.   007305  120 14 15            CR     R12,R13        . DONE
2688.   007306  235 375              LJLS   FS20           . NO
2689.   007307  203 10 00            J      *FS10
        007310  007271
2690.   007311  000062        FSIN   062
2691.   007312  100001        FSOT   0100001
2692.   007313  000000        DLEG   *0                    . DRAW HEADING ON TOP
2693.   007314  100 14 14            SUR    R12,R12        . OF SCREEN,CLR R12
2694.   007315  007 15 00            L      R13,YTOP       . X,Y=0,YTOP
        007316  007361
2695.   007317  006 17 00            LK     R15,B4AD       . START LEGEND OUTPUT AT DSOB
        007320  016230
2696.   007321  007 16 00            L      R14,XMAX
        007322  007362
2697.   007323  216 00 00            JLM    CHORZ          . DRAW HORZ LINE
        007324  007161
2698.   007325  007 14 00            L      R12,CORDX1     . POSITION X,Y OF
        007326  007355
2699.   007327  007 15 00            L      R13,CORDY1     . SYSTEM
        007330  007356
2700.   007331  007 16 00            L      R14,SBW        . SYS BANDWIDTH SETTING
        007332  007266
2701.                                                      . R15=BUFLOC
2702.   007333  216 00 00            JLM    D4C            . DRAW AND OUTPUT
        007334  006651
2703.   007335  216 00 00            JLM    DSCLK          . DRAWIN SYSTEM CLOCK
        007336  007440
2704.   007337  007 14 00            L      R12,CORDX3     . X,Y POSITION
        007340  007357
2705.   007341  007 15 00            L      R13,CORDY3     . OF
        007342  007360
2706.   007343  007 16 00            L      R14,DIXD       . LAST OPER INPUT WORD
        007344  004660
2707.                                                      . R15=BUFLOC
2708.   007345  216 00 00            JLM    D4G            . DRAW AND OUTPUT
        007346  006651
2709.   007347  006 14 00            LK     R12,B4AD       . FIRST LEGEND OUTPUT
        007350  016230
2710.   007351  004 15 17            LR     R13,R15        . R15=BUFLOC=LAST +1
2711.   007352  010 17 11            DROR   R15            . NOW = LAST
2712.   007353  203 10 00            J      *DLEG          . RETURN
        007354  007313
2713.   007355  001000        CORDX1 01000                 . SBW
2714.   007356  007600        CORDY1 07600                 . POSITION
2715.   007357  006000        CORDX3 06000                 . OPWD
2716.   007360  007600        CORDY3 07600                 . POSITION
2717.   007361  007400        YTOP   07400
2718.   007362  007777        XMAX   07777
2719.   007363  000000        D1MM   *0                    . DRAW ONE MINUTE
2720.   007364  007 14 00            L      R12,XSTART     . MARK
        007365  006776
2721.   007366  007 15 00            L      R13,YBEG
        007367  007433
2722.   007370  007 01 00            L      R1,LXINC
        007371  007176
2723.   007372  006 02 00            LK     R2,10          . DETERMINES LENGTH
        007373  000012
```

```
SOFTWARE SYSTEM. KWH III. VERSION 8-0

2724.          007374  130 00 02            MR    R0,R2
2725.          007375  110 01 14            AR    R1,R12
2726.          007376  004 16 01            LR    R14,R1
2727.          007377  007 17 00            L     R15,BUFLOC
               007400  007434
2728.          007401  216 00 00            JLM   CHORZ
               007402  007161
2729.          007403  047 17 00            S     R15,BUFLOC
               007404  007434
2730.          007405  203 10 00            J     *D1MM
               007406  007363
2731.          007407  000000      D5MM     *0                   . DRAW 5 MINUTE
2732.          007410  007 14 00            L     R12,XSTART     . MARK
               007411  006776
2733.          007412  007 15 00            L     R13,YBEG
               007413  007433
2734.          007414  007 01 00            L     F1,XINC
               007415  006777
2735.          007416  006 02 00            LK    R2,20          . DETERMINES LENGTH
               007417  000024
2736.          007420  130 00 02            MR    R0,R2
2737.          007421  110 01 14            AR    R1,R12
2738.          007422  004 16 01            LR    R14,R1
2739.          007423  007 17 00            L     R15,BUFLOC
               007424  007434
2740.          007425  216 00 00            JLM   DHORZ
               007426  007161
2741.          007427  047 17 00            S     R15,BUFLOC
               007430  007434
2742.          007431  203 10 00            J     *D5MM
               007432  007407
2743.          007433  000000      YBEG     0
2744.          007434  000000      BUFLOC   0
2745.          007435  000030      CLKST    030                  . ONE SEC STARTER
2746.          007436                       EVEN
2747.          007436  000000      SCLOCK   +0                   . PICTURE
2748.          007437  000000               +0                   . COUNTER
2749.                              . ************************************************************
2750.          007440  000000      DSCLK    *0                   . DRAW SYSTEM CLOCK
2751.                                                            . R15= LAST ADDR USED +1
2752.          007441  013 00 00            LD    R0,SCLOCK      . IN 12 OCTAL DIGITS
               007442  007436
2753.          007443  104 02 02            SUDR  R2,R2
2754.          007444  010 03 10            IROR  R3
2755.          007445  114 00 02            ADR   R0,R2          . INCREMENT PICTURE COUNTER
2756.          007446  053 00 00            SD    R0,SCLOCK
               007447  007436
2757.          007450  007 06 00            L     R6,MASK12      . LOWER 12 BITS
               007451  007532
2758.          007452  216 00 00            JLM   DCSP           . GET LOWER 4
               007453  007510
2759.          007454  047 03 00            S     R3,OL4         . STORE
               007455  007533
2760.          007456  052 00 00            LRD   R0,12
               007457  000014
2761.          007460  216 00 00            JLM   DCSP           . GET MIDDLE 4
               007461  007510
```

```
SOFTWARE SYSTEM, KWH III; VERSION 8-0

2762.   007462  047 03 00           S      R3,DM4        . STORE
        007463  007534
2763.   007464  052 00 00           LHb    R0;12
        007465  000014
2764.   007466  216 00 00           JLM    DCSP          . GET UPPER 4
        007467  007510
2765.   007470  047 03 00           S      R3,DU4        . STORF
        007471  007535
2766.   007472  007 14 00           L      R12,SCX0      . X,Y POSITION FOR
        007473  007536
2767.   007474  007 15 00           L      R13,SCY0      . CLOCK READ OUT
        007475  007537
2768.   007476  007 16 00           L      R14,DM4       . MIDDLE
        007477  007534
2769.   007500  216 00 00           JLM    D4C
        007501  006651
2770.   007502  007 16 00           L      R14,DL4       . GETLOWER FOUR
        007503  007533
2771.   007504  216 00 00           JLM    D4C
        007505  006651
2772.   007506  203 10 00           J      *DSCLK        . EXIT
        007507  007440
2773.   007510  000000      DCSP    *0                   . CHANGE FROM OCTAL TO
2774.   007511  004 02 01           LR     R2,R1         . IMITATION BCD
2775.   007512  140 02 06           ANDR   R2,R6
2776.   007513  006 04 00           LK     R4,3          . DBL SH DOWN 3
        007514  000003
2777.   007515  006 05 00           LK     R5,1          . SGL SH  DOWN 1
        007516  000001
2778.   007517  050 02 04           LRDR   R2,R4
2779.   007520  040 03 05           LRSR   R3,R5
2780.   007521  050 02 04           LRDR   R2,R4
2781.   007522  040 03 05           LRSR   R3,R5
2782.   007523  050 02 04           LRDR   R2,R4
2783.   007524  040 03 05           LRSR   R3,R5
2784.   007525  050 02 04           LRDR   R2,R4
2785.   007526  040 03 05           LRSR   R3,R5
2786.   007527  203 10 00           J      *DCSP
        007530  007510
2787.   007531                      EVEN
2788.   007532  007777      MASK12  07777
2789.   007533  000000      DL4     0
2790.   007534  000000      DM4     0
2791.   007535  000000      DU4     0
2792.   007536  003000      SCX0    03000                . X,Y COORDINATES
2793.   007537  007600      SCY0    07600                . OF SYS CLOCK READ OUT
2794.                       . *********************************************************
2795.   007540  000000      TABT    + 0                  . TEST EACH TKR ACTIVITY
2796.   007541  100 04 04   TABT10  SUR    R4,R4         .
2797.   007542  100 01 01           SUR    R1,R1         .
2798.   007543  007 02 01   TABT20  L      R2,TRKF,R1    .
        007544  005042
2799.   007545  100 05 05           SUR    R5,R5
2800.                                                    . R4 WILL BE CFLAG2
2801.   007546  034 02 16           CBR    R2,016        .
2802.   007547  221 025             LJE    TABT41        .
2803.   007550  034 02 00           CBR    R2,0          .
```

SOFTWARE SYSTEM, KWH III, VERSION 8-0

```
2804.   007551  225 016              LJNE   TABT40             .
2805.   007552  034 02 01            CBR    R2,1               .
2806.   007553  225 004              LJNE   TABT30             .
2807.   007554  034 02 02            CBR    R2,2               .
2808.   007555  221 012              LJE    TABT40             .
2809.   007556  201 007              LJ     TABT26             .
2810.   007557  034 02 02   TABT30   CBR    R2,2               .
2811.   007560  221 007              LJE    TABT40             .
2812.   007561  034 02 05            CBR    R2,5               .
2813.   007562  221 005              LJE    TABT40             .
2814.   007563  030 02 01            ZBR    R2,1               .
2815.   007564  010 05 12            IRTR   R5
2816.   007565  166 00 05   TABT26   REX    TABT70,R5
        007566  007621
2817.   007567  034 02 14   TABT40   CBR    R2,014             .
2818.   007570  221 004              LJE    TABT41             .
2819.   007571  030 02 14            ZBR    R2,014             .
2820.   007572  147 04 01            OR     R4,ORTAB+010,R1
        007573  005565
2821.   007574  047 02 01   TABT41   S      R2,TRKF,R1         .
        007575  005042
2822.   007576  010 01 10            IROR   R1                 .
2823.   007577  122 01 00            CK     R1,8               .
        007600  000010
2824.   007601  235 342              LJLS   TABT20             .
2825.   007602  004 00 04   TABT50   LR     R0,R4              .
2826.   007603  047 04 00            S      R4,CFLAG2
        007604  005030
2827.   007605  007 01 00            L      R1,CFLAG3          . WITH 0-7 OF CFLAG3
        007606  005031
2828.   007607  140 00 01            ANDR   R0,R1              .
2829.   007610  062 01 00            ALS    R1,010             . UP 8
        007611  000010
2830.   007612  006 02 00            LK     R2,010             . SHIFT COUNT
        007613  000010
2831.   007614  054 00 02            ARDR   R0,R2              .
2832.   007615  047 01 00            S      R1,CFLAG3          . STORE RESULT IN CFLAG3
        007616  005031
2833.   007617  203 10 00            J      *TABT              . RETURN
        007620  007540
2834.   007621  147 04 01   TABT70   OR     R4,ORTAB,R1
        007622  005555
2835.   007623  147 04 01            OR     R4,ORTAB+010,R1
        007624  005565
2836.   007625  000017      LOWR4    00017                     . LOWER 4 BITS MASK
2837.                       . ****************************************************************
2838.   007626  000000      SCOT     + 0                       . SCOPE OUTPUT
2839.   007627  047 14 00            S      R12,SCBCW+1        . R12=FIRST DATA ADDR
        007630  007673
2840.   007631  100 15 14            SUR    R13,R12            . R13=LAST
2841.   007632  010 15 10            IROR   R13                . R13=NOP
2842.   007633  007 12 00            L      R10,SCUPR          . UPPER 4 BITS
        007634  007677
2843.   007635  144 12 15            ORR    R10,R13            . MAKE SCRCW
2844.   007636  047 12 00            S      R10,SCBCW          .
        007637  007672
2845.   007640  013 06 00            LD     R6,SICKWD
```

```
SOFTWARE SYSTEM, KWH III, VERSION 8-0

              007641  007666
2846.         007642  006 10 00          LK      R8,0140         .
              007643  000140
2847.         007644  051 06 10          SDI     R6,R8           . LOAD COM CELL
2848.         007645  007 00 00    SC10  L       R0,SCBUSY       .
              007646  005037
2849.         007647  226 00 00          JNZ     R0,SC10         . WAIT
              007650  007645
2850.         007651  164 00 00          IOCR    R0              .
2851.         007652  165 00 10    SC30  BFI     R8              . R8=0140
2852.         007653  235 377            LJLS    SC30            .
2853.         007654  203 10 00          J       *SCOT           .
              007655  007626
2854.         007656  357 01 00    SCOTCH SF     SCBUSY          . SET SCOPE BUSY FLAG
              007657  005037
2855.         007660  343 01 00          IO      R1,SCBCW        . OUTPUT DATA
              007661  007672
2856.         007662  357 00 00          ZF      SCBUSY          . CLEAR FLAG
              007663  005037
2857.         007664  354 00 00          HCR                     .
2858.         007665                     EVEN                    .
2859.         007666  346 01 02    SICKWD ICK    CHAND,SCOTCH,02
              007667  007656
2860.         007670  346 01 02    SCKWD1 ICK    CHAND,COPCH,02
              007671  007720
2861.         007672  000000       SCBCW  0                      . SCUPR, NOP
2862.         007673  000000       SCBCW1 0                      . BUFLOC
2863.         007674  100001       NOCBCW 0100001 . EF , ONE WORD
2864.         007675  000000       NOCBC1 0                      . DUMMY
2865.         007676  000000       NOCEF  0                      . NO COPY FUNCTION
2866.         007677  100000       SCUPR  0100000                .
2867.         007700  000000       COPY   + 0                    . COPY AND ERASE SCREEN
2868.         007701  013 06 00          LD      R6,SCKWD1
              007702  007670
2869.         007703  006 10 00          LK      R8,0140
              007704  000140
2870.         007705  051 06 10          SDI     R6,R8
2871.         007706  164 00 00          IOCR    R0
2872.         007707  165 00 10    COP30 BFI     R8
2873.         007710  235 377            LJLS    COP30
2874.         007711  100 00 00          SUR     R0,R0           . BEGIN 5 MSEC WAIT LOOP
2875.                                                            . MUST WAIT ON COPY UNIT
2876.         007712  010 00 10    WAIT10 IROR   R0              . COUNT BY ONE
2877.         007713  122 00 00          CK      R0,03000        . 03000  = 5 7\10
              007714  003000
2878.         007715  235 375            LJLS    WAIT10
2879.         007716  203 10 00          J       *COPY
              007717  007700
2880.         007720  357 01 00    COPCH SF      COPFLG          . SET FLAG
              007721  005040
2881.         007722  343 03 00          IO      R3,COPBCW       . COPY
              007723  007732
2882.         007724  343 03 00          IO      R3,ERSBCW
              007725  007734
2883.         007726  357 00 00          ZF      COPFLG          . CLEAR FLAG
              007727  005040
2884.         007730  354 00 00          HCR
```

```
SOFTWARE SYSTEM, KWH III, VERSION 8-0

2885.   007731                        EVEN
2886.   007732  100001       COPBCW   0100001
2887.   007733  007736                + COPEF
2888.   007734  100001       ERSBCW   0100001
2889.   007735  007737                + ERSEF
2890.   007736  000002       COPEF    02                  . COPY EF CODE
2891.   007737  000001       ERSEF    01                  . ERASE EF CODE
2892.   007740  000000       ERASE    + 0                 . ERASE ONLY, NO COPY
2893.   007741  013 06 00             LD     R6,SCKWD2
        007742  007754
2894.   007743  006 10 00             LK     R8,0140
        007744  000140
2895.   007745  051 06 10             SDI    R6,R8
2896.   007746  164 00 00             IOCR   R0
2897.   007747  165 00 10    ERA10    RFI    R8
2898.   007750  235 377               LJLS   ERA10
2899.   007751  203 10 00             J      *ERASE
        007752  007740
2900.   007753                        EVEN
2901.   007754  346 01 02    SCKWD2   ICK    CHAND,ERACH,2
        007755  007756
2902.   007756  357 01 00    ERACH    SF     ERSFLG
        007757  005041
2903.   007760  343 03 00             IO     R3,ERSBCW
        007761  007734
2904.   007762  357 00 00             ZF     ERSFLG
        007763  005041
2905.   007764  354 00 00             HCR
2906.   007765  000000       TTKR     + 0                 . TEST CFLAG 2 AND 3
2907.                                                     . FOR TKR OUTPUT OR TRACER
2908.   007766  007 02 00    TTKR10   L      R2,CFLAG3    . TRACKER OUTPUT IS DETERMINED
        007767  005031
2909.                                                     . BY BITS 10 - 17 OF CFLAG3
2910.   007770  046 02 00             ARS    R2,010       . DOWN 8D
        007771  000010
2911.   007772  100 00 00             SUR    R0,R0        . CLR TKR CNTR
2912.   007773  006 01 00             LK     R1,010       . LOAD TKR CNT
        007774  000010
2913.   007775  056 02 00    TTKR11   ARD    R2,1         . ONE BIT TO R3 BIT 15
        007776  000001
2914.   007777  232 03 00             JP     R3,TTKR14    . POS IF NO OUTPUTT 15
        010000  010031
2915.                                                     . NEG MEANS TKR(X)  HAS OUTPUT
2916.   010001  057 00 02             SM     R0,TTK70,R2  . SAVE 3 REGS             TPUT
        010002  010104
2917.                                                     . THRESHOLD AND STORE TKR(X) IN SOR
2918.   010003  006 01 00             LK     R1,TRKO
        010004  005225
2919.   010005  110 01 00             AR     R1,R0
2920.   010006  005 02 01             LI     R2,R1        . R2= ABS ADDR OF PAR BUFFER
2921.   010007  007 14 02             L      R12,QRB,R2   . TREF(X) MODIFIED
        010010  000015
2922.   010011  004 15 14             LR     R13,R12
2923.   010012  007 01 02             L      R1,QDBW,R2   . BW
        010013  000016
2924.   010014  110 15 01             AR     R13,R1
2925.   010015  010 15 11             DROR   R13
```

```
SOFTWARE SYSTEM, KWH III, VERSION 8-0

2926.      010016  006 16 00            LK     R14,R4AD
           010017  016230
2927.      010020  007 04 02            L      R4,QDB,R2
           010021  000014
2928.      010022  110 16 04            AR     R14,R4        . RELATIVE STARTING POINT IN OUTPUT BUF
2929.                                                        . OF TKR(X) IN SOB
2930.      010023  007 17 00            L      R15,STO       . R15= TKR OUTPUT CODE
           010024  006117
2931.      010025  216 00 00            JLM    TH7           . DO THRESHOLD
           010026  005615
2932.      010027  017 00 02            LM     R0,TTK70,R2   . GET BACK 3  REG
           010030  010104
2933.      010031  010 00 10   TTKR14   IROR   R0            . INCR TKR NO CNTR
2934.      010032  120 00 01            CR     R0,R1         . DONE 8D TKRS
2935.      010033  235 342              LJLS   TTKR11        . NO
2936.      010034  203 10 00            J      *TTKR         . END OF TRACKER TEST
           010035  007765
2937.                          . ***************************************************************************
2938.      010036  000000      TTRA     + 0                  . START TRACER TEST
2939.      010037  007 02 00   TTKR20   L      R2,CFLAG2     . THEST TKRS FOR TRACER
           010040  005030
2940.      010041  056 02 00            ARD    R2,010        . USE BITS 10 - 17
           010042  000010
2941.      010043  100 03 03            SUR    R3,R3         . CLR R3
2942.      010044  100 00 00            SUR    R0,R0         . TKR NO CNTR
2943.      010045  006 01 00            LK     R1,010        . NO OF TKRS
           010046  000010
2944.      010047  056 02 00   TTKR22   ARD    R2,1          . TEST BIT(X)
           010050  000001
2945.      010051  232 03 00            JP     R3,TTKR24     . BIT(X) IS ZERO
           010052  010076
2946.                                                        . BIT (X) IS ONE, DO TRACER
2947.      010053  006 04 00            LK     R4,TRKD       . ADDR TABLE            RACER
           010054  005225
2948.      010055  110 04 00            AR     R4,R0         . ADD TKR NO
2949.      010056  005 05 04            LI     R5,R4         . R5=ADDR OF DAT(X)     RACER
2950.      010057  007 15 05            L      R13,QDBW,R5   . BW
           010060  000016
2951.      010061  004 14 15            LR     R12,R13
2952.      010062  042 14 00            LRS    R12,1         . BW/2
           010063  000001
2953.      010064  007 13 05            L      R11,QDB,R5
           010065  000014
2954.      010066  110 14 13            AR     R12,R11       . RELATIVE STARTING POINT
2955.      010067  004 16 00            LR     R14,R0        . R14=TKR NO =X
2956.      010070  057 00 03            SM     R0,TTK70,R3   . SAVE 3 REGS      X)   RACER
           010071  010104
2957.      010072  216 00 00            JLM    TT10          . DRAW TRACER
           010073  006706
2958.      010074  017 00 03            LM     R0,TTK70,R3
           010075  010104
2959.      010076  010 00 10   TTKR24   IROR   R0            . INCR TKR CNTR         RACER
2960.      010077  120 00 01            CR     R0,R1         . DONE 010 TKRS         RACER
2961.      010100  235 347              LJLS   TTKR22        . NO          5         RACER
2962.      010101  203 10 00            J      *TTRA         . END TRACER TEST
           010102  010036
2963.      010103                       EVEN
```

```
SOFTWARE SYSTEM, KWH III, VERSION 8-0

2964.        010104                   TTK70    RES 4
2965.                                  * ***********************************************************
2966.        010110                   TBUF0    RES    0200          * TRK REF BUFFER 0
2967.        010310                   TBUF1    RES    0200          * TRK REF BUFFER 1
2968.        010510                   TBUF2    RES    0200          * TRK REF BUFFER 2
2969.        010710                   TBUF3    RES    0200          * TRK REF BUFFER 3
2970.        011110                   TBUF4    RES    0200          * TRK REF BUFFER 4
2971.        011310                   TBUF5    RES    0200          * TRK REF BUFFER 5
2972.        011510                   TBUF6    RES    0200          * TRK REF BUFFER 6
2973.        011710                   TBUF7    RES    0200          * TRK REF BUFFER 7
2974.        012110                   TPAR0    RES    020           * TRK PARAMETER AREA 0
2975.        012130                   TPAR1    RES    020           * TRK PARAMETER AREA 1
2976.        012150                   TPAR2    RES    020           * TRK PARAMETER AREA 2
2977.        012170                   TPAR3    RES    020           * TRK PARAMETER AREA 3
2978.        012210                   TPAR4    RES    020           * TRK PARAMETER AREA 4
2979.        012230                   TPAR5    RES    020           * TRK PARAMETER AREA 5
2980.        012250                   TPAR6    RES    020           * TRK PARAMETER AREA 6
2981.        012270                   TPAR7    RES    020           * TRK PARAMETER AREA 7
2982.        012310                   BUF0     RES    0764          * INPUT BUFFER
2983.        013274                   BUF1     RES    0764          * RAW SPECTRUM BUFFER
2984.        014260                   BUF2     RES    0764          * ALI BUFFER
2985.        015244                   B3AD     RES    0764          * ALI INITIALIZATION
2986.        016230                   SOB      RES    0764          * OUTPUT BUFFER
2987.        017214                   B5AD     RES    0400          * OUTPUT WORKER AREA
2988.                 012310          BINPT    EQU    BUF0
2989.                 014260          B2AD     EQU    BUF2
2990.                 013274          RSBUF    EQU    BUF1
2991.                 013274          B1AD     EQU    BUF1
2992.                 016230          B4AD     EQU    SOB
2993.                                          END

@CDPOUT,S    !PFS.,OUT.
FURPUR 0021-04/03-15:08
 1 SYM

@CLOSE,I    OUT
```

I claim:

1. A method in which one or more input spectra in digital form, which are formed from associated time-segments of a voltage-vs.-time representation of a real-time signal, are analyzed for persistent signal content and are converted to digital data that are representative of such persistent signal content for display upon a display system, the method comprising the steps of:

A. performing frequency analysis on each one of a series of time segments of a voltage-vs.-time representation of a real-time signal to produce, a digital power spectrum for generating a series of digital power spectra corresponding to the series of time-segments;

B. generating a preliminary estimate of regular spectral features (possibly due to signals) by integrating successive ones of said digital power spectra, as they are available after said frequency analysis, into an integrated ALI (Automatic-Line-Integrator) buffer in a digital computer using an ALI algorithm of a stored program;

C. assigning ABTs (Automatic-Band-Trackers) in said digital computer to detect, follow in frequency and enhance any lines or line-sets present in one or more of said digital power spectra, in response to an operator-request or to internal control;

D. combining the enhanced lines or line-sets from said ABTs and other sources;

E. displaying said combined enhanced lines or line-sets in an appropriate visual display.

2. The method of claim 1 in which step C includes the steps of:

C-1. interpreting operator commands

C-2. initialization an ABT module;

C-3. operating in the steady-state mode after initialization, including automatically re-assigning and re-initializating after signal loss;

C-4. controlling by the internal programs or routines that are associated with all of the steps C-1–C-3.

3. The method of claim 2 in which step C-1 includes the step of:

C-1.1. operator selecting the center-frequency and band width in the current input spectrum (and in succeeding spectra) to which an ABT will be assigned to search.

4. The method of claim 2 in which step C-2 includes the steps of:

C-2.1. setting all internal parameters of the ABT consistent with new assignment, as described above;

C-2.2. placing, and maintaining the ABT, among the other ABTs, in the currently proper order of access to each input spectrum;

C-2.3. transferring an appropriate section of the Deleted-ALI buffer to an ABT reference buffer for use as an initial reference.

5. The method of claim 2 in which step C-3 includes the steps of:

C-3.1. initializing an automatic band tracker including coupling thereto an input spectrum and suitable reference spectrum;

C-3.2. comparing said input spectrum to said reference spectrum;

C-3.3. moving said reference spectrum about an estimated center on said input spectrum;

C-3.4. determining a maximum correlation-coefficient between said input spectrum and said reference spectrum;

C-3.5. comparing said maximum correlation-coefficient to a set level;

C-3.6. determining that said maximum correlation-coefficient is above said set level indicating that said reference spectrum is contained in said input spectrum;

C-3.7. depending on whether the condition of step C-3.6 is met, updating the reference pattern by integrating the said input spectrum into the reference pattern at the position indicated by the maximum correlation-coefficient;

C-3.8. depending on whether the condition of step C-3.6 is met, deleting said first reference spectrum from said first input spectrum for forming a first deleted input spectrum;

C-3.9 updating all flags and parameters which are internal under direct control of the ABT, as described above.

6. The method of claim 2 in which step C-4 includes the steps of:

C-4.1. inputting a first one of a plurality of input spectra;

C-4.2. integrating said first input spectrum into the program automatic line integrator;

C-4.3. generating an ALI-spectrum;

C-4.4. testing to determine whether or not said ALI-spectrum is to be deleted from said first input spectrum;

C-4.5. alternatively deleting or not deleting said ALI-spectrum from said first input spectrum;

C-4.6. testing to determine whether or not a plurality of automatic band trackers are to be reordered in an ABT access table;

C-4.7. alternatively reordering or not reordering said automatic band trackers in said ABT access table;

C-4.8. setting up call parameters for each automatic band tracker in said access table;

C-4.9. calling up the automatic band tracker module for each automatic band tracker in said access table;

C-4.10. integrating a remnant spectrum generated in step C-4.9 into the automatic line integrator as in step C-4.2.

7. The method of claim 6 in which said step C-4.9 includes the steps of:

C-4.9.1. setting up internal data and parameter calls to current ABT call;

C-4.9.2. testing whether or not re-initialization of said current automatic band tracker is required by determining whether or not the cumulative detection rate is above a set level;

C-4.9.3. alternatively re-initializing or not re-initializing said current automatic band tacker as indicated by step C-4.9.2;

C-4.9.4. transferring and initializing parameters to said current automatic band tracker if required by step C-4.9.3;

C-4.9.5. transferring appropriate section of initialization-ALI to ABT-ref if required by step C-4.9.3;

C-4.9.6. computing maximum correlation coefficient between ABT-ref and current spectrum indicating current signal offset;

C-4.9.7. testing to determine whether or not a maximum correlation-coefficient is scored as detect or non-detect;

C-4.9.8. updating cumulative detection rates;

C-4.9.9. integrating current spectrum into ABT-ref at position indicated by maximum correlation-coefficient;

C-4.9.10. testing to determine whether or not both cumulative detection rate of step C-4.9.2 is above the set level and if a detect of step C-4.9.7 is scored;

C-4.9.11. deleting the reference spectrum from the current spectrum if required by step C-4.9.10;

C-4.9.12. computing the most probable center position in next input spectrum for step C-4.9.6.

8. A method of enhancing the voltage-vs.-time representations of real-time phenomena for display in a visual display system, comprising the steps of:

A. detecting real-time phenomena;

B. converting said real-time phenomena into a voltage-vs.-time representation;

C. sampling said voltage-vs.-time representation at regular and timely intervals by an analog-to-digital converter for generating a corresponding series of time-segments;

D. performing frequency analysis on said series of time-segments by a frequency analyzer for producing at regular and timely intervals a corresponding series of digital power spectra;

E. generating a preliminary estimate of regular spectral features (possibly due to signals) by integrating successive ones of said digital power spectra, as they are available from said frequency analyzer, into an integrated ALI (Automatic-Line-Integrator) buffer in a digital computer using an ALI algorithm of a stored program;

F. assigning ABTs (Automatic-Band-Trackers) in said digital computer to detect, follow in frequency and enhance any lines or line-sets present in one or more of the digital power spectra in response to an operator-request or to said stored program;

G. combining the enhanced lines or line-sets from each of said ABTs and other sources;

H. displaying said combined enhanced lines or line-sets in a CRT display system for visual analysis.

* * * * *